United States Patent [19]

Kinoshita et al.

[11] Patent Number: 4,692,393

[45] Date of Patent: Sep. 8, 1987

[54] PHOTORECEPTOR HAVING A PHOTOSENSITIVE LAYER CONTAINING AN AZO COMPOUND

[75] Inventors: Akira Kinoshita; Kazumasa Watanabe; Hiroshi Yamazaki; Naohiro Hirose, all of Hino, Japan

[73] Assignee: Konishiroku Photo Industry Co., Ltd., Tokyo, Japan

[21] Appl. No.: 791,793

[22] Filed: Oct. 28, 1985

[30] Foreign Application Priority Data

Oct. 31, 1984 [JP] Japan ............................... 59-229793

[51] Int. Cl.[4] .......................... G03G 5/06; G03G 5/14

[52] U.S. Cl. ........................................ 430/59; 430/73; 430/75; 430/76; 430/79; 534/653

[58] Field of Search ....................... 430/73, 75, 78, 79, 430/76, 59, 58

[56] References Cited

U.S. PATENT DOCUMENTS

| | | | |
|---|---|---|---|
| 4,576,886 | 3/1986 | Hirose et al. | 430/73 |
| 4,579,800 | 4/1986 | Hirose et al. | 430/73 |

*Primary Examiner*—John L. Goodrow
*Attorney, Agent, or Firm*—Jordan B. Bierman

[57] ABSTRACT

A photoreceptor comprising a support and thereon a photosensitive layer containing an azo compound.

48 Claims, 6 Drawing Figures

PHOTORECEPTOR HAVING A PHOTOSENSITIVE LAYER CONTAINING AN AZO COMPOUND

BACKGROUND OF THE INVENTION

The present invention relates to a photoreceptor, and more particularly to a novel photoreceptor having a photosensitive layer comprising a specific azo compound.

Those which have hitherto been widely used as the photoreceptor in the electrophotographic process are inorganic photoreceptors having a photosensitive layer comprised principally of an inorganic photoconductive compound such as selenium, zinc oxide, cadmium sulfide, silicon, or the like. These, however, are not necessarily satisfactory in the sensitivity, thermal stability, moisture resistance, durability, and the like. For example, selenium is difficult of manufacture because, when crystallized, its characteristics as a photoreceptor becomes deteriorated. And it tends to be crystallized due to heat or finger marks, whereby its property as the photoreceptor becomes deteriorated. Cadmium sulfide also is problematic in the moisture resistance as well as in the durability. And so is zinc oxide in the durability.

For the purpose of overcoming such disadvantages of these inorganic photoreceptors, the research and development of organic photoreceptors having photoesensitive layer comprised principally of any of various organic photoconductive compounds having become extensively carried on in recent years. For example, Japanese Patent Examined Publication No. 10496/1975 describes an organic photoreceptor having a photosensitive layer containing both poly-N-vinylcarbazole and 2,4,7-trinitro-9-fluorenone. This photoreceptor, however, is not necessarily satisfactory in the sensitivity as well as in the durability. In order to get rid of such shortcomings, attempts have been made to allot the carrier-generating function and carrier-transport function to different materials to thereby develop a higher performance-having organic photoreceptor. Such a function-separated-type photoreceptor permits a wide selection of appropriate materials for the respective functions thereof, and by using them any discretional characteristic-having photoreceptors can be relatively easily produced. Thus, many researches have been carried on for the development of photoreceptors of this type.

In the above-mentioned function-separated-type photoreceptors, as the carrier-generating substance thereof a variety of compounds have been proposed. An example of those inorganic compounds usable as the carrier-generating substance is the amorphous selenium described in, e.g., Japanese Patent Examined Publication No. 16198/1968. This is to be used in combination with an organic photoconductive compound, but the carrier-generating layer comprised of the amorphous selenium is still not improved to get rid of the disadvantage that the layer is crystallized by heat to cause its characteristic to be deteriorated.

Also, there have been many proposals for electrophotographic photoreceptors which use organic dyes or pigments as the carrier-generating substance. For example, those electrophotographic photoreceptors which contain bisazo compounds in the photosensitive layer thereof are already of the prior art found in Japanese Patent Publication Open to Public Inspection (hereinafter referred to as Japanese Patent O.P.I. Publication) Nos. 22834/1979, 73057/1980, 117151/1980 and 46237/1981. These bisazo compounds, however, are not necessarily satisfactory in the sensitivity, residual potential or stability against the repetitional use, and limits the selectable range of carrier-transport substances, and thus are unable to adequately satisfy diverse requirements in the electrophotographic process.

Further, in recent years, as the light source for the photoreceptor, gas lasers such as Ar laser, He-Ne laser, etc., and semiconductor lasers have begun to be used. These lasers are characterized by permitting their time-series ON/OFF operation, and are promising as the light source for those image-processing function-having copiers including intelligent copiers or for those output printers used for computers. Among other things, semiconductor lasers attract attention for the reason that their nature requires no electric signal/light signal conversion elements such as acoustic elements, and they enable making their devices to be of a smaller size and a lighter weight. However, not only is the semiconductor laser's output lower than that of the gas laser but also its oscillating wavelength is on the longer wavelength side (not less than about 780 nm), and in contrast, the spectral sensitivity of conventional photoreceptors is on the far shorter wavelength side than that of the semiconductor laser. Accordingly, conventional photoreceptors can not be used as the photoreceptor for which the semiconductor laser is used as the light source.

SUMMARY OF THE INVENTION

It is therefore an object of the present invention to provide a photoreceptor comprising a specific azo compound which is excellent in the carrier-generating function.

It is another object of the present invention to provide a photoreceptor which is so excellently durable that it has a high sensitivity and small residual potential and, even when used repeatedly, these characteristics are unchangeably stable.

It is a further object of the present invention to provide a photoreceptor comprising an azo compound which, even when used in combination with any of diverse carrier-transport substances, is capable of acting effectively as a carrier-generating substance.

It is still another object of the present invention to provide a photoreceptor which has an adequately substantial sensitivity even when used to a longer-wavelength light source such as a semiconductor laser.

A still further object of the present invention will become apparent from the description in this specification.

According to the invention, photoreceptors can be provided which are excellent in electrophotographic characteristics such as electric charge holding power, sensitivity, residual potential and the like; small fatigue deterioration when used repeatedly; sufficient sensitivity in the long wavelength region of not less than 780 nm by using an azo compound represented by the Formula [I] as a photoconductive substance which is a constituent of a photosensitive layer of a photoreceptor.

DETAILED DESCRIPTION OF THE INVENTION

Figure 1:
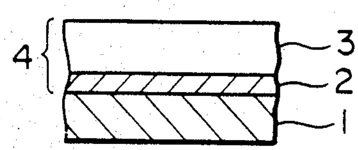
FIGS. 1 through 6 are cross-sectionaal views showing examples of the mechanical construction of the photoreceptor of the present invention.

As a result of our continued investigation to accomplish the above objects, we have now found that any one of those azo compounds having the following Formula [I] is capable of acting as an effective constituent of the photoreceptor, and thus, we have completed this invention.

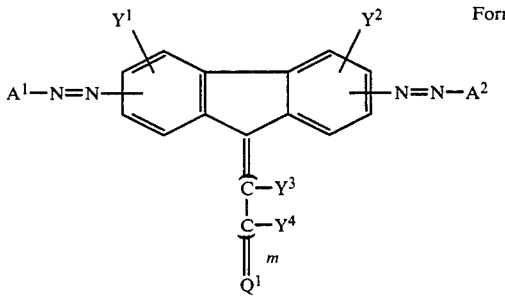

Formula [I]

wherein $Y^1$ and $Y^2$ represent hydrogen, an alkyl group preferably having one to 8 carbon atoms, an alkoxy group preferably having one to 8 carbon atoms, a halogen, a cyano group or

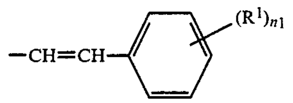

wherein $R^1$ represents hydrogen, an alkyl group preferably having one to 8 carbon atoms, an alkoxy group preferably having one to 8 carbon atoms, a halogen, a cyano group, an ester group such as acetoxy group, propionyloxy group and the like, an acyl group such as acetyl group, benzyl group and the like, a dialkyl amino group, a diarylamino group, a diaralkylamino group, or a hydroxy group; and $n_1$ represents an integer of from one to 5, provided that $R^1$ is allowed to be a different substituent in the case that $n_1$ is not less than 2;

$Y^3$ and $Y^4$ represent hydrogen, an alkyl group preferably having one to 8 carbon atoms, a halogen, a cyano group, an acyl group, an ester group, or

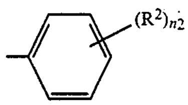

wherein $R^2$ represents hydrogen, an alkyl group preferably having one to 8 carbon atoms, an alkoxy group preferably having one to 8 carbon atoms, a halogen, a cyano group, an ester group such as acetoxy group, propionyloxy group and the like, an acyl group such as acetyl group, benzyl group and the like, a dialkylamino group, a diarylamino group, a diaralkylamino group or a hydroxy group; and $n_2$ represents an integer of from one to 5, provided that $R^2$ is allowed to be a different substituent in the case that $n_2$ is not less than 2;

$Q^1$ represents

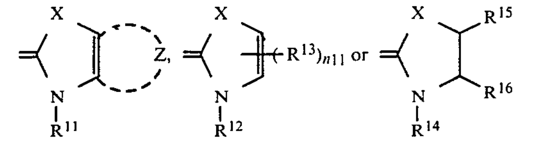

wherein Z represents a substituted or unsubstituted aromatic carbon ring or a group of atoms necessary for forming a substituted or unsubstituted aromatic heterocyclic ring, and preferably

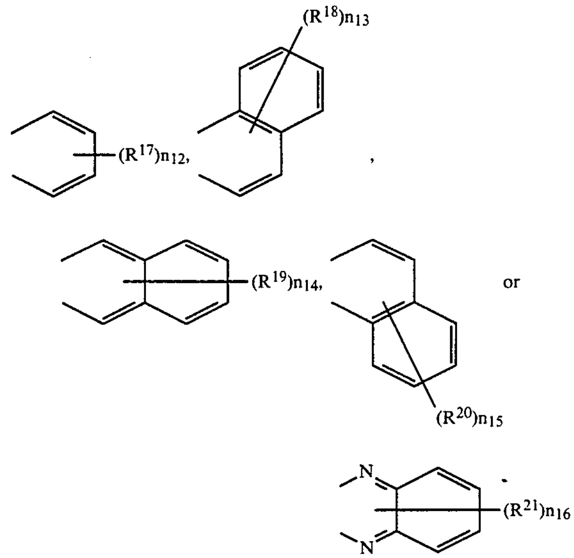

In the formulas represented by $Q^1$, $R^{11}$, $R^{12}$ and $R^{14}$ each represent hydrogen, an alkyl group preferably having one to 8 carbon atoms, an aralkyl group such as benzyl group, p-methylphenylmethyl group and the like, or

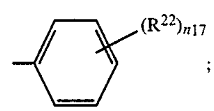

$R^{13}$, $R^{15}$, $R^{16}$, $R^{17}$, $R^{18}$, $R^{19}$, $R^{20}$, $R^{21}$ and $R^{22}$ each represent hydrogen, an alkyl group preferably having one to 8 carbon atoms, an alkoxy group preferably having one to 8 carbon atoms, a halogen, a cyano group, an ester group such as acetoxy group, propionyloxy group and the like, an acyl group such as acetyl group, benzyl group and the like, a dialkylamino group such as dimethylamino group, diethylamino group and the like, a diaralkylamino group such as dibenzylamino group and the like, a diarylamino group such as diphenylamino group and the like, a nitro group, an amino group, a hydroxy group, and an allyl group such as allyl group, 2phenylallyl group and the like;

$n_{11}$ is an integer of from one to 2; $n_{12}$ is an integer of from one to 4; $n_{13}$, $n_{14}$, and $n_{15}$ each represent an integer of from one to 6, respectively; $n_{16}$ and $n_{17}$ each represent an integer of from one to 5, respectively; provided that $R^{13}$, $R^{17}$, $R^{18}$, $R^{19}$, $R^{20}$, $R^{21}$ and $R^{22}$ are allowed to be a different substituent respectively when $n_{11}$, $n_{12}$, $n_{13}$, $n_{14}$, $n_{15}$, $n_{16}$ and $n_{17}$ each are not less than 2, respectively; and it is also allowed to form an aliphatic carbon ring or an aliphatic heterocyclic ring with $R^{15}$ and $R^{16}$, and two out of $R^{18}$, $R^{19}$, $R^{20}$ and $R^{21}$, respectively;

X represents —O—, —S—,

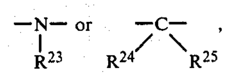

wherein $R^{23}$ represents hydrogen, an alkyl group preferably having one to 8 carbon atoms, an aralkyl group such as benzyl group, p-methylphenylmethyl group and the like, or a phenyl group capable of having a substituent, such as a phenyl group, p-methoxyphenyl group, p-chlorophenyl group, p-cyanophenyl group and the like; $R^{24}$ and $R^{25}$ represent hydrogen, an alkyl group preferably having one to 8 carbon atoms, an aralkyl group such as benzyl group, p-methylphenylmethyl group and the like, or a phenyl group capable of having a substituent;

$A^1$ and $A^2$ represent

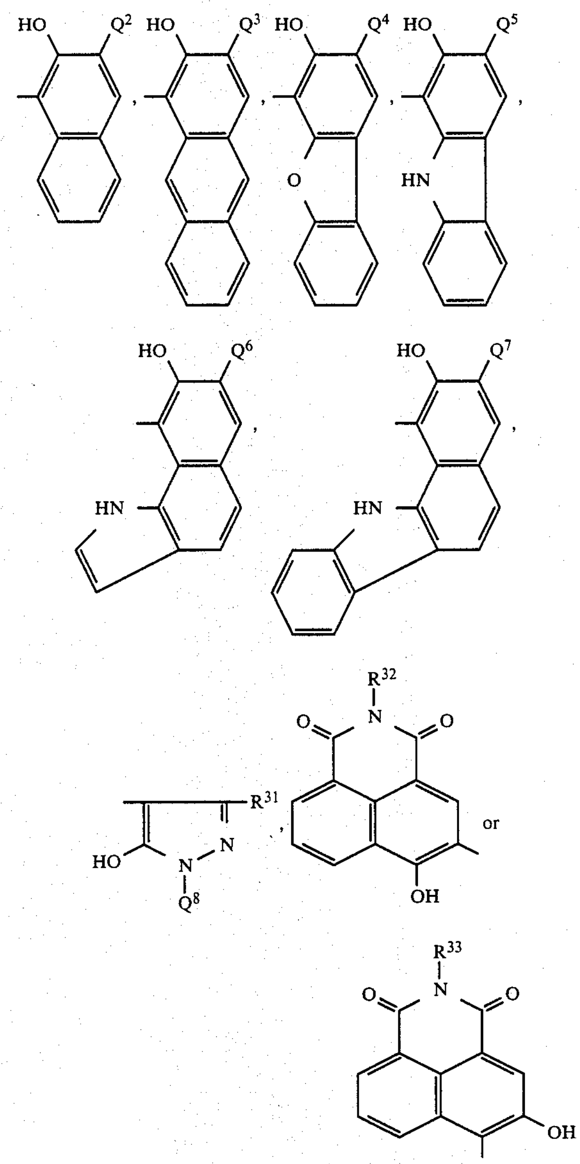

$Q^2$, $Q^3$, $Q^4$, $Q^5$, $Q^6$ and $Q^7$ each represent

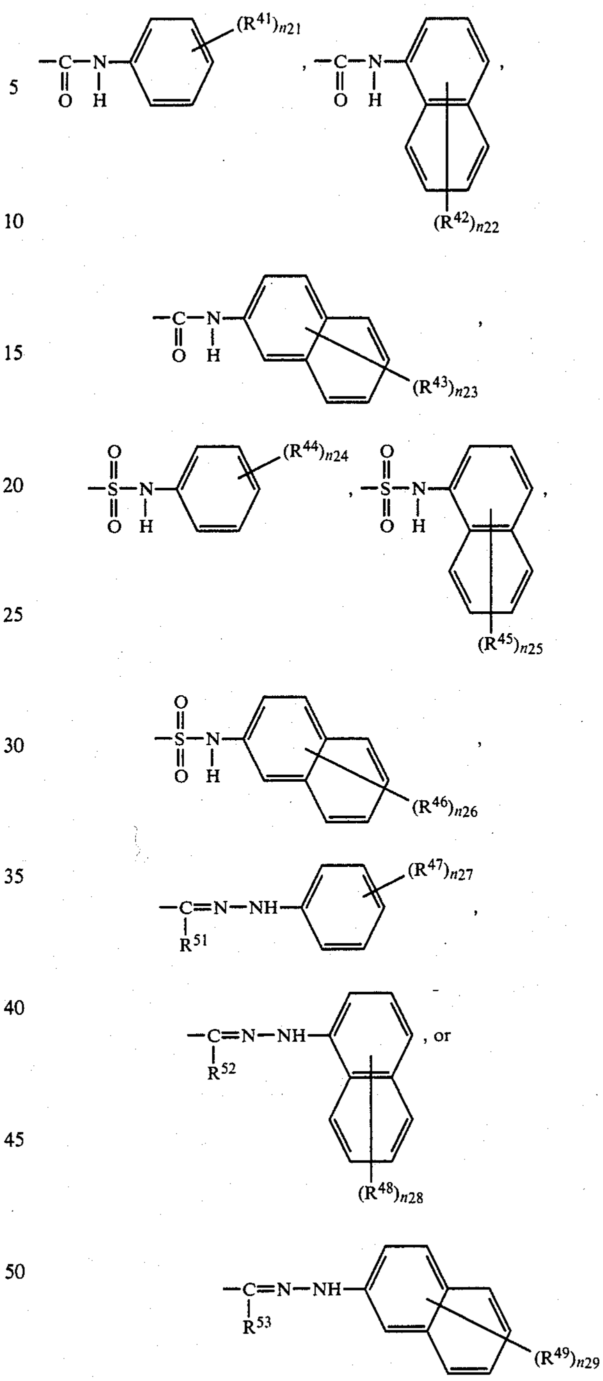

$R^{41}$, $R^{42}$, $R^{43}$, $R^{44}$, $R^{45}$, $R^{46}$, $R^{47}$, $R^{48}$ and $R^{49}$ each represent hydrogen, an alkyl group preferably having one to 8 carbon atoms, an alkoxy group preferably having one to 8 carbon atoms, a halogen, a cyano group, an ester group such as acetoxy group, propionyloxy group and the like, an acyl group such as acetyl group, benzyl group and the like, a dialkylamino group, a diaralkylamino group, diarylamino group, a hydroxy group, or a nitro group; $n_{21}$, $n_{24}$ and $n_{27}$ each are an integer of from 1 to 5, provided that $R^{41}$, $R^{44}$ and $R^{47}$ each may be a different substituent when $n_{21}$, $n_{24}$ and $n_{27}$ each are not less than 2; and $n_{22}$, $n_{23}$, $n_{25}$, $n_{26}$ and $n_{29}$ each are an integer of from one to 7, provided that $R^{42}$, $R^{43}$, $R^{45}$, $R^{46}$, $R^{48}$ and $R^{49}$ each are allowed to be a different substituent, respectively, when $n_{22}$, $n_{23}$, $n_{25}$, $n_{26}$, $n_{28}$ and $n_{29}$ each are not less than 2; and an aliphatic carbon ring or an aliphatic heterocyclic ring may be formed with two out of $R^{41}$, $R^{42}$, $R^{43}$, $R^{44}$, $R^{45}$, $R^{46}$, $R^{47}$, $R^{48}$ and $R^{49}$;

$R^{51}$, $R^{52}$ and $R^{53}$ each represent an alkyl group preferably having one to 8 carbon atoms;

$Q^8$ represents

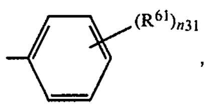

wherein $R^{61}$ represents hydrogen, an alkyl group preferably having one to 8 carbon atoms, an alkoxy group preferably having one to 8 carbon atoms, a halogen, a cyano group, an ester group such as acetoxy group, propionyloxy group and the like, an acyl group such as acetyl group, benzyl group and the like, a dialkylamino group, a diaralkylamino group, a diarylamino group or a hydroxy group, provided that $n_{31}$ is an integer of from one to 5, and $R^{61}$ is allowed to be a different substituent when $n_{31}$ is not less than 2;

$R^{31}$ represents hydrogen, an alkyl group, an amino group, a dialkylamino group, a diarylamino group, a diaralkylamino group, a carbamoyl group, a carboxyl group, and the ester group thereof, or a cyano group;

$R^{32}$ and $R^{33}$ each represent an alkyl group, an aralkyl group, or

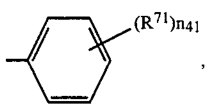

wherein $R^{71}$ represents hydrogen, an alkyl group, an alkoxy group, a halogen, a cyano group, an ester group, an acyl group, a dialkylamino group, a diaralkylamino group, a diarylamino group, or a hydroxy group; and $n_{41}$ is an integer of from one to 5, provided that $R^{71}$ is allowed to be a different substituent when $n_{41}$ is not less than 2;

m is an integer selected from the group containing of 0, 1 and 2.

The typical examples of the azo compounds represented by the abovegiven Formula [I] which are useful in the invention include the following compounds represented by the formulas of [II] to [XXXXIII], concretely the compounds of B-1 through B-1119 given below. In the formulas of [II] to [XXXXIII], $A^{11}$ to $A^{52}$ each represent aryl group which may have a substituent of alkyl group preferably having one to 8 carbon atoms, alkoxy group preferably having one to 8 carbon atoms, halogen, cyan group, ester group such as acetoxy group, propionyloxy group and the like, acyl such as acetyl group, benzyl group and the like, dialkylamino group, a diarylamino group, diaralkylamino group or hydroxy group; $R^{101}$, $R^{106}$, $R^{111}$, $R^{112}$, $R^{117}$, $R^{118}$, $R^{130}$, $R^{135}$, $R^{140}$, $R^{141}$, $R^{146}$, $R^{147}$, $R^{160}$, $R^{163}$, $R^{166}$, $R^{169}$, $R^{172}$, $R^{175}$, $R^{178}$, $R^{181}$, $R^{184}$, $R^{185}$, $R^{188}$, $R^{189}$, $R^{192}$, $R^{193}$, $R^{196}$, $R^{197}$, $R^{200}$, $R^{201}$, $R^{204}$, $R^{205}$, $R^{208}$, $R^{209}$, $R^{212}$, $R^{213}$, $R^{216}$, $R^{217}$, $R^{220}$, $R^{221}$, $R^{224}$, $R^{225}$, $R^{226}$, $R^{229}$, $R^{230}$, $R^{231}$, $R^{236}$, $R^{237}$, $R^{238}$, $R^{241}$, $R^{242}$, $R^{243}$, $R^{248}$, $R^{249}$, $R^{250}$, $R^{253}$, $R^{254}$, $R^{255}$, $R^{260}$, $R^{261}$, $R^{262}$, $R^{265}$, $R^{266}$, $R^{267}$, $R^{272}$, $R^{273}$, $R^{274}$, $R^{275}$, $R^{278}$, $R^{279}$, $R^{280}$, $R^{281}$, $R^{286}$, $R^{287}$, $R^{288}$, $R^{289}$, $R^{292}$, $R^{293}$, $R^{294}$, $R^{295}$, $R^{300}$, $R^{301}$, $R^{302}$, $R^{303}$, $R^{306}$, $R^{307}$, $R^{308}$, $R^{309}$, $R^{314}$, $R^{315}$, $R^{316}$, $R^{317}$, $R^{320}$, $R^{321}$, $R^{322}$, $R^{323}$, each represent hydrogen, an alkyl group preferably having one to 8 carbon atoms, an aralkyl group such as benzyl group; $R^{102}$, $R^{103}$, $R^{104}$, $R^{105}$, $R^{107}$, $R^{108}$, $R^{109}$, $R^{110}$, $R^{113}$, $R^{114}$, $R^{115}$, $R^{116}$, $R^{119}$, $R^{120}$, $R^{121}$, $R^{122}$, $R^{131}$, $R^{132}$, $R^{133}$, $R^{134}$, $R^{136}$, $R^{137}$, $R^{138}$, $R^{139}$, $R^{142}$, $R^{143}$, $R^{144}$, $R^{145}$, $R^{148}$, $R^{149}$, $R^{150}$, $R^{151}$, $R^{161}$, $R^{162}$, $R^{164}$, $R^{165}$, $R^{167}$, $R^{168}$, $R^{170}$, $R^{171}$, $R^{173}$, $R^{174}$, $R^{176}$, $R^{177}$, $R^{179}$, $R^{180}$, $R^{182}$, $R^{183}$, $R^{186}$, $R^{187}$, $R^{190}$, $R^{191}$, $R^{194}$, $R^{195}$, $R^{198}$, $R^{199}$, $R^{202}$, $R^{203}$, $R^{206}$, $R^{207}$, $R^{210}$, $R^{211}$, $R^{214}$, $R^{215}$, $R^{218}$, $R^{219}$, $R^{222}$, $R^{223}$, $R^{227}$, $R^{228}$, $R^{232}$, $R^{233}$, $R^{234}$, $R^{235}$, $R^{239}$, $R^{240}$, $R^{244}$, $R^{245}$, $R^{246}$, $R^{247}$, $R^{251}$, $R^{252}$, $R^{256}$, $R^{257}$, $R^{258}$, $R^{259}$, $R^{263}$, $R^{264}$, $R^{268}$, $R^{269}$, $R^{270}$, $R^{271}$, $R^{276}$, $R^{277}$, $R^{282}$, $R^{283}$, $R^{284}$, $R^{285}$, $R^{290}$, $R^{291}$, $R^{296}$, $R^{297}$, $R^{298}$, $R^{299}$, $R^{304}$, $R^{305}$, $R^{310}$, $R^{311}$, $R^{312}$, $R^{313}$, $R^{318}$, $R^{319}$, $R^{324}$, $R^{325}$, $R^{326}$, $R^{327}$, each represent hydrogen, an alkyl group preferably having one to 8 carbon atoms, an alkoxy group preferably having one to 8 carbon atoms, a halogen a cyano group an ester group such as acetoxy group, propionyloxy group and the like, an acyl group such as acetyl group, benzyl group and the like, a dialklamino group such as dimethylamino group, diethylamino group and the like, a diaralkylamino group such as dibenzylamino group and the like, a diarylamino group such as diphenylamino group and the like, a nitro group, an amino group, a hydroxy group, and an allyl group such as allyl group, 2-phenylallyl group and the like; and it is also allowed to form a carbon ring or a heterocyclic ring with neighbouring two out of above-mentioned $R^{102}$ to $R^{327}$. It is to be understood that the azo compounds of the invention shall not be limited thereto.

Compounds having the structure of Formula [II]
Formula [II]
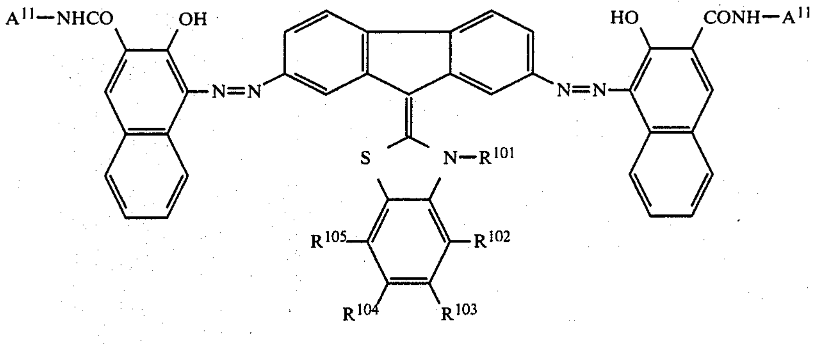
| Compound No. | $A^{11}$ | $R^{101}$ | $R^{102}$ | $R^{103}$ | $R^{104}$ | $R^{105}$ |
|---|---|---|---|---|---|---|
| B-1 | 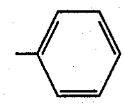 | $-CH_3$ | H | H | H | H |
| B-2 | 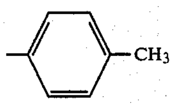 | $-CH_3$ | H | H | H | H |
| B-3 | 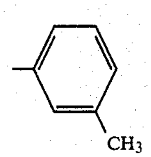 | $-CH_3$ | H | H | H | H |
| B-4 | 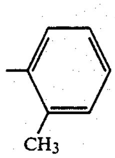 | $-CH_3$ | H | H | H | H |
| B-5 | 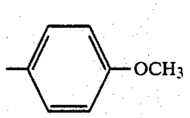 | $-CH_3$ | H | H | H | H |
| B-6 | 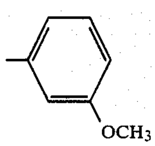 | $-CH_3$ | H | H | H | H |
| B-7 | 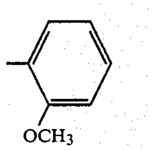 | $-CH_3$ | H | H | H | H |
| B-8 | 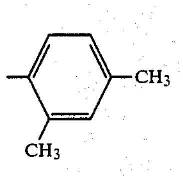 | $-CH_3$ | H | H | H | H |

-continued
Compounds having the structure of Formula [II]
Formula [II]
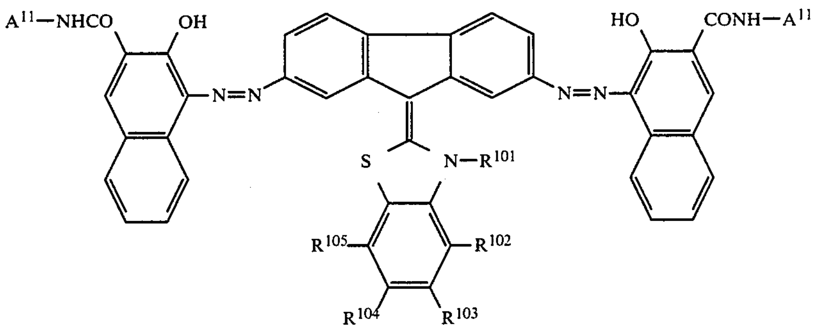
| Compound No. | $A^{11}$ | $R^{101}$ | $R^{102}$ | $R^{103}$ | $R^{104}$ | $R^{105}$ |
|---|---|---|---|---|---|---|
| B-9 | 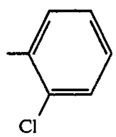  | $-CH_3$ | H | H | H | H |
| B-10 | 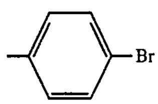  | $-CH_3$ | H | H | H | H |
| B-11 | 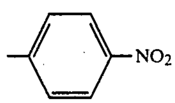  | $-CH_3$ | H | H | H | H |
| B-12 | 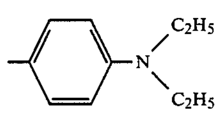  | $-CH_3$ | H | H | H | H |
| B-13 | 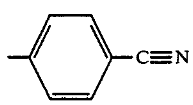  | $-CH_3$ | H | H | H | H |
| B-14 | 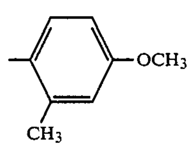  | $-CH_3$ | H | H | H | H |
| B-15 | 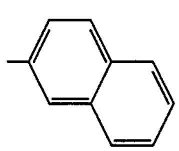 | $-CH_3$ | | 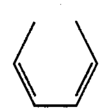 | H | H |
| B-16 | 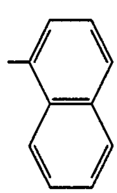 | $-CH_3$ | H | | 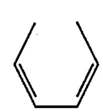 | H |

-continued
Compounds having the structure of Formula [II]
Formula [II]
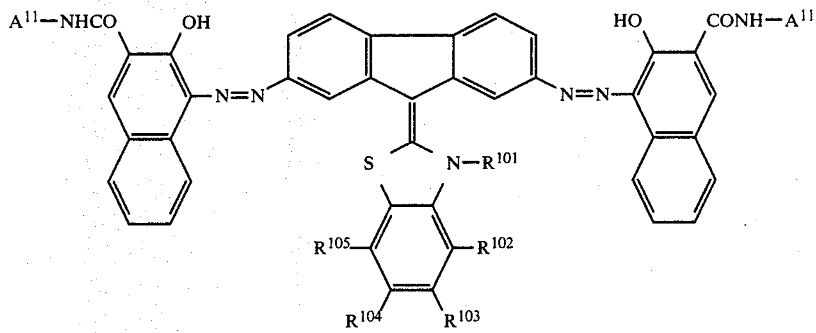
| Compound No. | $A^{11}$ | $R^{101}$ | $R^{102}$ | $R^{103}$ | $R^{104}$ | $R^{105}$ |
|---|---|---|---|---|---|---|
| B-17 | 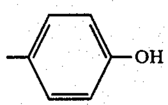  | $-CH_3$ | H | 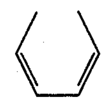 | | H |
| B-18 | 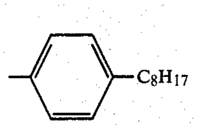  | $-CH_3$ | H | 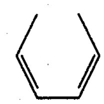 | | H |
| B-19 | 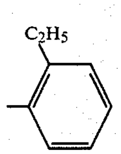  | $-CH_3$ | H | H | 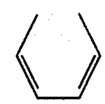 | |
| B-20 | 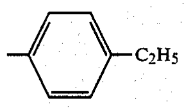  | $-C_2H_5$ | H | H | H | H |
| B-21 | 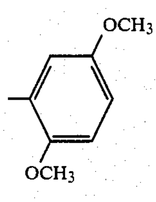  | $-C_2H_5$ | H | H | H | H |
| B-22 | 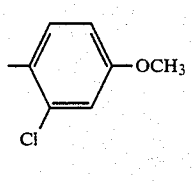  | $-C_2H_5$ | H | H | H | H |
| B-23 | 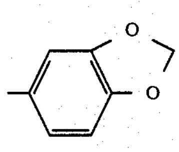  | $-C_2H_5$ | H | H | H | H |
| B-24 | 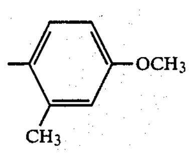  | $-C_2H_5$ | H | H | H | H |

-continued
Compounds having the structure of Formula [II]
Formula [II]
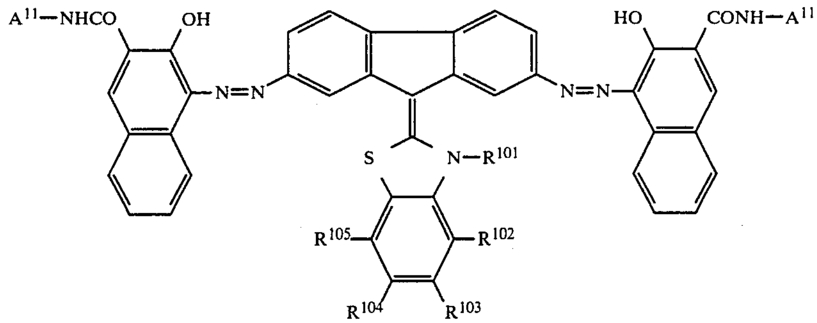
| Compound No. | $A^{11}$ | $R^{101}$ | $R^{102}$ | $R^{103}$ | $R^{104}$ | $R^{105}$ |
|---|---|---|---|---|---|---|
| B-25 | 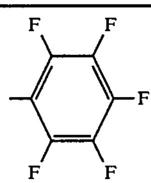 | $-C_2H_5$ | H | H | H | H |
| B-26 | 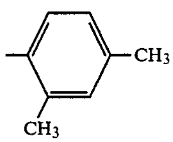 | $-C_2H_5$ | H | H | H | H |
| B-27 | 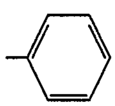 | $-C_2H_5$ | H | H | H | H |
| B-28 | 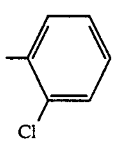 | $-C_2H_5$ | | 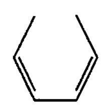 | H | H |
| B-29 | 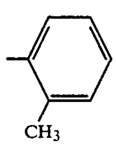 | $-C_2H_5$ | H | | 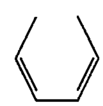 | H |
| B-30 | 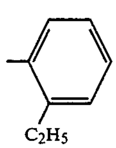 | $-C_2H_5$ | H | | 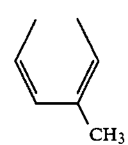 | H |
| B-31 | 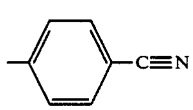 | $-C_2H_5$ | H | H | | 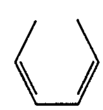 |
| B-32 | 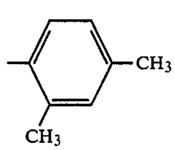 | $-CH_3$ | H | $-CH_3$ | H | H |

-continued
Compounds having the structure of Formula [II]
Formula [II]
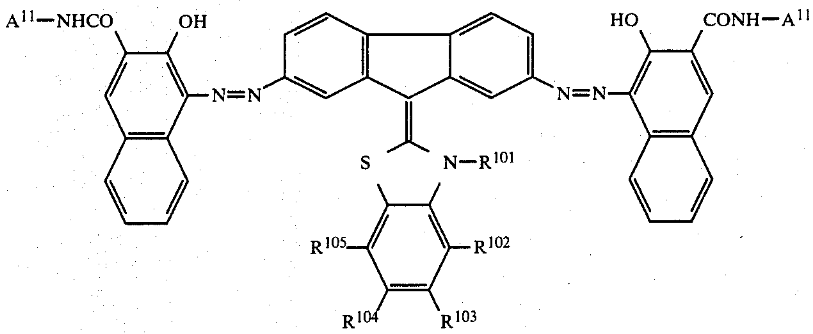
| Compound No. | $A^{11}$ | $R^{101}$ | $R^{102}$ | $R^{103}$ | $R^{104}$ | $R^{105}$ |
|---|---|---|---|---|---|---|
| B-33 | 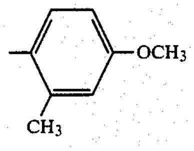 | $-CH_3$ | H | H | $-CH_3$ | H |
| B-34 | 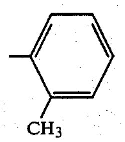 | $-CH_3$ | 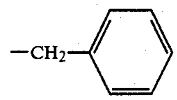 | H | H | H |
| B-35 | 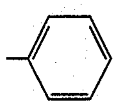 | $-CH_3$ | H | H | H | —Cl |
| B-36 | 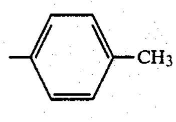 | $-CH_3$ | H | $-OCH_3$ | H | H |
| B-37 | 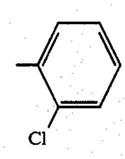 | $-CH_3$ | H | $-OCH_3$ | $-OCH_3$ | H |
| B-38 | 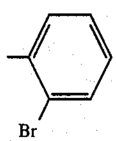 | $-CH_3$ | H | —Br | H | —Br |
| B-39 | 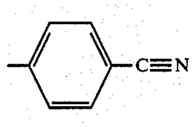 | $-C_2H_5$ | H | 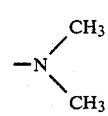 | H | H |
| B-40 | 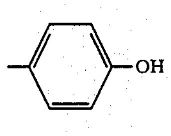 | $-C_2H_5$ | H | H | H | —C≡N |
| B-41 | 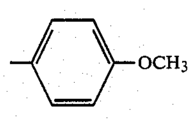 | $-C_2H_5$ | H | H | H | —OH |

-continued
Compounds having the structure of Formula [II]
Formula [II]
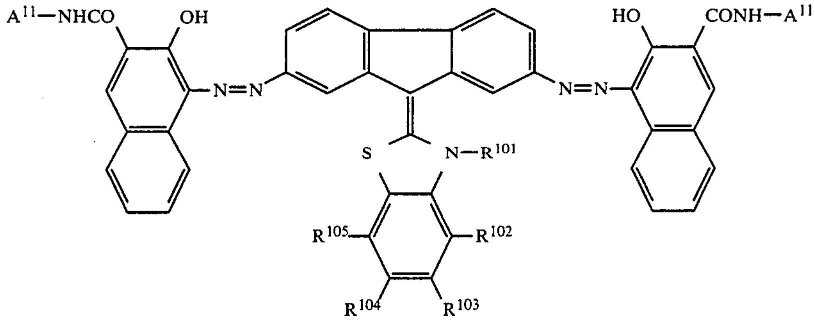
| Compound No. | $A^{11}$ | $R^{101}$ | $R^{102}$ | $R^{103}$ | $R^{104}$ | $R^{105}$ |
|---|---|---|---|---|---|---|
| B-42 | 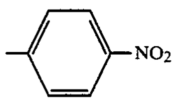 | $-C_2H_5$ | —OH | H | H | H |
| B-43 | 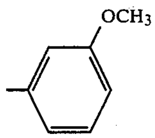 | $-C_2H_5$ | —F | —F | —F | —F |
| B-44 | 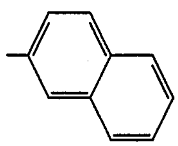 | $-C_2H_5$ | H | $-OC_8H_{17}$ | H | H |
| B-45 | 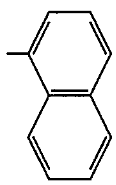 | 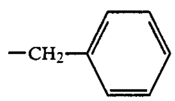 | H | H | H | H |
| B-46 | 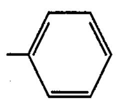 | 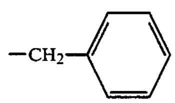 | | 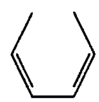 | H | —OH |
| B-47 | 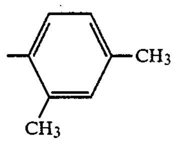 | 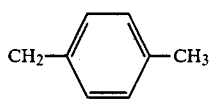 | —OH | H | H | H |
| B-48 | 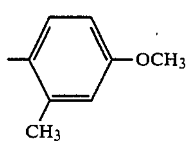 | 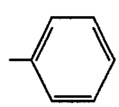 | H | $-OCH_3$ | $-OCH_3$ | H |
| B-49 | 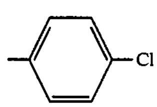 | 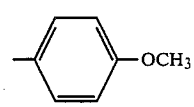 | H | 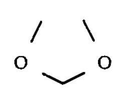 | | H |

-continued
Compounds having the structure of Formula [II]
Formula [II]
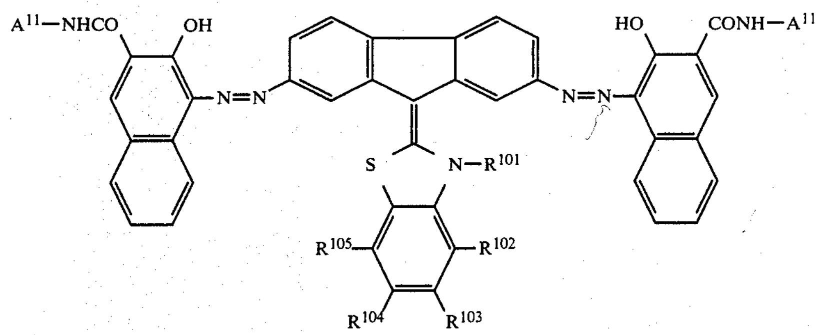
| Compound No. | $A^{11}$ | $R^{101}$ | $R^{102}$ | $R^{103}$ | $R^{104}$ | $R^{105}$ |
|---|---|---|---|---|---|---|
| B-50 | 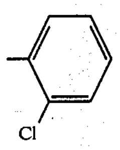 | 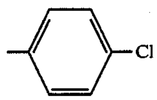 | H | 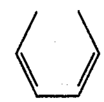 | | H |
| B-51 | 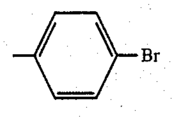 | 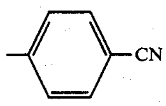 | H | $-CH_3$ | H | H |
| B-52 | 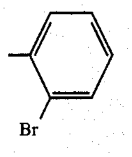 | $-C_2H_4-OH$ | H | 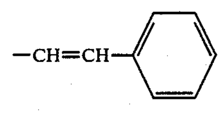 | 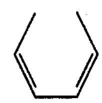 | |
| B-53 | 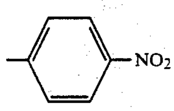 | $-C_2H_4-Cl$ | H | $-CH_3$ | H | $-Cl$ |
| B-54 | 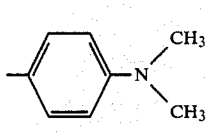 | $-C_4H_9$ | H | H | H | H |
| B-55 | 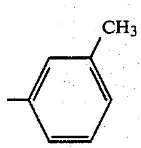 | $-C_8H_{17}$ | H | H | H | H |

Compounds having the structure of Formula [III]
Formula [III]
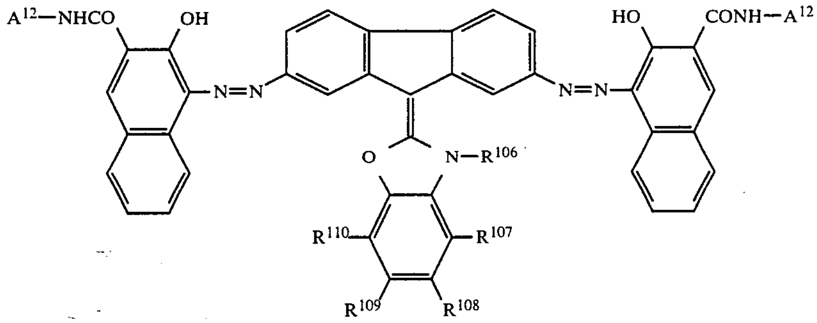
| Compound No. | $A^{12}$ | $R^{106}$ | $R^{107}$ | $R^{108}$ | $R^{109}$ | $R^{110}$ |
|---|---|---|---|---|---|---|
| B-56 | 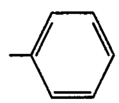 | $-CH_3$ | H | H | H | H |
| B-57 | 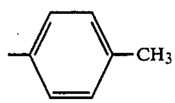 | $-CH_3$ | H | H | H | H |
| B-58 | 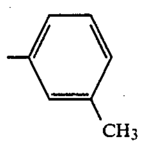 | $-CH_3$ | H | H | H | H |
| B-59 | 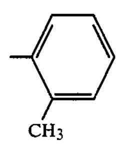 | $-CH_3$ | H | H | H | H |
| B-60 | 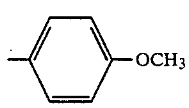 | $-CH_3$ | H | H | H | H |
| B-61 | 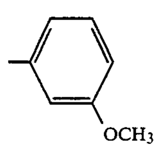 | $-CH_3$ | H | H | H | H |
| B-62 | 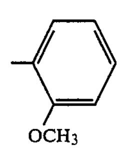 | $-CH_3$ | H | H | H | H |
| B-63 | 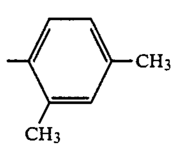 | $-CH_3$ | H | H | H | H |

-continued
Compounds having the structure of Formula [III]
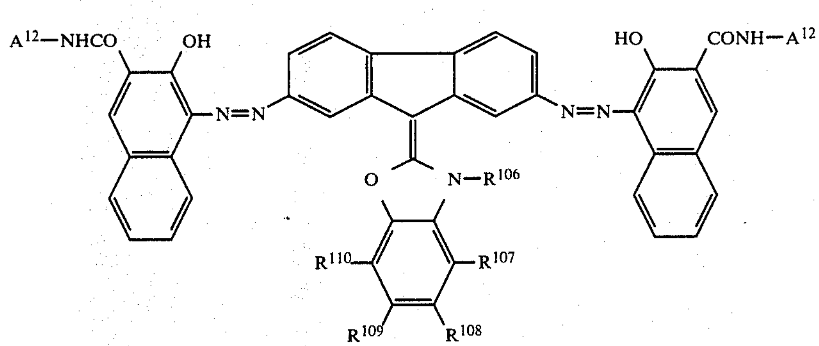
Formula [III]
| Compound No. | $A^{12}$ | $R^{106}$ | $R^{107}$ | $R^{108}$ | $R^{109}$ | $R^{110}$ |
|---|---|---|---|---|---|---|
| B-64 | 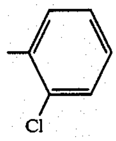 | $-CH_3$ | H | H | H | H |
| B-65 | 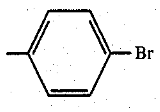 | $-CH_3$ | H | H | H | H |
| B-66 | 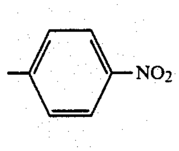 | $-CH_3$ | H | H | H | H |
| B-67 | 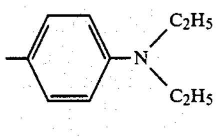 | $-CH_3$ | H | H | H | H |
| B-68 | 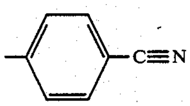 | $-CH_3$ | H | H | H | H |
| B-69 | 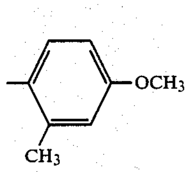 | $-CH_3$ | H | H | H | H |
| B-70 | 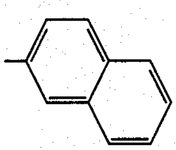 | $-CH_3$ | 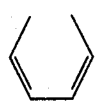 | | H | H |
| B-71 | 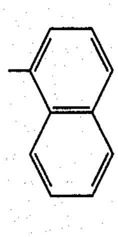 | $-CH_3$ | H | 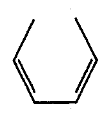 | | H |

-continued
Compounds having the structure of Formula [III]
Formula [III]
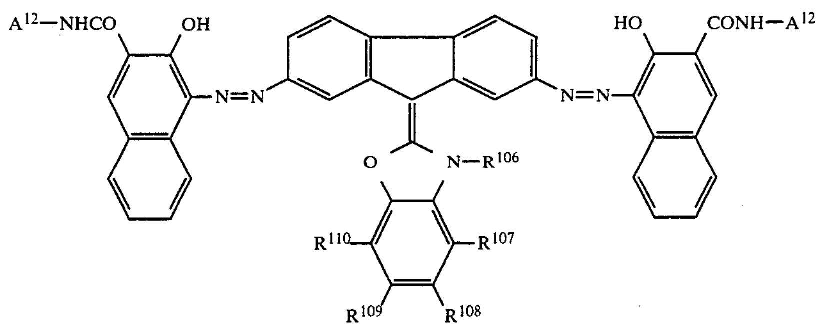
| Compound No. | $A^{12}$ | $R^{106}$ | $R^{107}$ | $R^{108}$ | $R^{109}$ | $R^{110}$ |
|---|---|---|---|---|---|---|
| B-72 | 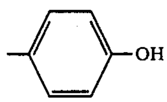 | $-CH_3$ | H | 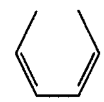 | | H |
| B-73 | 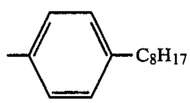 | $-CH_3$ | H | 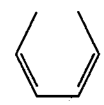 | | H |
| B-74 | 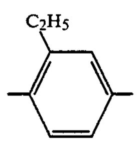 | $-CH_3$ | H | H | 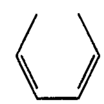 | |
| B-75 | 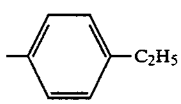 | $-C_2H_5$ | H | H | H | H |
| B-76 | 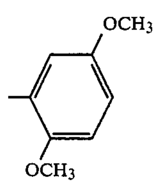 | $-C_2H_5$ | H | H | H | H |
| B-77 | 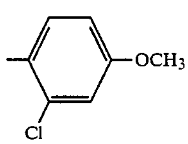 | $-C_2H_5$ | H | H | H | H |
| B-78 | 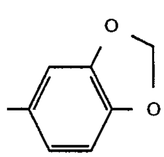 | $-C_2H_5$ | H | H | H | H |
| B-79 | 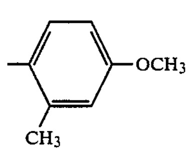 | $-C_2H_5$ | H | H | H | H |

-continued
Compounds having the structure of Formula [III]
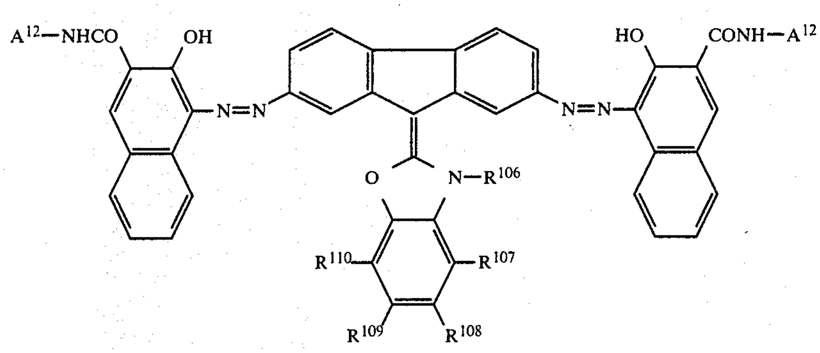
Formula [III]
| Compound No. | A12 | R106 | R107 | R108 | R109 | R110 |
|---|---|---|---|---|---|---|
| B-80 | 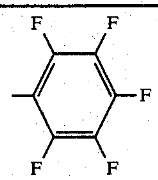 | —$C_2H_5$ | H | H | H | H |
| B-81 | 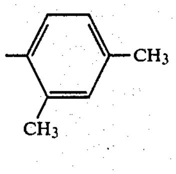 | —$C_2H_5$ | H | H | H | H |
| B-82 | 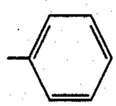 | —$C_2H_5$ | H | H | H | H |
| B-83 | 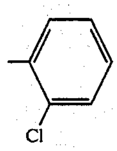 | —$C_2H_5$ | | 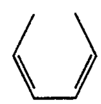 | H | H |
| B-84 | 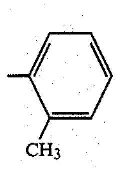 | —$C_2H_5$ | H | 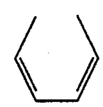 | | H |
| B-85 | 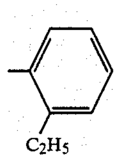 | —$C_2H_5$ | H | 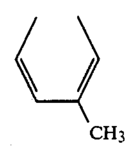 | | H |
| B-86 | 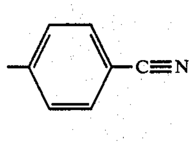 | —$C_2H_5$ | H | H | 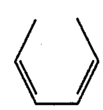 | |
| B-87 | 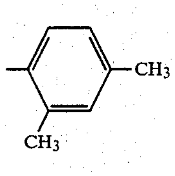 | —$CH_3$ | H | —$CH_3$ | H | H |

-continued
Compounds having the structure of Formula [III]
Formula [III]
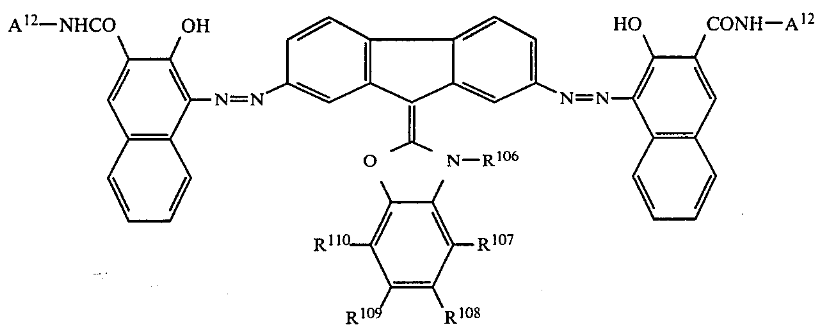
| Compound No. | $A^{12}$ | $R^{106}$ | $R^{107}$ | $R^{108}$ | $R^{109}$ | $R^{110}$ |
|---|---|---|---|---|---|---|
| B-88 | 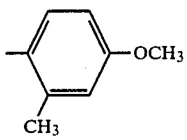 | $-CH_3$ | H | H | $-CH_3$ | H |
| B-89 | 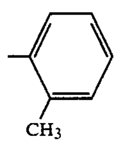 | $-CH_2$ | 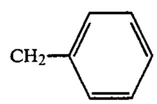 | H | H | H |
| B-90 | 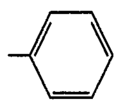 | $-CH_3$ | H | H | H | —Cl |
| B-91 | 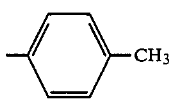 | $-CH_3$ | H | $-OCH_3$ | H | H |
| B-92 | 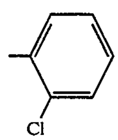 | $-CH_3$ | H | $-OCH_3$ | $-OCH_3$ | H |
| B-93 | 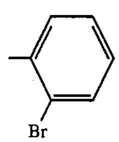 | $-CH_3$ | H | —Br | H | —Br |
| B-94 | 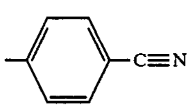 | $-C_2H_5$ | H | $-N(CH_3)_2$ | H | H |
| B-95 | 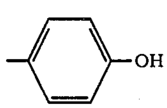 | $-C_2H_5$ | H | H | H | —C≡N |
| B-96 | 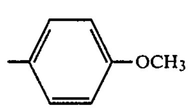 | $-C_2H_5$ | H | H | H | —OH |

-continued
Compounds having the structure of Formula [III]
Formula [III]
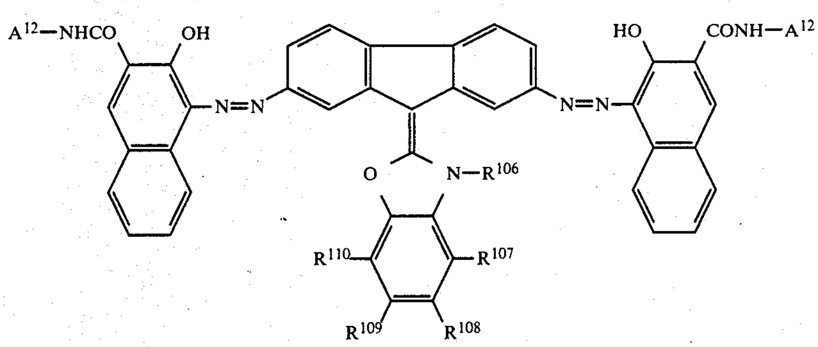
| Compound No. | $A^{12}$ | $R^{106}$ | $R^{107}$ | $R^{108}$ | $R^{109}$ | $R^{110}$ |
|---|---|---|---|---|---|---|
| B-97 | 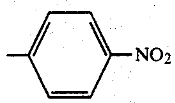 | $-C_2H_5$ | —OH | H | H | H |
| B-98 | 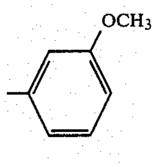 | $-C_2H_5$ | —F | —F | —F | —F |
| B-99 | 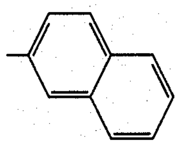 | $-C_2H_5$ | H | $-OC_8H_{17}$ | H | H |
| B-100 | 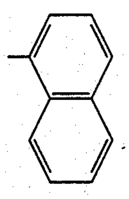 | 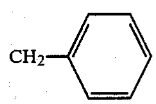 | H | H | H | H |
| B-101 | 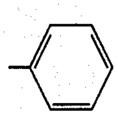 | 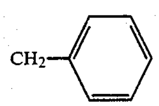 | 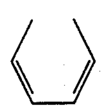 | | H | —OH |
| B-102 | 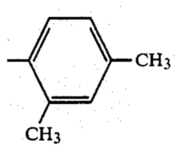 | 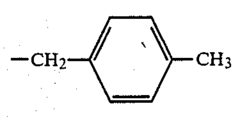 | —OH | H | H | H |
| B-103 | 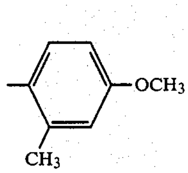 | 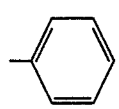 | H | $-OCH_3$ | $-OCH_3$ | H |
| B-104 | 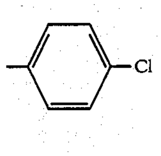 | 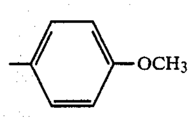 | H | 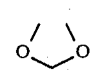 | | H |

-continued
Compounds having the structure of Formula [III]
Formula [III]
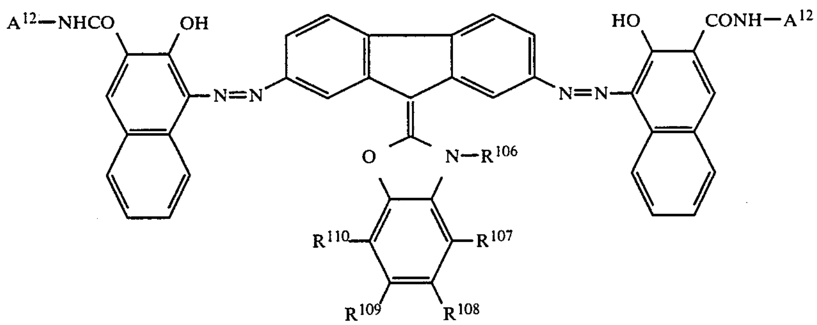
| Compound No. | $A^{12}$ | $R^{106}$ | $R^{107}$ | $R^{108}$ | $R^{109}$ | $R^{110}$ |
|---|---|---|---|---|---|---|
| B-105 | 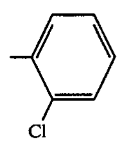 | 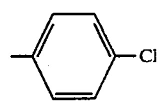 | H | 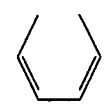 | | H |
| B-106 | 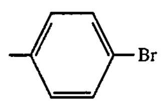 | 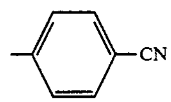 | H | $-CH_3$ | H | H |
| B-107 | 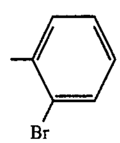 | $-C_2H_4-OH$ | H | 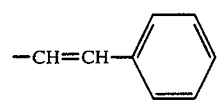 | 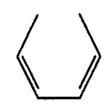 | |
| B-108 | 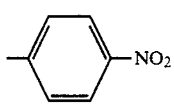 | $-C_2H_4-Cl$ | H | $-CH_3$ | H | $-Cl$ |
| B-109 | 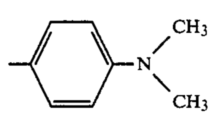 | $-C_4H_9$ | H | H | H | H |
| B-110 | 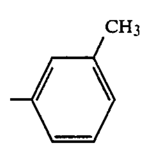 | $-C_8H_{17}$ | H | H | H | H |

Compounds having the structure of Formula [IV]
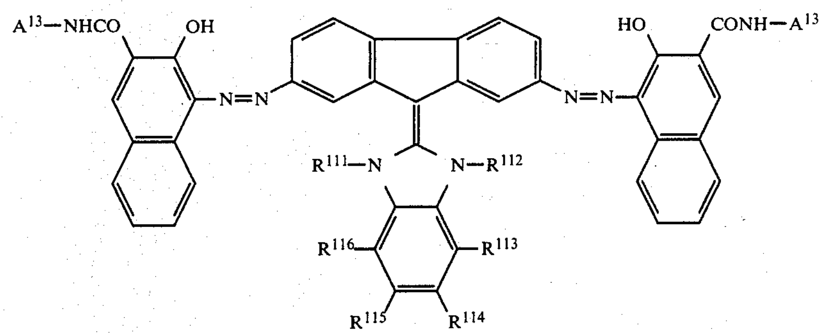
Formula [IV]
| Compound No. | $A^{13}$ | $R^{111}$ | $R^{112}$ | $R^{113}$ | $R^{114}$ | $R^{115}$ | $R^{116}$ |
|---|---|---|---|---|---|---|---|
| B-111 | 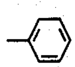 | $-CH_3$ | $-CH_3$ | H | H | H | H |
| B-112 | 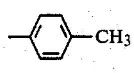 | $-CH_3$ | $CH_3$ | H | H | H | H |
| B-113 | 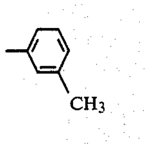 | $-CH_3$ | $-CH_3$ | H | H | H | H |
| B-114 | 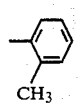 | $-CH_3$ | $-CH_3$ | H | H | H | H |
| B-115 | 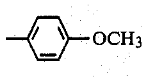 | $-CH_3$ | $-CH_3$ | H | H | H | H |
| B-116 | 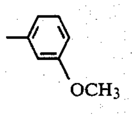 | $-CH_3$ | $-CH_3$ | H | H | H | H |
| B-117 | 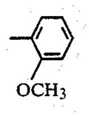 | $-CH_3$ | $-CH_3$ | H | H | H | H |
| B-118 | 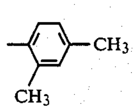 | $-CH_3$ | $-CH_3$ | H | H | H | H |
| B-119 | 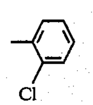 | $-CH_3$ | $-CH_3$ | H | H | H | H |
| B-120 | 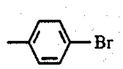 | $-CH_3$ | $-CH_3$ | H | H | H | H |
| B-121 | 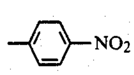 | $-CH_3$ | $-CH_3$ | H | H | H | H |
| B-122 | 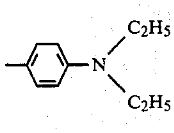 | $-CH_3$ | $-CH_3$ | H | H | H | H |

-continued
Compounds having the structure of Formula [IV]
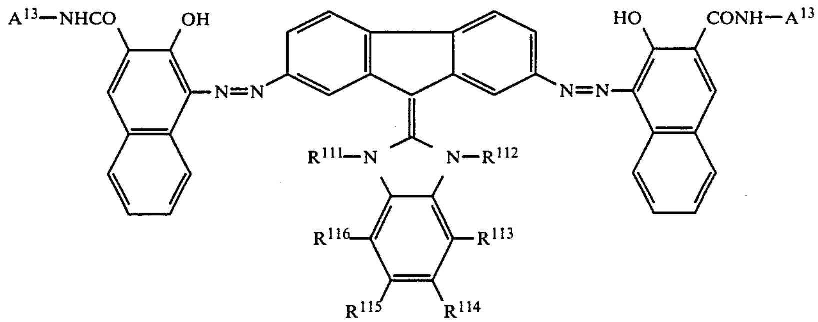
Formula [IV]
| Compound No. | $A^{13}$ | $R^{111}$ | $R^{112}$ | $R^{113}$ | $R^{114}$ | $R^{115}$ | $R^{116}$ |
|---|---|---|---|---|---|---|---|
| B-123 | 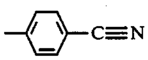 | $-CH_3$ | $-CH_3$ | H | H | H | H |
| B-124 | 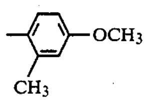 | $-CH_3$ | $-CH_3$ | H | H | H | H |
| B-125 | 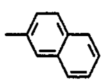 | $-CH_3$ | $-CH_3$ |  | | H | H |
| B-126 | 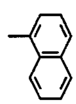 | $-CH_3$ | $-CH_3$ | H |  | | H |
| B-127 | 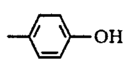 | $-CH_3$ | $-CH_3$ | H |  | | H |
| B-128 | 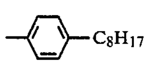 | $-CH_3$ | $-CH_3$ | H |  | | H |
| B-129 | 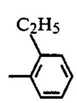 | $-CH_3$ | $-CH_3$ | H | H |  | |
| B-130 | 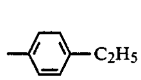 | $-C_2H_5$ | $-C_2H_5$ | H | H | H | H |
| B-131 | 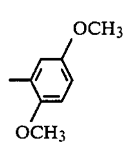 | $-C_2H_5$ | $-C_2H_5$ | H | H | H | H |
| B-132 | 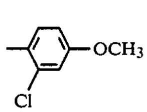 | $-C_2H_5$ | $-C_2H_5$ | H | H | H | H |
| B-133 | 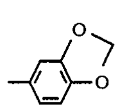 | $-C_2H_5$ | $-C_2H_5$ | H | H | H | H |

-continued
Compounds having the structure of Formula [IV]
Formula [IV]
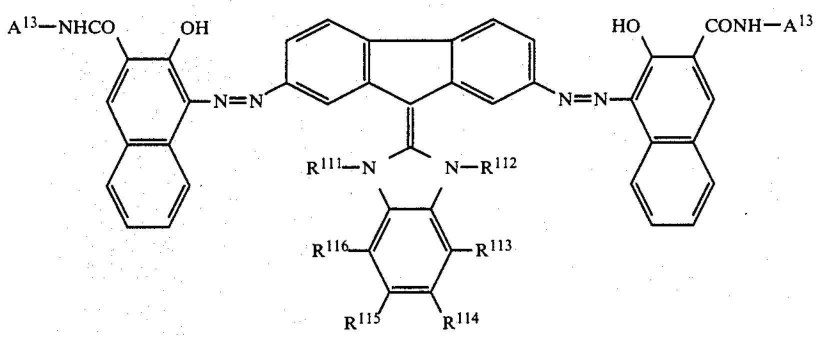
| Compound No. | $A^{13}$ | $R^{111}$ | $R^{112}$ | $R^{113}$ | $R^{114}$ | $R^{115}$ | $R^{116}$ |
|---|---|---|---|---|---|---|---|
| B-134 | 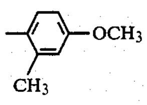 | $-C_2H_5$ | $-C_2H_5$ | H | H | H | H |
| B-135 | 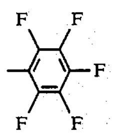 | $-C_2H_5$ | $-C_2H_5$ | H | H | H | H |
| B-136 | 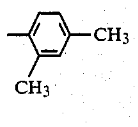 | $-C_2H_5$ | $-C_2H_5$ | H | H | H | H |
| B-137 | 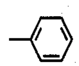 | $-C_2H_5$ | $-C_2H_5$ | H | H | H | H |
| B-138 | 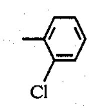 | $-C_2H_5$ | $-C_2H_5$ |  | | H | H |
| B-139 | 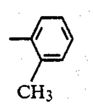 | $-C_2H_5$ | $-C_2H_5$ | H |  | | H |
| B-140 | 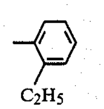 | $-CH_3$ | $-C_2H_5$ | H | 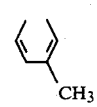 | | H |
| B-141 | 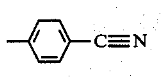 | $-CH_3$ | $-C_2H_5$ | H | H |  | |
| B-142 | 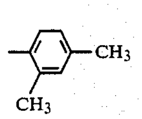 | $-CH_3$ | $-CH_3$ | H | $-CH_3$ | H | H |
| B-143 | 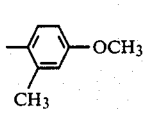 | $-CH_3$ | $-CH_3$ | H | H | $-CH_3$ | H |

-continued
Compounds having the structure of Formula [IV]
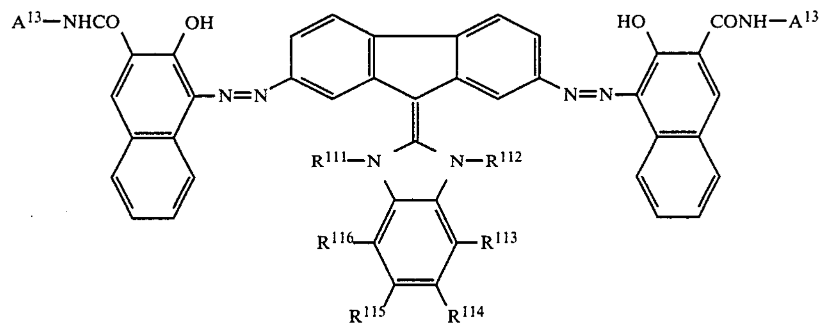
Formula [IV]
| Compound No. | $A^{13}$ | $R^{111}$ | $R^{112}$ | $R^{113}$ | $R^{114}$ | $R^{115}$ | $R^{116}$ |
|---|---|---|---|---|---|---|---|
| B-144 | 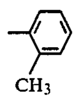 | $-CH_3$ | $-CH_3$ | 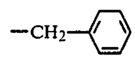 | H | H | H |
| B-145 | 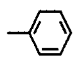 | $-CH_3$ | $-CH_3$ | H | H | H | $-Cl$ |
| B-146 | 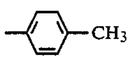 | $-CH_3$ | $-CH_3$ | H | $-OCH_3$ | H | H |
| B-147 | 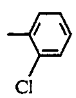 | $-CH_3$ | $-CH_3$ | H | $-OCH_3$ | $-OCH_3$ | H |
| B-148 | 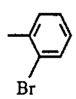 | $-CH_3$ | $-CH_3$ | H | $-Br$ | H | $-Br$ |
| B-149 | 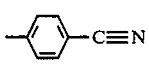 | $-C_2H_5$ | $-C_2H_5$ | H | $-N(CH_3)_2$ | H | H |
| B-150 | 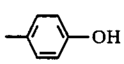 | $-C_2H_5$ | $-C_2H_5$ | H | H | H | $-C{\equiv}N$ |
| B-151 | 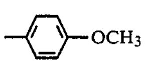 | $-C_2H_5$ | $-C_2H_5$ | H | H | H | $-OH$ |
| B-152 | 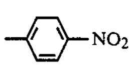 | $-C_2H_5$ | $-C_2H_5$ | $-OH$ | H | H | H |
| B-153 | 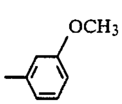 | $-C_2H_5$ | $-C_2H_5$ | $-F$ | $-F$ | $-F$ | $-F$ |
| B-154 | 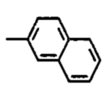 | $-C_2H_5$ | $-C_2H_5$ | H | $-OC_8H_{17}$ | H | H |
| B-155 | 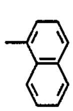 | 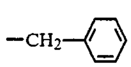 | 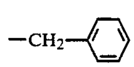 | H | H | H | H |

-continued
Compounds having the structure of Formula [IV]
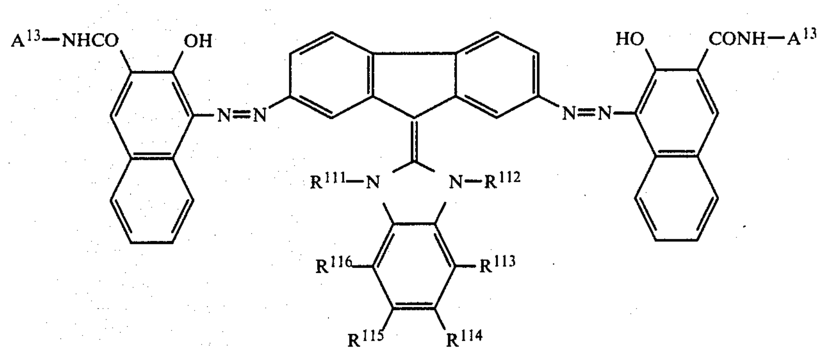
Formula [IV]
| Compound No. | $A^{13}$ | $R^{111}$ | $R^{112}$ | $R^{113}$ | $R^{114}$ | $R^{115}$ | $R^{116}$ |
|---|---|---|---|---|---|---|---|
| B-156 | 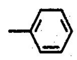 | 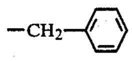 | 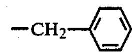 |  | | H | —OH |
| B-157 | 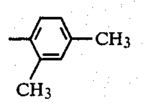 | 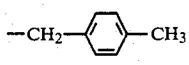 | 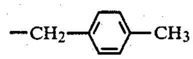 | —OH | H | H | H |
| B-158 | 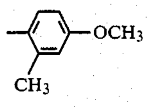 | 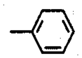 | 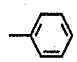 | H | $—OCH_3$ | $—OCH_3$ | H |
| B-159 | 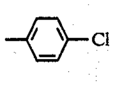 | $—CH_3$ | 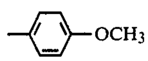 | H | 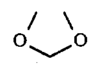 | | H |
| B-160 | 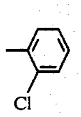 | $—CH_3$ | 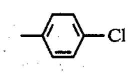 | H |  | | H |
| B-161 | 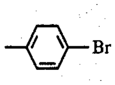 | $—CH_3$ | 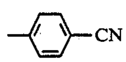 | H | $—CH_3$ | H | H |
| B-162 | 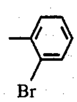 | $—CH_3$ | $—C_2H_4—OH$ | H | 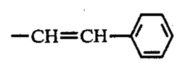 |  | |
| B-163 | 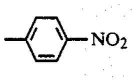 | $—CH_3$ | $—C_2H_4—Cl$ | H | $—CH_3$ | H | —Cl |
| B-164 | 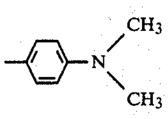 | $—CH_3$ | $—C_4H_9$ | H | H | H | H |
| B-165 | 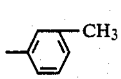 | $—CH_3$ | $—C_8H_{17}$ | H | H | H | H |

Compounds having the structure of Formula [V]
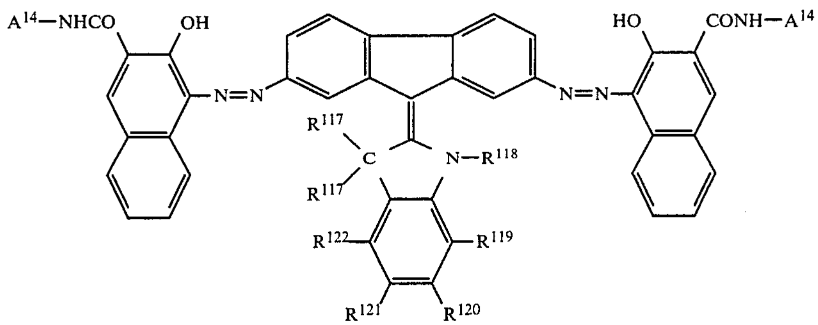
Formula [V]
| Compound No. | $A^{14}$ | $R^{117}$ | $R^{118}$ | $R^{119}$ | $R^{120}$ | $R^{121}$ | $R^{122}$ |
|---|---|---|---|---|---|---|---|
| B-166 | 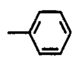 | H | $-CH_3$ | H | H | H | H |
| B-167 | 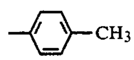 | H | $-CH_3$ | H | H | H | H |
| B-168 | 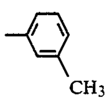 | H | $-CH_3$ | H | H | H | H |
| B-169 | 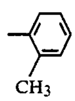 | H | $-CH_3$ | H | H | H | H |
| B-170 | 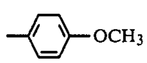 | H | $-CH_3$ | H | H | H | H |
| B-171 | 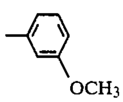 | H | $-CH_3$ | H | H | H | H |
| B-172 | 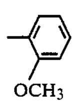 | H | $-CH_3$ | H | H | H | H |
| B-173 | 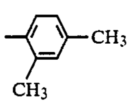 | H | $-CH_3$ | H | H | H | H |
| B-174 | 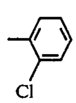 | H | $-CH_3$ | H | H | H | H |
| B-175 | 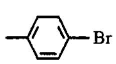 | H | $-CH_3$ | H | H | H | H |
| B-176 | 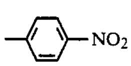 | H | $-CH_3$ | H | H | H | H |
| B-177 | 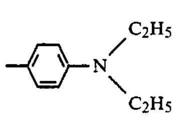 | H | $-CH_3$ | H | H | H | H |

-continued
Compounds having the structure of Formula [V]
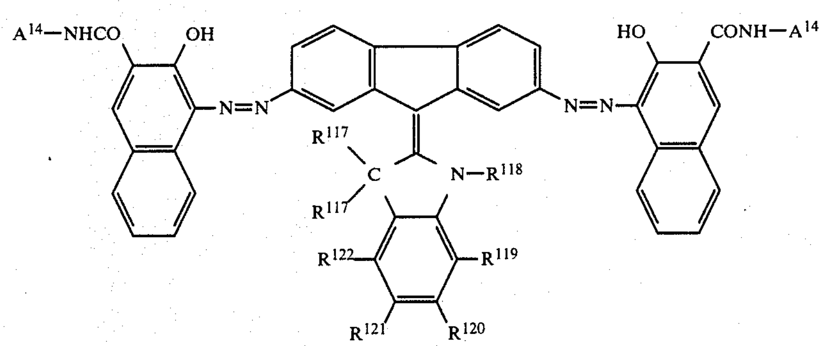
Formula [V]
| Compound No. | $A^{14}$ | $R^{117}$ | $R^{118}$ | $R^{119}$ | $R^{120}$ | $R^{121}$ | $R^{122}$ |
|---|---|---|---|---|---|---|---|
| B-178 | 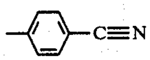 | $-CH_3$ | $-CH_3$ | H | H | H | H |
| B-179 | 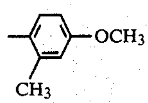 | $-CH_3$ | $-CH_3$ | H | H | H | H |
| B-180 | 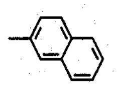 | $-CH_3$ | $-CH_3$ |  | | H | H |
| B-181 | 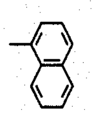 | H | $-CH_3$ | H |  | | H |
| B-182 | 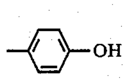 | H | $-CH_3$ | H | 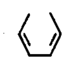 | | H |
| B-183 | 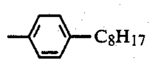 | H | $-CH_3$ | H |  | | H |
| B-184 | 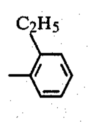 | H | $-CH_3$ | H | H |  | |
| B-185 | 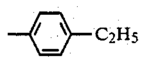 | $-C_2H_5$ | $-C_2H_5$ | H | H | H | H |
| B-186 | 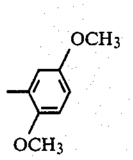 | $-C_2H_5$ | $-C_2H_5$ | H | H | H | H |
| B-187 | 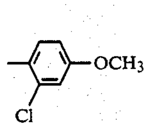 | $-C_2H_5$ | $-C_2H_5$ | H | H | H | H |
| B-188 | 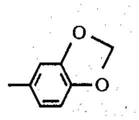 | $-C_2H_5$ | $-C_2H_5$ | H | H | H | H |

-continued
Compounds having the structure of Formula [V]
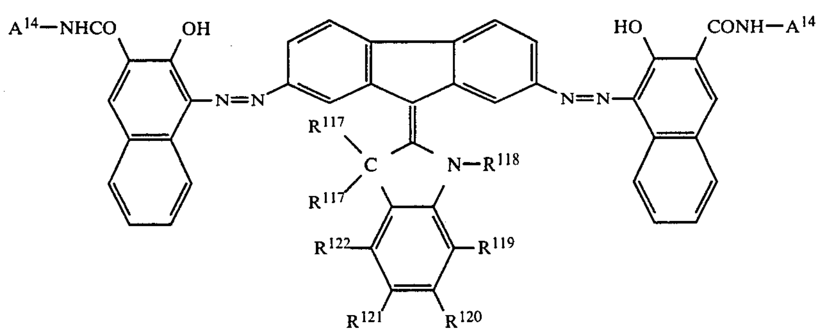
Formula [V]
| Compound No. | $A^{14}$ | $R^{117}$ | $R^{118}$ | $R^{119}$ | $R^{120}$ | $R^{121}$ | $R^{122}$ |
|---|---|---|---|---|---|---|---|
| B-189 | 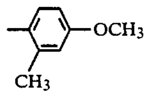  | $-C_2H_5$ | $-C_2H_5$ | H | H | H | H |
| B-190 | 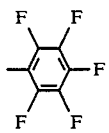  | $-C_2H_5$ | $-C_2H_5$ | H | H | H | H |
| B-191 | 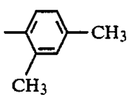  | $-C_2H_5$ | $-C_2H_5$ | H | H | H | H |
| B-192 | 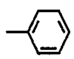 | $-CH_3$ | $-C_2H_5$ | H | H | H | H |
| B-193 | 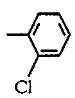  | $-CH_3$ | $-C_2H_5$ |  | | H | H |
| B-194 | 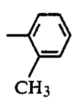  | H | $-C_2H_5$ | H |  | | H |
| B-195 | 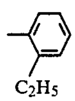  | H | $-C_2H_5$ | H | 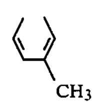  | | H |
| B-196 | 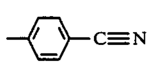  | H | $-C_2H_5$ | H | H |  | |
| B-197 | 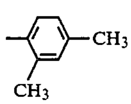  | H | $-CH_3$ | H | $-CH_3$ | H | H |
| B-198 | 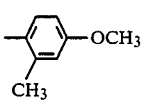  | H | $-CH_3$ | H | H | $-CH_3$ | H |
| B-199 | 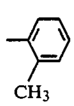  | H | $-CH_3$ | 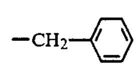  | H | H | H |

-continued
Compounds having the structure of Formula [V]
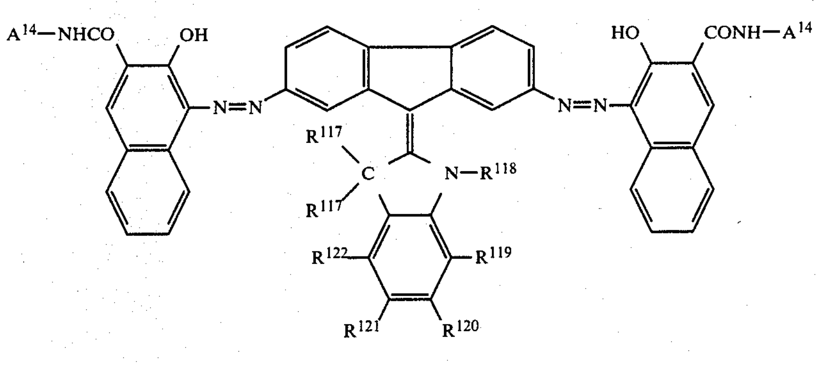
Formula [V]
| Compound No. | $A^{14}$ | $R^{117}$ | $R^{118}$ | $R^{119}$ | $R^{120}$ | $R^{121}$ | $R^{122}$ |
|---|---|---|---|---|---|---|---|
| B-200 | 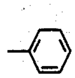 | H | $-CH_3$ | H | H | H | —Cl |
| B-201 | 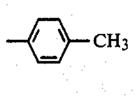 | H | $-CH_3$ | H | $-OCH_3$ | H | H |
| B-202 | 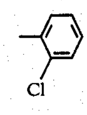 | H | $-CH_3$ | H | $-OCH_3$ | $-OCH_3$ | H |
| 203 | 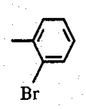 | H | $-CH_3$ | H | —Br | H | —Br |
| B-204 | 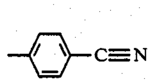 | H | $-C_2H_5$ | H | $-N(CH_3)_2$ | H | H |
| B-205 | 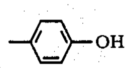 | H | $-C_2H_5$ | H | H | H | —C≡N |
| B-206 | 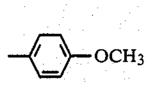 | H | $-C_2H_5$ | H | H | H | —OH |
| B-207 | 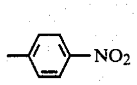 | H | $-C_2H_5$ | —OH | H | H | H |
| B-208 | 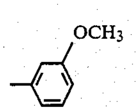 | H | $-C_2H_5$ | —F | —F | —F | —F |
| B-209 | 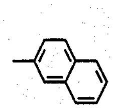 | $-CH_3$ | $-C_2H_5$ | H | $-C_8H_{17}$ | H | H |
| B-210 | 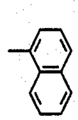 | 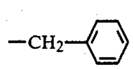 | 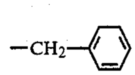 | H | H | H | H |
| B-211 | 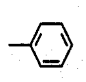 | H | 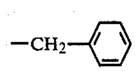 |  | | H | —OH |

-continued
Compounds having the structure of Formula [V]
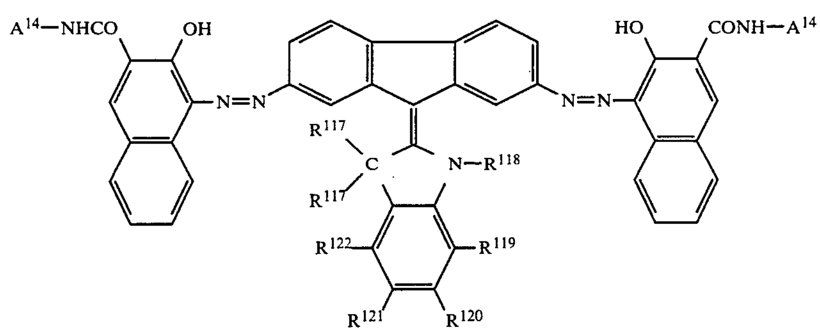
Formula [V]
| Compound No. | $A^{14}$ | $R^{117}$ | $R^{118}$ | $R^{119}$ | $R^{120}$ | $R^{121}$ | $R^{122}$ |
|---|---|---|---|---|---|---|---|
| B-212 | 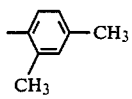 | H | 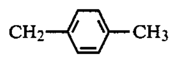 | —OH | H | H | H |
| B-213 | 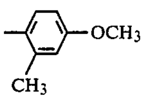 | H | 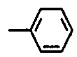 | H | $—OCH_3$ | $—OCH_3$ | H |
| B-214 | 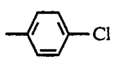 | H | 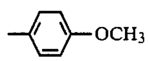 | H | 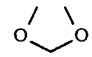 | | H |
| B-215 | 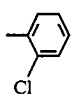 | H | 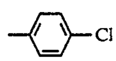 | H |  | | H |
| B-216 | 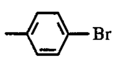 | H | 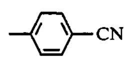 | H | $—CH_3$ | H | H |
| B-217 | 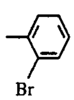 | $—CH_3$ | $—C_2H_4—OH$ | H | 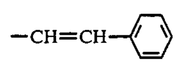 |  | |
| B-218 | 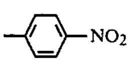 | $—CH_3$ | $—C_2H_4—Cl$ | H | $—CH_3$ | H | —Cl |
| B-219 | 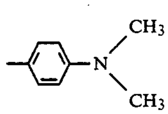 | $—CH_3$ | $—C_4H_9$ | H | H | H | H |
| B-220 | 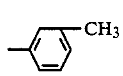 | $—CH_3$ | $—C_8H_{17}$ | H | H | H | H |

Compounds having the structure of Formula [VI]
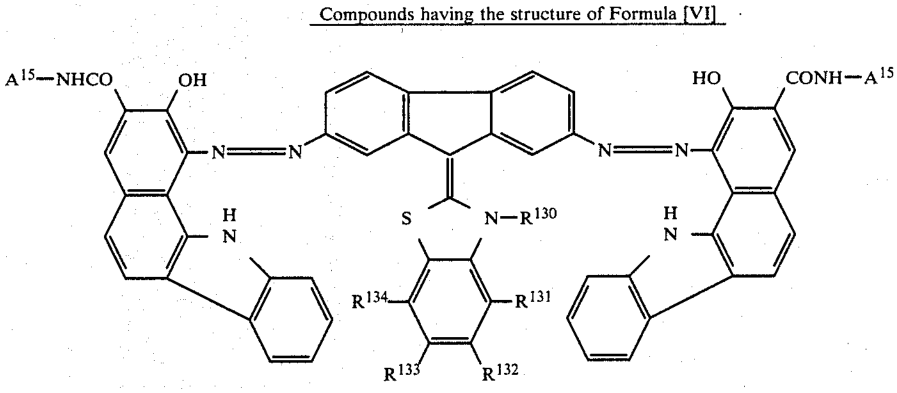
Formula [VI]
| Compound No. | $A^{15}$ | $R^{130}$ | $R^{131}$ | $R^{132}$ | $R^{133}$ | $R^{134}$ |
|---|---|---|---|---|---|---|
| B-221 | 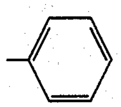 | $-CH_3$ | H | H | H | H |
| B-222 | 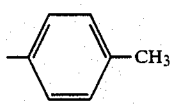 | $-CH_3$ | H | H | H | H |
| B-223 | 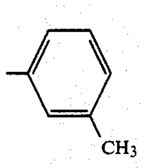 | $-CH_3$ | H | H | H | H |
| B-224 | 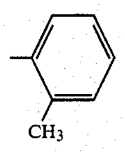 | $-CH_3$ | H | H | H | H |
| B-225 | 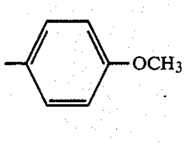 | $-CH_3$ | H | H | H | H |
| B-226 | 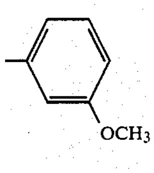 | $-CH_3$ | H | H | H | H |
| B-227 | 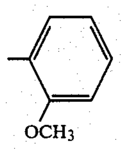 | $-CH_3$ | H | H | H | H |
| B-228 | 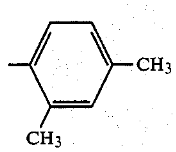 | $-CH_3$ | H | H | H | H |

-continued
Compounds having the structure of Formula [VI]
Formula [VI]
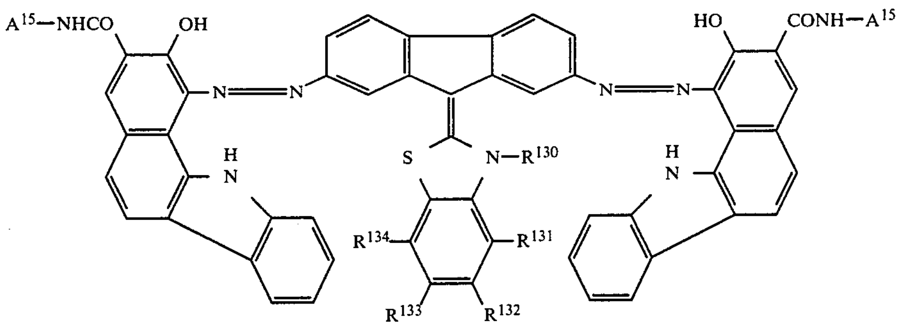
| Compound No. | $A^{15}$ | $R^{130}$ | $R^{131}$ | $R^{132}$ | $R^{133}$ | $R^{134}$ |
|---|---|---|---|---|---|---|
| B-229 | 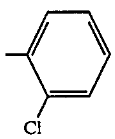 | $-CH_3$ | H | H | H | H |
| B-230 | 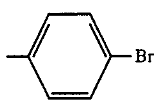 | $-CH_3$ | H | H | H | H |
| B-231 | 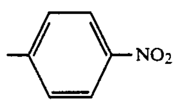 | $-CH_3$ | H | H | H | H |
| B-232 | 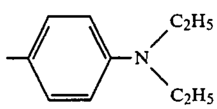 | $-CH_3$ | H | H | H | H |
| B-233 | 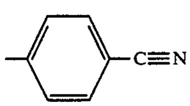 | $-CH_3$ | H | H | H | H |
| B-234 | 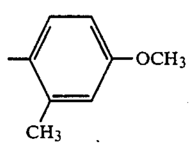 | $-CH_3$ | H | H | H | H |
| B-235 | 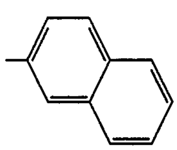 | $-CH_3$ | 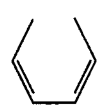 | | H | H |
| B-236 | 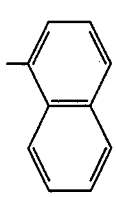 | $-CH_3$ | H | 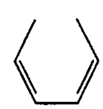 | | H |

-continued
Compounds having the structure of Formula [VI]
Formula [VI]
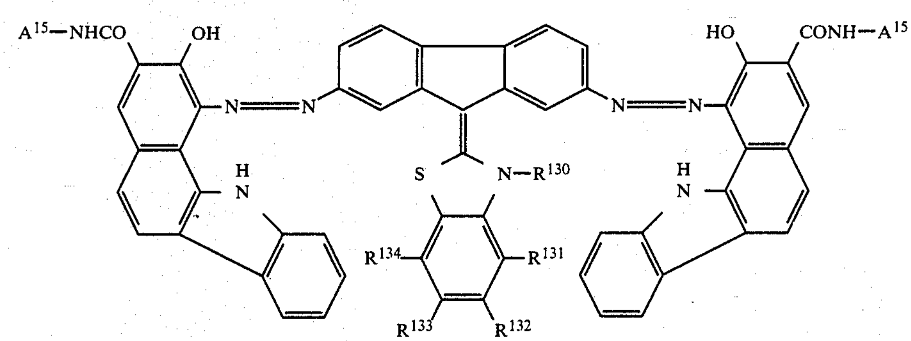
| Compound No. | $A^{15}$ | $R^{130}$ | $R^{131}$ | $R^{132}$ | $R^{133}$ | $R^{134}$ |
|---|---|---|---|---|---|---|
| B-237 | 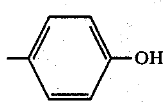 | $-CH_3$ | H | 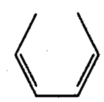 | | H |
| B-238 | 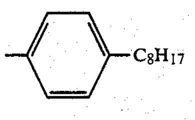 | $-CH_3$ | H | 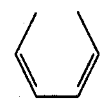 | | H |
| B-239 | 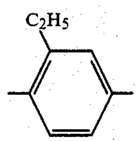 | $-CH_3$ | H | H | 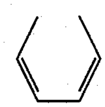 | |
| B-240 | 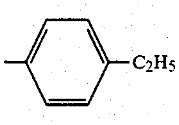 | $-C_2H_5$ | H | H | H | H |
| B-241 | 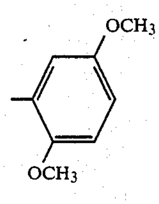 | $-C_2H_5$ | H | H | H | H |
| B-242 | 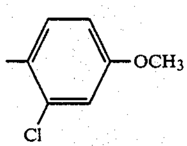 | $-C_2H_5$ | H | H | H | H |
| B-243 | 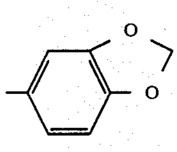 | $-C_2H_5$ | H | H | H | H |
| B-244 | 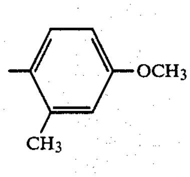 | $-C_2H_5$ | H | H | H | H |

-continued
Compounds having the structure of Formula [VI]
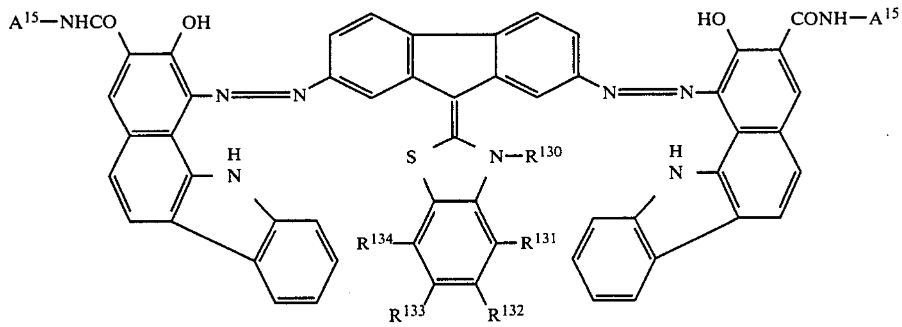
Formula [VI]
| Compound No. | $A^{15}$ | $R^{130}$ | $R^{131}$ | $R^{132}$ | $R^{133}$ | $R^{134}$ |
|---|---|---|---|---|---|---|
| B-245 | 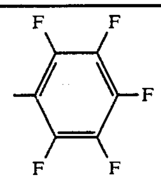 | $-C_2H_5$ | H | H | H | H |
| B-246 | 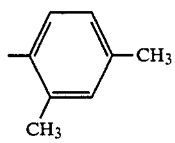 | $-C_2H_5$ | H | H | H | H |
| B-247 | 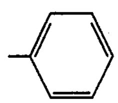 | $-C_2H_5$ | H | H | H | H |
| B-248 | 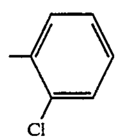 | $-C_2H_5$ | 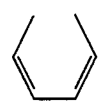 | | H | H |
| B-249 | 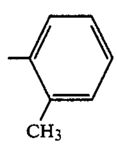 | $-C_2H_5$ | H | 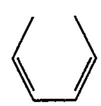 | | H |
| B-250 | 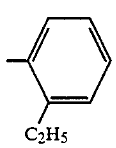 | $-C_2H_5$ | H | 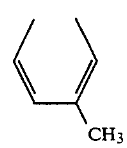 | | H |
| B-251 | 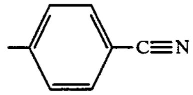 | $-C_2H_5$ | H | H | 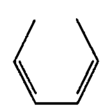 | |
| B-252 | 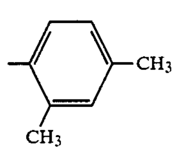 | $-CH_3$ | H | $-CH_3$ | H | H |

-continued
Compounds having the structure of Formula [VI]
Formula [VI]
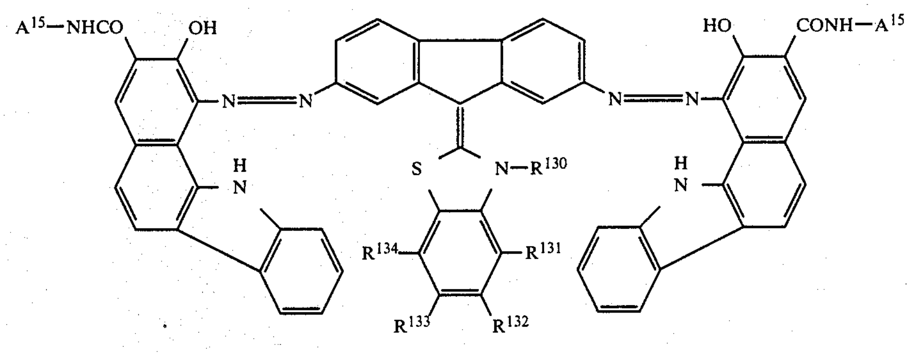
| Compound No. | A15 | R130 | R131 | R132 | R133 | R134 |
|---|---|---|---|---|---|---|
| B-253 | 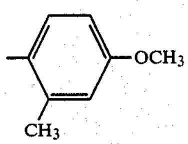 | $-CH_3$ | H | H | $-CH_3$ | H |
| B-254 | 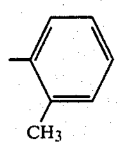 | $-CH_3$ | 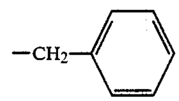 | H | H | H |
| B-255 | 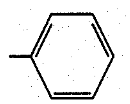 | $-CH_3$ | H | H | H | Cl |
| B-256 | 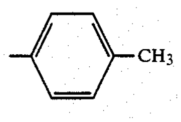 | $-CH_3$ | H | $-OCH_3$ | H | H |
| B-257 | 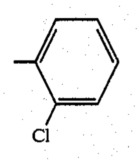 | $-CH_3$ | H | $-OCH_3$ | $-OCH_3$ | H |
| B-258 | 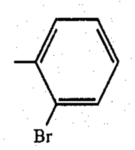 | $-CH_3$ | H | —Br | H | —Br |
| B-259 | 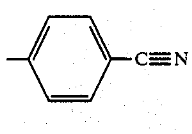 | $-C_2H_5$ | H | 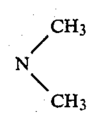 | H | H |
| B-260 | 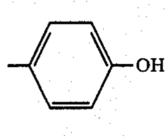 | $-C_2H_5$ | H | H | H | —C≡N |
| B-261 | 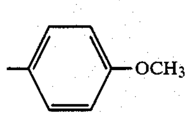 | $-C_2H_5$ | H | H | H | —OH |

-continued
Compounds having the structure of Formula [VI]
Formula [VI]
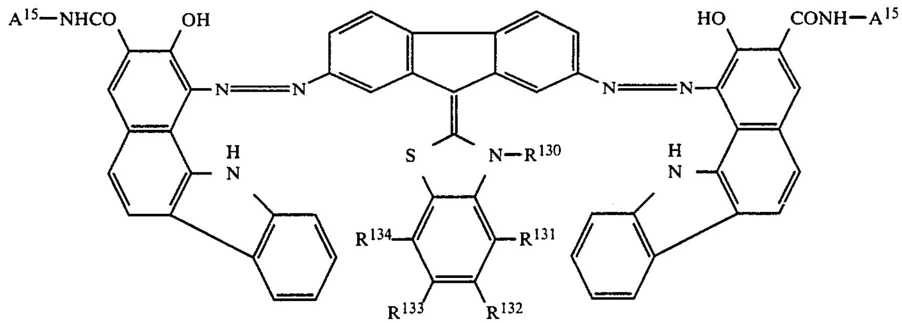
| Compound No. | $A^{15}$ | $R^{130}$ | $R^{131}$ | $R^{132}$ | $R^{133}$ | $R^{134}$ |
|---|---|---|---|---|---|---|
| B-262 | 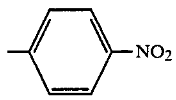  | $-C_2H_5$ | $-OH$ | H | H | H |
| B-263 | 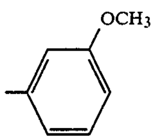  | $-C_2H_5$ | $-F$ | $-F$ | $-F$ | $-F$ |
| B-264 | 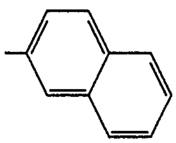 | $-C_2H_5$ | H | $-OC_8H_{17}$ | H | H |
| B-265 | 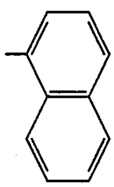 | 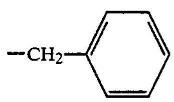  | H | H | H | H |
| B-266 | 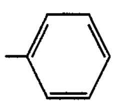 | 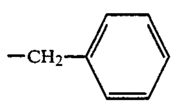  | 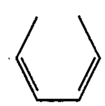 | | H | $-OH$ |
| B-267 | 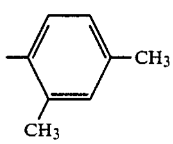  | 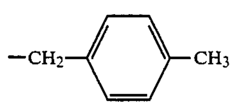  | $-OH$ | H | H | H |
| B-268 | 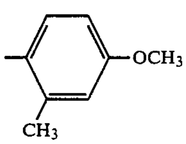  | 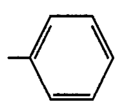 | H | $-OCH_3$ | $-OCH_3$ | H |
| B-269 | 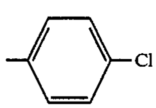  | 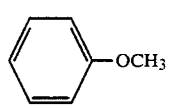  | H | 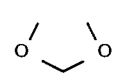  | | H |

-continued
Compounds having the structure of Formula [VI]
Formula [VI]
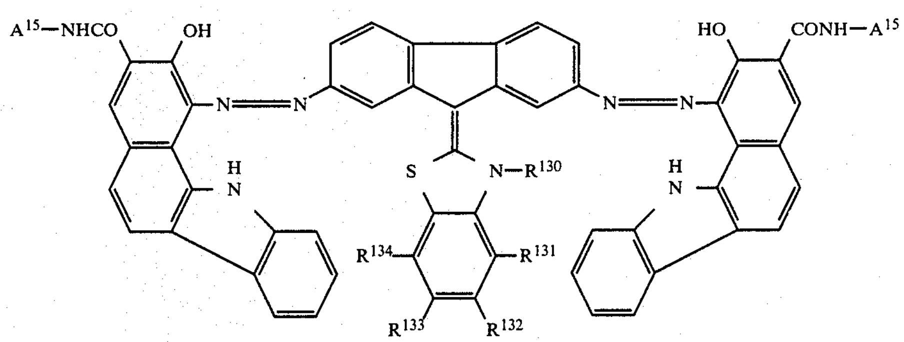
| Compound No. | $A^{15}$ | $R^{130}$ | $R^{131}$ | $R^{132}$ | $R^{133}$ | $R^{134}$ |
|---|---|---|---|---|---|---|
| B-270 | 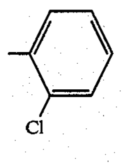 | 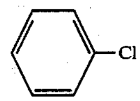 | H | 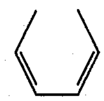 | | H |
| B-271 | 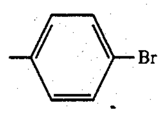 | 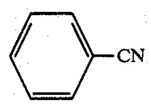 | H | $-CH_3$ | H | H |
| B-272 | 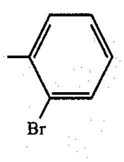 | $-C_2H_4-OH$ | H | 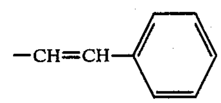 | 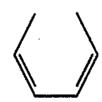 | |
| B-273 | 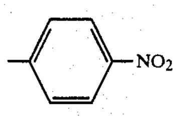 | $-C_2H_4-Cl$ | H | $-CH_3$ | H | $-Cl$ |
| B-274 | 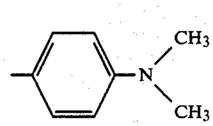 | $-C_4H_9$ | H | H | H | H |
| B-275 | 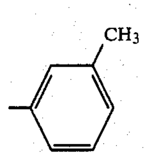 | $-C_8H_{17}$ | H | H | H | H |

Compounds having the structure of Formula [VII]
Formula [VII]
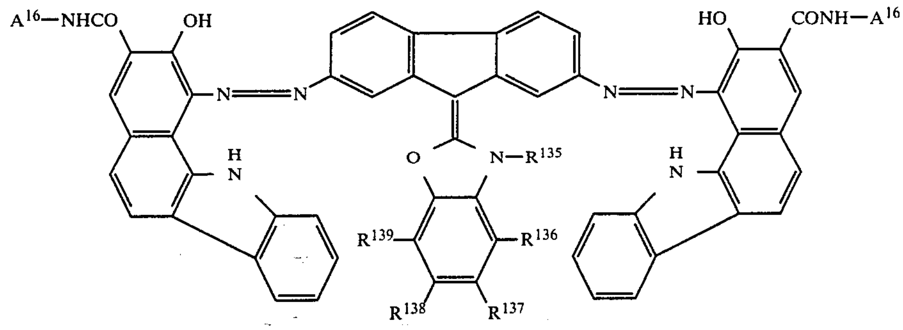
| Compound No. | $A^{16}$ | $R^{135}$ | $R^{136}$ | $R^{137}$ | $R^{138}$ | $R^{139}$ |
|---|---|---|---|---|---|---|
| B-276 | 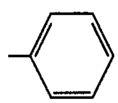 | $-CH_3$ | H | H | H | H |
| B-277 | 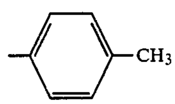 | $-CH_3$ | H | H | H | H |
| B-278 | 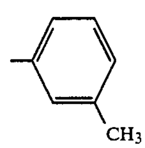 | $-CH_3$ | H | H | H | H |
| B-279 | 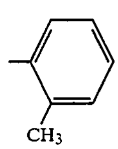 | $-CH_3$ | H | H | H | H |
| B-280 | 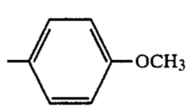 | $-CH_3$ | H | H | H | H |
| B-281 | 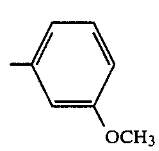 | $-CH_3$ | H | H | H | H |
| B-282 | 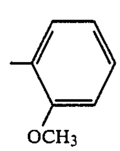 | $-CH_3$ | H | H | H | H |
| B-283 | 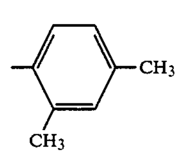 | $-CH_3$ | H | H | H | H |

-continued
Compounds having the structure of Formula [VII]
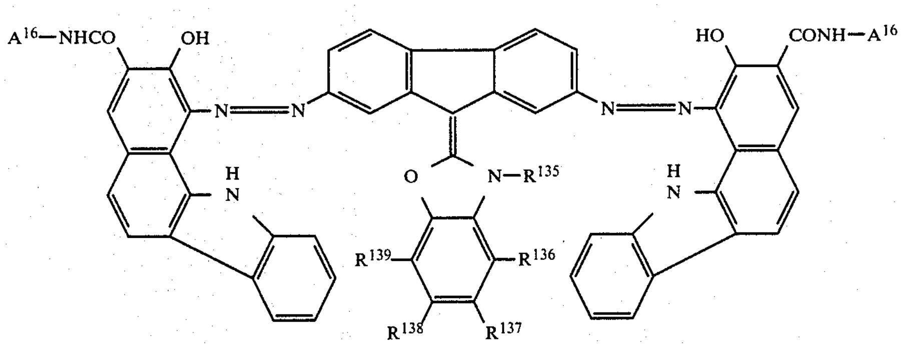
Formula [VII]
| Compound No. | $A^{16}$ | $R^{135}$ | $R^{136}$ | $R^{137}$ | $R^{138}$ | $R^{139}$ |
|---|---|---|---|---|---|---|
| B-284 | 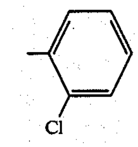 | $-CH_3$ | H | H | H | H |
| B-285 | 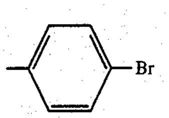 | $-CH_3$ | H | H | H | H |
| B-286 | 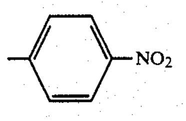 | $-CH_3$ | H | H | H | H |
| B-287 | 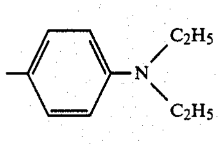 | $-CH_3$ | H | H | H | H |
| B-288 | 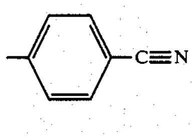 | $-CH_3$ | H | H | H | H |
| B-289 | 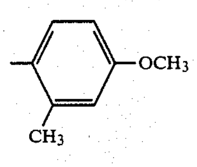 | $-CH_3$ | H | H | H | H |
| B-290 | 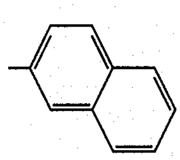 | $-CH_3$ | 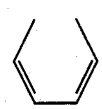 | | H | H |
| B-291 | 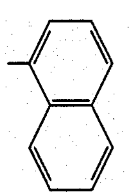 | $-CH_3$ | H | 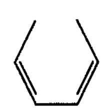 | | H |

-continued
Compounds having the structure of Formula [VII]
Formula [VII]
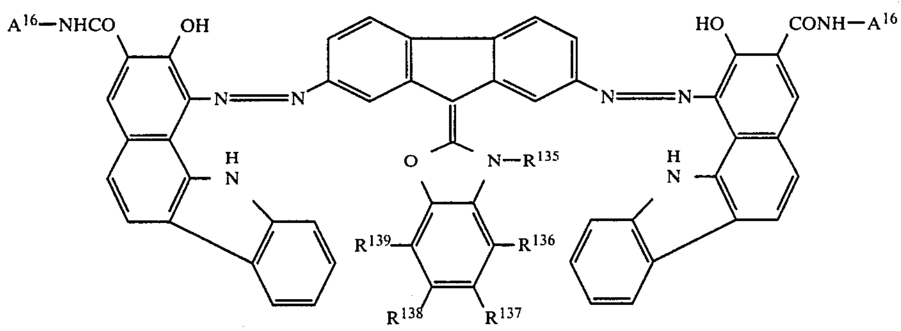
| Compound No. | $A^{16}$ | $R^{135}$ | $R^{136}$ | $R^{137}$ | $R^{138}$ | $R^{139}$ |
|---|---|---|---|---|---|---|
| B-292 | 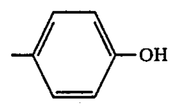 | $-CH_3$ | H | 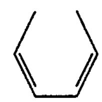 | | H |
| B-293 | 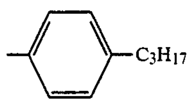 | $-CH_3$ | H | 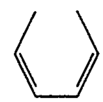 | | H |
| B-294 | 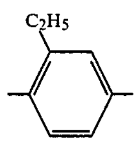 | $-CH_3$ | H | H | 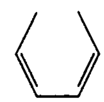 | |
| B-295 | 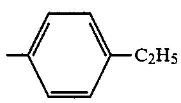 | $-C_2H_5$ | H | H | H | H |
| B-296 | 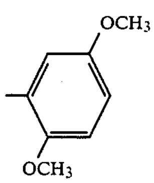 | $-C_2H_5$ | H | H | H | H |
| B-297 | 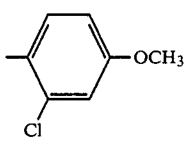 | $-C_2H_5$ | H | H | H | H |
| B-298 | 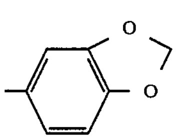 | $-C_2H_5$ | H | H | H | H |
| B-299 | 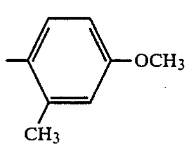 | $-C_2H_5$ | H | H | H | H |

-continued
Compounds having the structure of Formula [VII]
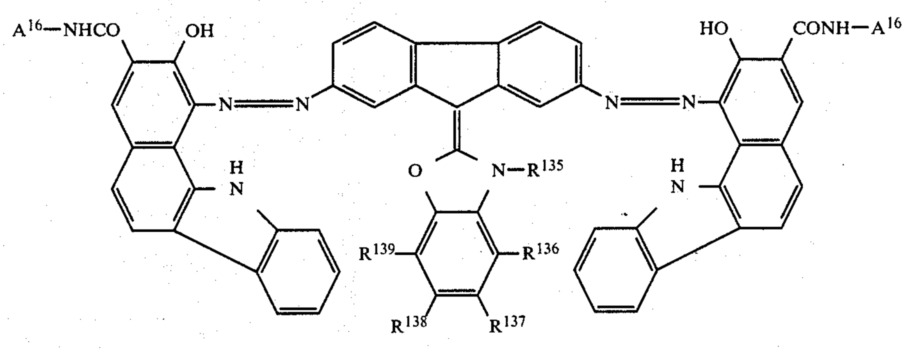
Formula [VII]
| Compound No. | $A^{16}$ | $R^{135}$ | $R^{136}$ | $R^{137}$ | $R^{138}$ | $R^{139}$ |
|---|---|---|---|---|---|---|
| B-300 | 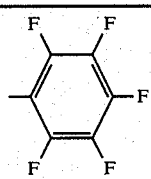 | $-C_2H_5$ | H | H | H | H |
| B-301 | 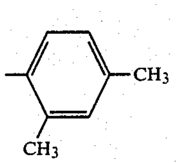 | $-C_2H_5$ | H | H | H | H |
| B-302 | 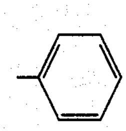 | $-C_2H_5$ | H | H | H | H |
| B-303 | 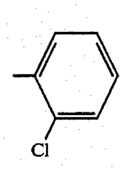 | $-C_2H_5$ | 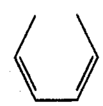 | | H | H |
| B-304 | 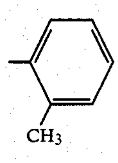 | $-C_2H_3$ | H | 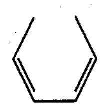 | | H |
| B-305 | 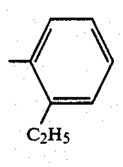 | $-C_2H_5$ | H | 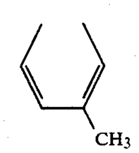 | | H |
| B-306 | 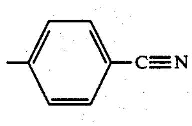 | $-C_2H_5$ | H | H | 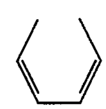 | |
| B-307 | 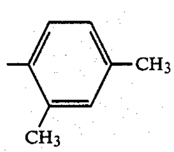 | $-CH_3$ | H | $-CH_3$ | H | H |

-continued
Compounds having the structure of Formula [VII]
Formula [VII]
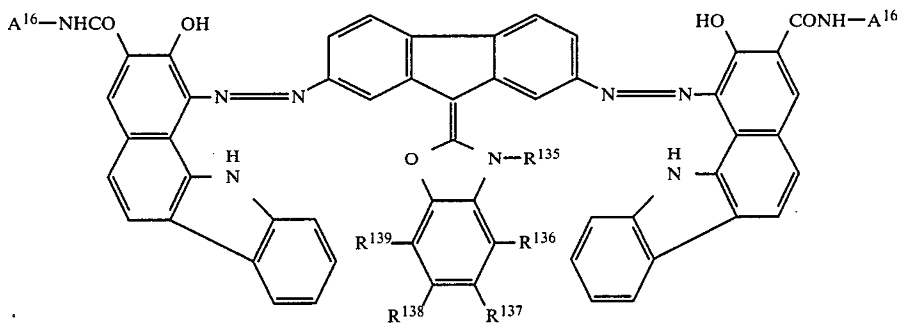
| Compound No. | $A^{16}$ | $R^{135}$ | $R^{136}$ | $R^{137}$ | $R^{138}$ | $R^{139}$ |
|---|---|---|---|---|---|---|
| B-308 | 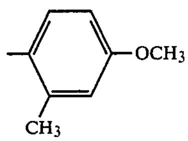 | $-CH_3$ | H | H | $-CH_3$ | H |
| B-309 | 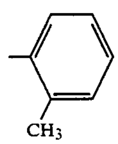 | $-CH_3$ | 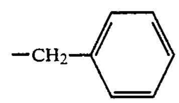 | H | H | H |
| B-310 | 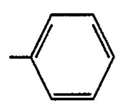 | $-CH_3$ | H | H | H | $-Cl$ |
| B-311 | 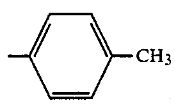 | $-CH_3$ | H | $-OCH_3$ | H | H |
| B-312 | 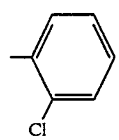 | $-CH_3$ | H | $-OCH_3$ | $-OCH_3$ | H |
| B-313 | 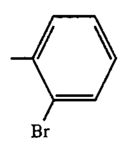 | $-CH_3$ | H | $-Br$ | H | $-Br$ |
| B-314 | 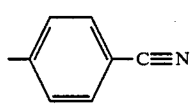 | $-C_2H_5$ | H | $N(CH_3)_2$ | H | H |
| B-315 | 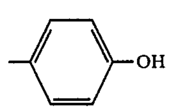 | $-C_2H_5$ | H | H | H | $-C \equiv N$ |
| B-316 | 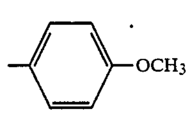 | $-C_2H_5$ | H | H | H | $-OH$ |

-continued
Compounds having the structure of Formula [VII]
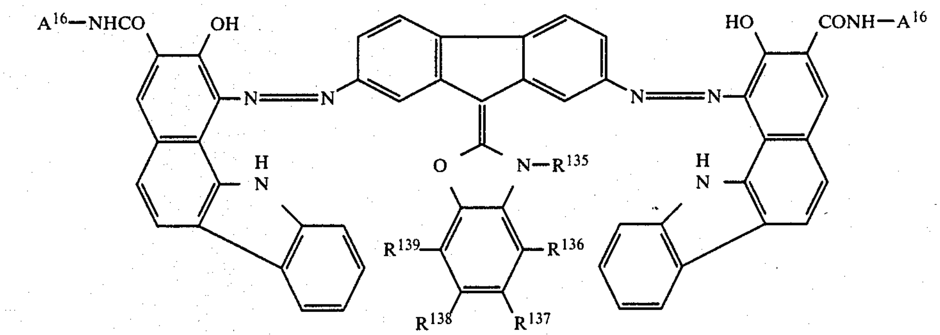
Formula [VII]
| Compound No. | $A^{16}$ | $R^{135}$ | $R^{136}$ | $R^{137}$ | $R^{138}$ | $R^{139}$ |
|---|---|---|---|---|---|---|
| B-317 | 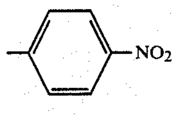 | $-C_2H_5$ | $-OH$ | H | H | H |
| B-318 | 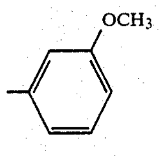 | $-C_2H_5$ | $-F$ | $-F$ | $-F$ | $-F$ |
| B-319 | 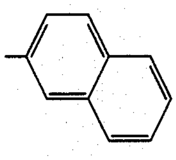 | $-C_2H_5$ | H | $-OC_8H_{17}$ | H | H |
| B-320 | 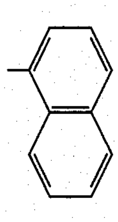 | 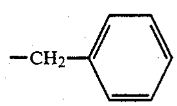 | H | H | H | H |
| B-321 | 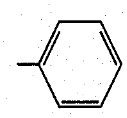 | 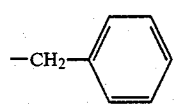 | 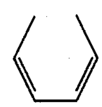 | | H | $-OH$ |
| B-322 | 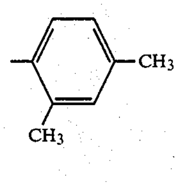 | 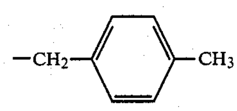 | $-OH$ | H | H | H |
| B-323 | 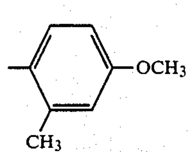 | 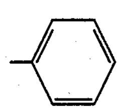 | H | $-OCH_3$ | $-OCH_3$ | H |
| B-324 | 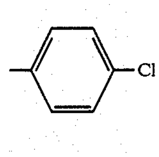 | 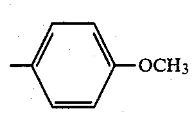 | H |  | | H |

-continued
Compounds having the structure of Formula [VII]
Formula [VII]
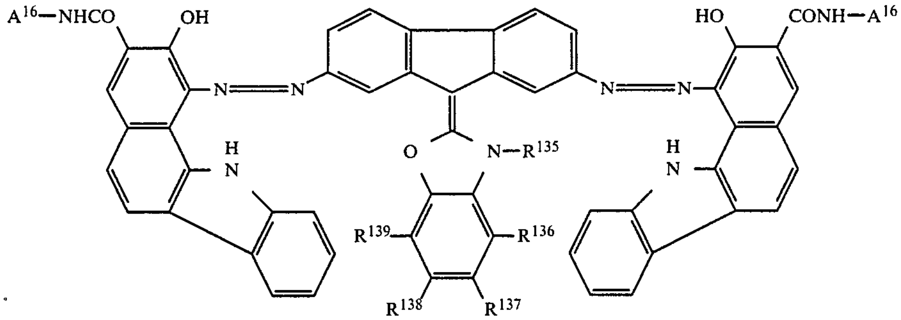
| Compound No. | $A^{16}$ | $R^{135}$ | $R^{136}$ | $R^{137}$ | $R^{138}$ | $R^{139}$ |
|---|---|---|---|---|---|---|
| B-325 | 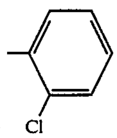 | 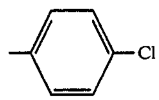 | H | 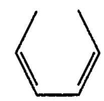 | | H |
| B-326 | 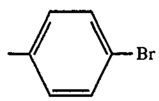 | 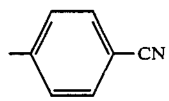 | H | $-CH_3$ | H | H |
| B-327 | 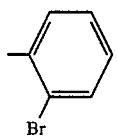 | $-C_2H_4-OH$ | H | 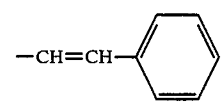 | 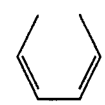 | |
| B-328 | 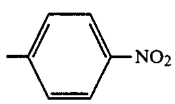 | $-C_2H_4-Cl$ | H | $-CH_3$ | H | $-Cl$ |
| B-329 | 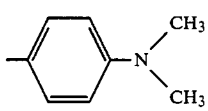 | $-C_4H_9$ | H | H | H | H |
| B-330 | 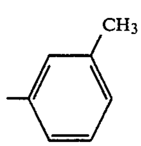 | $-C_8H_{17}$ | H | H | H | H |

Compounds having the structure of Formula [VIII]
Formula [VIII]
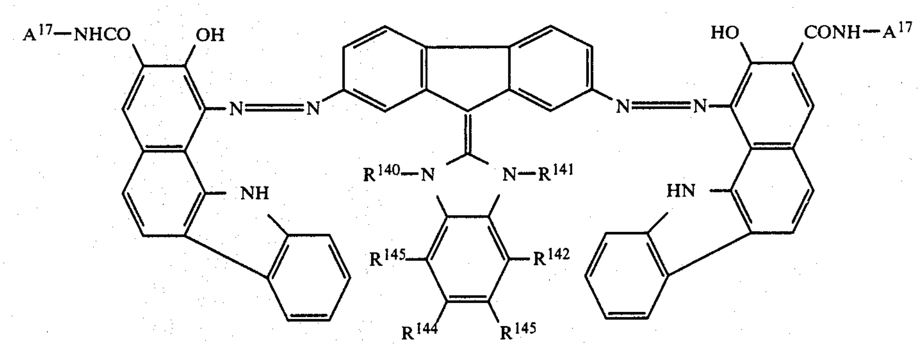
| Compound No. | $A^{17}$ | $R^{140}$ | $R^{141}$ | $R^{142}$ | $R^{143}$ | $R^{144}$ | $R^{145}$ |
|---|---|---|---|---|---|---|---|
| B-331 | 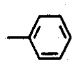 | $-CH_3$ | $-CH_3$ | H | H | H | H |
| B-332 | 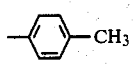 | $-CH_3$ | $-CH_3$ | H | H | H | H |
| B-333 | 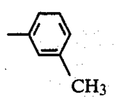 | $-CH_3$ | $CH_3$ | H | H | H | H |
| B-334 | 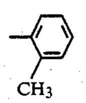 | $-CH_3$ | $-CH_3$ | H | H | H | H |
| B-335 | 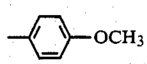 | $-CH_3$ | $CH_3$ | H | H | H | H |
| B-336 | 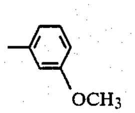 | $-CH_3$ | $-CH_3$ | H | H | H | H |
| B-337 | 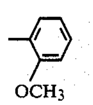 | $-CH_3$ | $-CH_3$ | H | H | H | H |
| B-338 | 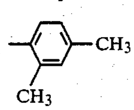 | $-CH_3$ | $CH_3$ | H | H | H | H |
| B-339 | 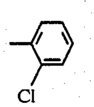 | $-CH_3$ | $CH_3$ | H | H | H | H |
| B-340 | 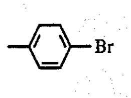 | $-CH_3$ | $-CH_3$ | H | H | H | H |
| B-341 | 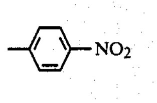 | $-CH_3$ | $-CH_3$ | H | H | H | H |
| B-342 | 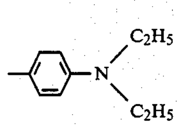 | $-CH_3$ | $-CH_3$ | H | H | H | H |

-continued
Compounds having the structure of Formula [VIII]
Formula [VIII]
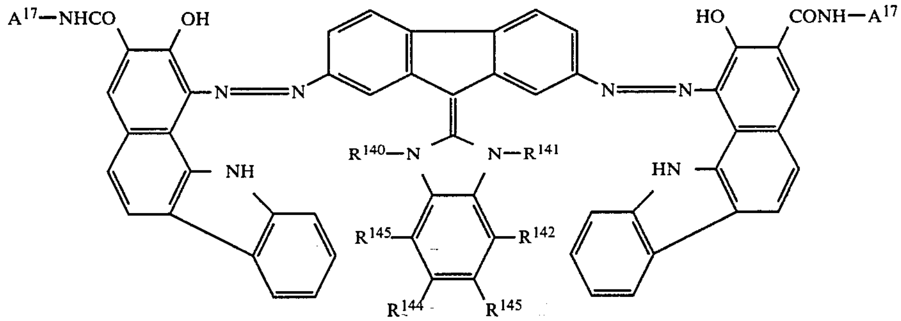
| Compound No. | $A^{17}$ | $R^{140}$ | $R^{141}$ | $R^{142}$ | $R^{143}$ | $R^{144}$ | $R^{145}$ |
|---|---|---|---|---|---|---|---|
| B-343 | 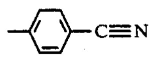 | $-CH_3$ | $-CH_3$ | H | H | H | H |
| B-344 | 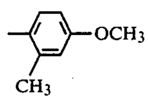 | $-CH_3$ | $-CH_3$ | H | H | H | H |
| B-345 | 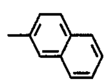 | $-CH_3$ | $-CH_3$ | |  | H | H |
| B-346 | 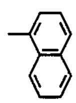 | $-CH_3$ | $-CH_3$ | H | |  | H |
| B-347 | 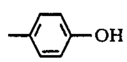 | $-CH_3$ | $-CH_3$ | H | |  | H |
| B-348 | 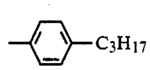 | $-CH_3$ | $-CH_3$ | H | |  | H |
| B-349 | 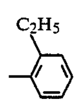 | $-CH_3$ | $-CH_3$ | H | H | |  |
| B-350 | 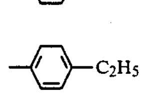 | $-C_2H_5$ | $-C_2H_5$ | H | H | H | H |
| B-351 | 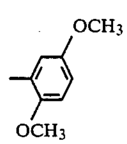 | $-C_2H_5$ | $-C_2H_5$ | H | H | H | H |
| B-352 | 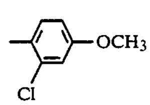 | $-C_2H_5$ | $-C_2H_5$ | H | H | H | H |
| B-353 | 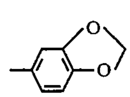 | $-C_2H_5$ | $-C_2H_5$ | H | H | H | H |
| B-354 | 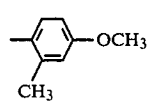 | $-C_2H_5$ | $-C_2H_5$ | H | H | H | H |

-continued
Compounds having the structure of Formula [VIII]
Formula [VIII]
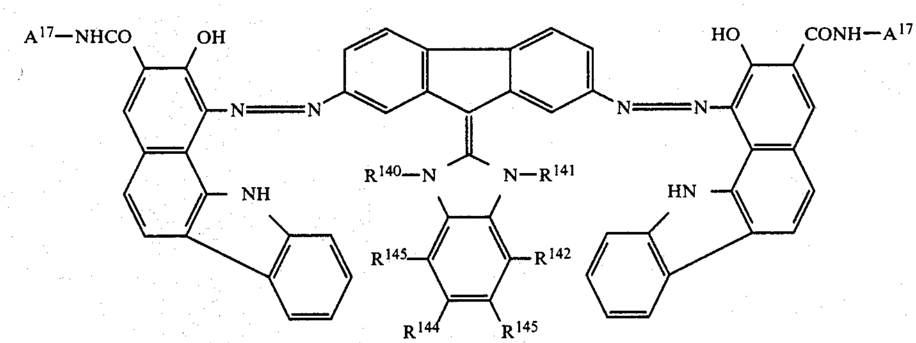
| Compound No. | $A^{17}$ | $R^{140}$ | $R^{141}$ | $R^{142}$ | $R^{143}$ | $R^{144}$ | $R^{145}$ |
|---|---|---|---|---|---|---|---|
| B-355 | 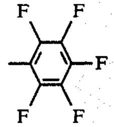 | $-C_2H_5$ | $-C_2H_5$ | H | H | H | H |
| B-356 | 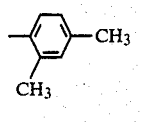 | $-C_2H_5$ | $-C_2H_5$ | H | H | H | H |
| B-357 | 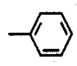 | $-C_2H_5$ | $-C_2H_5$ | H | H | H | H |
| B-358 | 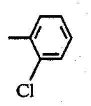 | $-C_2H_5$ | $-C_2H_5$ |  | | H | H |
| B-359 | 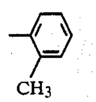 | $-C_2H_5$ | $-C_2H_5$ | H |  | | H |
| B-360 | 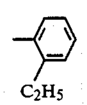 | $-C_2H_5$ | $-C_2H_5$ | H | 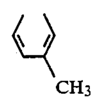 | | H |
| B-361 | 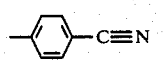 | $-C_2H_5$ | $-C_2H_5$ | H | H | |  |
| B-362 | 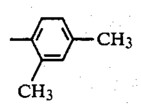 | 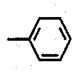 | $-CH_3$ | H | $-CH_3$ | H | H |
| B-363 | 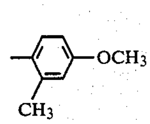 | 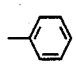 | $-CH_3$ | H | H | $-CH_3$ | H |
| B-364 | 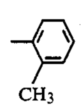 | 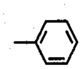 | $-CH_3$ | 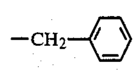 | H | H | H |
| B-365 | 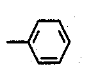 | 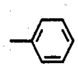 | $-CH_3$ | H | H | H | $-Cl$ |

-continued
Compounds having the structure of Formula [VIII]
Formula [VIII]
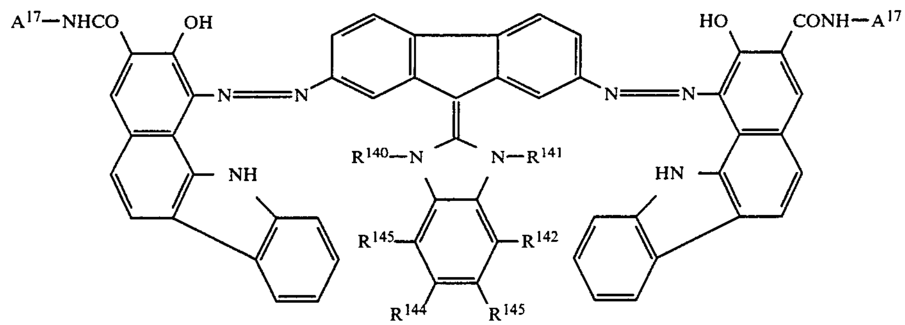
| Compound No. | $A^{17}$ | $R^{140}$ | $R^{141}$ | $R^{142}$ | $R^{143}$ | $R^{144}$ | $R^{145}$ |
|---|---|---|---|---|---|---|---|
| B-366 | 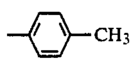 | $-CH_3$ | $-CH_3$ | H | $-OCH_3$ | H | H |
| B-367 | 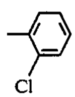 | $-CH_3$ | $-CH_3$ | H | $-OCH_3$ | $-OCH_3$ | H |
| B-368 | 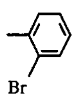 | $-CH_3$ | $-CH_3$ | H | $-Br$ | H | $-Br$ |
| B-369 | 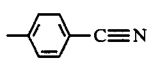 | $-CH_3$ | $-C_2H_5$ | H | 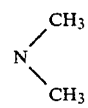 | H | H |
| B-370 | 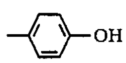 | $-CH_3$ | $-C_2H_5$ | H | H | H | $-C{\equiv}N$ |
| B-371 | 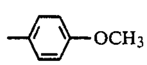 | $-CH_3$ | $-C_2H_5$ | H | H | H | $-OH$ |
| B-372 | 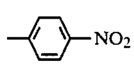 | $-CH_3$ | $-C_2H_5$ | $-OH$ | H | H | H |
| B-373 | 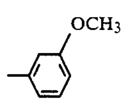 | $-CH_3$ | $-C_2H_5$ | $-F$ | $-F$ | $-F$ | $-F$ |
| B-374 | 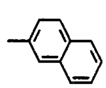 | $-CH_3$ | $-C_2H_5$ | H | $-OC_8H_{17}$ | H | H |
| B-375 | 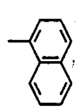 | $-CH_3$ | 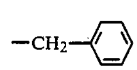 | H | H | H | H |
| B-376 | 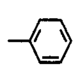 | $-CH_3$ | 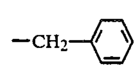 | |  | H | $-OH$ |
| B-377 | 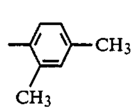 | 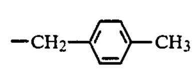 | 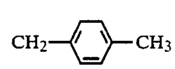 | $-OH$ | H | H | H |

-continued
Compounds having the structure of Formula [VIII]
Formula [VIII]
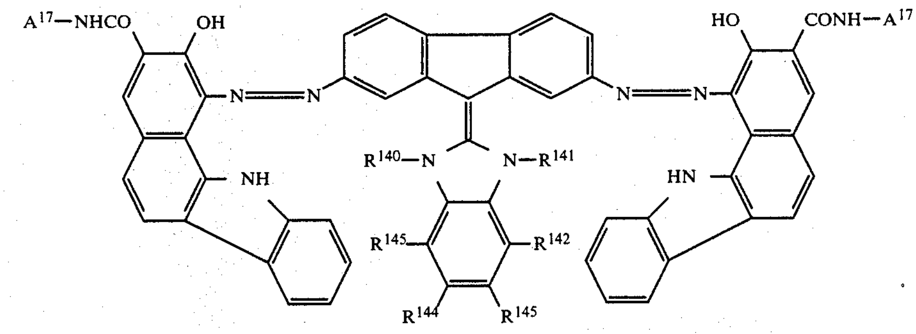
| Compound No. | $A^{17}$ | $R^{140}$ | $R^{141}$ | $R^{142}$ | $R^{143}$ | $R^{144}$ | $R^{145}$ |
|---|---|---|---|---|---|---|---|
| B-378 | 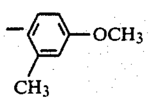 | 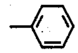 | 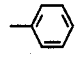 | H | $-OCH_3$ | $-OCH_3$ | H |
| B-379 | 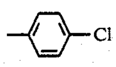 | 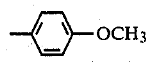 | 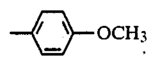 | H | 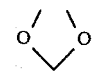 | | H |
| B-380 | 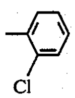 | 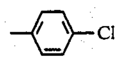 | 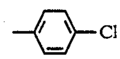 | H |  | | H |
| B-381 | 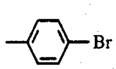 | 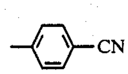 | 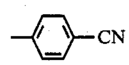 | H | $-CH_3$ | H | H |
| B-382 | 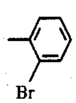 | $-C_2H_4-OH$ | $-C_2H_4-OH$ | H | 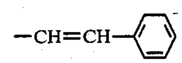 | |  |
| B-383 | 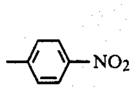 | $-C_2H_4-Cl$ | $-C_2H_4-Cl$ | H | $-CH_3$ | H | $-Cl$ |
| B-384 | 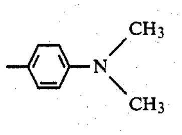 | $-C_4H_9$ | $-C_4H_9$ | H | H | H | H |
| B-385 | 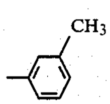 | $-C_8H_{17}$ | $-C_8H_{17}$ | H | H | H | H |

Compounds having the structure of Formula [IX]
Formula [IX]
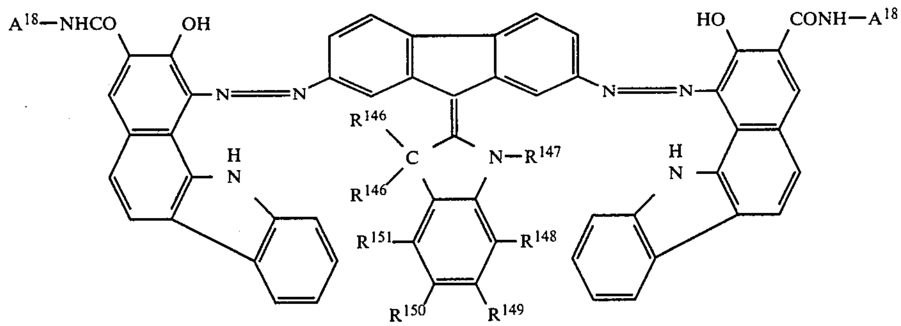
| Compound No. | $A^{18}$ | $R^{146}$ | $R^{147}$ | $R^{148}$ | $R^{149}$ | $R^{150}$ | $R^{151}$ |
|---|---|---|---|---|---|---|---|
| B-386 | 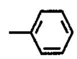 | H | $-CH_3$ | H | H | H | H |
| B-387 | 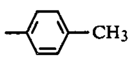 | H | $-CH_3$ | H | H | H | H |
| B-388 | 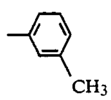 | H | $-CH_3$ | H | H | H | H |
| B-389 | 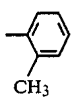 | H | $-CH_3$ | H | H | H | H |
| B-390 | 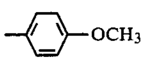 | H | $-CH_3$ | H | H | H | H |
| B-391 | 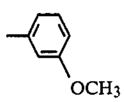 | H | $-CH_3$ | H | H | H | H |
| B-392 | 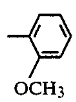 | H | $-CH_3$ | H | H | H | H |
| B-393 | 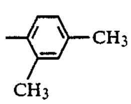 | H | $-CH_3$ | H | H | H | H |
| B-394 | 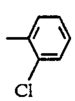 | H | $-CH_3$ | H | H | H | H |
| B-395 | 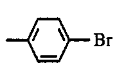 | H | $-CH_3$ | H | H | H | H |
| B-396 | 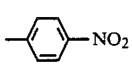 | H | $-CH_3$ | H | H | H | H |
| B-397 | 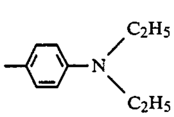 | H | $-CH_3$ | H | H | H | H |

-continued
Compounds having the structure of Formula [IX]
Formula [IX]
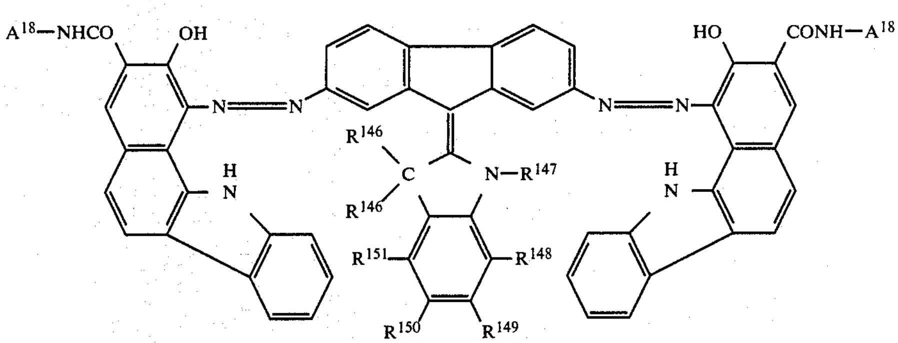
| Compound No. | $A^{18}$ | $R^{146}$ | $R^{147}$ | $R^{148}$ | $R^{149}$ | $R^{150}$ | $R^{151}$ |
|---|---|---|---|---|---|---|---|
| B-398 | 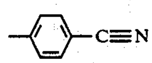 | H | $-CH_3$ | H | H | H | H |
| B-399 | 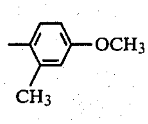 | H | $-CH_3$ | H | H | H | H |
| B-400 | 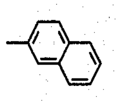 | H | $-CH_3$ |  | | H | H |
| B-401 | 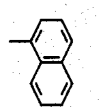 | $-CH_3$ | $-CH_3$ | H |  | | H |
| B-402 | 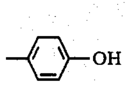 | $-CH_3$ | $-CH_3$ | H |  | | H |
| B-403 | 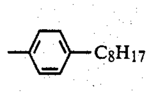 | $-CH_3$ | $-CH_3$ | H |  | | H |
| B-404 | 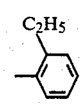 | $-CH_3$ | $-CH_3$ | H | H |  | |
| B-405 | 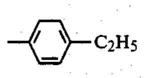 | $-CH_3$ | $-C_2H_5$ | H | H | H | H |
| B-406 | 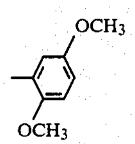 | $-CH_3$ | $-C_2H_5$ | H | H | H | H |
| B-407 | 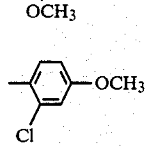 | $-CH_3$ | $-C_2H_5$ | H | H | H | H |
| B-408 | 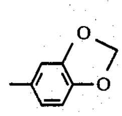 | $-CH_3$ | $-C_2H_5$ | H | H | H | H |
| B-409 | 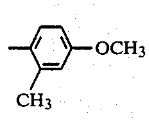 | $-CH_3$ | $-C_2H_5$ | H | H | H | H |

-continued
Compounds having the structure of Formula [IX]
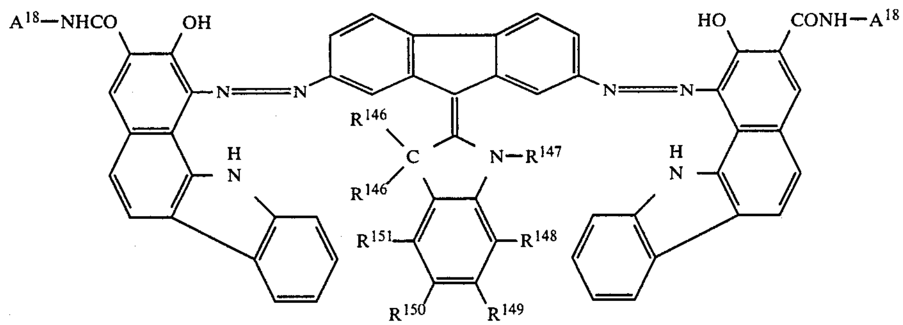
Formula [IX]
| Compound No. | $A^{18}$ | $R^{146}$ | $R^{147}$ | $R^{148}$ | $R^{149}$ | $R^{150}$ | $R^{151}$ |
|---|---|---|---|---|---|---|---|
| B-410 | 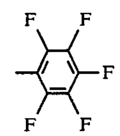 | $-CH_3$ | $-C_2H_5$ | H | H | H | H |
| B-411 | 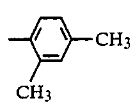 | $-CH_3$ | $-C_2H_5$ | H | H | H | H |
| B-412 | 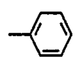 | $-CH_3$ | $-C_2H_5$ | H | H | H | H |
| B-413 | 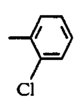 | $-CH_3$ | $-C_2H_5$ |  | | H | H |
| B-414 | 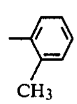 | $-CH_3$ | $-C_2H_5$ | H |  | | H |
| B-415 | 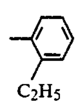 | $-CH_3$ | $-C_2H_5$ | H | 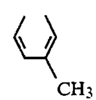 | | H |
| B-416 | 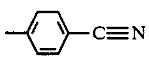 | $-CH_3$ | $-C_2H_5$ | H | H | 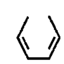 | |
| B-417 | 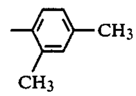 | H | $-CH_3$ | H | $-CH_3$ | H | H |
| B-418 | 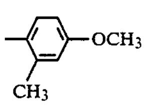 | H | $-CH_3$ | H | H | $-CH_3$ | H |
| B-419 | 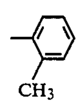 | H | $-CH_3$ | 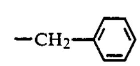 | H | H | H |
| B-420 | 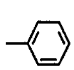 | H | $-CH_3$ | H | H | H | $-Cl$ |

-continued
Compounds having the structure of Formula [IX]
Formula [IX]
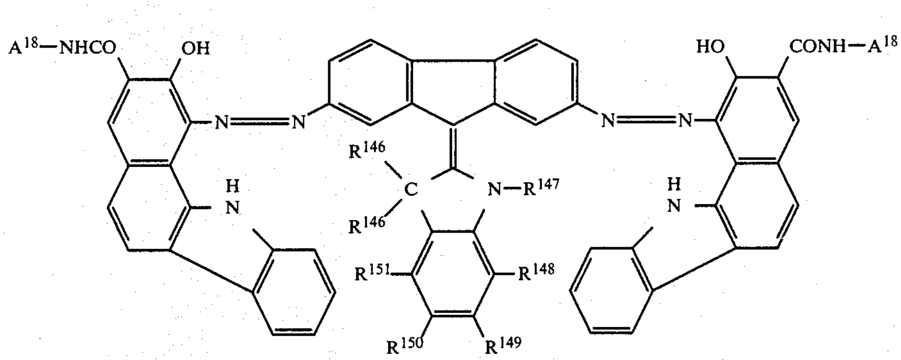
| Compound No. | $A^{18}$ | $R^{146}$ | $R^{147}$ | $R^{148}$ | $R^{149}$ | $R^{150}$ | $R^{151}$ |
|---|---|---|---|---|---|---|---|
| B-421 | 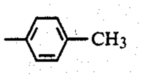 | H | $-CH_3$ | H | $-OCH_3$ | H | H |
| B-422 | 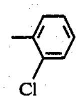 | H | $-CH_3$ | H | $-OCH_3$ | $-OCH_3$ | H |
| B-423 | 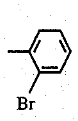 | $-CH_3$ | $-CH_3$ | H | $-Br$ | H | $-Br$ |
| B-424 | 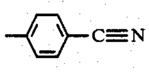 | $-CH_3$ | $-C_2H_5$ | H | 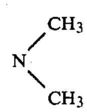 | H | H |
| B-425 | 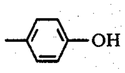 | $-CH_3$ | $-C_2H_5$ | H | H | H | $-C\equiv N$ |
| B-426 | 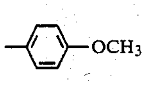 | $-CH_3$ | $-C_2H_5$ | H | H | H | $-OH$ |
| B-427 | 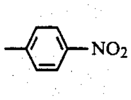 | $-CH_3$ | $-C_2H_5$ | $-OH$ | H | H | H |
| B-428 | 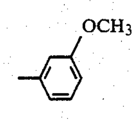 | $-CH_3$ | $-C_2H_5$ | $-F$ | $-F$ | $-F$ | $-F$ |
| B-429 | 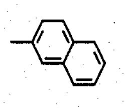 | $-CH_3$ | $-C_2H_5$ | H | $-OC_8H_{17}$ | H | H |
| B-430 | 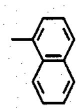 | $-CH_3$ | 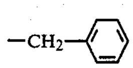 | H | H | H | H |
| B-431 | 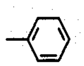 | $-CH_3$ | 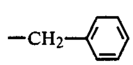 | |  | H | $-CH$ |
| B-432 | 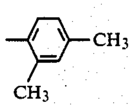 | $-CH_3$ | 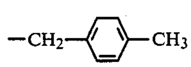 | $-OH$ | H | H | H |

-continued
Compounds having the structure of Formula [IX]
Formula [IX]
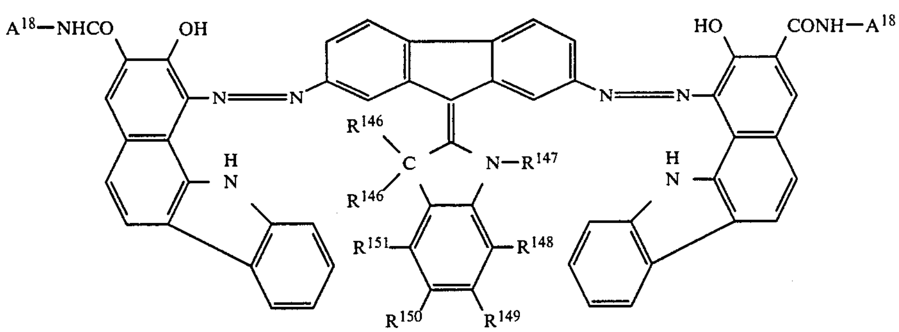
| Compound No. | $A^{18}$ | $R^{146}$ | $R^{147}$ | $R^{148}$ | $R^{149}$ | $R^{150}$ | $R^{151}$ |
|---|---|---|---|---|---|---|---|
| B-433 | 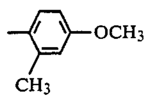 | $-CH_3$ | 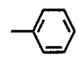 | H | $-OCH_3$ | $-OCH_3$ | H |
| B-434 | 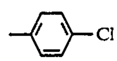 | $-CH_3$ | 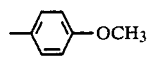 | H | 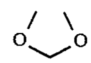 | | H |
| B-435 | 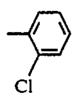 | $-CH_3$ | 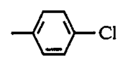 | H |  | | H |
| B-436 | 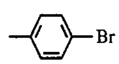 | $-CH_3$ | 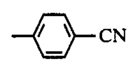 | H | $-CH_3$ | H | H |
| B-437 | 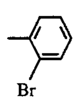 | $-C_2H_5$ | $-C_2H_4-OH$ | H | 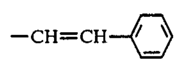 |  | |
| B-438 | 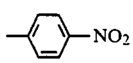 | $-C_2H_5$ | $-C_2H_4-Cl$ | H | $-CH_3$ | H | $-Cl$ |
| B-439 | 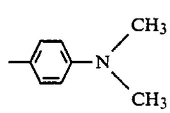 | $-C_2H_5$ | $-C_4H_9$ | H | H | H | H |
| B-440 | 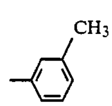 | $-C_2H_5$ | $-C_8H_{17}$ | H | H | H | H |

Compounds having the structure of Formula [X]
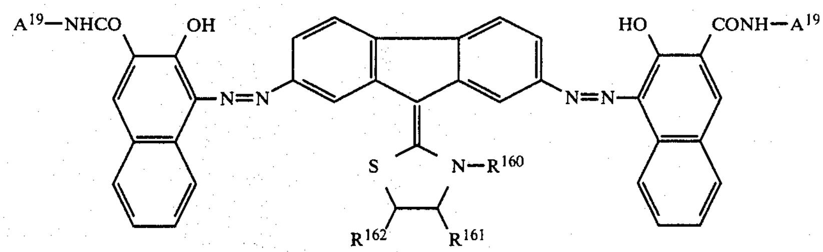
Formula [X]
| Compound No. | $A^{19}$ | $R^{160}$ | $R^{161}$ | $R^{162}$ |
|---|---|---|---|---|
| B-441 | 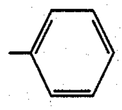 | $-CH_3$ | H | H |
| B-442 | 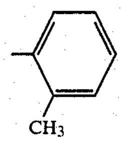 | $-CH_3$ | H | H |
| B-443 | 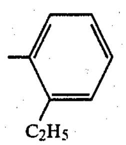 | $-CH_3$ | H | H |
| B-444 | 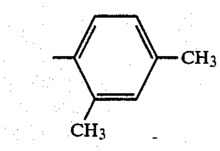 | $-CH_3$ | H | H |
| B-445 | 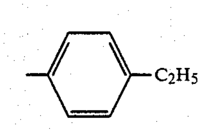 | $-CH_3$ | H | H |
| B-446 | 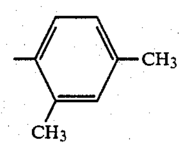 | $-CH_3$ | H | H |
| B-447 | 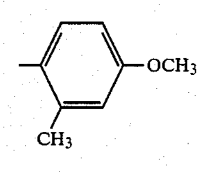 | $-CH_3$ | $-CH_3$ | H |
| B-448 | 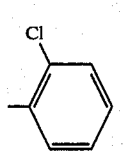 | $-CH_3$ | $-CH_3$ | $-CH_3$ |
| B-449 | 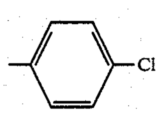 | $-C_2H_5$ | H | H |

-continued
Compounds having the structure of Formula [X]
Formula [X]
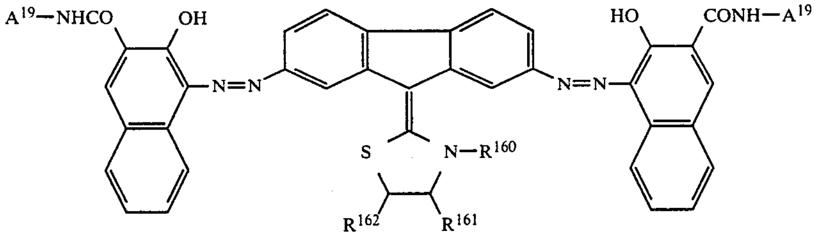
| Compound No. | $A^{19}$ | $R^{160}$ | $R^{161}$ | $R^{162}$ |
|---|---|---|---|---|
| B-450 | 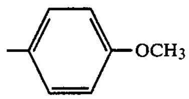 | $-C_2H_5$ | H | H |
| B-451 | 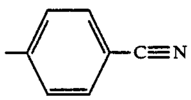 | $-C_2H_5$ | H | H |
| B-452 | 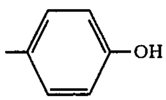 | $-C_2H_5$ | H | H |
| B-453 | 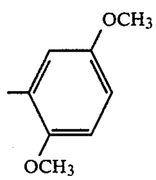 | $-C_2H_5$ | H | H |
| B-454 | 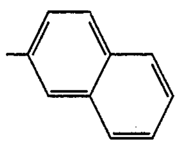 | $-C_2H_5$ | $-CH_3$ | $-CH_3$ |
| B-455 | 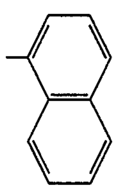 | $-C_2H_5$ | $-OCH_3$ | H |
| B-456 | 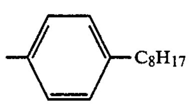 | $-C_3H_7$ | $-Cl$ | $-Cl$ |
| B-457 | 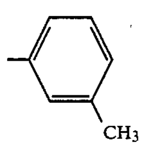 | 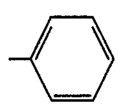 | $-C\equiv N$ | H |
| B-458 | 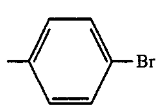 | 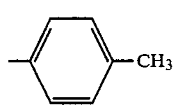 | $-CH_3$ | $-CH_3$ |

-continued
Compounds having the structure of Formula [X]
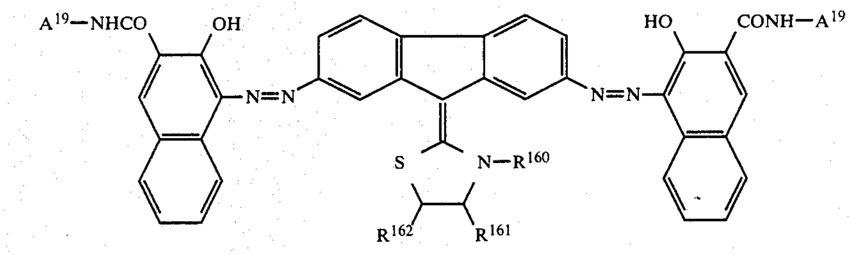
Formula [X]
| Compound No. | $A^{19}$ | $R^{160}$ | $R^{161}$ | $R^{162}$ |
|---|---|---|---|---|
| B-459 | 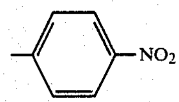 | $-C_8H_{17}$ | H | H |
| B-460 | 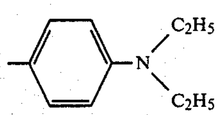 | 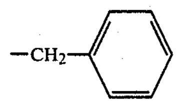 | H | H |
Compounds having the structure of Formula [XI]
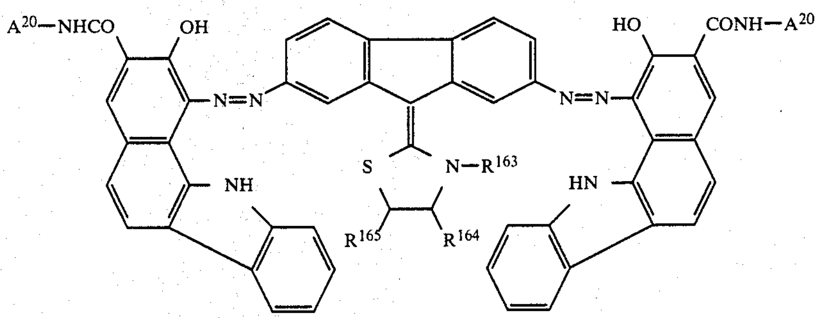
Formula [XI]
| Compound No. | $A^{20}$ | $R^{163}$ | $R^{164}$ | $R^{165}$ |
|---|---|---|---|---|
| B-461 | 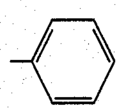 | $-CH_3$ | H | H |
| B-462 | 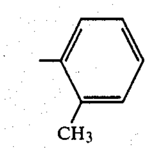 | $-CH_3$ | H | H |
| B-463 | 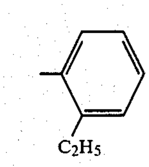 | $-CH_3$ | H | H |
| B-464 | 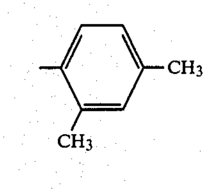 | $-CH_3$ | H | H |

-continued
Compounds having the structure of Formula [XI]
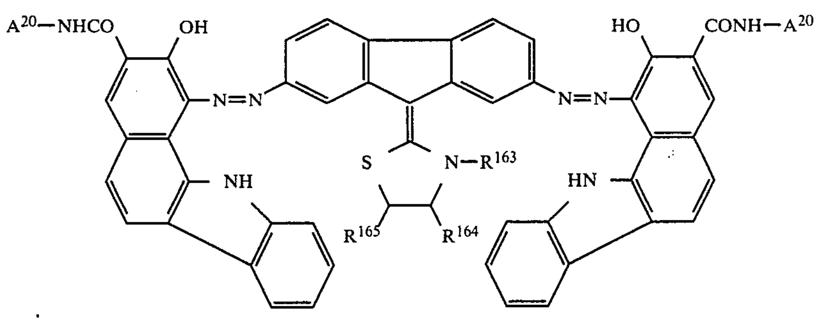
Formula [XI]
| Compound No. | $A^{20}$ | $R^{163}$ | $R^{164}$ | $R^{165}$ |
|---|---|---|---|---|
| B-465 | 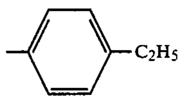 | $-CH_3$ | H | H |
| B-466 | 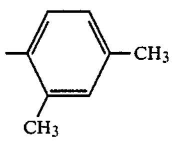 | $-CH_3$ | H | H |
| B-467 | 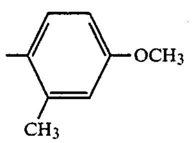 | $-CH_3$ | $-CH_3$ | H |
| B-468 | 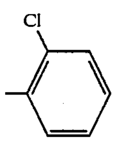 | $-CH_3$ | $-CH_3$ | $-CH_3$ |
| B-469 | 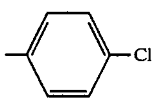 | $-C_2H_5$ | H | H |
| B-470 | 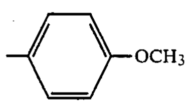 | $-C_2H_5$ | H | H |
| B-471 | 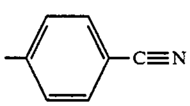 | $-C_2H_5$ | H | H |
| B-472 | 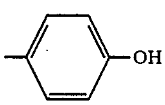 | $-C_2H_5$ | H | H |
| B-473 | 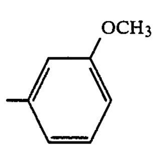 | $-C_2H_5$ | H | H |

-continued
Compounds having the structure of Formula [XI]
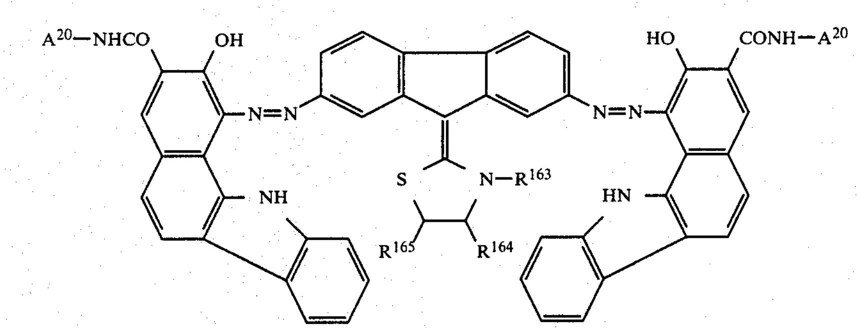
Formula [XI]
| Compound No. | $A^{20}$ | $R^{163}$ | $R^{164}$ | $R^{165}$ |
|---|---|---|---|---|
| B-474 | 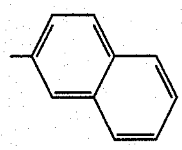 | $-C_2H_5$ | $-CH_3$ | $-CH_3$ |
| B-475 | 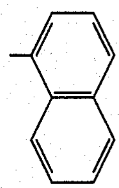 | $-C_2H_5$ | $-OCH_3$ | H |
| B-476 | 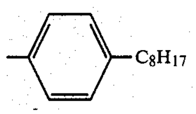 | $-C_3H_7$ | $-Cl$ | $-Cl$ |
| B-477 | 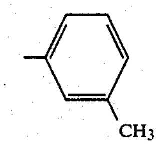 | 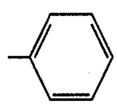 | $-C\equiv N$ | H |
| B-478 | 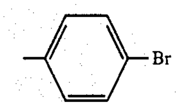 | 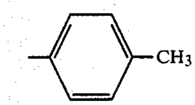 | $-CH_3$ | $-CH_3$ |
| B-479 | 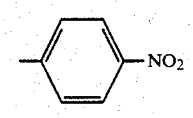 | $-C_8H_{17}$ | H | H |
| B-480 | 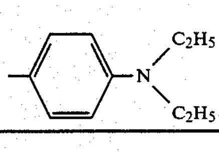 | 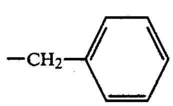 | H | H |

Compounds having the structure of Formula [XII]
Formula [XII]
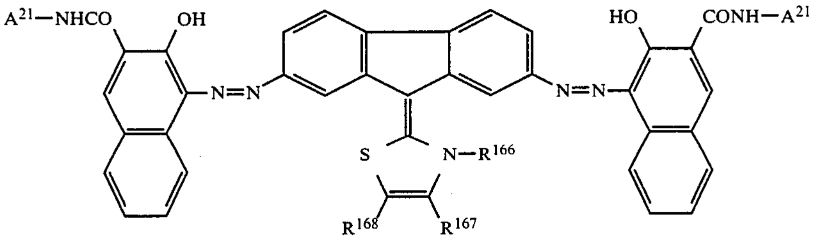
| Compound No. | $A^{21}$ | $R^{166}$ | $R^{167}$ | $R^{168}$ |
|---|---|---|---|---|
| B-481 | 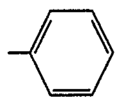 | $-CH_3$ | H | H |
| B-482 | 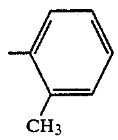 | $-CH_3$ | H | H |
| B-483 | 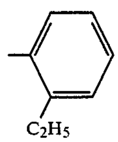 | $-CH_3$ | H | H |
| B-484 | 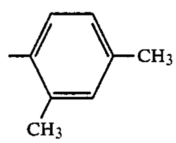 | $-CH_3$ | H | H |
| B-485 | 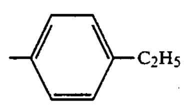 | $-CH_3$ | H | H |
| B-486 | 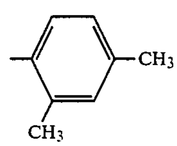 | $-CH_3$ | H | H |
| B-487 | 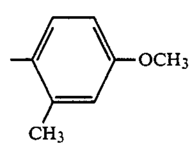 | $-CH_3$ | $-CH_3$ | H |
| B-488 | 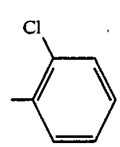 | $-CH_3$ | $-CH_3$ | $-CH_3$ |
| B-489 | 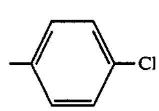 | $-C_2H_5$ | H | H |

-continued
Compounds having the structure of Formula [XII]
Formula [XII]
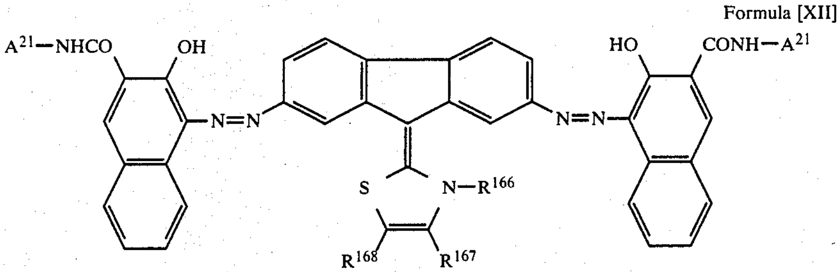
| Compound No. | $A^{21}$ | $R^{166}$ | $R^{167}$ | $R^{168}$ |
|---|---|---|---|---|
| B-490 | 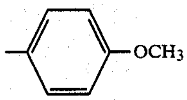 | $-C_2H_5$ | H | H |
| B-491 | 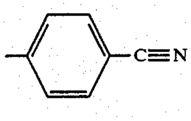 | $-C_2H_5$ | H | H |
| B-492 | 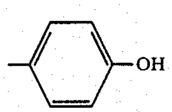 | $-C_2H_5$ | H | H |
| B-493 | 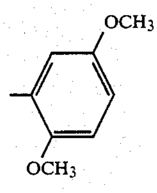 | $-C_2H_5$ | H | H |
| B-494 | 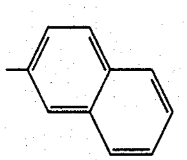 | $-C_2H_5$ | $-CH_3$ | $-CH_3$ |
| B-495 | 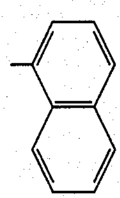 | $-C_2H_5$ | $-OCH_3$ | H |
| B-496 | 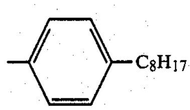 | $-C_3H_7$ | —Cl | —Cl |
| B-497 | 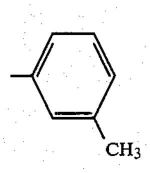 | 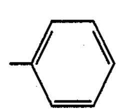 | —C≡N | H |
| B-498 | 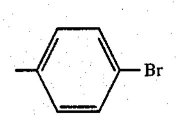 | 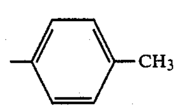 | $-CH_3$ | $-CH_3$ |

-continued
Compounds having the structure of Formula [XII]
Formula [XII]
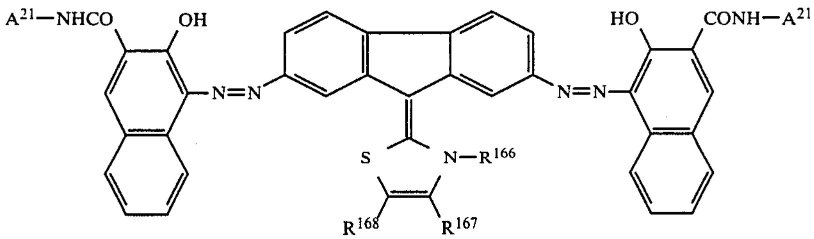
| Compound No. | $A^{21}$ | $R^{166}$ | $R^{167}$ | $R^{168}$ |
|---|---|---|---|---|
| B-499 | 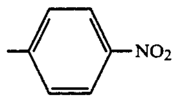 | $-C_8H_{17}$ | H | H |
| B-500 | 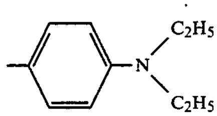 | 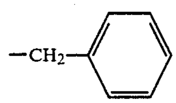 | H | H |
Compounds having the structure of Formula [XIII]
Formula [XIII]
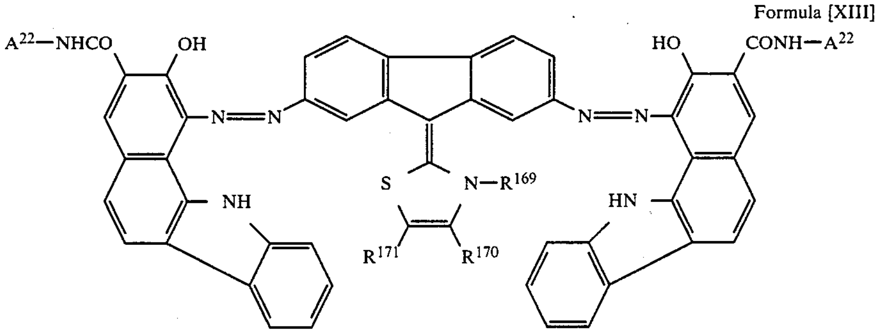
| Compound No. | $A^{22}$ | $R^{169}$ | $R^{170}$ | $R^{171}$ |
|---|---|---|---|---|
| B-501 | 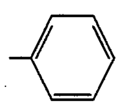 | $-CH_3$ | H | H |
| B-502 | 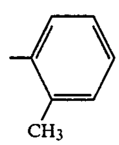 | $-CH_3$ | H | H |
| B-503 | 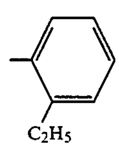 | $-CH_3$ | H | H |
| B-504 | 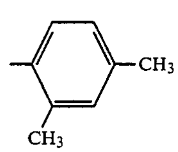 | $-CH_3$ | H | H |

-continued
Compounds having the structure of Formula [XIII]
Formula [XIII]
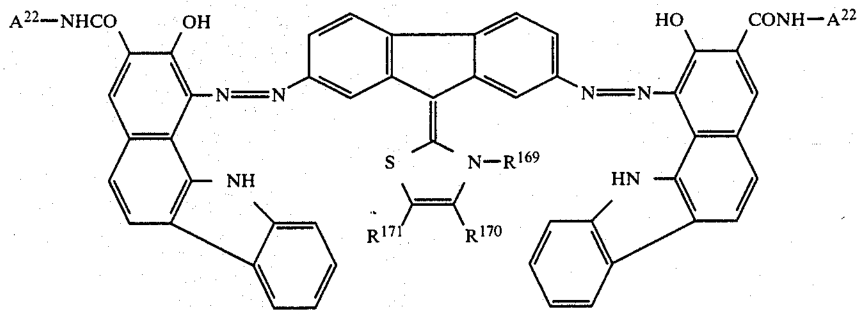
| Compound No. | $A^{22}$ | $R^{169}$ | $R^{170}$ | $R^{171}$ |
|---|---|---|---|---|
| B-505 | 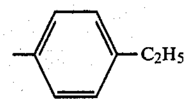 | $-CH_3$ | H | H |
| B-506 | 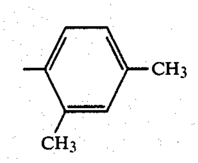 | $-CH_3$ | H | H |
| B-507 | 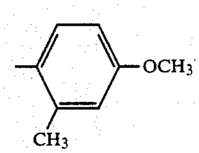 | $-CH_3$ | $-CH_3$ | H |
| B-508 | 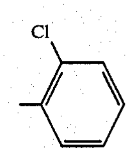 | $-CH_3$ | $-CH_3$ | $-CH_3$ |
| B-509 | 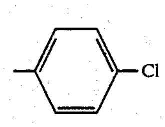 | $-C_2H_5$ | H | H |
| B-510 | 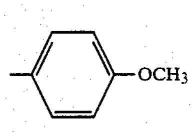 | $-C_2H_5$ | H | H |
| B-511 | 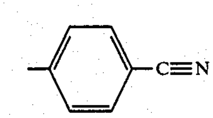 | $-C_2H_5$ | H | H |
| B-512 | 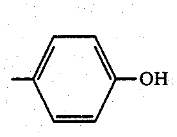 | $-C_2H_5$ | H | H |
| B-513 | 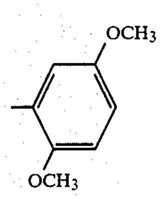 | $-C_2H_5$ | H | H |

-continued
Compounds having the structure of Formula [XIII]
Formula [XIII]
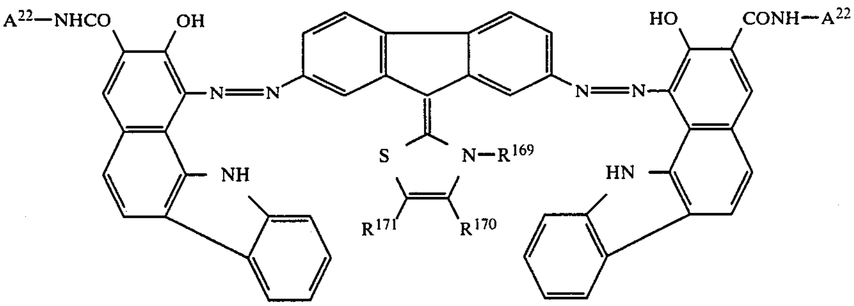
| Compound No. | A22 | R169 | R170 | R171 |
| --- | --- | --- | --- | --- |
| B-514 | 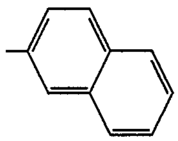 | $-C_2H_5$ | $-CH_3$ | $-CH_3$ |
| B-515 | 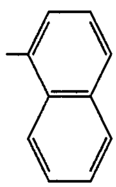 | $-C_2H_5$ | $-OCH_3$ | H |
| B-516 | 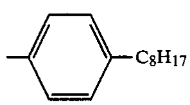  | $-C_3H_7$ | —Cl | —Cl |
| B-517 | 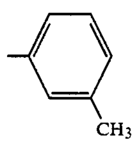  | 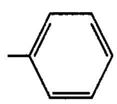 | —C≡N | H |
| B-518 | 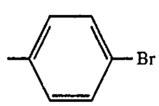  | 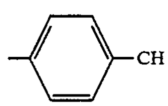  | —CH | —CH |
| B-519 | 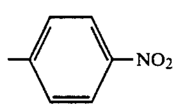  | $-C_8H_{17}$ | H | H |
| B-520 | 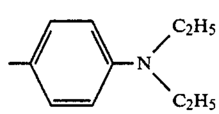  | 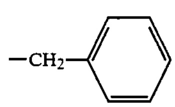  | H | H |

Compounds having the structure of Formula [XIV]
Formula [XIV]
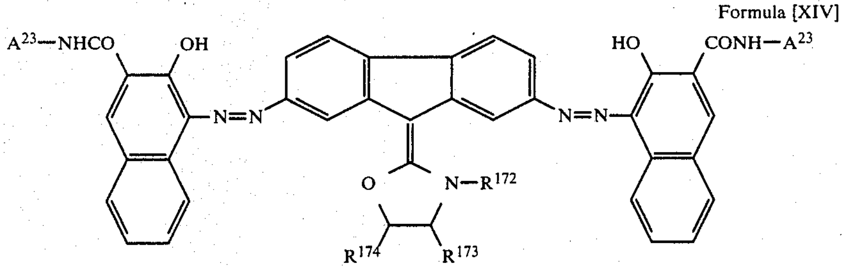
| Compound No. | $A^{23}$ | $R^{172}$ | $R^{173}$ | $R^{174}$ |
|---|---|---|---|---|
| B-521 | 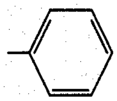 | $-CH_3$ | H | H |
| B-522 | 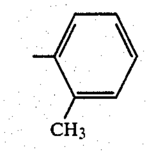 | $-CH_3$ | H | H |
| B-523 | 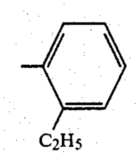 | $-CH_3$ | H | H |
| B-524 | 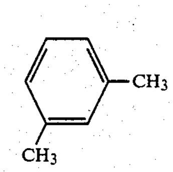 | $-CH_3$ | H | H |
| B-525 | 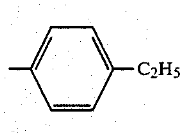 | $-CH_3$ | H | H |
| B-526 | 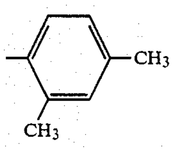 | $-CH_3$ | H | H |
| B-527 | 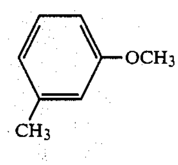 | $-CH_3$ | $-CH_3$ | H |
| B-528 | 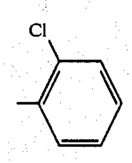 | $-CH_3$ | $-CH_3$ | $-CH_3$ |
| B-529 | 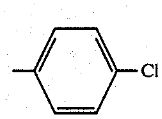 | $-C_2H_5$ | H | H |

-continued
Compounds having the structure of Formula [XIV]
Formula [XIV]
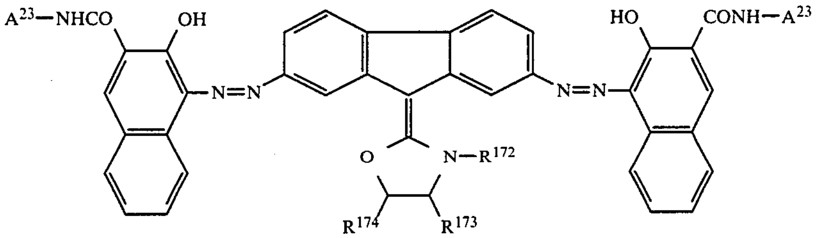
| Compound No. | $A^{23}$ | $R^{172}$ | $R^{173}$ | $R^{174}$ |
|---|---|---|---|---|
| B-530 | 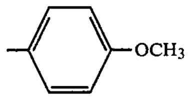 | $-C_2H_5$ | H | H |
| B-531 | 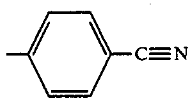 | $-C_2H_5$ | H | H |
| B-532 | 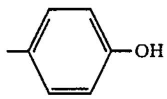 | $-C_2H_5$ | H | H |
| B-533 | 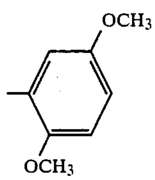 | $-C_2H_5$ | H | H |
| B-534 | 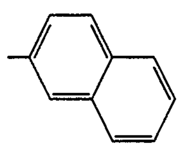 | $-C_2H_5$ | $-CH_3$ | $-CH_3$ |
| B-535 | 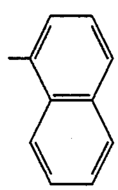 | $-C_2H_5$ | $-OCH_3$ | H |
| B-536 | 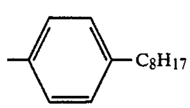 | $-C_3H_7$ | $-Cl$ | $-Cl$ |
| B-537 | 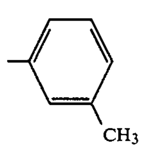 | 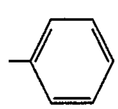 | $-C\equiv N$ | H |
| B-538 | 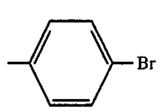 | 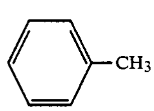 | $-CH_3$ | $-CH_3$ |

-continued
Compounds having the structure of Formula [XIV]
Formula [XIV]
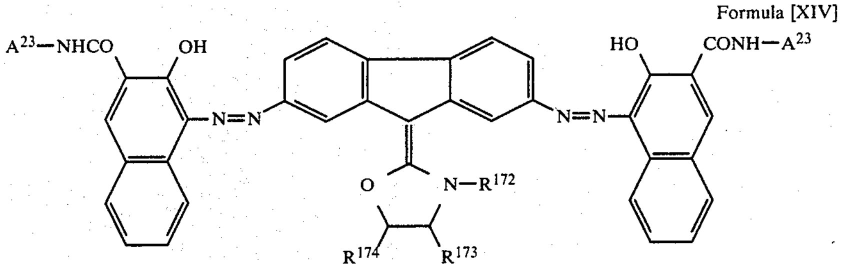
| Compound No. | $A^{23}$ | $R^{172}$ | $R^{173}$ | $R^{174}$ |
|---|---|---|---|---|
| B-539 | 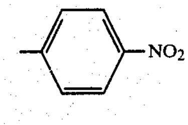 | $-C_8H_{17}$ | H | H |
| B-540 | 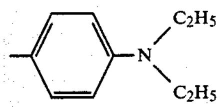 | 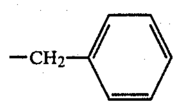 | H | H |
Compounds having the structure of Formula [XV]
Formula [XV]
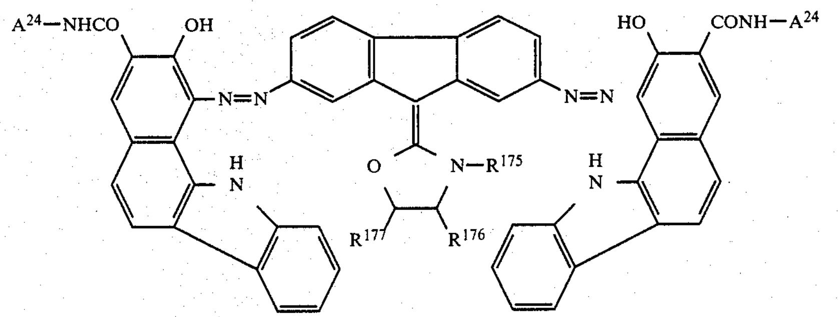
| Compound No. | $A^{24}$ | $R^{175}$ | $R^{176}$ | $R^{177}$ |
|---|---|---|---|---|
| B-541 | 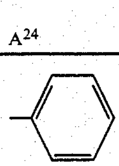 | $-CH_3$ | H | H |
| B-542 | 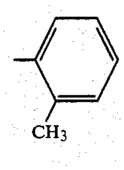 | $-CH_3$ | H | H |
| B-543 | 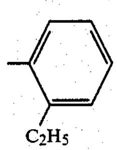 | $-CH_3$ | H | H |
| B-544 | 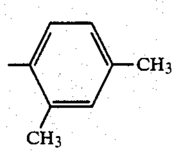 | $-CH_3$ | H | H |

-continued
Compounds having the structure of Formula [XV]
Formula [XV]
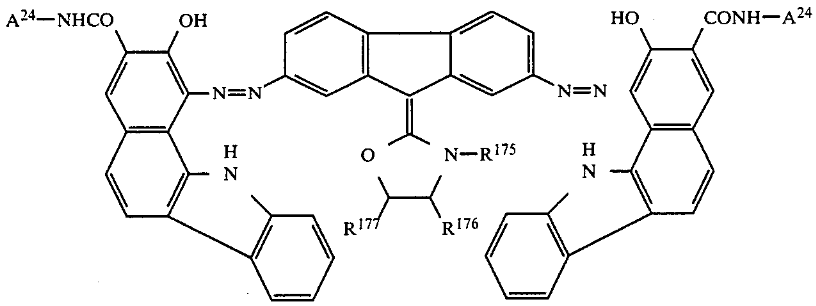
| Compound No. | $A^{24}$ | $R^{175}$ | $R^{176}$ | $R^{177}$ |
|---|---|---|---|---|
| B-545 | 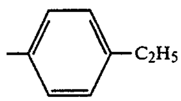 | $-CH_3$ | H | H |
| B-546 | 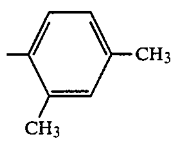 | $-CH_3$ | H | H |
| B-547 | 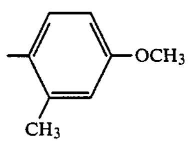 | $-CH_3$ | $-CH_3$ | H |
| B-548 | 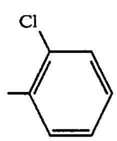 | $-CH_3$ | $-CH_3$ | $-CH_3$ |
| B-549 | 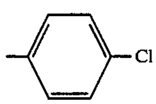 | $-C_2H_5$ | H | H |
| B-550 | 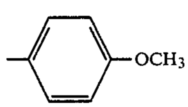 | $-C_2H_5$ | H | H |
| B-551 | 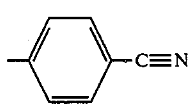 | $-C_2H_5$ | H | H |
| B-552 | 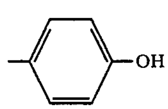 | $-C_2H_5$ | H | H |
| B-553 | 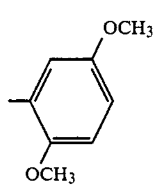 | $-C_2H_5$ | H | H |

-continued
Compounds having the structure of Formula [XV]
Formula [XV]
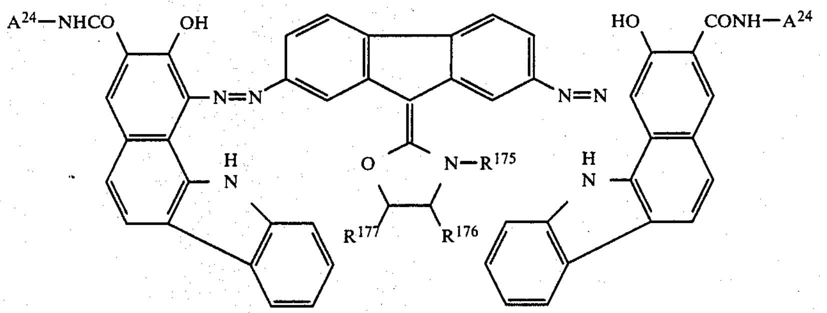
| Compound No. | $A^{24}$ | $R^{175}$ | $R^{176}$ | $R^{177}$ |
|---|---|---|---|---|
| B-554 | 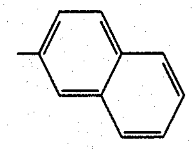 | $-C_2H_5$ | $-CH_3$ | $-CH_3$ |
| B-555 | 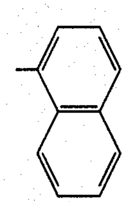 | $-C_2H_5$ | $-OCH_3$ | H |
| B-556 | 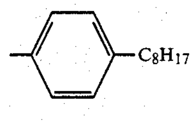 | $-C_3H_7$ | $-Cl$ | $-Cl$ |
| B-557 | 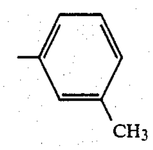 | 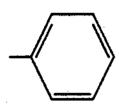 | $-C{\equiv}N$ | H |
| B-558 | 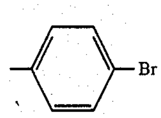 | 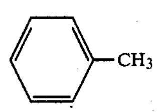 | $-CH_3$ | $-CH_3$ |
| B-559 | 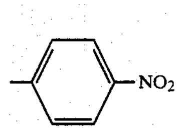 | $-C_8H_{17}$ | H | H |
| B-560 | 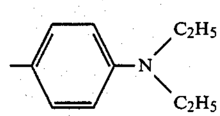 | 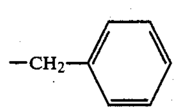 | H | H |

Compounds having the structure of Formula [XVI]
Formula [XVI]
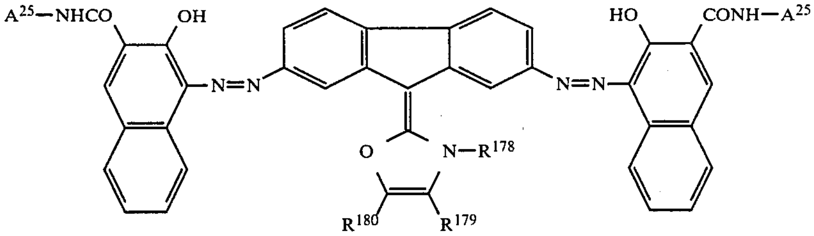
| Compound No. | $A^{25}$ | $R^{178}$ | $R^{179}$ | $R^{180}$ |
|---|---|---|---|---|
| B-561 | 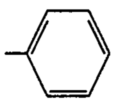 | $-CH_3$ | H | H |
| B-562 | 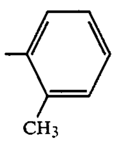 | $-CH_3$ | H | H |
| B-563 | 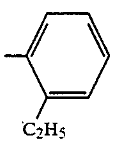 | $-CH_3$ | H | H |
| B-564 | 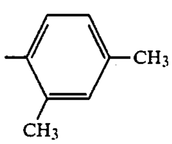 | $-CH_3$ | H | H |
| B-565 | 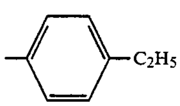 | $-CH_3$ | H | H |
| B-566 | 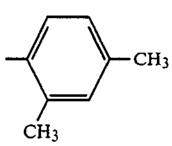 | $-CH_3$ | H | H |
| B-567 | 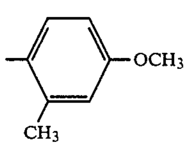 | $-CH_3$ | $-CH_3$ | H |
| B-568 | 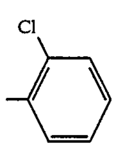 | $-CH_3$ | $-CH_3$ | $-CH_3$ |
| B-569 | 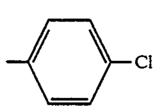 | $-C_2H_5$ | H | H |

-continued
Compounds having the structure of Formula [XVI]
Formula [XVI]
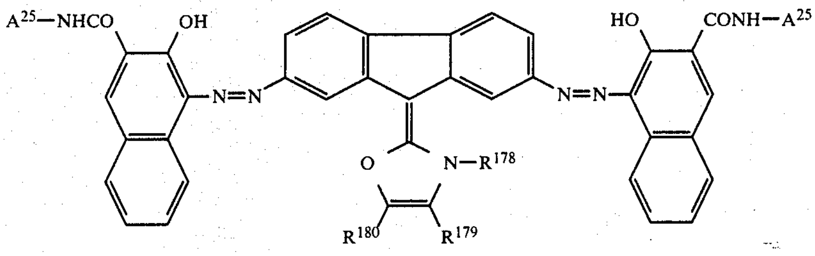
| Compound No. | $A^{25}$ | $R^{178}$ | $R^{179}$ | $R^{180}$ |
|---|---|---|---|---|
| B-570 | 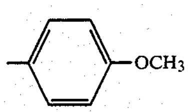 | $-C_2H_5$ | H | H |
| B-571 | 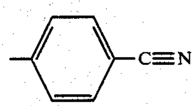 | $-C_2H_5$ | H | H |
| B-572 | 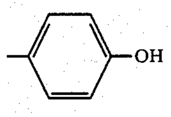 | $-C_2H_5$ | H | H |
| B-573 | 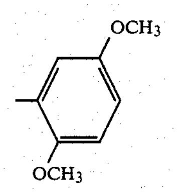 | $-C_2H_5$ | H | H |
| B-574 | 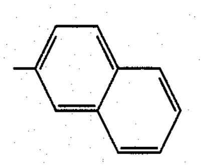 | $-C_2H_5$ | $-CH_3$ | $-CH_3$ |
| B-575 | 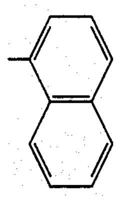 | $-C_2H_5$ | $-OCH_3$ | H |
| B-576 | 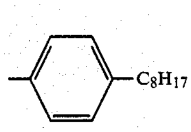 | $-C_3H_7$ | $-Cl$ | $-Cl$ |
| B-577 | 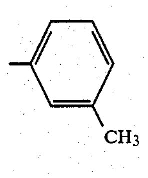 | 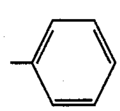 | $-C \equiv N$ | H |

-continued
Compounds having the structure of Formula [XVI]
Formula [XVI]
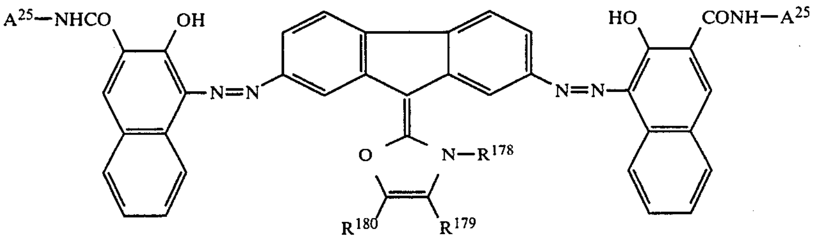
| Compound No. | $A^{25}$ | $R^{178}$ | $R^{179}$ | $R^{180}$ |
|---|---|---|---|---|
| B-578 | 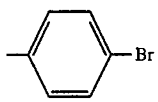 | 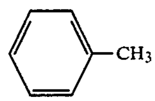 | $-CH_3$ | $-CH_3$ |
| B-579 | 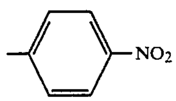 | $-C_8H_{17}$ | H | H |
| B-580 | 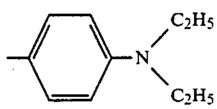 | 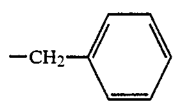 | H | H |
Compounds having the structure of Formula [XVII]
Formula [XVII]
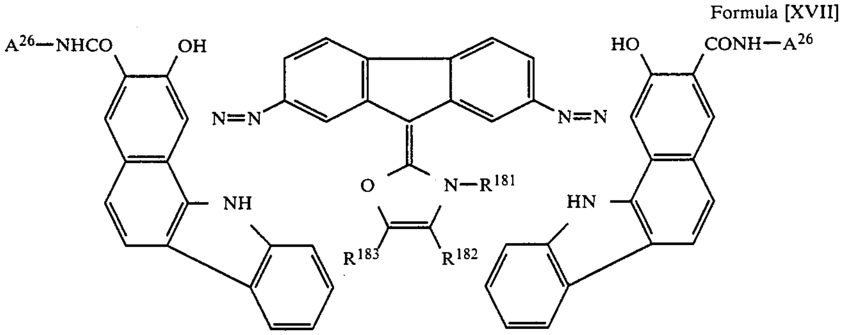
| Compound No. | $A^{26}$ | $R^{181}$ | $R^{182}$ | $R^{183}$ |
|---|---|---|---|---|
| B-581 | 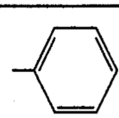 | $-CH_3$ | H | H |
| B-582 | 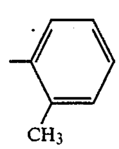 | $-CH_3$ | H | H |
| B-583 | 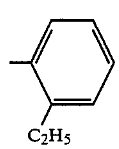 | $-CH_3$ | H | H |

-continued
Compounds having the structure of Formula [XVII]
Formula [XVII]
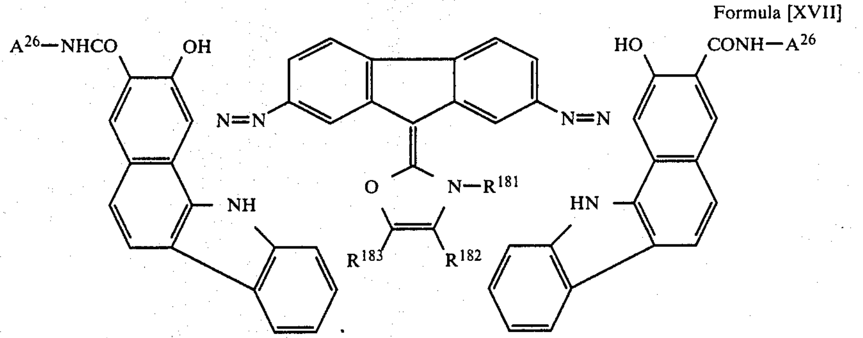
| Compound No. | $A^{26}$ | $R^{181}$ | $R^{182}$ | $R^{183}$ |
|---|---|---|---|---|
| B-584 | 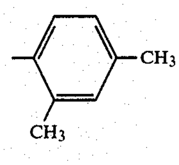 | $-CH_3$ | H | H |
| B-585 | 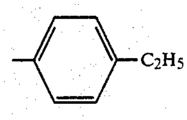 | $-CH_3$ | H | H |
| B-586 | 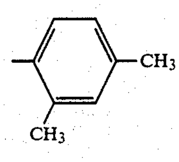 | $-CH_3$ | H | H |
| B-587 | 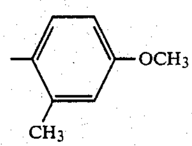 | $-CH_3$ | $-CH_3$ | H |
| B-588 | 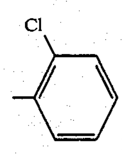 | $-CH_3$ | $-CH_3$ | $-CH_3$ |
| B-589 | 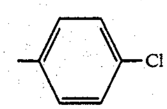 | $-C_2H_5$ | H | H |
| B-590 | 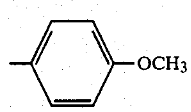 | $-C_2H_5$ | H | H |
| B-591 | 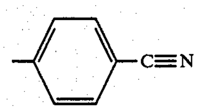 | $-C_2H_5$ | H | H |
| B-592 | 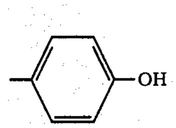 | $-C_2H_5$ | H | H |

-continued
Compounds having the structure of Formula [XVII]
Formula [XVII]
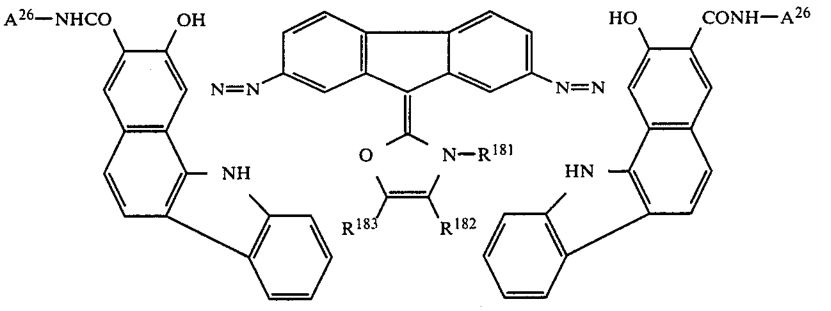
| Compound No. | A26 | R181 | R182 | R183 |
|---|---|---|---|---|
| B-593 | 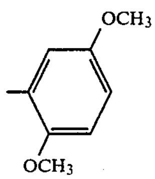 | $-C_2H_5$ | H | H |
| B-594 | 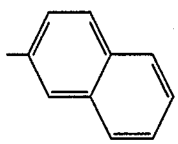 | $-C_2H_5$ | $-CH_3$ | $-CH_3$ |
| B-595 | 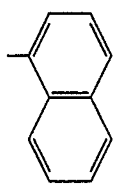 | $-C_2H_5$ | $-OCH_3$ | H |
| B-596 | 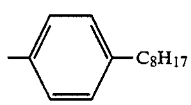 | $-C_3H_7$ | —Cl | —Cl |
| B-597 | 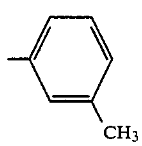 | 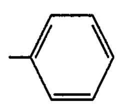 | —C≡N | H |
| B-598 | 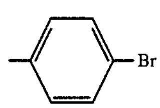 | 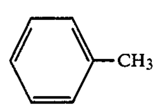 | $-CH_3$ | $-CH_3$ |
| B-599 | 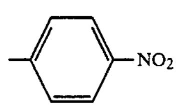 | $-C_8H_{17}$ | H | H |
| B-600 | 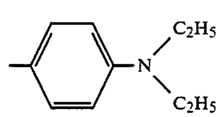 | 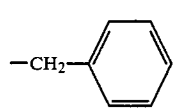 | H | H |

Compounds having the structure of Formula [XVIII]
Formula [XVIII]
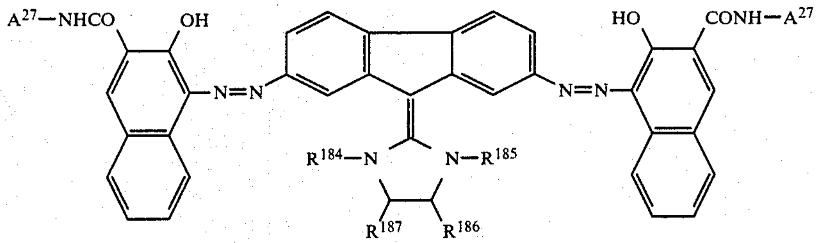
| Compound No. | $A^{27}$ | $R^{184}$ | $R^{185}$ | $R^{186}$ | $R^{187}$ |
|---|---|---|---|---|---|
| B-601 | 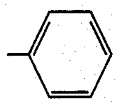 | $-CH_3$ | $-CH_3$ | H | H |
| B-602 | 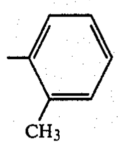 | $-CH_3$ | $-CH_3$ | H | H |
| B-603 | 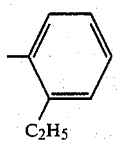 | $-CH_3$ | $-CH_3$ | H | H |
| B-604 | 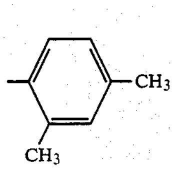 | $-CH_3$ | $-CH_3$ | H | H |
| B-605 | 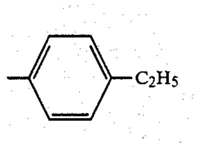 | $-CH_3$ | $-CH_3$ | H | H |
| B-606 | 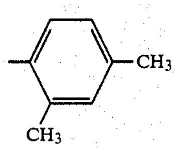 | $-CH_3$ | $-CH_3$ | H | H |
| B-607 | 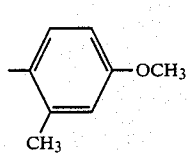 | $-CH_3$ | $-CH_3$ | $-CH_3$ | H |
| B-608 | 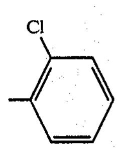 | $-CH_3$ | $-CH_3$ | $-CH_3$ | $-CH_3$ |
| B-609 | 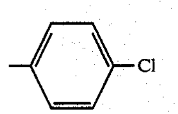 | $-CH_3$ | $-C_2H_5$ | H | H |

-continued
Compounds having the structure of Formula [XVIII]
Formula [XVIII]
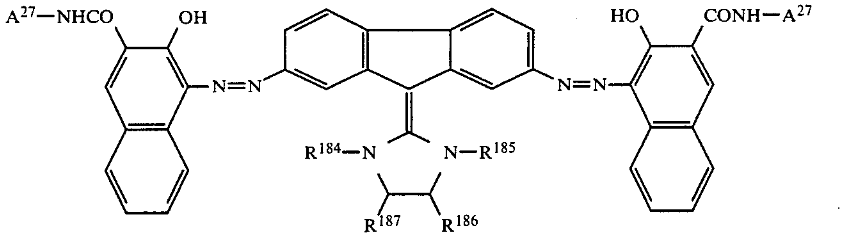
| Compound No. | $A^{27}$ | $R^{184}$ | $R^{185}$ | $R^{186}$ | $R^{187}$ |
|---|---|---|---|---|---|
| B-610 | 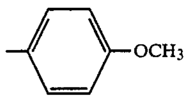 | $-CH_3$ | $-C_2H_5$ | H | H |
| B-611 | 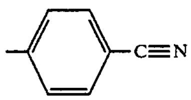 | $-CH_3$ | $-C_2H_5$ | H | H |
| B-612 | 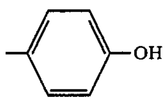 | $-C_2H_5$ | $-C_2H_5$ | H | H |
| B-613 | 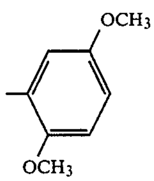 | $-C_2H_5$ | $-C_2H_5$ | H | H |
| B-614 | 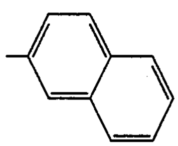 | $-C_2H_5$ | $-C_2H_5$ | $-CH_3$ | $-CH_3$ |
| B-615 | 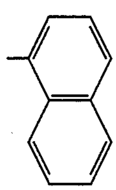 | 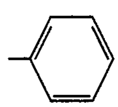 | $-C_2H_5$ | $-OCH_3$ | H |
| B-616 | 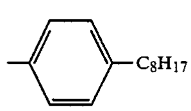 | 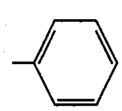 | $-C_3H_7$ | $-Cl$ | $-Cl$ |
| B-617 | 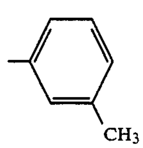 | 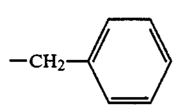 | 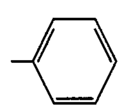 | $-C{\equiv}N$ | H |
| B-618 | 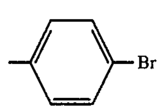 | $-CH_3$ | 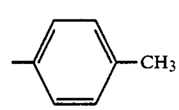 | $-CH_3$ | $-CH_3$ |

-continued
Compounds having the structure of Formula [XVIII]
Formula [XVIII]
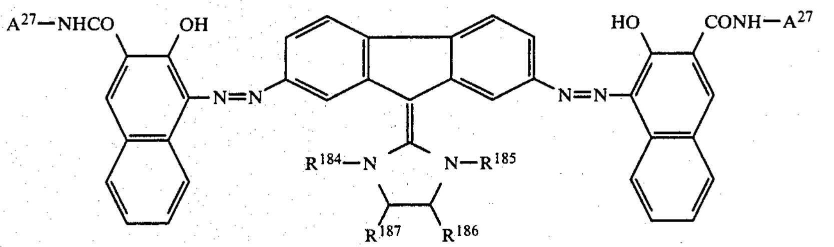
| Compound No. | $A^{27}$ | $R^{184}$ | $R^{185}$ | $R^{186}$ | $R^{187}$ |
|---|---|---|---|---|---|
| B-619 | 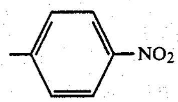 | $-CH_3$ | $-C_8H_{17}$ | H | H |
| B-620 | 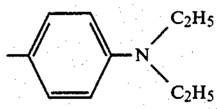 | $-CH_3$ | 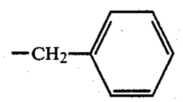 | H | H |
Compounds having the structure of Formula [XIX]
Formula [XIX]
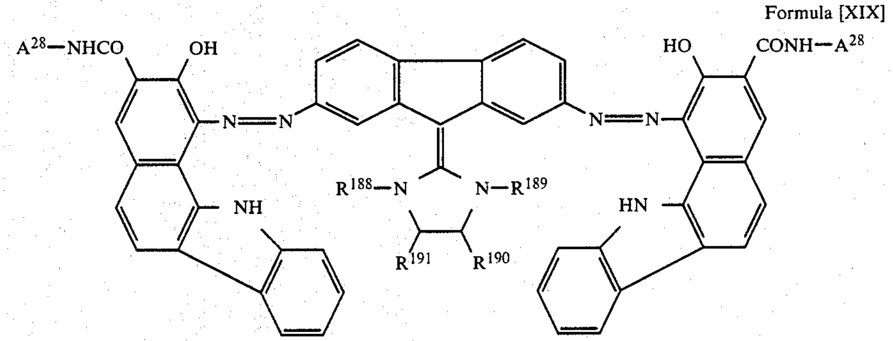
| Compound No. | $A^{28}$ | $R^{188}$ | $R^{189}$ | $R^{190}$ | $R^{191}$ |
|---|---|---|---|---|---|
| B-621 | 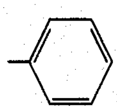 | $-CH_3$ | $-CH_3$ | H | H |
| B-622 | 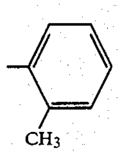 | $-CH_3$ | $-CH_3$ | H | H |
| B-623 | 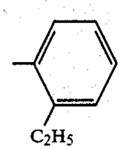 | $-CH_3$ | $-CH_3$ | H | H |
| B-624 | 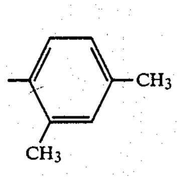 | $-CH_3$ | $-CH_3$ | H | H |

-continued
Compounds having the structure of Formula [XIX]
Formula [XIX]
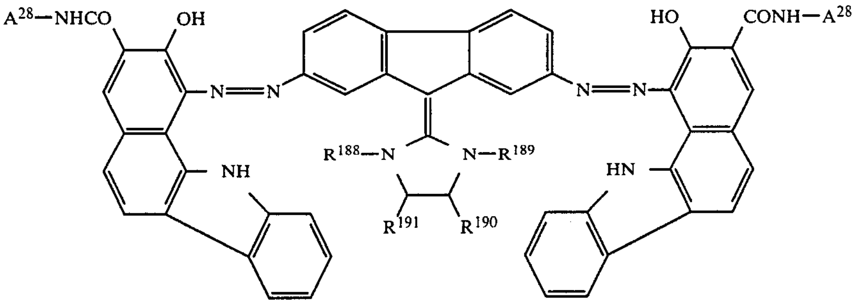
| Compound No. | $A^{28}$ | $R^{188}$ | $R^{189}$ | $R^{190}$ | $R^{191}$ |
|---|---|---|---|---|---|
| B-625 | 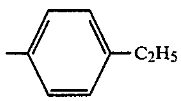 | $-CH_3$ | $-CH_3$ | H | H |
| B-626 | 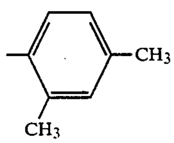 | $-CH_3$ | $-CH_3$ | H | H |
| B-627 | 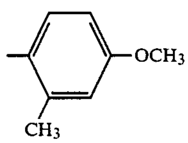 | $-CH_3$ | $-CH_3$ | $-CH_3$ | H |
| B-628 | 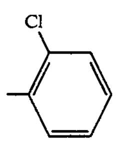 | $-CH_3$ | $-CH_3$ | $-CH_3$ | $-CH_3$ |
| B-629 | 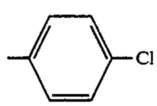 | $-C_2H_5$ | $-C_2H_5$ | H | H |
| B-630 | 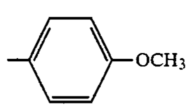 | $-C_2H_5$ | $-C_2H_5$ | H | H |
| B-631 | 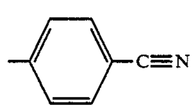 | $-C_2H_5$ | $-C_2H_5$ | H | H |
| B-632 | 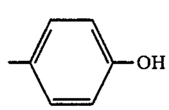 | 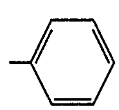 | $-C_2H_5$ | H | H |
| B-633 | 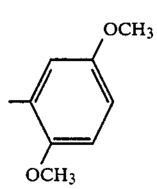 | 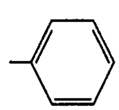 | $-C_2H_5$ | H | H |

-continued
Compounds having the structure of Formula [XIX]
Formula [XIX]
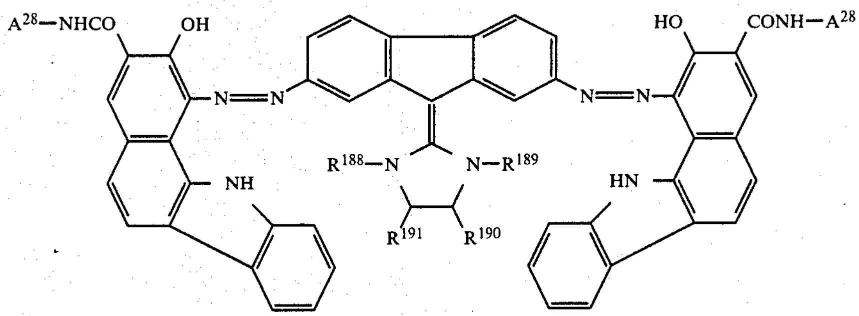
| Compound No. | $A^{28}$ | $R^{188}$ | $R^{189}$ | $R^{190}$ | $R^{191}$ |
|---|---|---|---|---|---|
| B-634 | 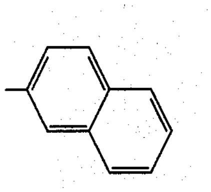 | 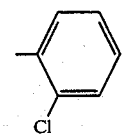 | $-C_2H_5$ | $-CH_3$ | $-CH_3$ |
| B-635 | 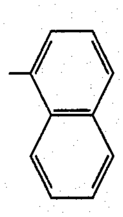 | $-CH_3$ | $-C_2H_5$ | $-OCH_3$ | H |
| B-636 | 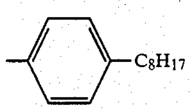 | $-CH_3$ | $-C_3H_7$ | $-Cl$ | $-Cl$ |
| B-637 | 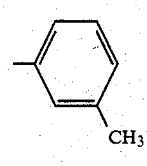 | $-CH_3$ | 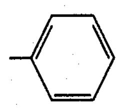 | $-C{\equiv}N$ | H |
| B-638 | 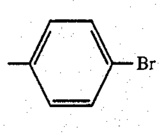 | $-CH_3$ | 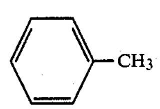 | $-CH_3$ | $-CH_3$ |
| B-639 | 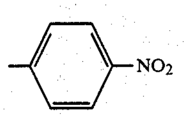 | $-CH_3$ | $-C_8H_{17}$ | H | H |
| B-640 | 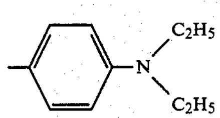 | $-CH_3$ | 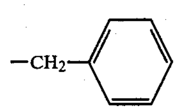 | H | H |

Compounds having the structure of Formula [XX]
Formula [XX]
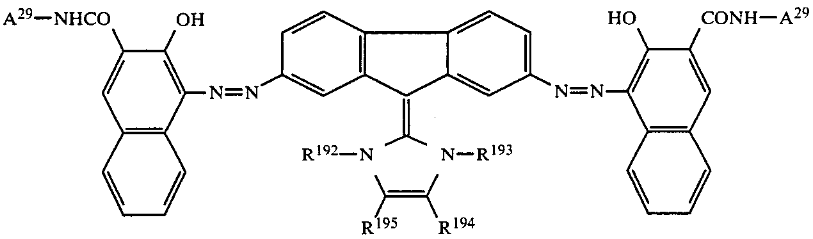
| Compound No. | $A^{29}$ | $R^{192}$ | $R^{193}$ | $R^{194}$ | $R^{195}$ |
|---|---|---|---|---|---|
| B-641 | 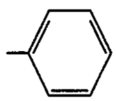 | $-CH_3$ | $-CH_3$ | H | H |
| B-642 | 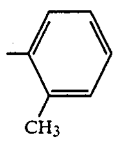 | $-CH_3$ | $-CH_3$ | H | H |
| B-643 | 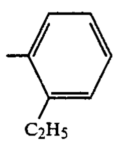 | $-CH_3$ | $-CH_3$ | H | H |
| B-644 | 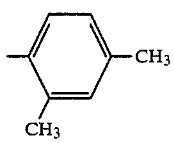 | $-CH_3$ | $-CH_3$ | H | H |
| B-645 | 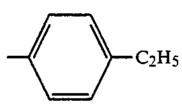 | $-CH_3$ | $-CH_3$ | H | H |
| B-646 | 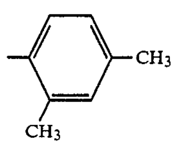 | $-C_2H_5$ | $-CH_3$ | H | H |
| B-647 | 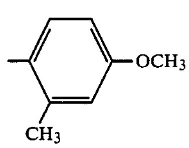 | $-C_2H_5$ | $-CH_3$ | $-CH_3$ | H |
| B-648 | 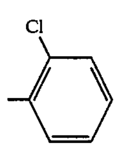 | $-C_2H_5$ | $-CH_3$ | $-CH_3$ | $-CH_3$ |
| B-649 | 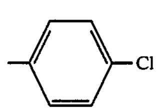 | $-C_2H_5$ | $-C_2H_5$ | H | H |

-continued
Compounds having the structure of Formula [XX]
Formula [XX]
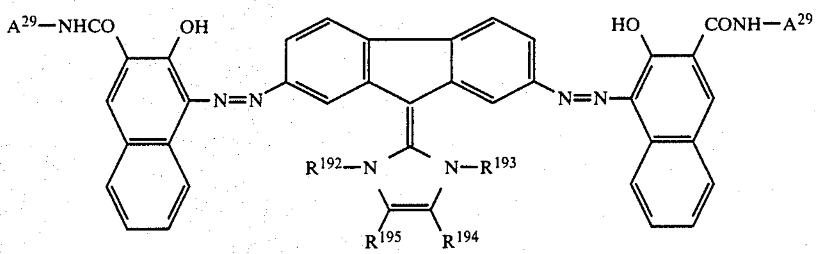
| Compound No. | $A^{29}$ | $R^{192}$ | $R^{193}$ | $R^{194}$ | $R^{195}$ |
|---|---|---|---|---|---|
| B-650 | 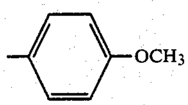 | 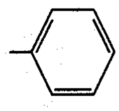 | $-C_2H_5$ | H | H |
| B-651 | 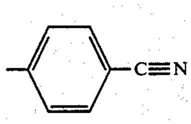 | 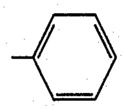 | $-C_2H_5$ | H | H |
| B-652 | 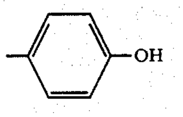 | 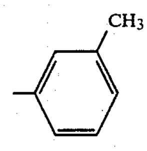 | $-C_2H_5$ | H | H |
| B-653 | 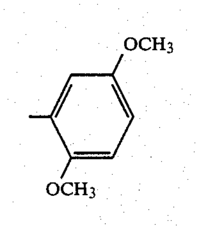 | 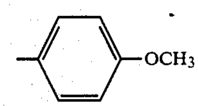 | $-C_2H_5$ | H | H |
| B-654 | 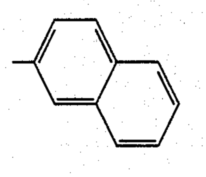 | $-CH_3$ | $-C_2H_5$ | $-CH_3$ | $-CH_3$ |
| B-655 | 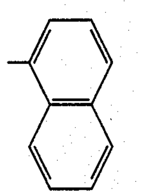 | $-CH_3$ | $-C_2H_5$ | $-OCH_3$ | H |
| B-656 | 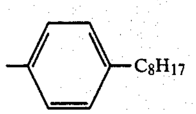 | $-CH_3$ | $-C_3H_7$ | $-Cl$ | $-Cl$ |
| B-657 | 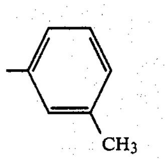 | $-C_2H_5$ | 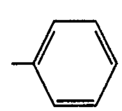 | $-C\equiv N$ | H |
| B-658 | 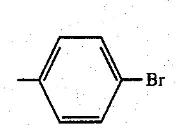 | $-C_2H_5$ | 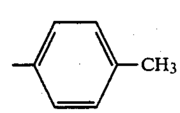 | $-CH_3$ | $-CH_3$ |

-continued
Compounds having the structure of Formula [XX]
Formula [XX]
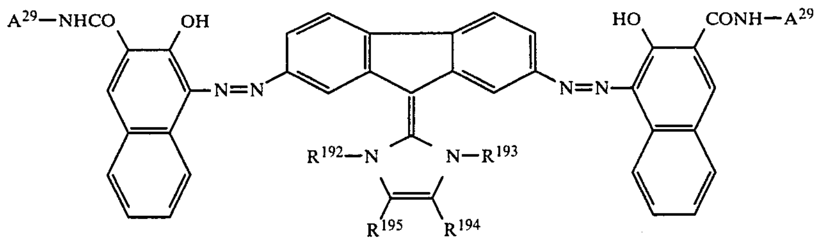
| Compound No. | $A^{29}$ | $R^{192}$ | $R^{193}$ | $R^{194}$ | $R^{195}$ |
|---|---|---|---|---|---|
| B-659 | 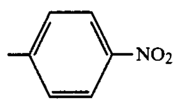 | $-C_2H_5$ | $-C_8H_{17}$ | H | H |
| B-660 | 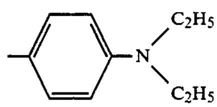 | $-CH_3$ | 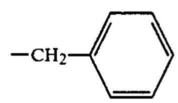 | H | H |
Compounds having the structure of Formula [XXI]
Formula [XXI]
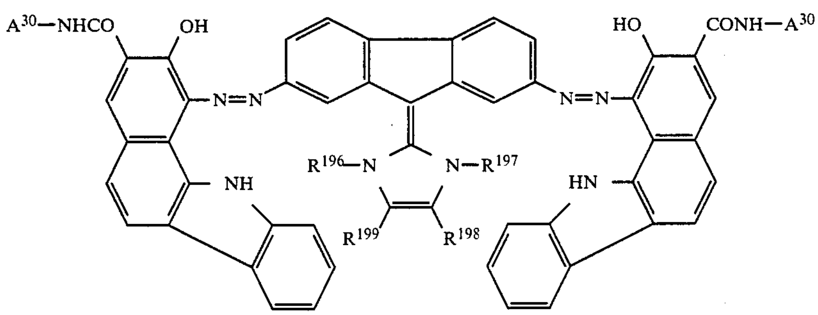
| Compound No. | $A^{30}$ | $R^{196}$ | $R^{197}$ | $R^{198}$ | $R^{199}$ |
|---|---|---|---|---|---|
| B - 661 | 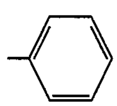 | $-CH_3$ | $-CH_3$ | H | H |
| B - 662 | 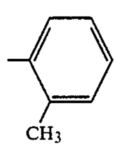 | $-CH_3$ | $-CH_3$ | H | H |
| B - 663 | 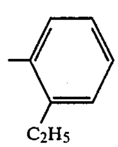 | $-CH_3$ | $-CH_3$ | H | H |
| B - 664 | 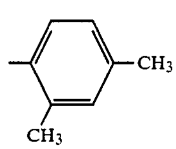 | $-CH_3$ | $-CH_3$ | H | H |

-continued
Compounds having the structure of Formula [XXI]
Formula [XXI]
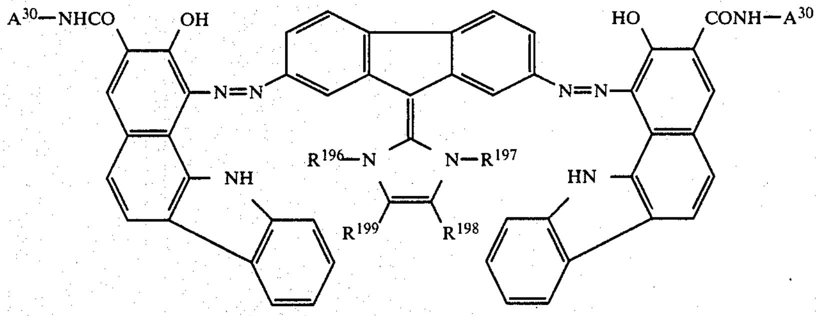
| Compound No. | $A^{30}$ | $R^{196}$ | $R^{197}$ | $R^{198}$ | $R^{199}$ |
|---|---|---|---|---|---|
| B - 665 | 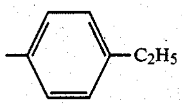 | $-CH_3$ | $-CH_3$ | H | H |
| B - 666 | 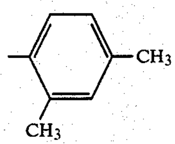 | $-CH_3$ | $-CH_3$ | H | H |
| B - 667 | 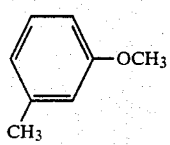 | $-CH_3$ | $-CH_3$ | $-CH_3$ | H |
| B - 668 | 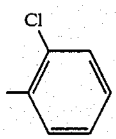 | $-CH_3$ | $-CH_3$ | $-CH_3$ | $-CH_3$ |
| B - 669 | 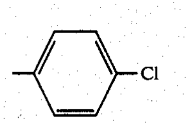 | $-CH_3$ | $-C_2H_5$ | H | H |
| B - 670 | 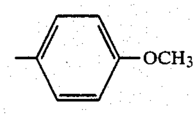 | $-CH_3$ | $-C_2H_5$ | H | H |
| B - 671 | 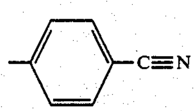 | $-CH_3$ | $-C_2H_5$ | H | H |
| B - 672 | 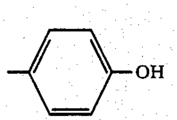 | $-CH_3$ | $-C_2H_5$ | H | H |
| B - 673 | 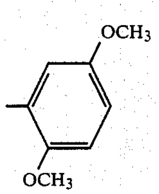 | 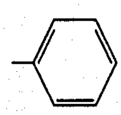 | $-C_2H_5$ | H | H |

-continued
Compounds having the structure of Formula [XXI]
Formula [XXI]
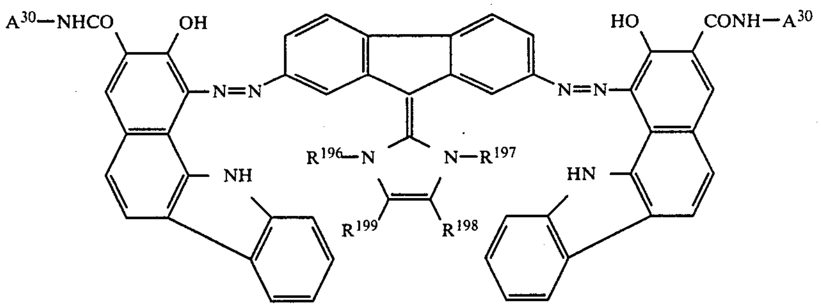
| Compound No. | $A^{30}$ | $R^{196}$ | $R^{197}$ | $R^{198}$ | $R^{199}$ |
|---|---|---|---|---|---|
| B - 674 | 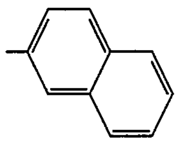 | 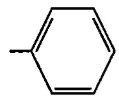 | $-C_2H_5$ | $-CH_3$ | $-CH_3$ |
| B - 675 | 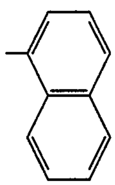 | 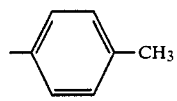 | $-C_2H_5$ | $-OCH_3$ | H |
| B - 676 | 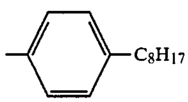 | $-C_2H_5$ | $-C_3H_7$ | $-Cl$ | $-Cl$ |
| B - 677 | 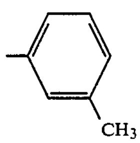 | $-C_2H_5$ | 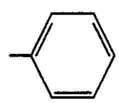 | $-C{\equiv}N$ | H |
| B - 678 | 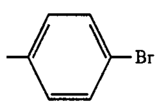 | $-C_2H_5$ | 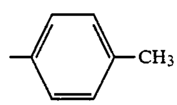 | $-CH_3$ | $-CH_3$ |
| B - 679 | 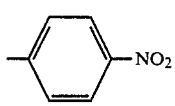 | $-CH_3$ | $-C_8H_{17}$ | H | H |
| B - 680 | 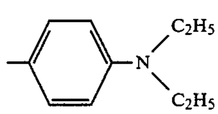 | $-CH_3$ | 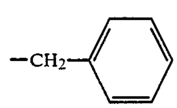 | H | H |

Compounds having the structure of Formula [XXII]
Formula [XXII]
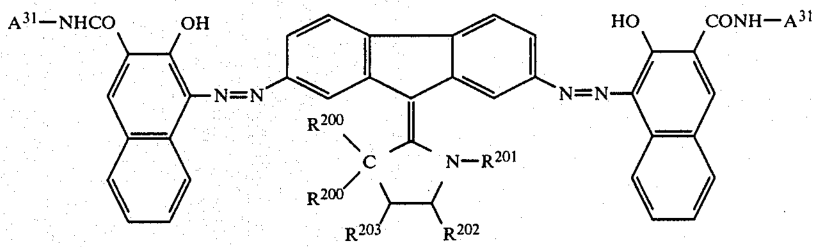
| Compound No. | $A^{31}$ | $R^{200}$ | $R^{201}$ | $R^{202}$ | $R^{203}$ |
|---|---|---|---|---|---|
| B - 681 | 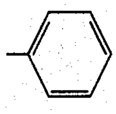 | H | $-CH_3$ | H | H |
| B - 682 | 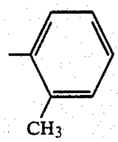 | H | $-CH_3$ | H | H |
| B - 683 | 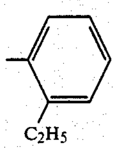 | H | $-CH_3$ | H | H |
| B - 684 | 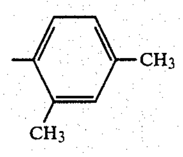 | H | $-CH_3$ | H | H |
| B - 685 | 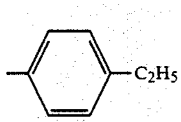 | H | $-CH_3$ | H | H |
| B - 686 | 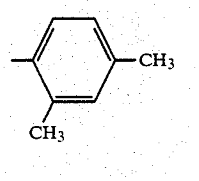 | H | $-CH_3$ | H | H |
| B - 687 | 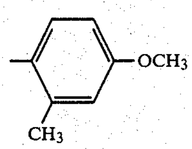 | H | $-CH_3$ | $-CH_3$ | H |
| B - 688 | 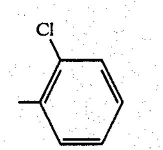 | $-CH_3$ | $-CH_3$ | $-CH_3$ | $-CH_3$ |
| B - 689 | 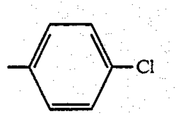 | $-CH_3$ | $-C_2H_5$ | H | H |

-continued
| Compounds having the structure of Formula [XXII] |
|---|
Formula [XXII]
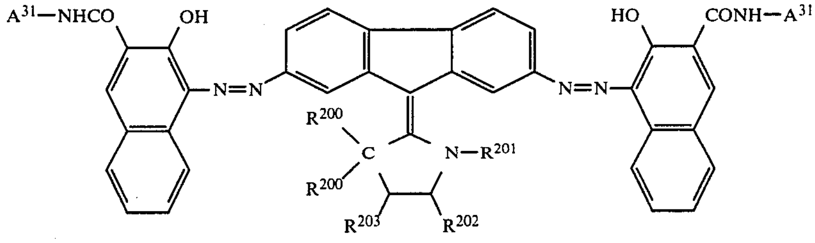
| Compound No. | $A^{31}$ | $R^{200}$ | $R^{201}$ | $R^{202}$ | $R^{203}$ |
|---|---|---|---|---|---|
| B - 690 | 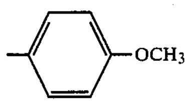 | $-CH_3$ | $-C_2H_5$ | H | H |
| B - 691 | 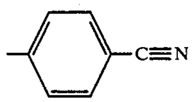 | $-CH_3$ | $-C_2H_5$ | H | H |
| B - 692 | 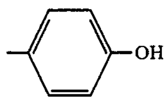 | $-CH_3$ | $-C_2H_5$ | H | H |
| B - 693 | 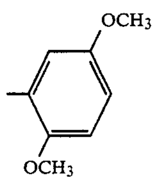 | $-CH_3$ | $-C_2H_5$ | H | H |
| B - 694 | 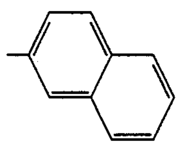 | $-CH_3$ | $-C_2H_5$ | $-CH_3$ | $-CH_3$ |
| B - 695 | 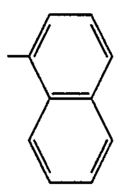 | $-CH_3$ | $-C_2H_5$ | $-OCH_3$ | H |
| B - 696 | 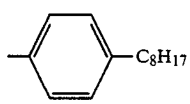 | $-C_2H_5$ | $-C_3H_7$ | —Cl | —Cl |
| B - 697 | 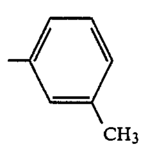 | $-C_2H_5$ | 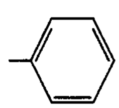 | —C≡N | H |
| B - 698 | 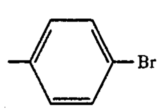 | $-C_2H_5$ | 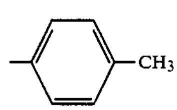 | $-CH_3$ | $-CH_3$ |

-continued
Compounds having the structure of Formula [XXII]
Formula [XXII]
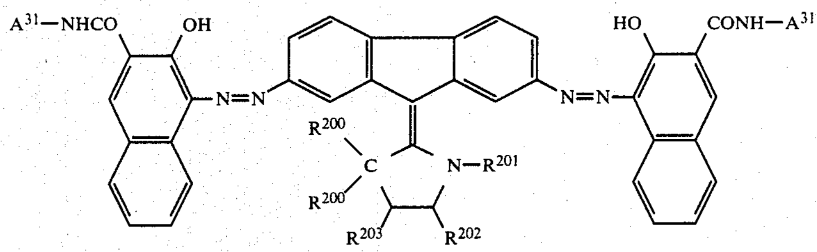
| Compound No. | $A^{31}$ | $R^{200}$ | $R^{201}$ | $R^{202}$ | $R^{203}$ |
|---|---|---|---|---|---|
| B - 699 | 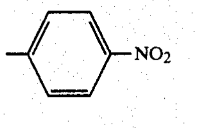 | $-CH_3$ | $-C_8H_{17}$ | H | H |
| B - 700 | 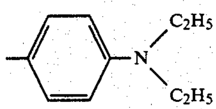 | $-CH_3$ | 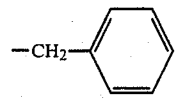 | H | H |
Compounds having the structure of Formula [XXIII]
Formula [XXIII]
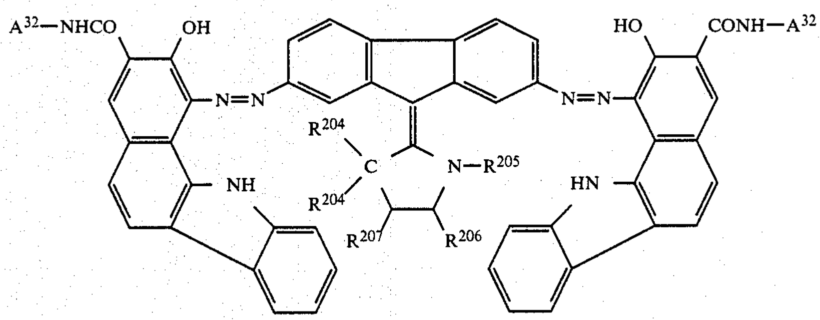
| Compound No. | $A^{32}$ | $R^{204}$ | $R^{205}$ | $R^{206}$ | $R^{207}$ |
|---|---|---|---|---|---|
| B - 701 | 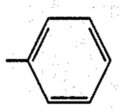 | H | $-CH_3$ | H | H |
| B - 702 | 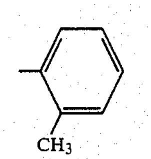 | H | $-CH_3$ | H | H |
| B - 703 | 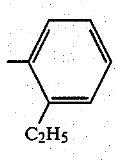 | H | $-CH_3$ | H | H |
| B - 704 | 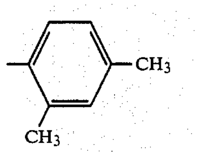 | H | $-CH_3$ | H | H |

-continued
Compounds having the structure of Formula [XXIII]
Formula [XXIII]
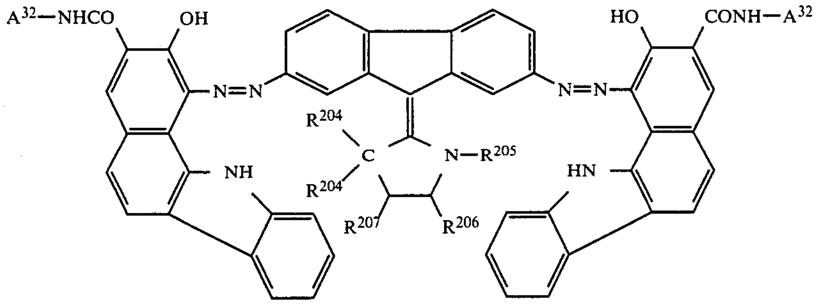
| Compound No. | $A^{32}$ | $R^{204}$ | $R^{205}$ | $R^{206}$ | $R^{207}$ |
| --- | --- | --- | --- | --- | --- |
| B - 705 | 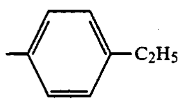 | H | $-CH_3$ | H | H |
| B - 706 | 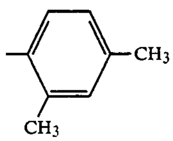 | H | $-CH_3$ | H | H |
| B - 707 | 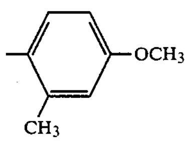 | H | $-CH_3$ | $-CH_3$ | H |
| B - 708 | 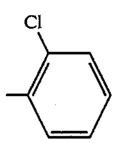 | $-C_2H_5$ | $-CH_3$ | $-CH_3$ | $-CH_3$ |
| B - 709 | 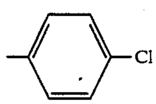 | $-CH_3$ | $-C_2H_5$ | H | H |
| B - 710 | 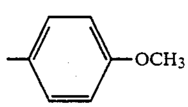 | $-CH_3$ | $-C_2H_5$ | H | H |
| B - 711 | 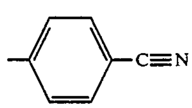 | $-CH_3$ | $-C_2H_5$ | H | H |
| B - 712 | 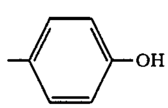 | $-CH_3$ | $-C_2H_5$ | H | H |
| B - 713 | 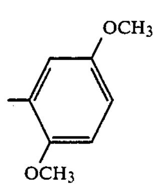 | $-CH_3$ | $-C_2H_5$ | H | H |

-continued
Compounds having the structure of Formula [XXIII]
Formula [XXIII]
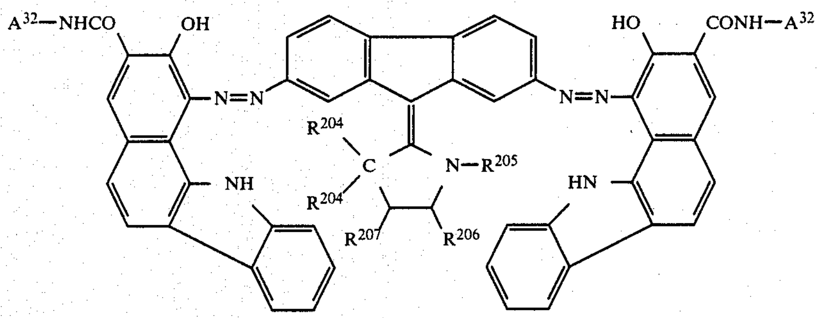
| Compound No. | $A^{32}$ | $R^{204}$ | $R^{205}$ | $R^{206}$ | $R^{207}$ |
|---|---|---|---|---|---|
| B - 714 | 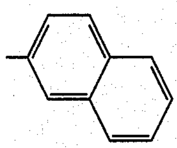 | $-CH_3$ | $-C_2H_5$ | $-CH_3$ | $-CH_3$ |
| B - 715 | 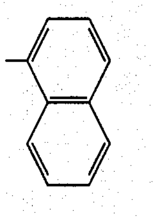 | $-CH_3$ | $-C_2H_5$ | $-OCH_3$ | H |
| B - 716 | 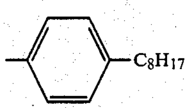 | $-C_2H_5$ | $-C_3H_7$ | $-Cl$ | $-Cl$ |
| B - 717 | 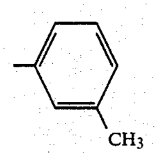 | $-C_2H_5$ | 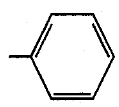 | $-C\equiv N$ | H |
| B - 718 | 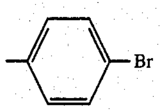 | $-C_2H_5$ | 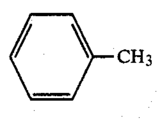 | $-CH_3$ | $-CH_3$ |
| B - 719 | 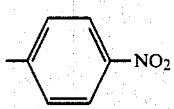 | $-CH_3$ | $-C_8H_{17}$ | H | H |
| B - 720 | 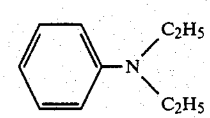 | $-CH_3$ | 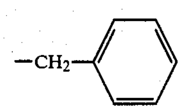 | H | H |

Compounds having the structure of Formula [XXIV]
Formula [XXIV]
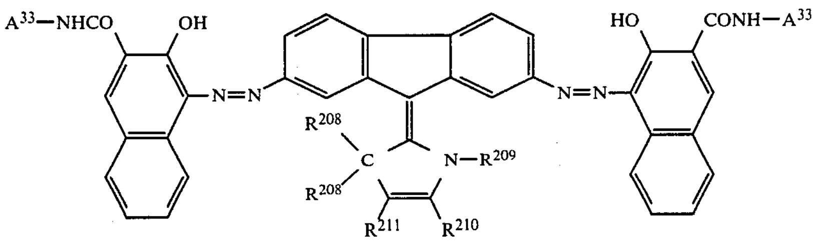
| Compound No. | $A^{33}$ | $R^{208}$ | $R^{209}$ | $R^{210}$ | $R^{211}$ |
|---|---|---|---|---|---|
| B-721 | 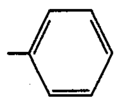 | H | $-CH_3$ | H | H |
| B-722 | 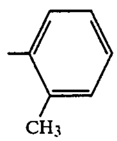 | H | $-CH_3$ | H | H |
| B-723 | 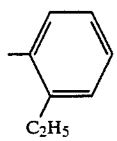 | H | $-CH_3$ | H | H |
| B-724 | 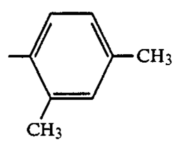 | H | $-CH_3$ | H | H |
| B-725 | 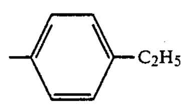 | H | $-CH_3$ | H | H |
| B-726 | 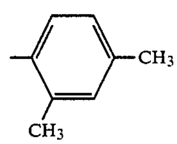 | H | $-CH_3$ | H | H |
| B-727 | 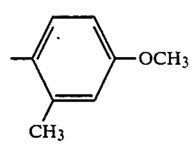 | H | $-CH_3$ | $-CH_3$ | H |
| B-728 | 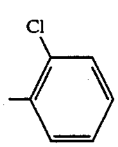 | $-C_2H_5$ | $-CH_3$ | $-CH_3$ | $-CH_3$ |
| B-729 | 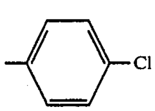 | $-CH_3$ | $-C_2H_5$ | H | H |

-continued
Compounds having the structure of Formula [XXIV]
Formula [XXIV]
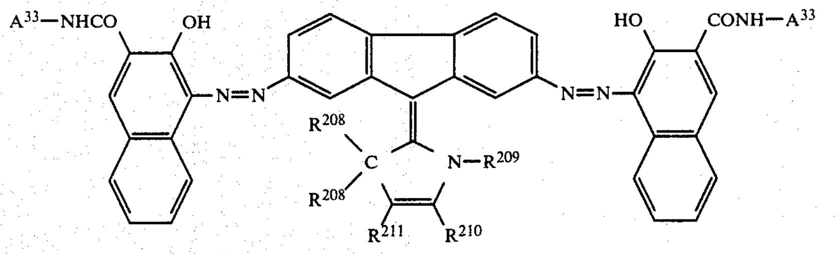
| Compound No. | $A^{33}$ | $R^{208}$ | $R^{209}$ | $R^{210}$ | $R^{211}$ |
|---|---|---|---|---|---|
| B-730 | 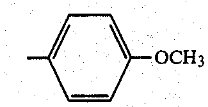 | $-CH_3$ | $-C_2H_5$ | H | H |
| B-731 | 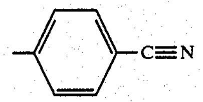 | $-CH_3$ | $-C_2H_5$ | H | H |
| B-732 | 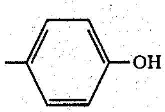 | $-CH_3$ | $-C_2H_5$ | H | H |
| B-733 | 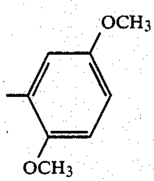 | $-CH_3$ | $-C_2H_5$ | H | H |
| B-734 | 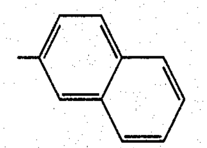 | $-CH_3$ | $-C_2H_5$ | $-CH_3$ | $-CH_3$ |
| B-735 | 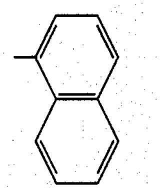 | $-CH_3$ | $-C_2H_5$ | $-OCH_3$ | H |
| B-736 | 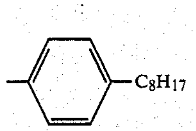 | $-C_2H_5$ | $-C_3H_7$ | $-Cl$ | $-Cl$ |
| B-737 | 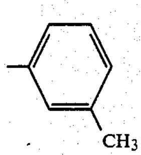 | $-C_2H_5$ | 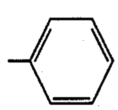 | $-C\equiv N$ | H |
| B-738 | 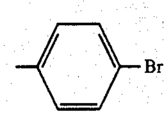 | $-CH_3$ | 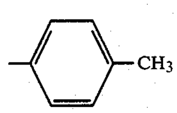 | $-CH_3$ | $-CH_3$ |

-continued
Compounds having the structure of Formula [XXIV]
Formula [XXIV]
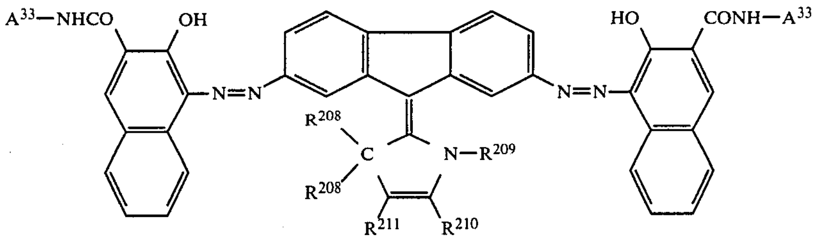
| Compound No. | $A^{33}$ | $R^{208}$ | $R^{209}$ | $R^{210}$ | $R^{211}$ |
|---|---|---|---|---|---|
| B-739 | 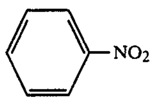 | $-CH_3$ | $-C_8H_{17}$ | H | H |
| B-740 | 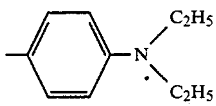 | $-CH_3$ | 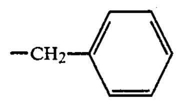 | H | H |
Compounds having the structure of Formula [XXV]
Formula [XXV]
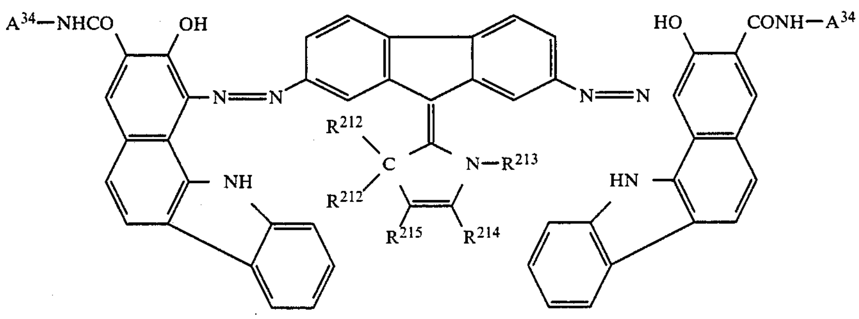
| Compound No. | $A^{34}$ | $R^{212}$ | $R^{213}$ | $R^{214}$ | $R^{215}$ |
|---|---|---|---|---|---|
| B-741 | 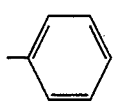 | H | $-CH_3$ | H | H |
| B-742 | 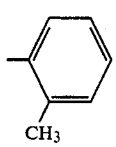 | H | $-CH_3$ | H | H |
| B-743 | 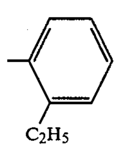 | H | $-CH_3$ | H | H |
| B-744 | 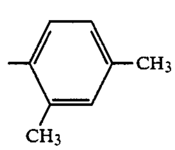 | H | $-CH_3$ | H | H |

-continued
Compounds having the structure of Formula [XXV]
Formula [XXV]
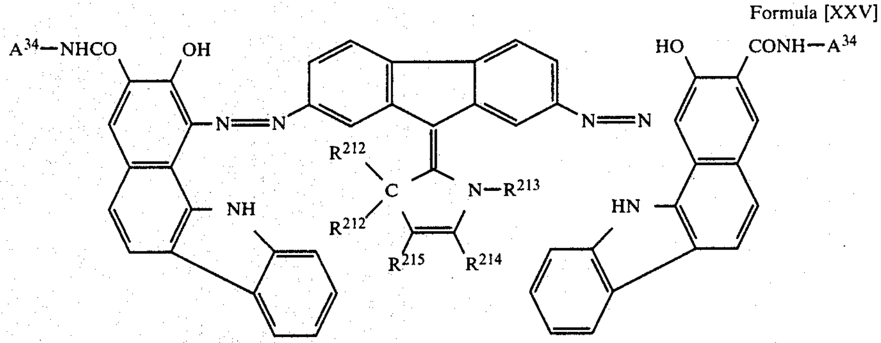
| Compound No. | $A^{34}$ | $R^{212}$ | $R^{213}$ | $R^{214}$ | $R^{215}$ |
|---|---|---|---|---|---|
| B-745 | 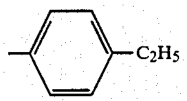 | H | $-CH_3$ | H | H |
| B-746 | 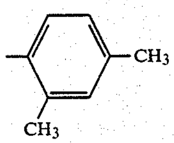 | H | $-CH_3$ | H | H |
| B-747 | 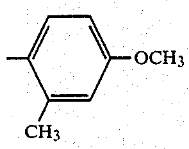 | H | $-CH_3$ | $-CH_3$ | H |
| B-748 | 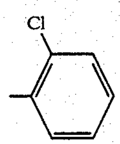 | $-C_2H_5$ | $-CH_3$ | $-CH_3$ | $-CH_3$ |
| B-749 | 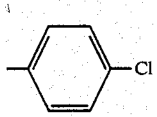 | $-CH_3$ | $-C_2H_5$ | H | H |
| B-750 | 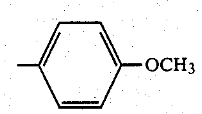 | $-CH_3$ | $-C_2H_5$ | H | H |
| B-751 | 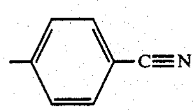 | $-CH_3$ | $-C_2H_5$ | H | H |
| B-752 | 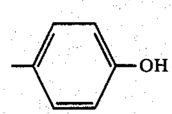 | $-CH_3$ | $-C_2H_5$ | H | H |
| B-753 | 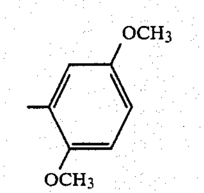 | $-CH_3$ | $-C_2H_5$ | H | H |

-continued
Compounds having the structure of Formula [XXV]
Formula [XXV]
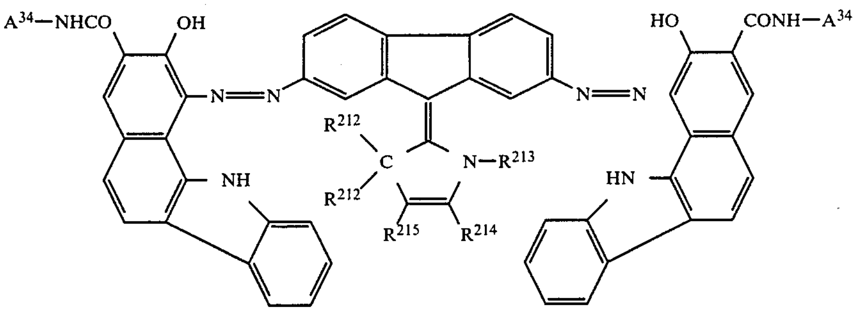
| Compound No. | $A^{34}$ | $R^{212}$ | $R^{213}$ | $R^{214}$ | $R^{215}$ |
| --- | --- | --- | --- | --- | --- |
| B-754 | 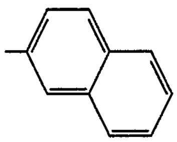 | $-CH_3$ | $-C_2H_5$ | $-CH_3$ | $-CH_3$ |
| B-755 | 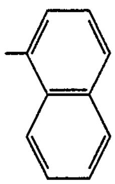 | $-CH_3$ | $-C_2H_5$ | $-OCH_3$ | H |
| B-756 | 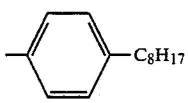 | $-C_2H_5$ | $-C_3H_7$ | $-Cl$ | $-Cl$ |
| B-757 | 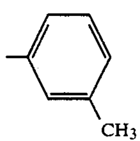 | $-C_2H_5$ | 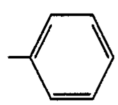 | $-C\equiv N$ | H |
| B-758 | 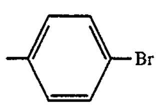 | $-CH_3$ | 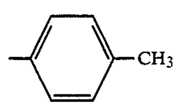 | $-CH_3$ | $-CH_3$ |
| B-759 | 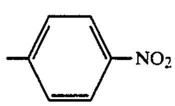 | $-CH_3$ | $-C_8H_{17}$ | H | H |
| B-760 | 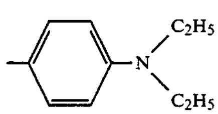 | $-CH_3$ | 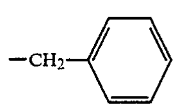 | H | H |

Compounds having the structure of Formula [XXVI]
Formula [XXVI]
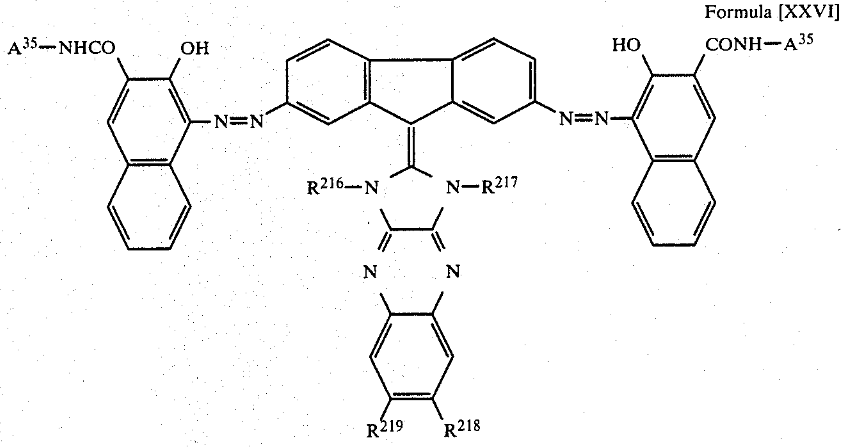
| Compound No. | $A^{35}$ | $R^{216}$ | $R^{217}$ | $R^{218}$ | $R^{219}$ |
|---|---|---|---|---|---|
| B-761 | 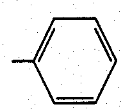 | $-CH_3$ | $-CH_3$ | H | H |
| B-762 | 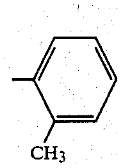 | $-CH_3$ | $-CH_3$ | H | H |
| B-763 | 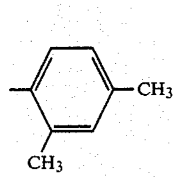 | $-CH_3$ | $-CH_3$ | H | H |
| B-764 | 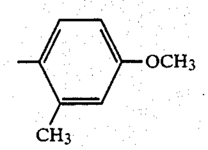 | $-C_2H_5$ | $-C_2H_5$ | $-CH_3$ | $-CH_3$ |
| B-765 | 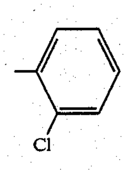 | $-C_2H_5$ | $-C_2H_5$ | $-CH_3$ | $-CH_3$ |
| B-766 | 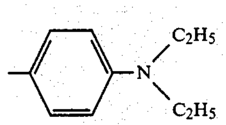 | $-C_2H_5$ | $-C_2H_5$ | $-C_2H_5$ | $-C_2H_5$ |
| B-767 | 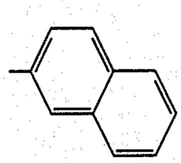 | 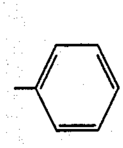 | 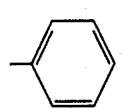 | $-CH_3$ | H |

Compounds having the structure of Formula [XXVII]
Formula [XXVII]
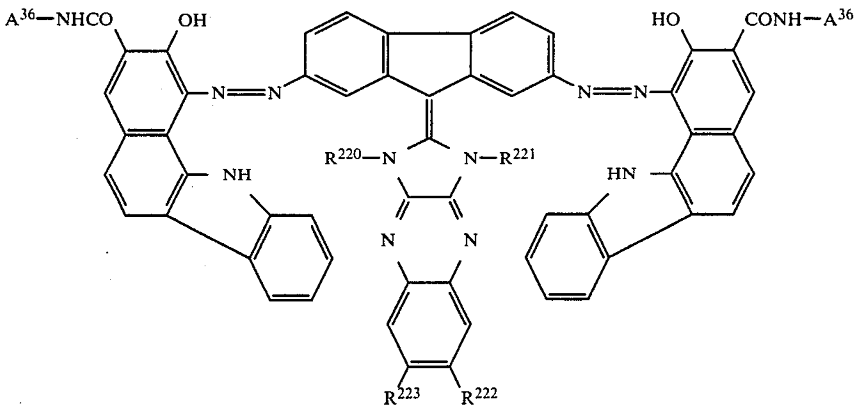
| Compound No. | $A^{36}$ | $R^{220}$ | $R^{221}$ | $R^{222}$ | $R^{223}$ |
|---|---|---|---|---|---|
| B-768 | 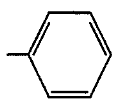 | $-CH_3$ | $-CH_3$ | H | H |
| B-769 | 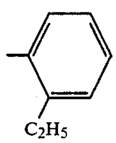 | $-CH_3$ | $-CH_3$ | H | H |
| B-770 | 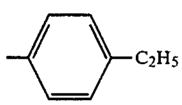 | $-CH_3$ | $-CH_3$ | H | H |
| B-771 | 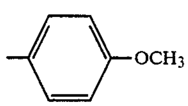 | $-C_2H_5$ | $-C_2H_5$ | H | H |
| B-772 | 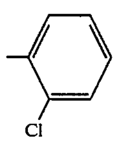 | $-C_2H_5$ | $-C_2H_5$ | $-CH_3$ | $-CH_3$ |
| B-773 | 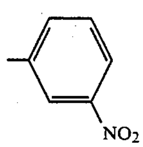 | $-C_2H_5$ | $-C_2H_5$ | $-CH_3$ | $-CH_3$ |
| B-774 | 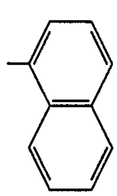 | 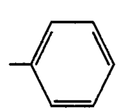 | 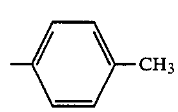 | H | H |

-continued
Compounds having the structure of Formula [XXV]
Formula [XXV]
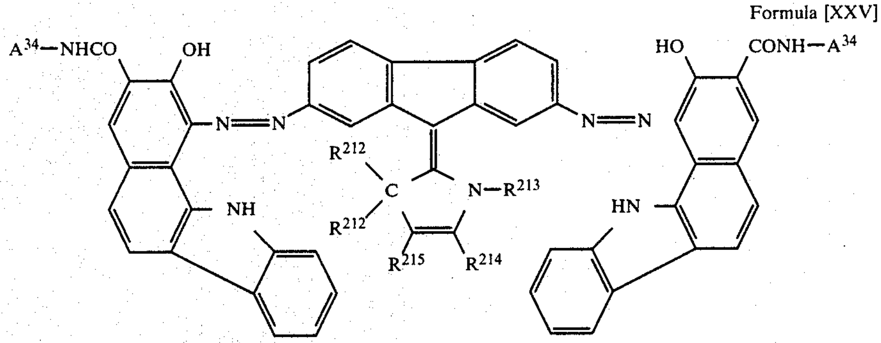
| Compound No. | $A^{34}$ | $R^{212}$ | $R^{213}$ | $R^{214}$ | $R^{215}$ |
|---|---|---|---|---|---|
| B-745 | 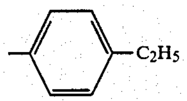 | H | $-CH_3$ | H | H |
| B-746 | 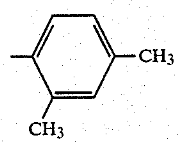 | H | $-CH_3$ | H | H |
| B-747 | 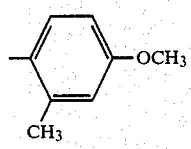 | H | $-CH_3$ | $-CH_3$ | H |
| B-748 | 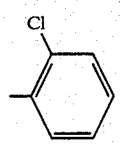 | $-C_2H_5$ | $-CH_3$ | $-CH_3$ | $-CH_3$ |
| B-749 | 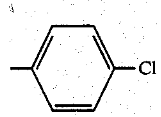 | $-CH_3$ | $-C_2H_5$ | H | H |
| B-750 | 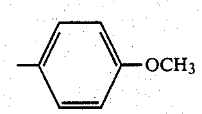 | $-CH_3$ | $-C_2H_5$ | H | H |
| B-751 | 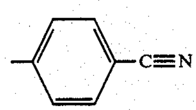 | $-CH_3$ | $-C_2H_5$ | H | H |
| B-752 | 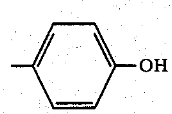 | $-CH_3$ | $-C_2H_5$ | H | H |
| B-753 | 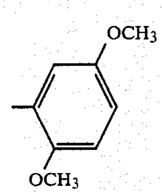 | $-CH_3$ | $-C_2H_5$ | H | H |

-continued
Compounds having the structure of Formula [XXVIII]
Formula [XXVIII]
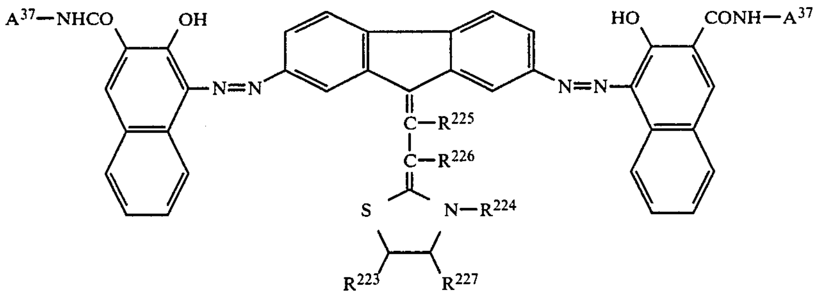
| Compound No. | $A^{37}$ | $R^{224}$ | $R^{225}$ | $R^{226}$ | $R^{227}$ | $R^{228}$ |
|---|---|---|---|---|---|---|
| B-783 | 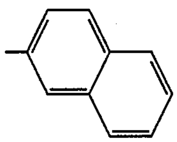 | $-CH_3$ | H | $-CN$ | H | H |
| B-784 | 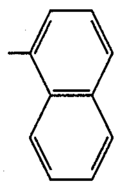 | $-C_2H_5$ | $-CN$ | $-CN$ | H | H |
| B-785 | 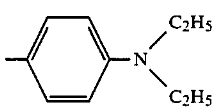 | $-C_2H_5$ | 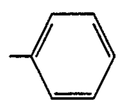 | H | H | H |
| B-786 | 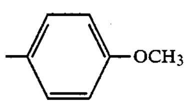 | $-C_2H_5$ | H | H | H | H |
| B-787 | 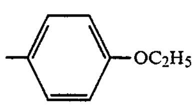 | $-C_2H_5$ | H | $-CH_3$ | H | H |
| B-788 | 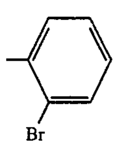 | 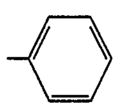 | H | H | $-CH_3$ | H |
| B-789 | 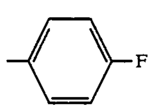 | 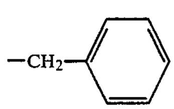 | H | H | H | $-CH_3$ |
| B-790 | 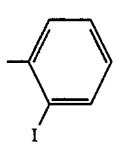 | 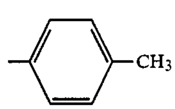 | H | H | $-Cl$ | $-Cl$ |

-continued
Compounds having the structure of Formula [XXVIII]
Formula [XXVIII]
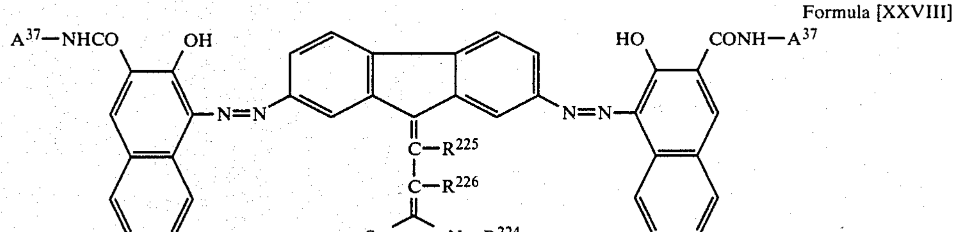

Compounds having the structure of Formula [XXVII]
Formula [XXVII]
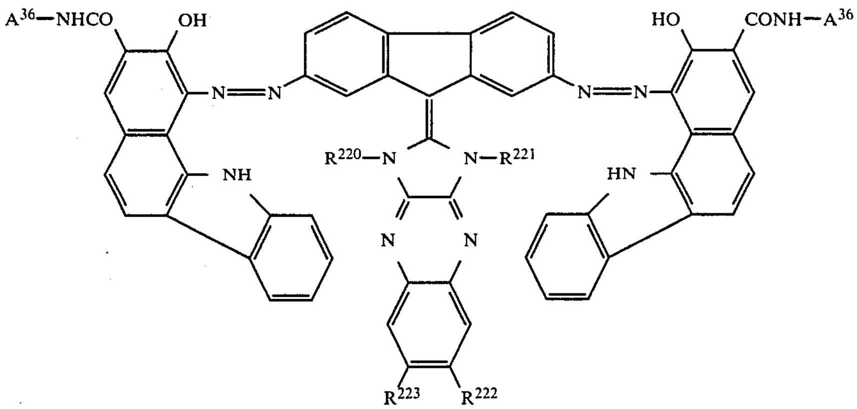
| Compound No. | $A^{36}$ | $R^{220}$ | $R^{221}$ | $R^{222}$ | $R^{223}$ |
|---|---|---|---|---|---|
| B-768 | 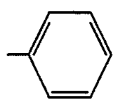 | $-CH_3$ | $-CH_3$ | H | H |
| B-769 | 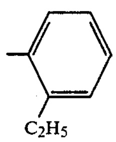 | $-CH_3$ | $-CH_3$ | H | H |
| B-770 | 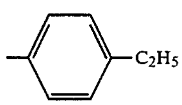 | $-CH_3$ | $-CH_3$ | H | H |
| B-771 | 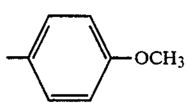 | $-C_2H_5$ | $-C_2H_5$ | H | H |
| B-772 | 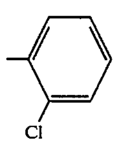 | $-C_2H_5$ | $-C_2H_5$ | $-CH_3$ | $-CH_3$ |
| B-773 | 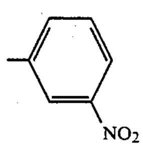 | $-C_2H_5$ | $-C_2H_5$ | $-CH_3$ | $-CH_3$ |
| B-774 | 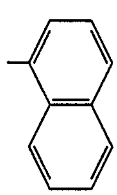 | 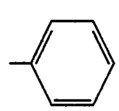 | 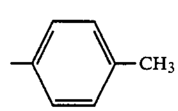 | H | H |

-continued
Compounds having the structure of Formula [XXIX]
Formula [XXIX]
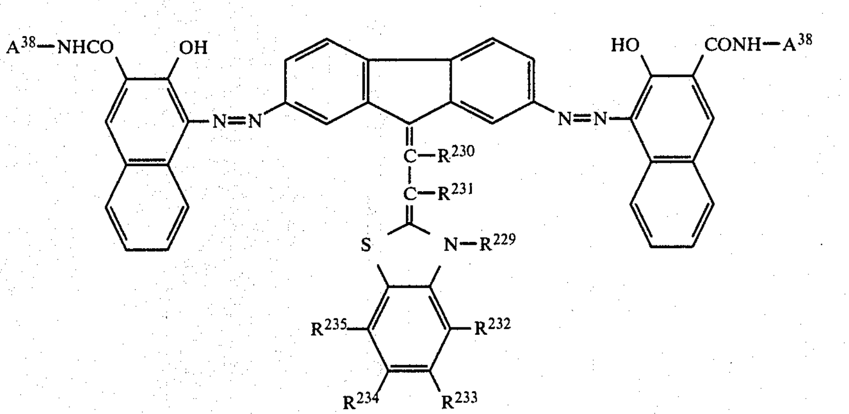
| Compound No. | $A^{38}$ | $R^{229}$ | $R^{230}$ | $R^{231}$ | $R^{232}$ | $R^{233}$ | $R^{234}$ | $R^{235}$ |
|---|---|---|---|---|---|---|---|---|
| B-807 | 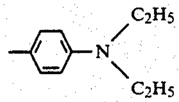 | $-C_2H_5$ | —CN | —CN | H | H | —Br | H |
| B-808 | 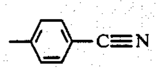 | $-C_2H_5$ | —CN | H | H | $-C_2H_5$ | H | H |
| B-809 | 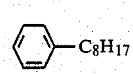 | $-C_4H_9$ | —CN | H | H | |  | H |
| B-810 | 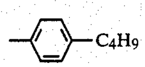 | $-C_8H_{17}$ | 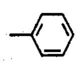 | H | 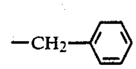 | H | H | H |
| B-811 | 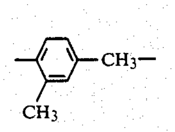 | 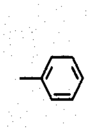 | 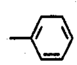 | H | H | H | H | —OH |
| B-812 | 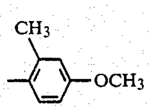 | 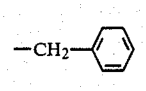 | H | $-CH_3$ | H | $-OCH_3$ | $-OCH_3$ | H |
Compounds having the structure of Formula [XXX]
Formula [XXX]
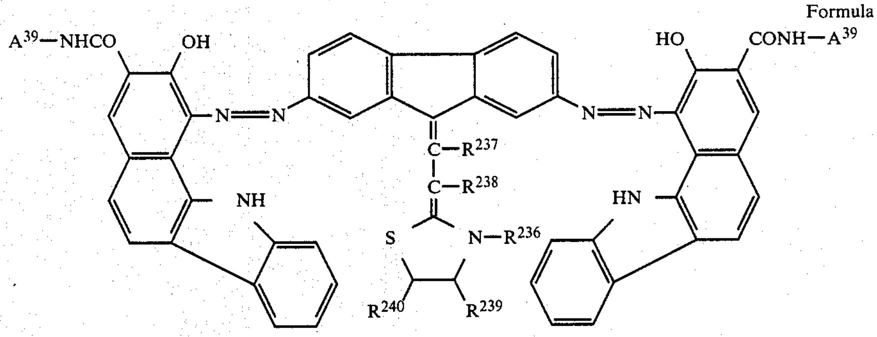
| Compound No. | $A^{39}$ | $R^{236}$ | $R^{237}$ | $R^{238}$ | $R^{239}$ | $R^{240}$ |
|---|---|---|---|---|---|---|
| B-813 | 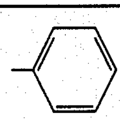 | $-CH_3$ | H | H | H | H |

-continued
Compounds having the structure of Formula [XXX]
Formula [XXX]
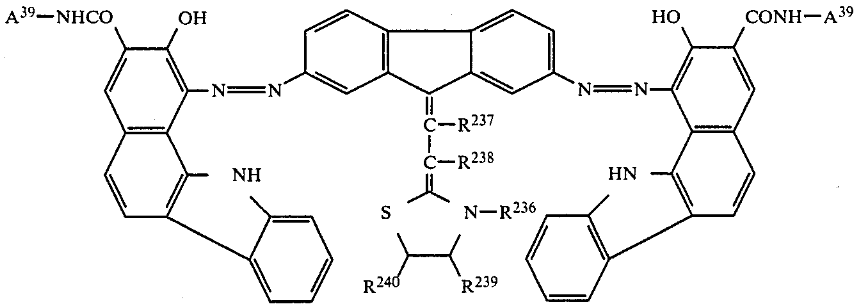
| Compound No. | $A^{39}$ | $R^{236}$ | $R^{237}$ | $R^{238}$ | $R^{239}$ | $R^{240}$ |
|---|---|---|---|---|---|---|
| B-814 | 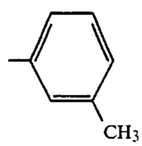 | $-CH_3$ | H | H | H | H |
| B-815 | 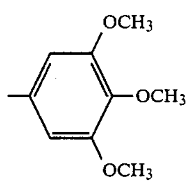 | $-CH_3$ | H | H | H | H |
| B-816 | 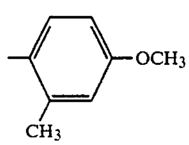 | $-CH_3$ | H | H | H | H |
| B-817 | 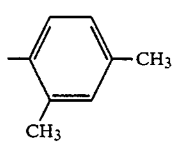 | $-CH_3$ | H | H | H | H |
| B-818 | 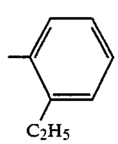 | $-CH_3$ | H | H | H | H |
| B-819 | 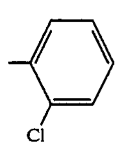 | $-CH_3$ | H | H | H | H |
| B-820 | 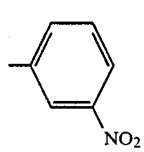 | $-CH_3$ | $-CN$ | H | H | H |

-continued
Compounds having the structure of Formula [XXX]
Formula [XXX]
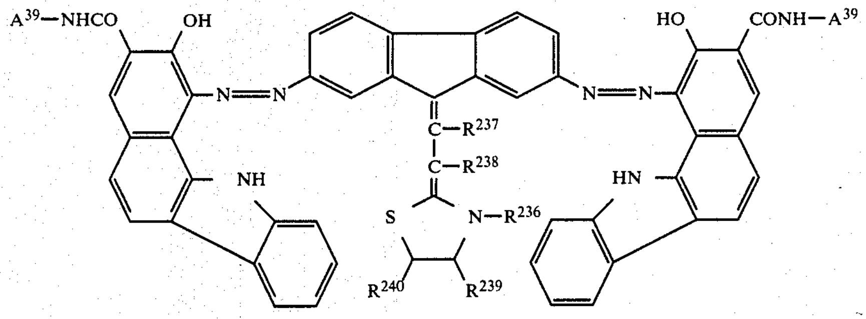
| Compound No. | $A^{39}$ | $R^{236}$ | $R^{237}$ | $R^{238}$ | $R^{239}$ | $R^{240}$ |
|---|---|---|---|---|---|---|
| B-821 | 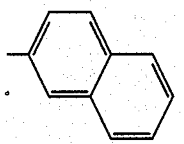 | $-CH_3$ | H | $-CN$ | H | H |
| B-822 | 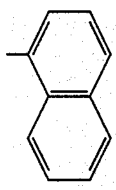 | $-C_2H_5$ | $-CN$ | $-CN$ | H | H |
| B-823 | 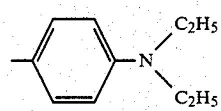 | $-C_2H_5$ | 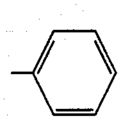 | H | H | H |
| B-824 | 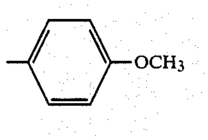 | $-C_2H_5$ | H | H | H | H |
| B-825 | 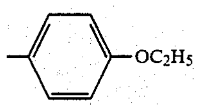 | $-C_2H_5$ | H | $-CH_3$ | H | H |
| B-826 | 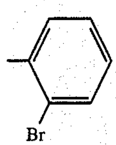 | 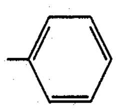 | H | H | $-CH_3$ | H |
| B-827 | 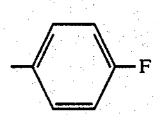 | 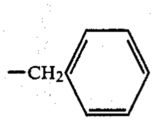 | H | H | H | $-CH_3$ |
| B-828 | 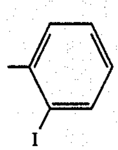 | 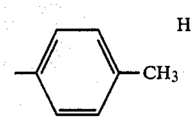 | H | H | $-Cl$ | $-Cl$ |

-continued
Compounds having the structure of Formula [XXX]
Formula [XXX]
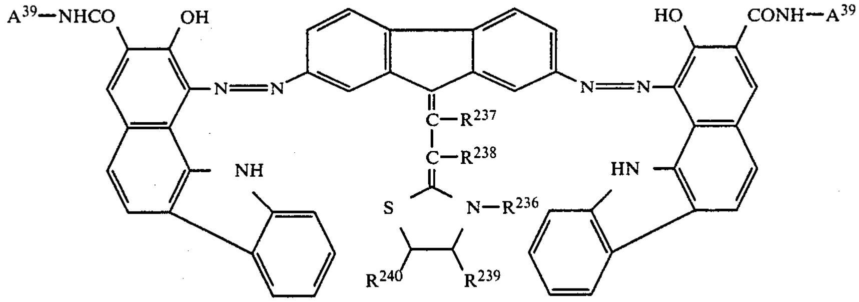
| Compound No. | $A^{39}$ | $R^{236}$ | $R^{237}$ | $R^{238}$ | $R^{239}$ | $R^{240}$ |
|---|---|---|---|---|---|---|
| B-829 | 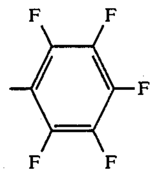 | $-C_4H_9$ | —CN | H | $-CH_3$ | $-CH_3$ |
| B-830 | 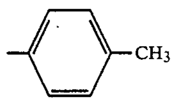 | $-C_8H_{17}$ | H | 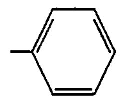 | $-C_2H_5$ | H |
| B-831 | 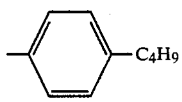 | $-C_2H_4OH$ | H | H | H | H |
Compounds having the structure of Formula [XXXI]
Formula [XXXI]
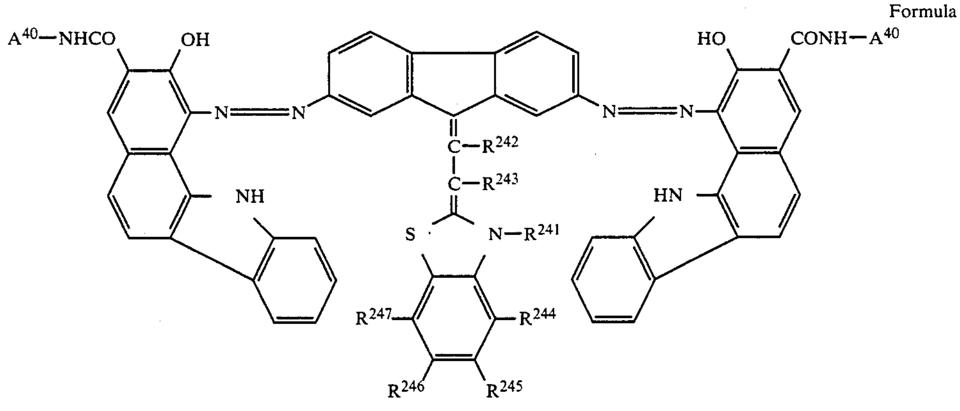
| Compound No. | $A^{40}$ | $R^{241}$ | $R^{242}$ | $R^{243}$ | $R^{244}$ | $R^{245}$ | $R^{246}$ | $R^{247}$ |
|---|---|---|---|---|---|---|---|---|
| B-832 | 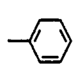 | $-CH_3$ | H | H | H | H | H | H |
| B-833 | 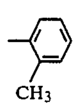 | $-CH_3$ | H | H | H | H | H | H |

-continued
Compounds having the structure of Formula [XXXI]
Formula [XXXI]
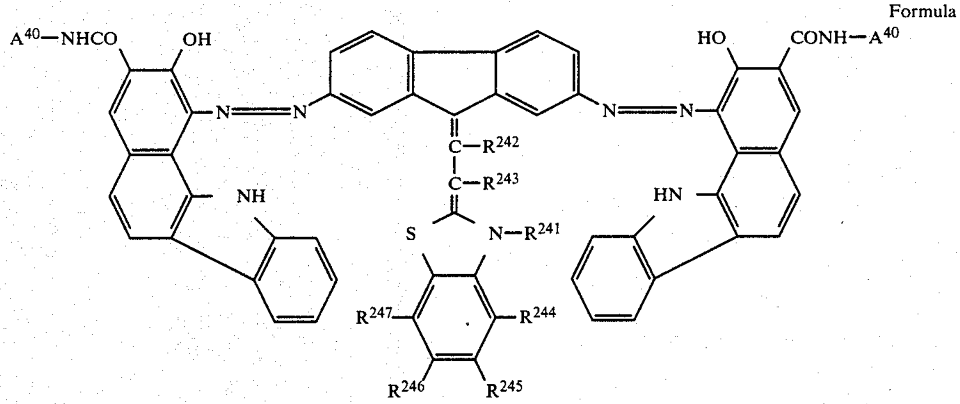
| Compound No. | $A^{40}$ | $R^{241}$ | $R^{242}$ | $R^{243}$ | $R^{244}$ | $R^{245}$ | $R^{246}$ | $R^{247}$ |
|---|---|---|---|---|---|---|---|---|
| B-834 | 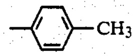 | $-CH_3$ | H | H | H | H | H | H |
| B-835 | 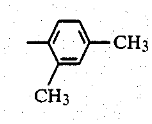 | $-CH_3$ | H | H | H | H | H | H |
| B-836 | 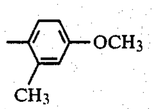 | $-CH_3$ | H | H | H | H | H | H |
| B-837 | 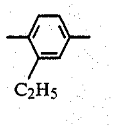 | $-CH_3$ | H | H | H | H | H | H |
| B-838 | 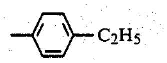 | $-CH_3$ | H | H | H | H | H | H |
| B-839 | 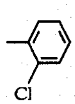 | $-CH_3$ | $-CN$ | H | H | H | |  |
| B-840 | 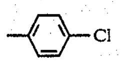 | $-CH_3$ | H | $-CN$ | H | $-CH_3$ | H | H |
| B-841 | 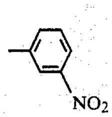 | $-CH_3$ | 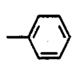 | H | H | H | $-CH_3$ | H |
| B-842 | 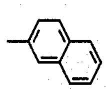 | $-C_2H_5$ | H | 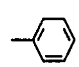 | H | $-CH_3$ | $-CH_3$ | H |
| B-843 | 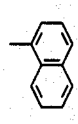 | $-C_2H_5$ | $-CH_3$ | H | |  | H | H |
| B-844 | 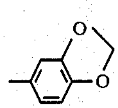 | $-C_2H_5$ | H | $-CH_3$ | H | $-Cl$ | $-Cl$ | H |

-continued
Compounds having the structure of Formula [XXXI]
Formula [XXXI]
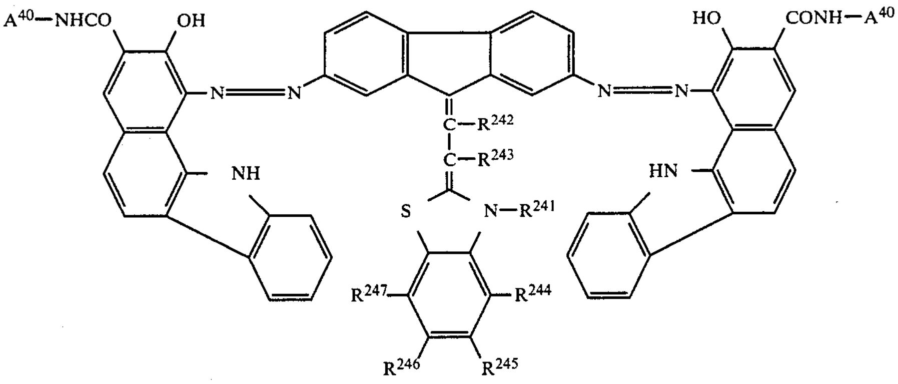
| Compound No. | $A^{40}$ | $R^{241}$ | $R^{242}$ | $R^{243}$ | $R^{244}$ | $R^{245}$ | $R^{246}$ | $R^{247}$ |
|---|---|---|---|---|---|---|---|---|
| B-845 | 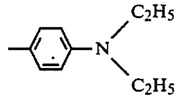 | $-C_2H_5$ | —CN | —CN | H | H | —Br | H |
| B-846 | 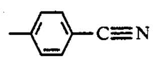 | $-C_2H_5$ | —CN | H | H | $-C_2H_5$ | H | H |
| B-847 | 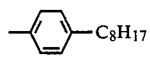 | $-C_4H_9$ | —CN | H | H | |  | H |
| B-848 | 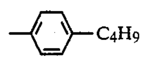 | $-C_8H_{17}$ | 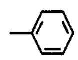 | H | 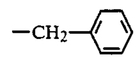 | H | H | H |
| B-849 | 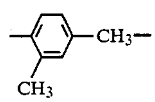 | 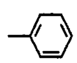 | 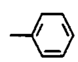 | H | H | H | H | —OH |
| B-850 | 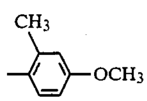 | 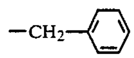 | H | $-CH_3$ | H | $-OCH_3$ | $-OCH_3$ | H |
Compounds having the structure of Formula [XXXII]
Formula [XXXII]
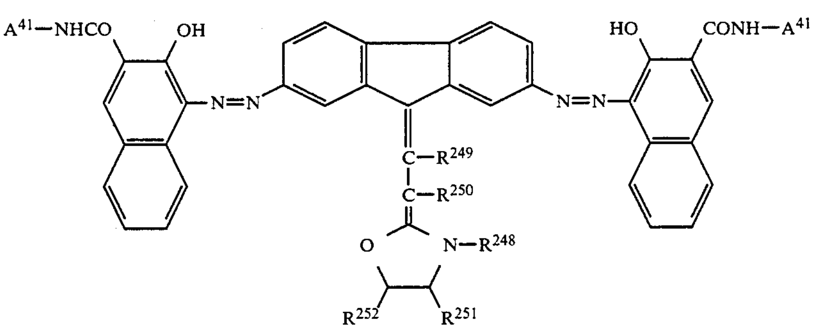
| Compound No. | $A^{41}$ | $R^{248}$ | $R^{249}$ | $R^{250}$ | $R^{251}$ | $R^{252}$ |
|---|---|---|---|---|---|---|
| B-851 | 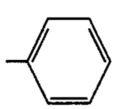 | $-CH_3$ | H | H | H | H |

-continued
Compounds having the structure of Formula [XXXII]
Formula [XXXII]
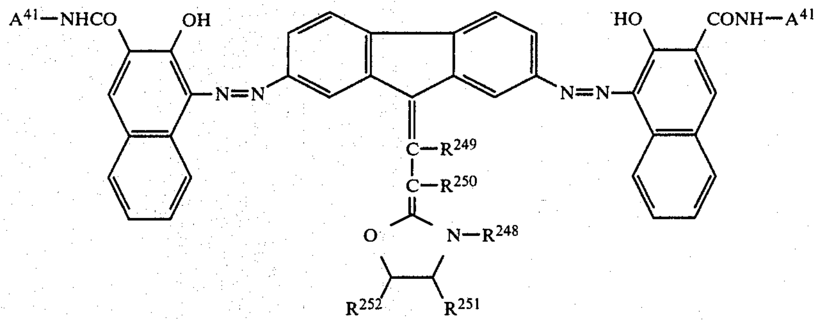
| Compound No. | $A^{41}$ | $R^{248}$ | $R^{249}$ | $R^{250}$ | $R^{251}$ | $R^{252}$ |
|---|---|---|---|---|---|---|
| B-852 | 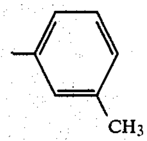 | $-CH_3$ | H | H | H | H |
| B-853 | 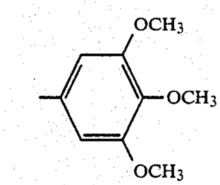 | $-CH_3$ | H | H | H | H |
| B-854 | 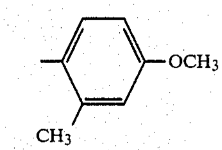 | $-CH_3$ | H | H | H | H |
| B-855 | 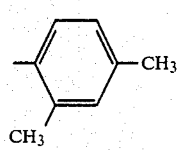 | $-CH_3$ | H | H | H | H |
| B-856 | 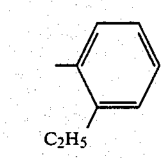 | $-CH_3$ | H | H | H | H |
| B-857 | 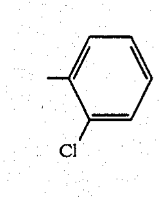 | $-CH_3$ | H | H | H | H |
| B-858 | 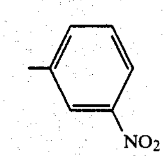 | $-CH_3$ | $-CN$ | H | H | H |

-continued
Compounds having the structure of Formula [XXXII]
Formula [XXXII]
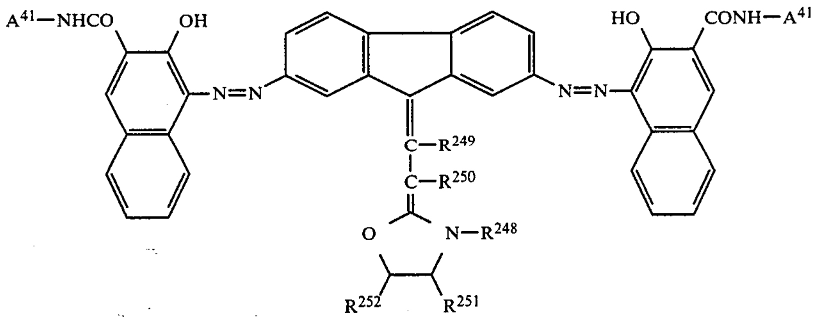
| Compound No. | $A^{41}$ | $R^{248}$ | $R^{249}$ | $R^{250}$ | $R^{251}$ | $R^{252}$ |
|---|---|---|---|---|---|---|
| B-859 | 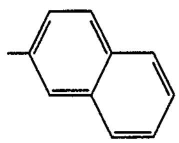 | $-CH_3$ | H | —CN | H | H |
| B-860 | 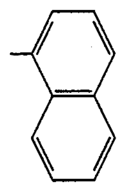 | $-C_2H_5$ | —CN | —CN | H | H |
| B-861 | 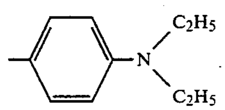 | $-C_2H_5$ | 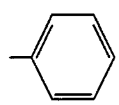 | H | H | H |
| B-862 | 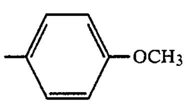 | $-C_2H_5$ | H | H | H | H |
| B-863 | 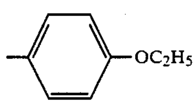 | $-C_2H_5$ | H | $-CH_3$ | H | H |
| B-864 | 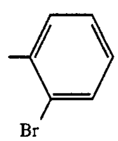 | 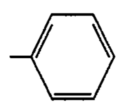 | H | H | $-CH_3$ | H |
| B-865 | 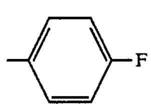 | 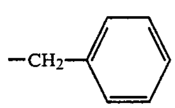 | H | H | H | $-CH_3$ |
| B-866 | 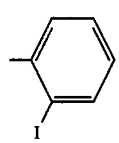 | 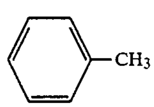 | H | H | —Cl | —Cl |

-continued
Compounds having the structure of Formula [XXXII]
Formula [XXXII]
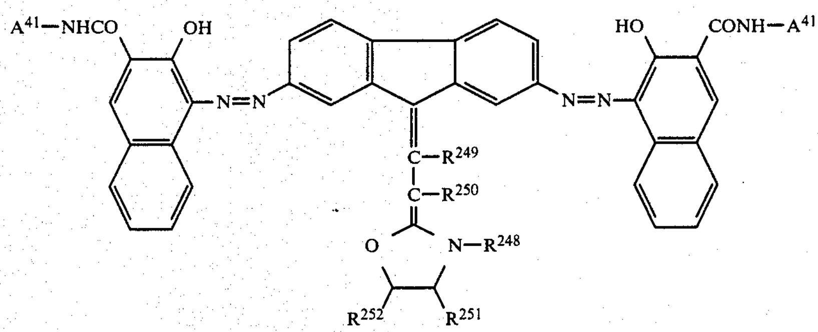
| Compound No. | $A^{41}$ | $R^{248}$ | $R^{249}$ | $R^{250}$ | $R^{251}$ | $R^{252}$ |
|---|---|---|---|---|---|---|
| B-867 | 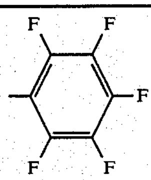 | $-C_4H_9$ | —CN | H | $-CH_3$ | $-CH_3$ |
| B-868 | 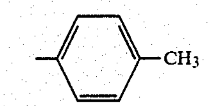 | $-C_8H_{17}$ | H | 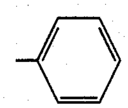 | $-C_2H_5$ | H |
| B-869 | 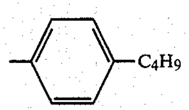 | $-C_2H_4OH$ | H | H | H | H |
Compounds having the structure of Formula [XXXIII]
Formula [XXXIII]
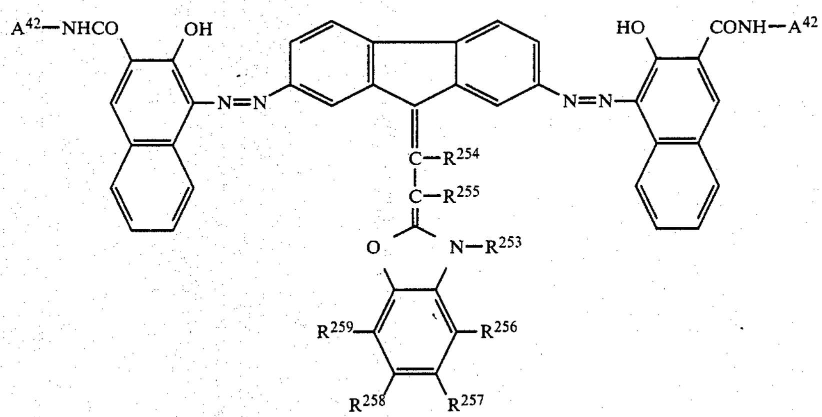
| Compound No. | $A^{42}$ | $R^{253}$ | $R^{254}$ | $R^{255}$ | $R^{256}$ | $R^{257}$ | $R^{258}$ | $R^{259}$ |
|---|---|---|---|---|---|---|---|---|
| B-870 | 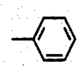 | $-CH_3$ | H | H | H | H | H | H |
| B-871 | 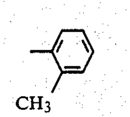 | $-CH_3$ | H | H | H | H | H | H |

-continued
Compounds having the structure of Formula [XXXIII]
Formula [XXXIII]
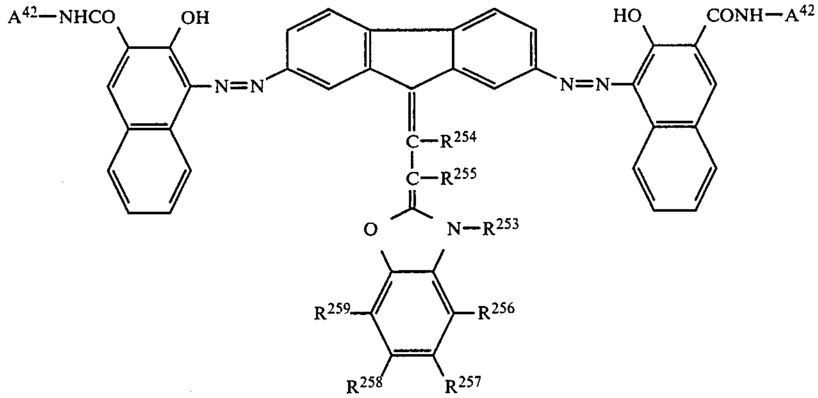
| Compound No. | $A^{42}$ | $R^{253}$ | $R^{254}$ | $R^{255}$ | $R^{256}$ | $R^{257}$ | $R^{258}$ | $R^{259}$ |
|---|---|---|---|---|---|---|---|---|
| B-872 | 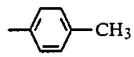 | $-CH_3$ | H | H | H | H | H | H |
| B-873 | 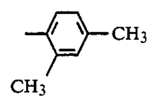 | $-CH_3$ | H | H | H | H | H | H |
| B-874 | 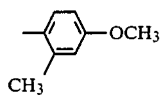 | $-CH_3$ | H | H | H | H | H | H |
| B-875 | 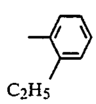 | $-CH_3$ | H | H | H | H | H | H |
| B-876 | 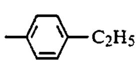 | $-CH_3$ | H | H | H | H | H | H |
| B-877 | 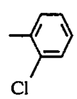 | $-CH_3$ | $-CN$ | H | H | H |  | |
| B-878 | 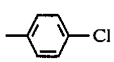 | $-CH_3$ | H | $-CN$ | H | $-CH_3$ | H | H |
| B-879 | 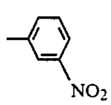 | $-CH_3$ | 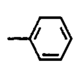 | H | H | H | $-CH_3$ | H |
| B-880 | 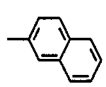 | $-C_2H_5$ | H | 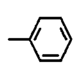 | H | $-CH_3$ | $-CH_3$ | H |
| B-881 | 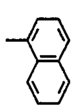 | $-C_2H_5$ | $-CH_3$ | H |  | | H | H |
| B-882 | 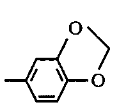 | $-C_2H_5$ | H | $-CH_3$ | H | $-Cl$ | $-Cl$ | H |

-continued
Compounds having the structure of Formula [XXXIII]
Formula [XXXIII]
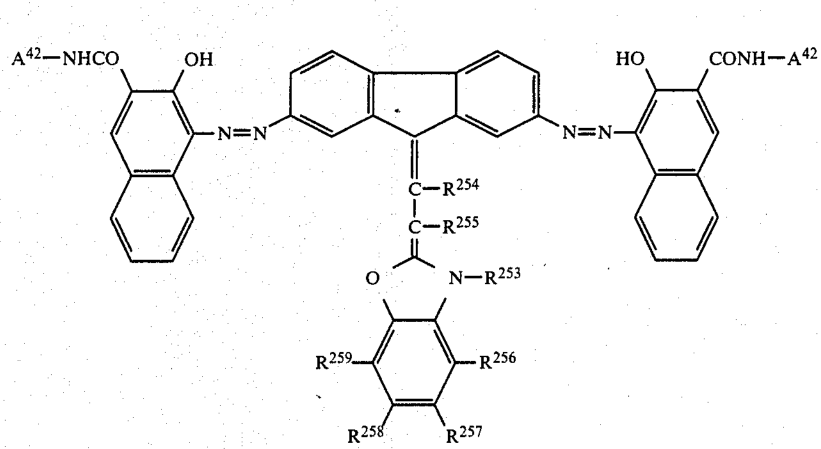
| Compound No. | $A^{42}$ | $R^{253}$ | $R^{254}$ | $R^{255}$ | $R^{256}$ | $R^{257}$ | $R^{258}$ | $R^{259}$ |
|---|---|---|---|---|---|---|---|---|
| B-883 | 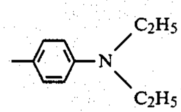 | $-C_2H_5$ | —CN | —CN | H | H | —Br | H |
| B-884 | 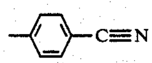 | $-C_2H_5$ | —CN | H | H | $-C_2H_5$ | H | H |
| B-885 | 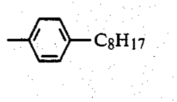 | $-C_4H_9$ | —CN | H | H |  | | H |
| B-886 | 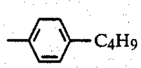 | $-C_8H_{17}$ | 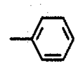 | H | 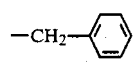 | H | H | H |
| B-887 | 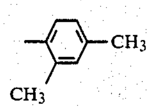 | 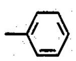 | 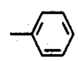 | H | H | H | H | —OH |
| B-888 | 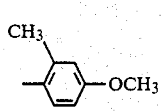 | 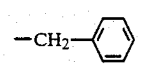 | H | $-CH_3$ | H | $-OCH_3$ | $-OCH_3$ | H |

Compounds having the structure of Formula [XXXIV]
Formula [XXXIV]
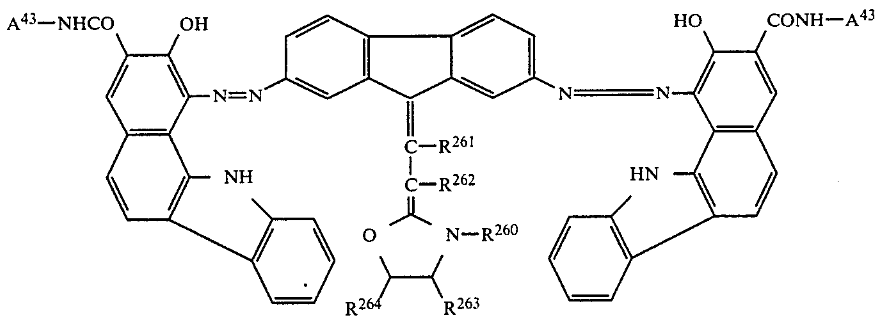
| Compound No. | $A^{43}$ | $R^{260}$ | $R^{261}$ | $R^{262}$ | $R^{263}$ | $R^{264}$ |
|---|---|---|---|---|---|---|
| B-889 | 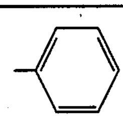 | $-CH_3$ | H | H | H | H |
| B-890 | 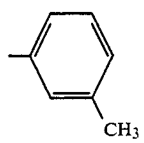 | $-CH_3$ | H | H | H | H |
| B-891 | 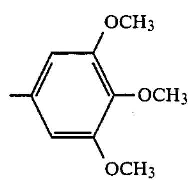 | $-CH_3$ | H | H | H | H |
| B-892 | 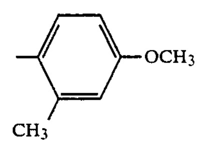 | $-CH_3$ | H | H | H | H |
| B-893 | 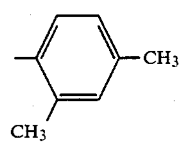 | $-CH_3$ | H | H | H | H |
| B-894 | 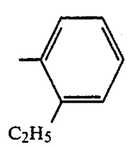 | $-CH_3$ | H | H | H | H |
| B-895 | 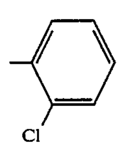 | $-CH_3$ | H | H | H | H |
| B-896 | 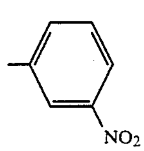 | $-CH_3$ | $-CN$ | H | H | H |

-continued
Compounds having the structure of Formula [XXXIV]
Formula [XXXIV]
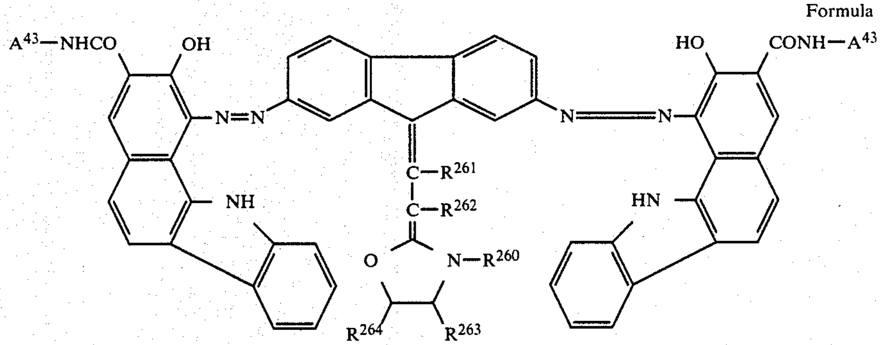
| Compound No. | $A^{43}$ | $R^{260}$ | $R^{261}$ | $R^{262}$ | $R^{263}$ | $R^{264}$ |
|---|---|---|---|---|---|---|
| B-897 | 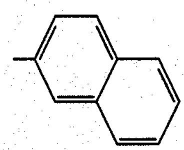 | $-CH_3$ | H | —CN | H | H |
| B-898 | 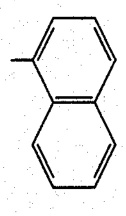 | $-C_2H_5$ | —CN | —CN | H | H |
| B-899 | 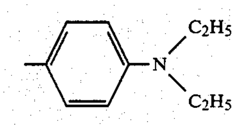  | $-C_2H_5$ | 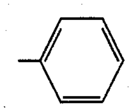 | H | H | H |
| B-900 | 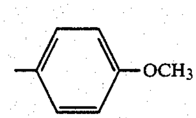  | $-C_2H_5$ | H | H | H | H |
| B-901 | 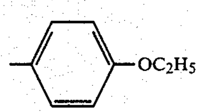  | $-C_2H_5$ | H | $-CH_3$ | H | H |
| B-902 | 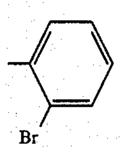  | 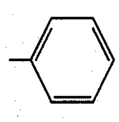 | H | H | $-CH_3$ | H |
| B-903 | 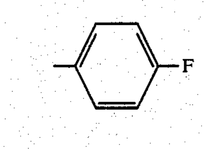  | 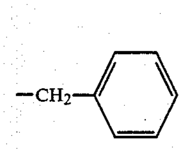  | H | H | H | $-CH_3$ |
| B-904 | 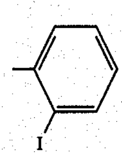  | 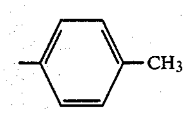  | H | H | —Cl | —Cl |

-continued
Compounds having the structure of Formula [XXXIV]
Formula [XXXIV]
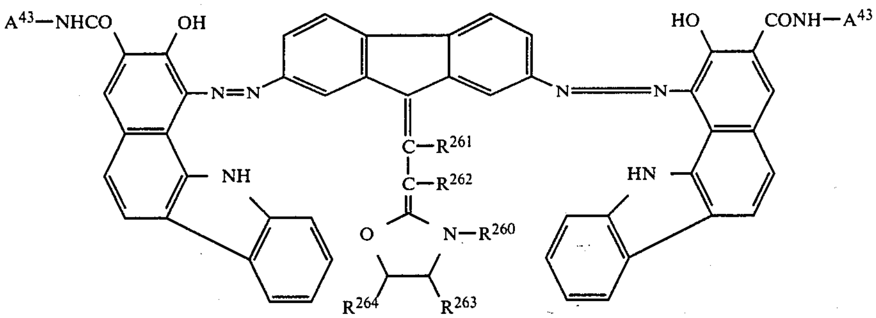
| Compound No. | $A^{43}$ | $R^{260}$ | $R^{261}$ | $R^{262}$ | $R^{263}$ | $R^{264}$ |
| --- | --- | --- | --- | --- | --- | --- |
| B-905 | 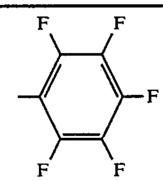 | $-C_4H_9$ | —CN | H | $-CH_3$ | $-CH_3$ |
| B-906 | 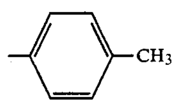 | $-C_8H_{17}$ | H | 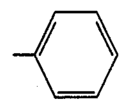 | $-C_2H_5$ | H |
| B-907 | 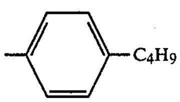 | $-C_2H_4OH$ | H | H | H | H |
Compounds having the structure of Formula [XXXV]
Formula [XXXV]
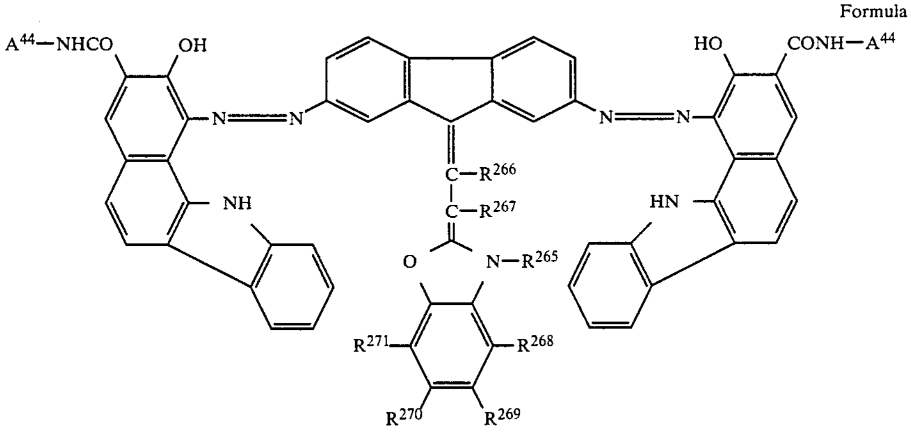
| Compound No. | $A^{44}$ | $R^{265}$ | $R^{266}$ | $R^{267}$ | $R^{268}$ | $R^{269}$ | $R^{270}$ | $R^{271}$ |
| --- | --- | --- | --- | --- | --- | --- | --- | --- |
| B-908 | 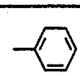 | $-CH_3$ | H | H | H | H | H | H |
| B-909 | 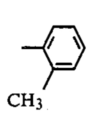 | $-CH_3$ | H | H | H | H | H | H |

-continued
Compounds having the structure of Formula [XXXV]
Formula [XXXV]
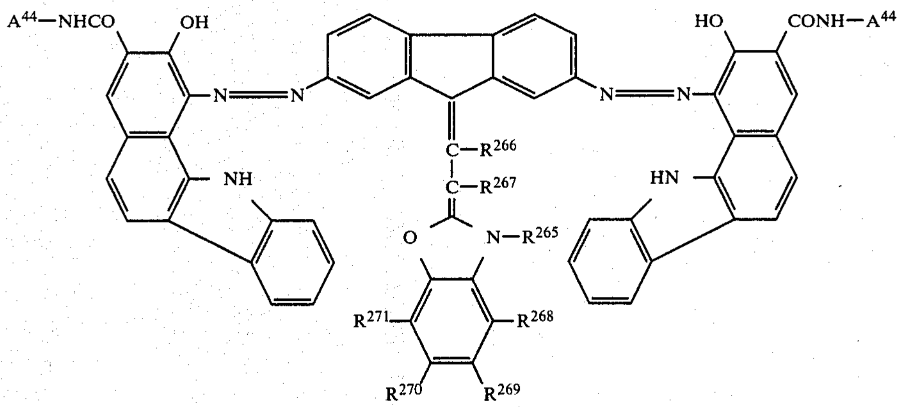
| Compound No. | $A^{44}$ | $R^{265}$ | $R^{266}$ | $R^{267}$ | $R^{268}$ | $R^{269}$ | $R^{270}$ | $R^{271}$ |
|---|---|---|---|---|---|---|---|---|
| B-910 | 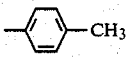 | $-CH_3$ | H | H | H | H | H | H |
| B-911 | 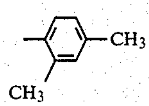 | $-CH_3$ | H | H | H | H | H | H |
| B-912 | 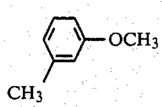 | $-CH_3$ | H | H | H | H | H | H |
| B-913 | 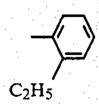 | $-CH_3$ | H | H | H | H | H | H |
| B-914 | 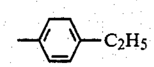 | $-CH_3$ | H | H | H | H | H | H |
| B-915 | 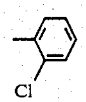 | $-CH_3$ | H | H | H | H | 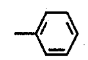 | 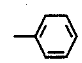 |
| B-916 | 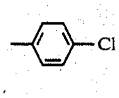 | $-CH_3$ | H | $-CN$ | H | $-CH_3$ | H | H |
| B-917 | 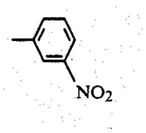 | $-CH_3$ | 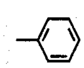 | H | H | H | $-CH_3$ | H |
| B-918 | 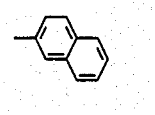 | $-C_2H_5$ | H | 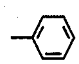 | H | $-CH_3$ | $-CH_3$ | H |
| B-919 | 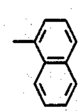 | $-C_2H_5$ | $-CH_3$ | H | 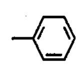 | 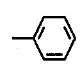 | H | H |

-continued
Compounds having the structure of Formula [XXXV]
Formula [XXXV]
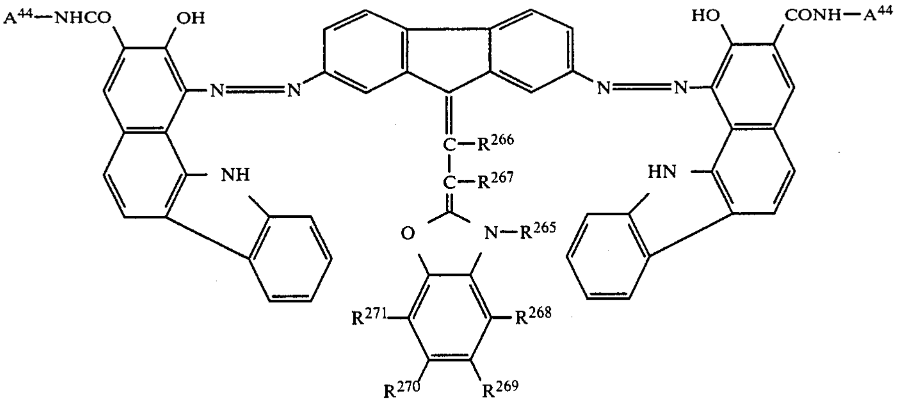
| Compound No. | $A^{44}$ | $R^{265}$ | $R^{266}$ | $R^{267}$ | $R^{268}$ | $R^{269}$ | $R^{270}$ | $R^{271}$ |
|---|---|---|---|---|---|---|---|---|
| B-920 | 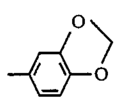 | $-C_2H_5$ | H | $-CH_3$ | H | —Cl | —Cl | H |
| B-921 | 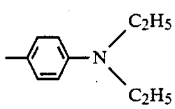 | $-C_2H_5$ | —CN | —CN | H | H | —Br | H |
| B-922 | 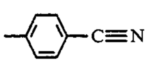 | $-C_2H_5$ | —CN | H | H | $-C_2H_5$ | H | H |
| B-923 | 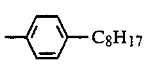 | $-C_4H_9$ | —CN | H | H | 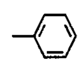 | 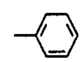 | H |
| B-924 | 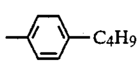 | $-C_8H_{17}$ | 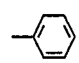 | H | 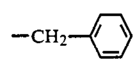 | H | H | H |
| B-925 | 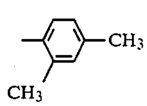 | 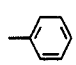 | 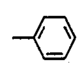 | H | H | H | H | —OH |
| B-926 | 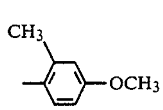 | 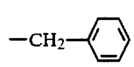 | H | $-CH_3$ | H | $-OCH_3$ | $-OCH_3$ | H |

Compounds having the structure of Formula [XXXVI]
Formula [XXXVI]
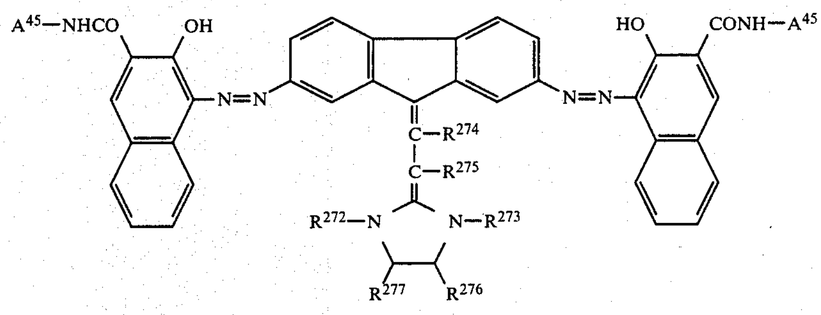
| Compound No. | $A^{45}$ | $R^{272}$ | $R^{273}$ | $R^{274}$ | $R^{275}$ | $R^{276}$ | $R^{277}$ |
|---|---|---|---|---|---|---|---|
| B-927 | 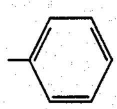 | $-CH_3$ | $-CH_3$ | H | H | H | H |
| B-928 | 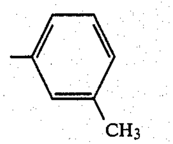 | $-CH_3$ | $-CH_3$ | H | H | H | H |
| B-929 | 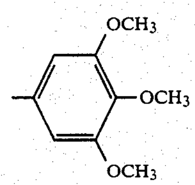 | $-CH_3$ | $-CH_3$ | H | H | H | H |
| B-930 | 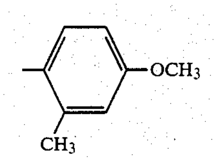 | $-CH_3$ | $-CH_3$ | H | H | H | H |
| B-931 | 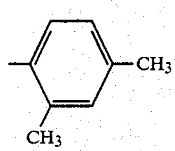 | $-CH_3$ | $-CH_3$ | H | H | H | H |
| B-932 | 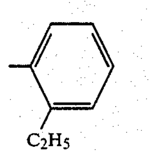 | $-CH_3$ | $-CH_3$ | H | H | H | H |
| B-933 | 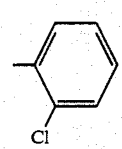 | $-CH_3$ | $-CH_3$ | H | H | H | H |
| B-934 | 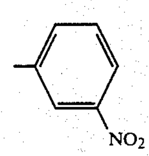 | $-CH_3$ | $-CH_3$ | $-CN$ | H | H | H |

-continued
Compounds having the structure of Formula [XXXVI]
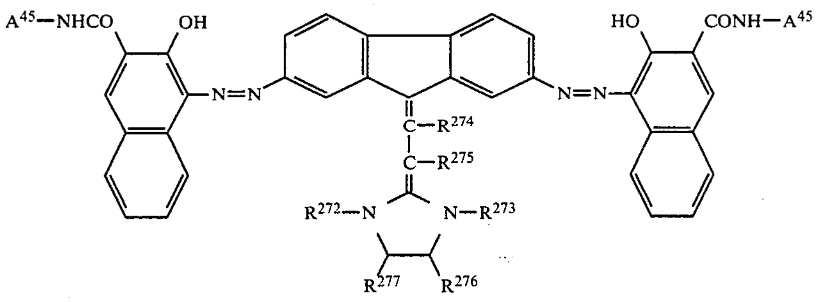
Formula [XXXVI]
| Compound No. | $A^{45}$ | $R^{272}$ | $R^{273}$ | $R^{274}$ | $R^{275}$ | $R^{276}$ | $R^{277}$ |
|---|---|---|---|---|---|---|---|
| B-935 | 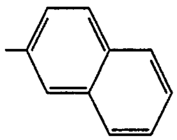 | $-CH_3$ | $-CH_3$ | H | $-CN$ | H | H |
| B-936 | 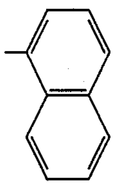 | $-C_2H_5$ | $-C_2H_5$ | $-CN$ | $-CN$ | H | H |
| B-937 | 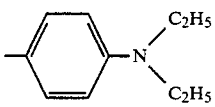 | $-C_2H_5$ | $-C_2H_5$ | 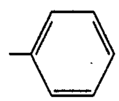 | H | H | H |
| B-938 | 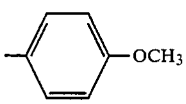 | $-C_2H_5$ | $-C_2H_5$ | H | H | H | H |
| B-939 | 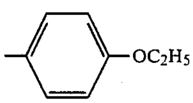 | 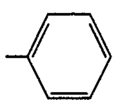 | $-C_2H_5$ | H | $-CH_3$ | H | H |
| B-940 | 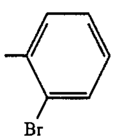 | 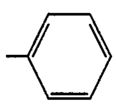 | 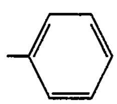 | H | H | $-CH_3$ | H |
| B-941 | 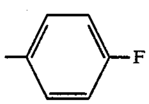 | $-CH_3$ | 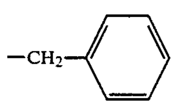 | H | H | H | $-CH_3$ |
| B-942 | 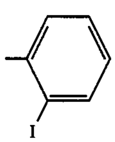 | $-CH_3$ | 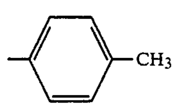 | H | H | $-Cl$ | $-Cl$ |

-continued
Compounds having the structure of Formula [XXXVI]
Formula [XXXVI]
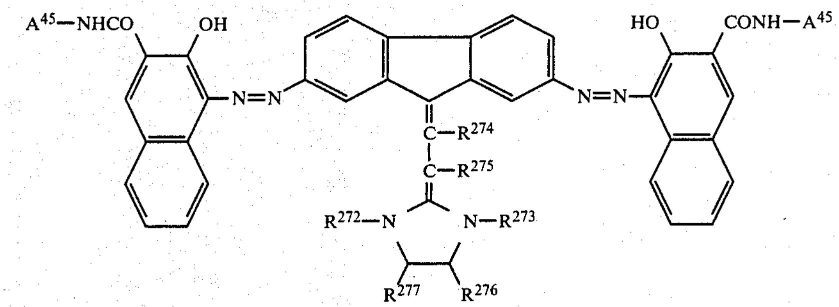
| Compound No. | $A^{45}$ | $R^{272}$ | $R^{273}$ | $R^{274}$ | $R^{275}$ | $R^{276}$ | $R^{277}$ |
|---|---|---|---|---|---|---|---|
| B-943 | 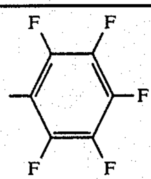 | $-CH_3$ | $-C_4H_9$ | $-CN$ | H | $-CH_3$ | $-CH_3$ |
| B-944 | 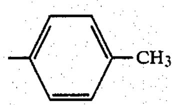 | $-CH_3$ | $-C_8H_{17}$ | H | 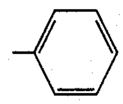 | $-C_2H_5$ | H |
| B-945 | 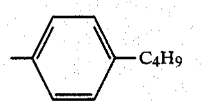 | $-CH_3$ | $-C_2H_4OH$ | H | H | H | H |
Compounds having the structure of Formula [XXXVII]
Formula [XXXVII]
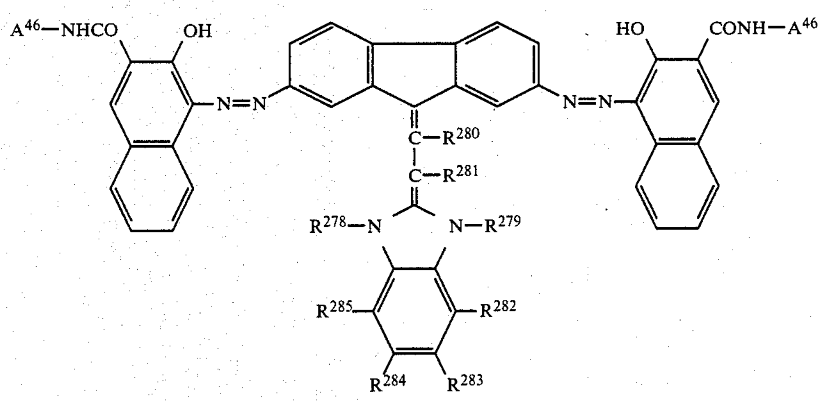
| Compound No. | $A^{46}$ | $R^{278}$ | $R^{279}$ | $R^{280}$ | $R^{281}$ | $R^{282}$ | $R^{283}$ | $R^{284}$ | $R^{285}$ |
|---|---|---|---|---|---|---|---|---|---|
| B-946 | 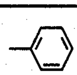 | $-CH_3$ | $-CH_3$ | H | H | H | H | H | H |
| B-947 | 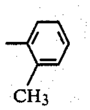 | $-CH_3$ | $-CH_3$ | H | H | H | H | H | H |
| B-948 | 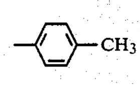 | $-CH_3$ | $-CH_3$ | H | H | H | H | H | H |

-continued
Compounds having the structure of Formula [XXXVII]
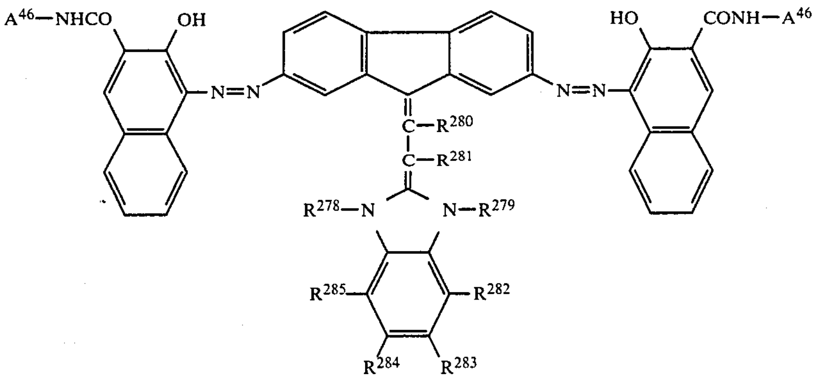
Formula [XXXVII]
| Compound No. | $A^{46}$ | $R^{278}$ | $R^{279}$ | $R^{280}$ | $R^{281}$ | $R^{282}$ | $R^{283}$ | $R^{284}$ | $R^{285}$ |
|---|---|---|---|---|---|---|---|---|---|
| B-949 | 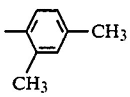 | $-CH_3$ | $-CH_3$ | H | H | H | H | H | H |
| B-950 | 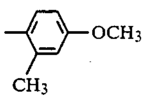 | $-CH_3$ | $-CH_3$ | H | H | H | H | H | H |
| B-951 | 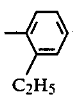 | $-CH_3$ | $-CH_3$ | H | H | H | H | H | H |
| B-952 | 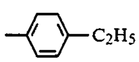 | $-CH_3$ | $-CH_3$ | H | H | H | H | H | H |
| B-953 | 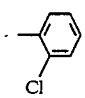 | $-CH_3$ | $-CH_3$ | $-CN$ | H | H | H | |  |
| B-954 | 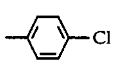 | $-CH_3$ | $-CH_3$ | H | $-CN$ | H | $-CH_3$ | H | H |
| B-955 | 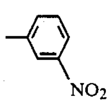 | $-CH_3$ | $-CH_3$ | 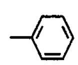 | H | H | H | $-CH_3$ | H |
| B-956 | 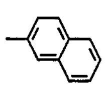 | $-C_2H_5$ | $-C_2H_5$ | H | 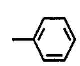 | H | $-CH_3$ | $-CH_3$ | H |
| B-957 | 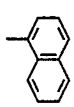 | $-C_2H_5$ | $-C_2H_5$ | $-CH_3$ | H | |  | H | H |
| B-958 | 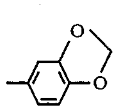 | $-C_2H_5$ | $-C_2H_5$ | H | $-CH_3$ | H | $-Cl$ | $-Cl$ | H |

-continued

Compounds having the structure of Formula [XXXVII]

Formula [XXXVII]

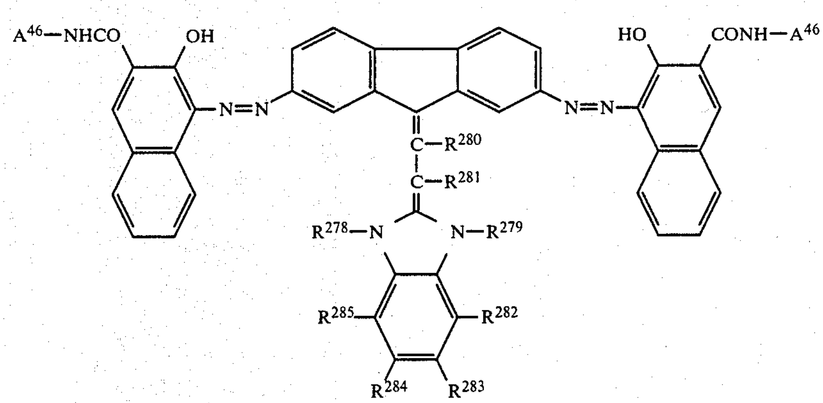

| Compound No. | $A^{46}$ | $R^{278}$ | $R^{279}$ | $R^{280}$ | $R^{281}$ | $R^{282}$ | $R^{283}$ | $R^{284}$ | $R^{285}$ |
|---|---|---|---|---|---|---|---|---|---|
| B-959 | 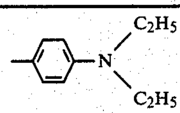 | $-C_2H_5$ | $-C_2H_5$ | —CN | —CN | H | H | —Br | H |
| B-960 | 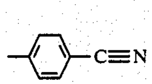 | $-C_2H_5$ | $-C_2H_5$ | —CN | H | H | $-C_2H_5$ | H | H |
| B-961 | 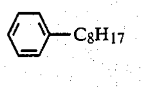 | $-C_4H_9$ | $-C_4H_9$ | —CN | H | H | |  | H |
| B-962 | 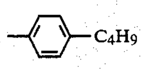 | $-C_8H_{17}$ | $-C_8H_{17}$ | 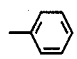 | H | 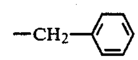 | H | H | H |
| B-963 | 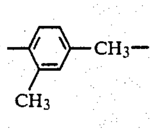 | 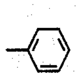 | 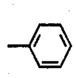 | 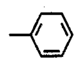 | H | H | H | H | —OH |
| B-964 | 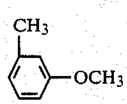 | 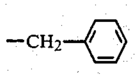 | 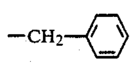 | H | $-CH_3$ | H | $-OCH_3$ | $-OCH_3$ | H |

Compounds having the structure of Formula [XXXVIII]

Formula [XXXVIII]

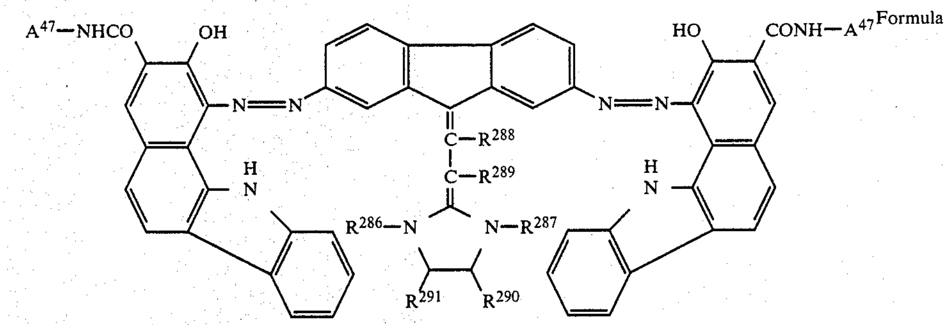

| Compound No. | $A^{47}$ | $R^{286}$ | $R^{287}$ | $R^{288}$ | $R^{289}$ | $R^{290}$ | $R^{291}$ |
|---|---|---|---|---|---|---|---|
| B-965 | 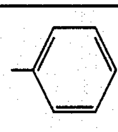 | $-CH_3$ | $-CH_3$ | H | H | H | H |

-continued
Compounds having the structure of Formula [XXXVIII]
Formula [XXXVIII]
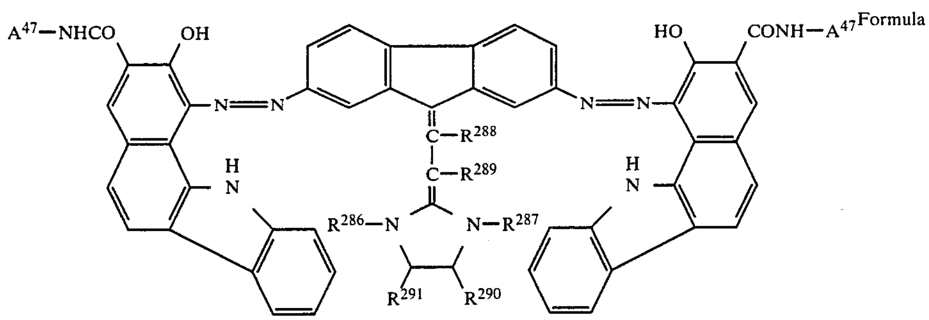
| Compound No. | $A^{47}$ | $R^{286}$ | $R^{287}$ | $R^{288}$ | $R^{289}$ | $R^{290}$ | $R^{291}$ |
|---|---|---|---|---|---|---|---|
| B-966 | 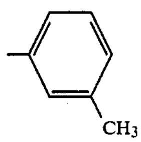 | $-CH_3$ | $-CH_3$ | H | H | H | H |
| B-967 | 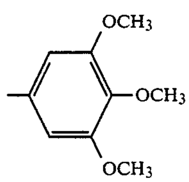 | $-CH_3$ | $-CH_3$ | H | H | H | H |
| B-968 | 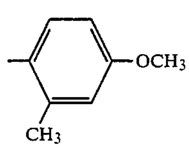 | $-CH_3$ | $-CH_3$ | H | H | H | H |
| B-969 | 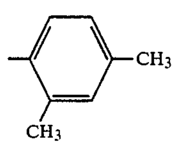 | $-CH_3$ | $-CH_3$ | H | H | H | H |
| B-970 | 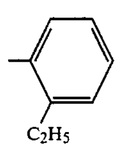 | $-CH_3$ | $-CH_3$ | H | H | H | H |
| B-971 | 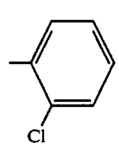 | $-CH_3$ | $-CH_3$ | H | H | H | H |
| B-972 | 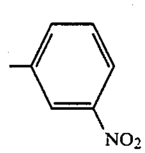 | $-CH_3$ | $-CH_3$ | $-CN$ | H | H | H |

-continued
Compounds having the structure of Formula [XXXVIII]
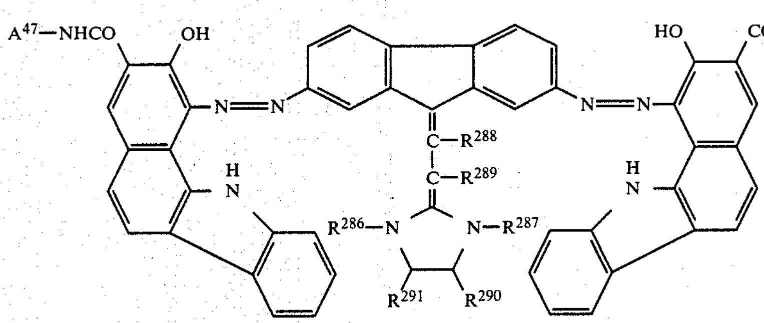
Formula [XXXVIII]
| Compound No. | $A^{47}$ | $R^{286}$ | $R^{287}$ | $R^{288}$ | $R^{289}$ | $R^{290}$ | $R^{291}$ |
|---|---|---|---|---|---|---|---|
| B-973 | 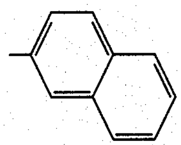 | $-CH_3$ | $-CH_3$ | H | $-CN$ | H | H |
| B-974 | 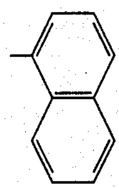 | $-CH_3$ | $-C_2H_5$ | $-CN$ | $-CN$ | H | H |
| B-975 | 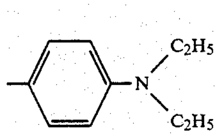  | $-CH_3$ | $-C_2H_5$ | 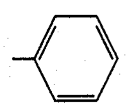 | H | H | H |
| B-976 | 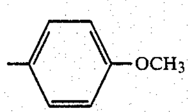  | $-CH_3$ | $-C_2H_5$ | H | H | H | H |
| B-977 | 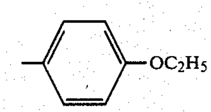  | $-CH_3$ | $-C_2H_5$ | H | $-CH_3$ | H | H |
| B-978 | 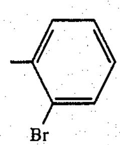  | $-CH_2$ | 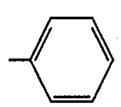 | H | H | $-CH_3$ | H |
| B-979 | 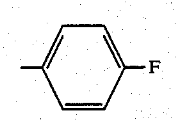  | $-CH_3$ | 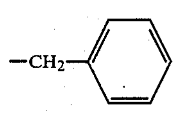  | H | H | H | $-CH_3$ |
| B-980 | 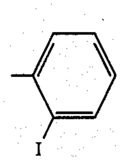  | $-CH_3$ | 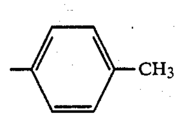  | H | H | $-Cl$ | $-Cl$ |

-continued

Compounds having the structure of Formula [XXXVIII]

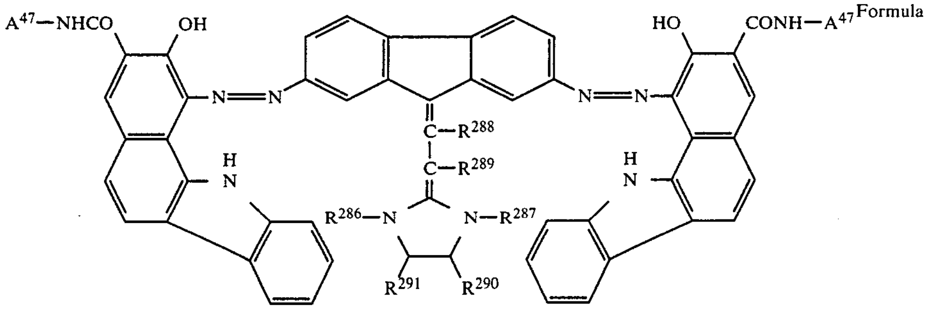

Formula [XXXVIII]

| Compound No. | $A^{47}$ | $R^{286}$ | $R^{287}$ | $R^{288}$ | $R^{289}$ | $R^{290}$ | $R^{291}$ |
|---|---|---|---|---|---|---|---|
| B-981 | 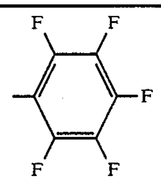 | $-CH_3$ | $-C_4H_9$ | $-CN$ | H | $-CH_3$ | $-CH_3$ |
| B-982 | 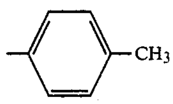 | $-CH_3$ | $-C_8H_{17}$ | H | 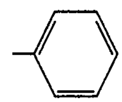 | $-C_2H_5$ | H |
| B-983 | 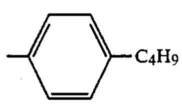 | $-CH_3$ | $-C_2H_4OH$ | H | H | H | H |

Compounds having the structure of Formula [XXXIX]

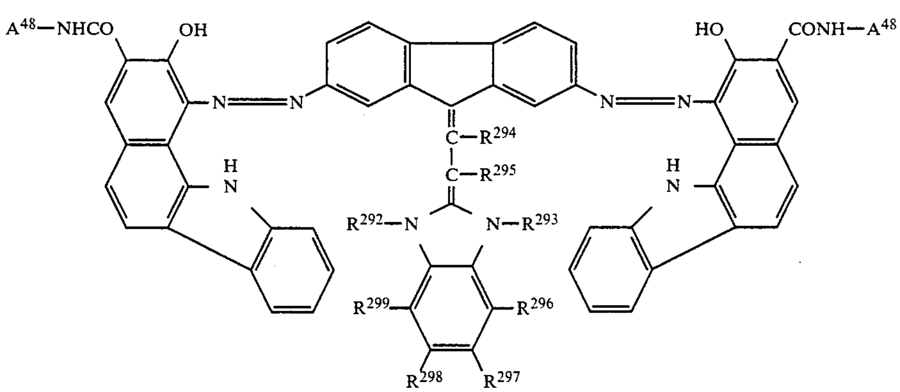

[Formula [XXXIX]

| Compound No. | $A^{48}$ | $R^{292}$ | $R^{293}$ | $R^{294}$ | $R^{295}$ | $R^{296}$ | $R^{297}$ | $R^{298}$ | $R^{299}$ |
|---|---|---|---|---|---|---|---|---|---|
| B-984 | 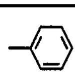 | $-CH_3$ | $-CH_3$ | H | H | H | H | H | H |
| B-985 | 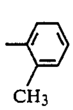 | $-CH_3$ | $-CH_3$ | H | H | H | H | H | H |
| B-986 | 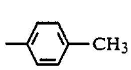 | $-CH_3$ | $-CH_3$ | H | H | H | H | H | H |

-continued
Compounds having the structure of Formula [XXXIX]
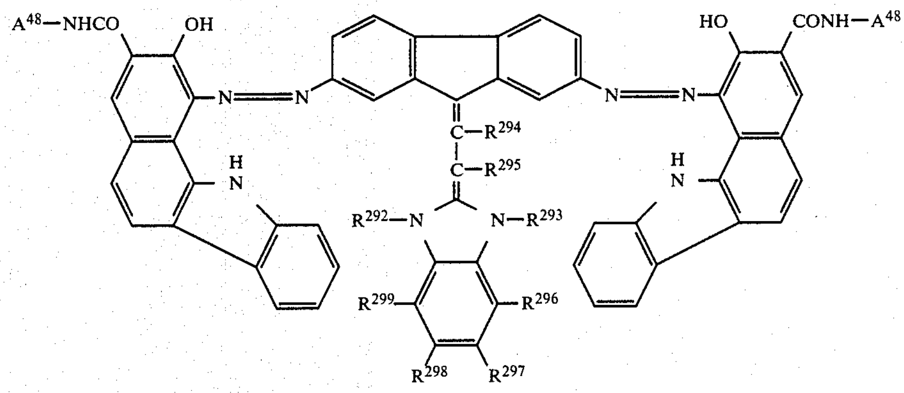
[Formula [XXXIX]
| Compound No. | $A^{48}$ | $R^{292}$ | $R^{293}$ | $R^{294}$ | $R^{295}$ | $R^{296}$ | $R^{297}$ | $R^{298}$ | $R^{299}$ |
|---|---|---|---|---|---|---|---|---|---|
| B-987 | 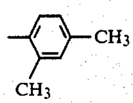 | $-CH_3$ | $-CH_3$ | H | H | H | H | H | H |
| B-988 | 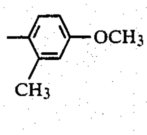 | $-CH_3$ | $-CH_3$ | H | H | H | H | H | H |
| B-989 | 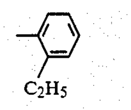 | $-CH_3$ | $-CH_3$ | H | H | H | H | H | H |
| B-990 | 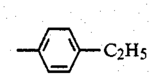 | $-CH_3$ | $-CH_3$ | H | H | H | H | H | H |
| B-991 | 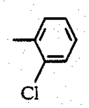 | $-CH_3$ | $-CH_3$ | $-CN$ | H | H | H | |  |
| B-992 | 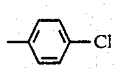 | $-CH_3$ | $-CH_3$ | H | $-CN$ | H | $-CH_3$ | H | H |
| B-993 | 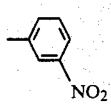 | $-CH_3$ | $-CH_3$ | 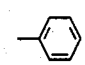 | H | H | H | $-CH_3$ | H |
| B-994 | 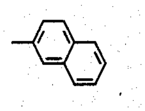 | $-C_2H_5$ | $-C_2H_5$ | H | 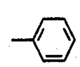 | H | $-CH_3$ | $-CH_3$ | H |
| B-995 | 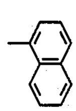 | $-C_2H_5$ | $-C_2H_5$ | $-CH_3$ | H | |  | H | H |
| B-996 | 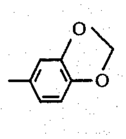 | $-C_2H_5$ | $-C_2H_5$ | H | $-CH_3$ | H | $-Cl$ | $-Cl$ | H |

-continued
Compounds having the structure of Formula [XXXIX]
[Formula [XXXIX]
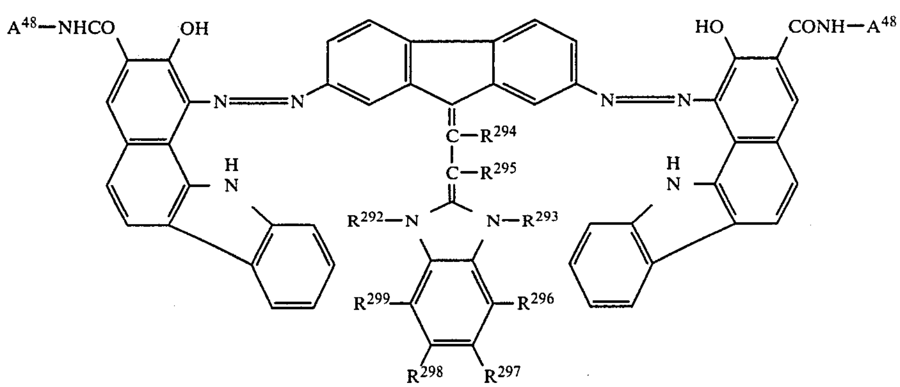
| Compound No. | A48 | R292 | R293 | R294 | R295 | R296 | R297 | R298 | R299 |
|---|---|---|---|---|---|---|---|---|---|
| B-997 | 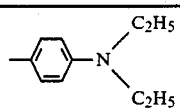 | $-C_2H_5$ | $-C_2H_5$ | —CN | —CN | H | H | —Br | H |
| B-998 | 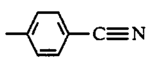 | $-C_2H_5$ | $-C_2H_5$ | —CN | H | H | $-C_2H_5$ | H | H |
| B-999 | 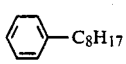 | $-C_4H_9$ | $-C_4H_9$ | —CN | H | H | |  | H |
| B-1000 | 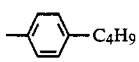 | $-C_8H_{17}$ | $-C_8H_{17}$ | 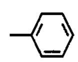 | H | 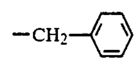 | H | H | H |
| B-1001 | 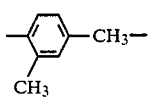 | 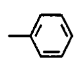 | 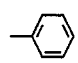 | 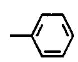 | H | H | H | H | —OH |
| B-1002 | 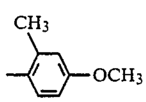 | 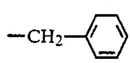 | 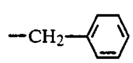 | H | $-CH_3$ | H | $-OCH_3$ | $-OCH_3$ | H |
Compounds having the structure of Formula [XXXX]
Formula [XXXX]
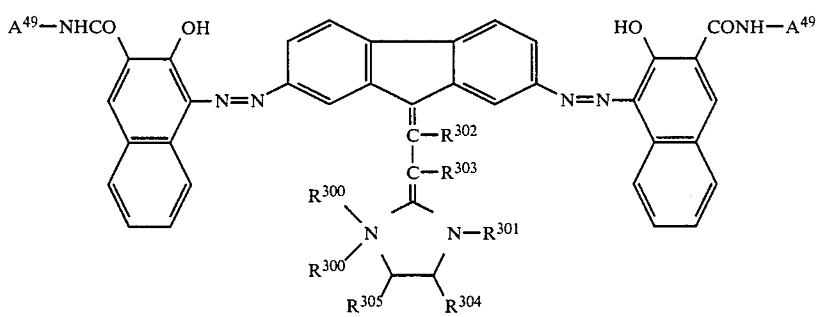
| Compound No. | A49 | R300 | R301 | R302 | R303 | R304 | R305 |
|---|---|---|---|---|---|---|---|
| B-1003 | 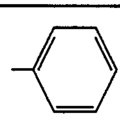 | H | $-CH_3$ | H | H | H | H |

-continued
Compounds having the structure of Formula [XXXX]
Formula [XXXX]
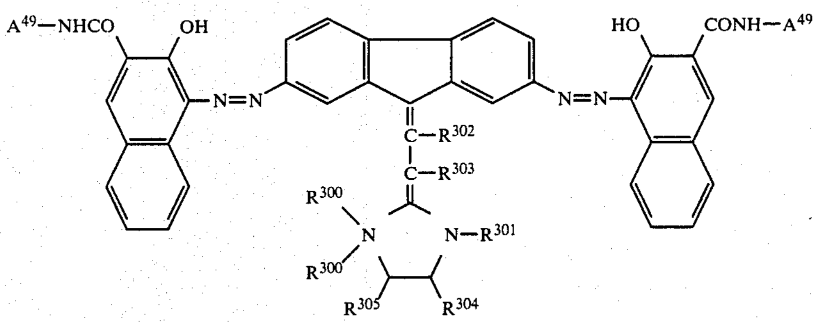
| Compound No. | $A^{49}$ | $R^{300}$ | $R^{301}$ | $R^{302}$ | $R^{303}$ | $R^{304}$ | $R^{305}$ |
|---|---|---|---|---|---|---|---|
| B-1004 | 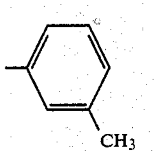 | H | $-CH_3$ | H | H | H | H |
| B-1005 | 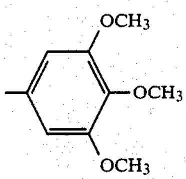 | H | $-CH_3$ | H | H | H | H |
| B-1006 | 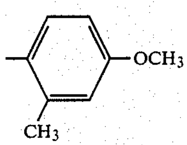 | H | $-CH_3$ | H | H | H | H |
| B-1007 | 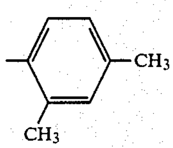 | $-CH_3$ | $-CH_3$ | H | H | H | H |
| B-1008 | 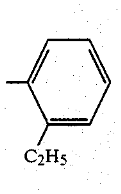 | $-CH_3$ | $-CH_3$ | H | H | H | H |
| B-1009 | 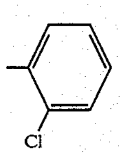 | $-C_2H_5$ | $-CH_3$ | H | H | H | H |
| B-1010 | 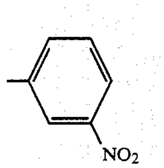 | H | $-CH_3$ | $-CN$ | H | H | H |

-continued
Compounds having the structure of Formula [XXXX]
Formula [XXXX]
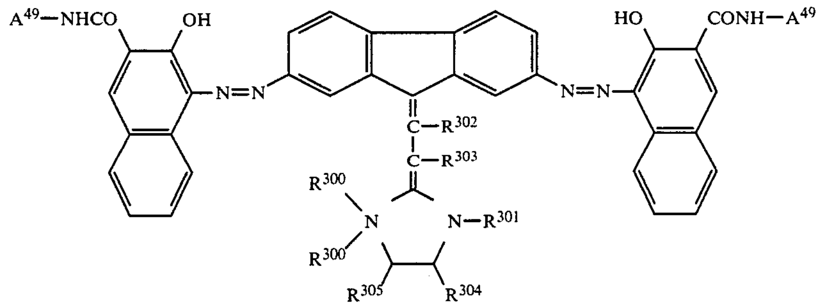
| Compound No. | $A^{49}$ | $R^{300}$ | $R^{301}$ | $R^{302}$ | $R^{303}$ | $R^{304}$ | $R^{305}$ |
|---|---|---|---|---|---|---|---|
| B-1011 | 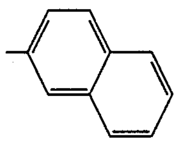 | H | $-CH_3$ | H | $-CN$ | H | H |
| B-1012 | 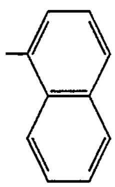 | H | $-C_2H_5$ | $-CN$ | $-CN$ | H | H |
| B-1013 | 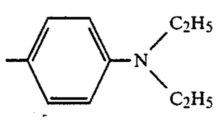 | $-CH_3$ | $-C_2H_5$ | 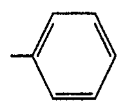 | H | H | H |
| B-1014 | 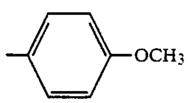 | $-CH_3$ | $-C_2H_5$ | H | H | H | H |
| B-1015 | 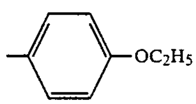 | $-CH_3$ | $-C_2H_5$ | H | $-CH_3$ | H | H |
| B-1016 | 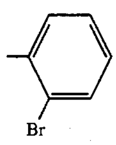 | $-C_2H_5$ | 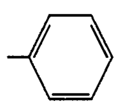 | H | H | $-CH_3$ | H |
| B-1017 | 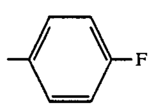 | $-C_2H_5$ | 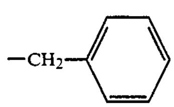 | H | H | H | $-CH_3$ |
| B-1018 | 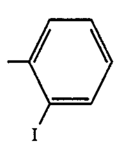 | $-C_2H_5$ | 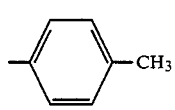 | H | H | $-Cl$ | $-Cl$ |

-continued
Compounds having the structure of Formula [XXXX]
Formula [XXXX]
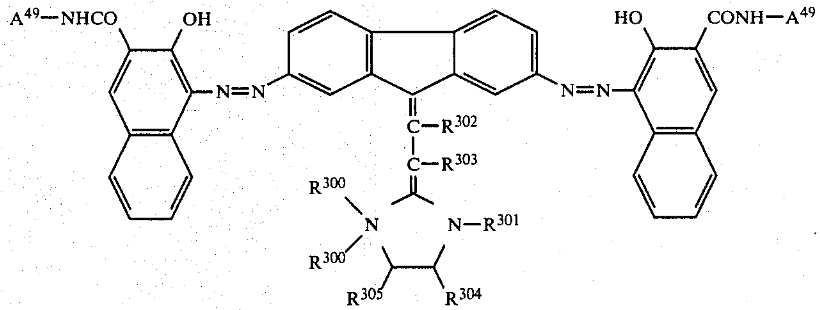
| Compound No. | $A^{49}$ | $R^{300}$ | $R^{301}$ | $R^{302}$ | $R^{303}$ | $R^{304}$ | $R^{305}$ |
|---|---|---|---|---|---|---|---|
| B-1019 | 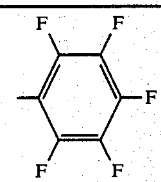 | H | $-C_4H_9$ | —CN | H | $-CH_3$ | $-CN_3$ |
| B-1020 | 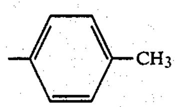 | H | $-C_8H_{17}$ | H | 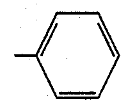 | $-C_2H_5$ | H |
| B-1021 | 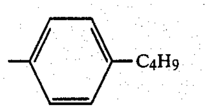 | H | $-C_2H_4OH$ | H | H | H | H |
Compounds having the structure of Formula [XXXXI]
Formula [XXXXI]
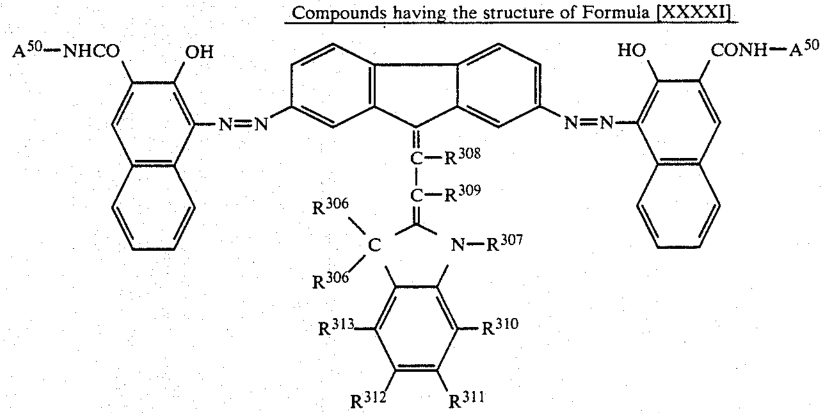
| Compound No. | $A^{50}$ | $R^{306}$ | $R^{307}$ | $R^{308}$ | $R^{309}$ | $R^{310}$ | $R^{311}$ | $R^{312}$ | $R^{313}$ |
|---|---|---|---|---|---|---|---|---|---|
| B-1022 | 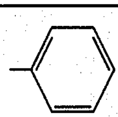 | H | $-CH_3$ | H | H | H | H | H | H |
| B-1023 | 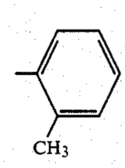 | H | $-CH_3$ | H | H | H | H | H | H |

-continued
Compounds having the structure of Formula [XXXXI]
Formula [XXXXI]
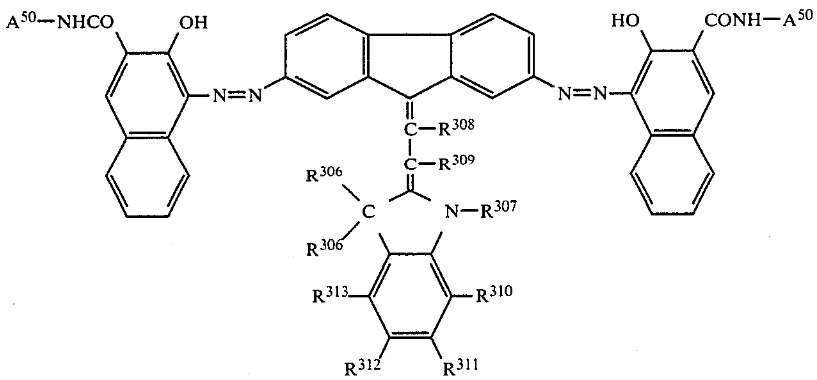
| Compound No. | $A^{50}$ | $R^{306}$ | $R^{307}$ | $R^{308}$ | $R^{309}$ | $R^{310}$ | $R^{311}$ | $R^{312}$ | $R^{313}$ |
|---|---|---|---|---|---|---|---|---|---|
| B-1024 | 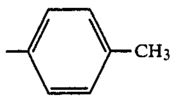 | H | $-CH_3$ | H | H | H | H | H | H |
| B-1025 | 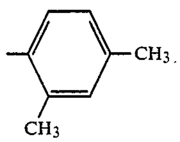 | $-CH_3$ | $-CH_3$ | H | H | H | H | H | H |
| B-1026 | 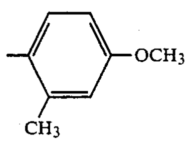 | $-CH_3$ | $-CH_3$ | H | H | H | H | H | H |
| B-1027 | 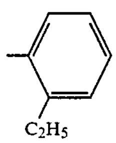 | $-C_2H_5$ | $-CH_3$ | H | H | H | H | H | H |
| B-1028 | 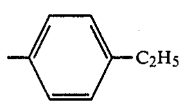 | $-C_2H_5$ | $-CH_3$ | H | H | H | H | H | H |
| B-1029 | 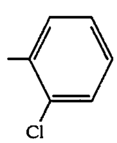 | H | $-CH_3$ | $-CN$ | H | H | H | 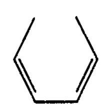 | |
| B-1030 | 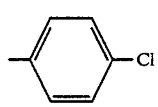 | H | $-CH_3$ | H | $-CN$ | H | $-CH_3$ | H | H |
| B-1031 | 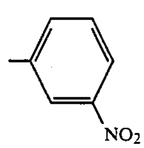 | $-CH_3$ | $-CH_3$ | 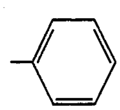 | H | H | H | $-CH_3$ | H |

-continued
Compounds having the structure of Formula [XXXXI]
Formula [XXXXI]
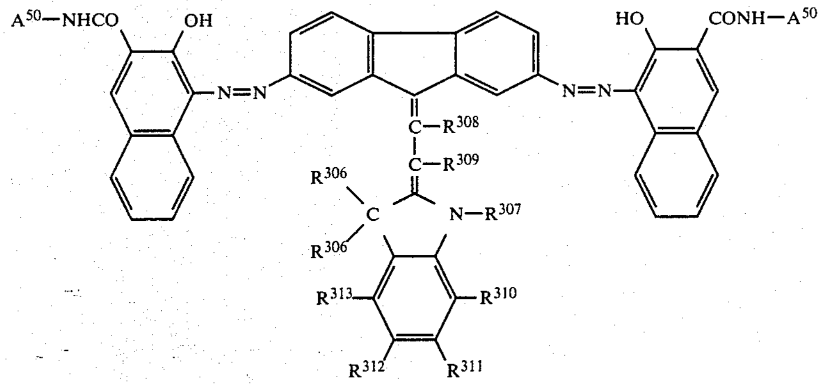
| Compound No. | $A^{50}$ | $R^{306}$ | $R^{307}$ | $R^{308}$ | $R^{309}$ | $R^{310}$ | $R^{311}$ | $R^{312}$ | $R^{313}$ |
|---|---|---|---|---|---|---|---|---|---|
| B-1032 | 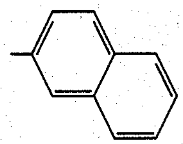 | $-CH_3$ | $-C_2H_5$ | H | 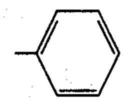 | H | $-CH_3$ | $-CH_3$ | H |
| B-1033 | 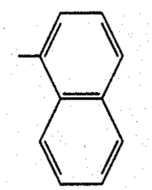 | $-CH_3$ | $-C_2H_5$ | $-CH_3$ | H | 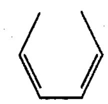 | | H | H |
| B-1034 | 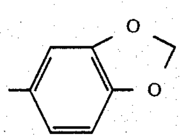  | $-C_2H_5$ | $-C_2H_5$ | H | $-CH_3$ | H | —Cl | —Cl | H |
| B-1035 | 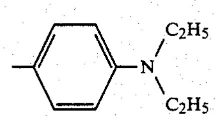  | $-C_2H_5$ | $-C_2H_5$ | —CN | —CN | H | H | —Br | H |
| B-1036 | 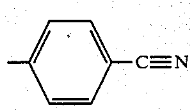  | $-C_2H_5$ | $-C_2H_5$ | —CN | H | H | $-C_2H_5$ | H | H |
| B-1037 | 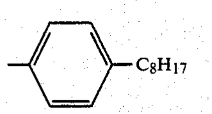  | H | $-C_4H_9$ | —CN | H | H | 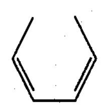 | | H |
| B-1038 | 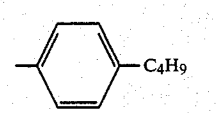  | H | $-C_8H_{17}$ | 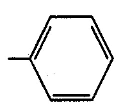 | H | $-CH_2$ | H | H | H |
| B-1039 | 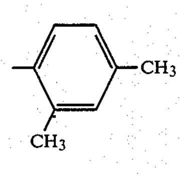  | H | 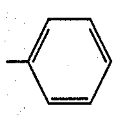 | 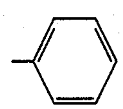 | H | H | H | H | —OH |

-continued
Compounds having the structure of Formula [XXXXI]
Formula [XXXXI]
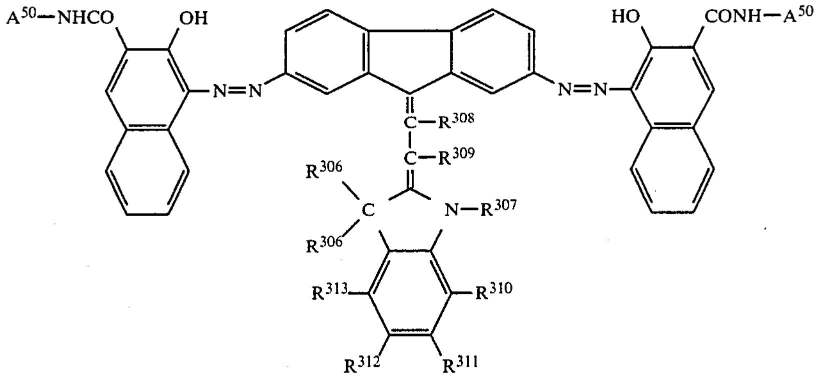
| Compound No. | A50 | R306 | R307 | R308 | R309 | R310 | R311 | R312 | R313 |
|---|---|---|---|---|---|---|---|---|---|
| B-1040 | 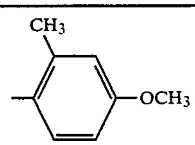  | H | 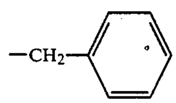  | H | $—CH_3$ | H | $—OCH_3$ | $—OCH_3$ | H |
Compounds having the structure of Formula [XXXXII]
Formula [XXXXII]
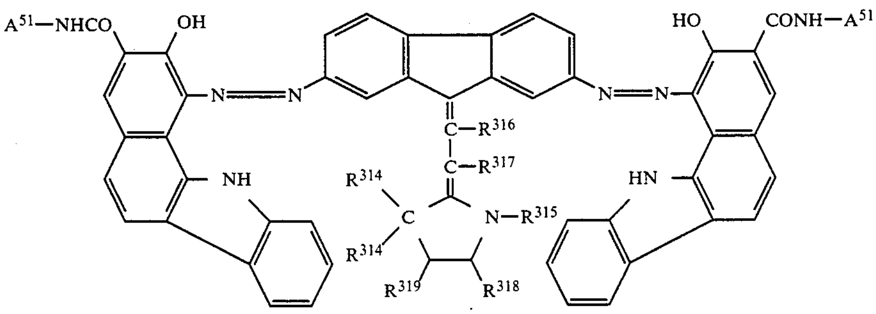
| Compound No. | A51 | R314 | R315 | R316 | R317 | R318 | R319 |
|---|---|---|---|---|---|---|---|
| B-1041 | 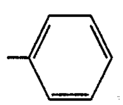 | H | $—CH_3$ | H | H | H | H |
| B-1042 | 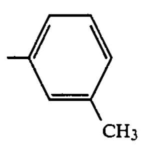  | H | $—CH_3$ | H | H | H | H |
| B-1043 | 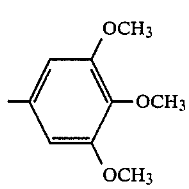  | H | $—CH_3$ | H | H | H | H |

-continued
Compounds having the structure of Formula [XXXXII]
Formula [XXXXII]
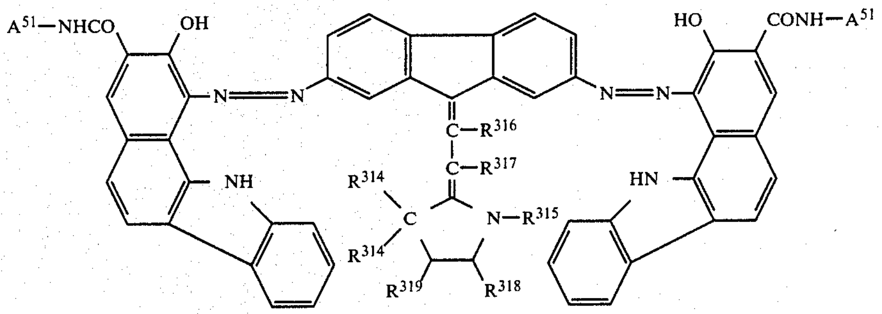
| Compound No. | $A^{51}$ | $R^{314}$ | $R^{315}$ | $R^{316}$ | $R^{317}$ | $R^{318}$ | $R^{319}$ |
|---|---|---|---|---|---|---|---|
| B-1044 | 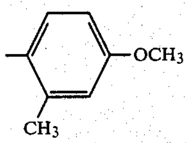 | H | $-CH_3$ | H | H | H | H |
| B-1045 | 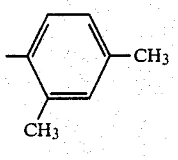 | $-CH_3$ | $-CH_3$ | H | H | H | H |
| B-1046 | 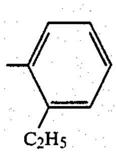 | $-CH_3$ | $-CH_3$ | H | H | H | H |
| B-1047 | 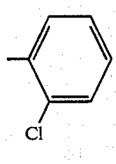 | $-C_2H_5$ | $-CH_3$ | H | H | H | H |
| B-1048 | 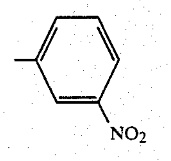 | $-C_2H_5$ | $-CH_3$ | $-CN$ | H | H | H |
| B-1049 | 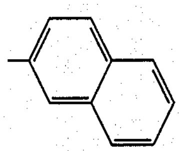 | H | $-CH_3$ | H | $-CN$ | H | H |
| B-1050 | 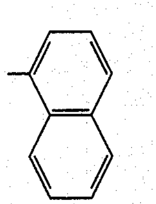 | H | $-C_2H_5$ | $-CN$ | $-CN$ | H | H |
| B-1051 | 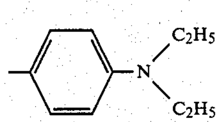 | H | $-C_2H_5$ | 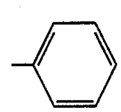 | H | H | H |

-continued
Compounds having the structure of Formula [XXXXII]
Formula [XXXXII]
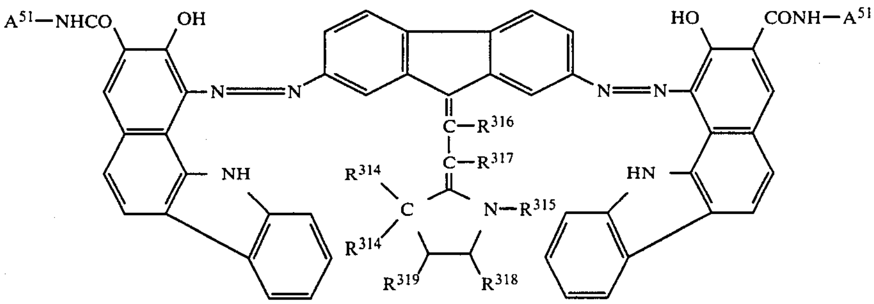
| Compound No. | $A^{51}$ | $R^{314}$ | $R^{315}$ | $R^{316}$ | $R^{317}$ | $R^{318}$ | $R^{319}$ |
|---|---|---|---|---|---|---|---|
| B-1052 | 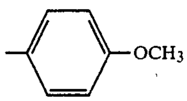 | H | $-C_2H_5$ | H | H | H | H |
| B-1053 | 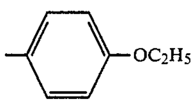 | $-CH_3$ | $-C_2H_5$ | H | $-CH_3$ | H | H |
| B-1054 | 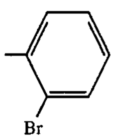 | $-CH_3$ | 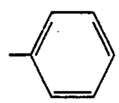 | H | H | $-CH_3$ | H |
| B-1055 | 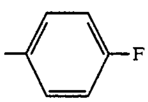 | $-CH_3$ | 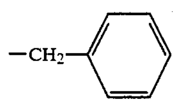 | H | H | H | $-CH_3$ |
| B-1056 | 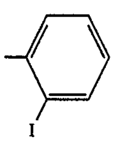 | $-CH_3$ | 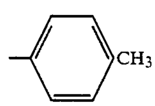 | H | H | $-Cl$ | $-Cl$ |
| B-1057 | 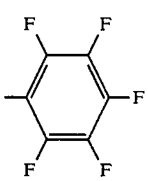 | $-C_2H_5$ | $-C_4H_9$ | $-CN$ | H | $-CH_3$ | $-CH_3$ |
| B-1058 | 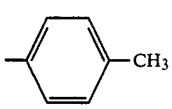 | $-C_2H_5$ | $-C_8H_{17}$ | H | 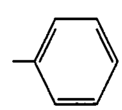 | $-C_2H_5$ | H |
| B-1059 | 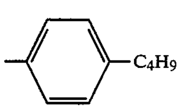 | $-C_2H_5$ | $-C_2H_4OH$ | H | H | H | H |

Compounds having the structure of Formula [XXXXIII]
Formula [XXXXIII]
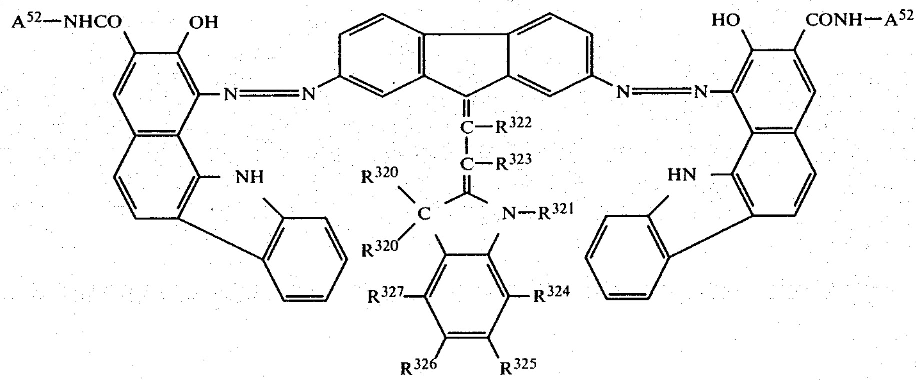
| Compound No. | $A^{52}$ | $R^{320}$ | $R^{321}$ | $R^{322}$ | $R^{323}$ | $R^{324}$ | $R^{325}$ | $R^{326}$ | $R^{327}$ |
|---|---|---|---|---|---|---|---|---|---|
| B-1060 | 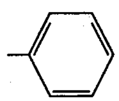 | H | $-CH_3$ | H | H | H | H | H | H |
| B-1061 | 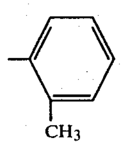 | H | $-CH_3$ | H | H | H | H | H | H |
| B-1062 | 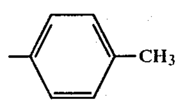 | H | $-CH_3$ | H | H | H | H | H | H |
| B-1063 | 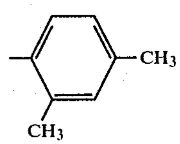 | H | $-CH_3$ | H | H | H | H | H | H |

-continued
Compounds having the structure of Formula [XXXXIII]
Formula [XXXXIII]
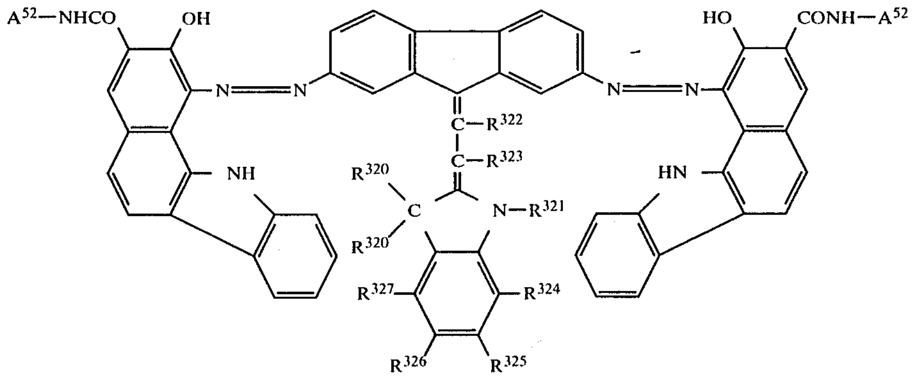
| Compound No. | $A^{52}$ | $R^{320}$ | $R^{321}$ | $R^{322}$ | $R^{323}$ | $R^{324}$ | $R^{325}$ | $R^{326}$ | $R^{327}$ |
|---|---|---|---|---|---|---|---|---|---|
| B-1064 | 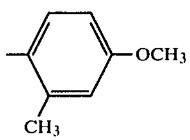 | $-CH_3$ | $-CH_3$ | H | H | H | H | H | H |
| B-1065 | 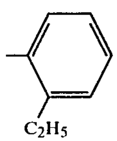 | $-CH_3$ | $-CH_3$ | H | H | H | H | H | H |
| B-1066 | 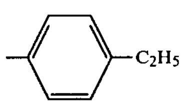 | $-C_2H_5$ | $-CH_3$ | H | H | H | H | H | H |
| B-1067 | 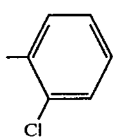 | $-C_2H_5$ | $-CH_3$ | $-CN$ | H | H | H | 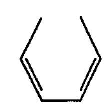 | |

-continued
Compounds having the structure of Formula [XXXXXIII]
Formula [XXXXXIII]
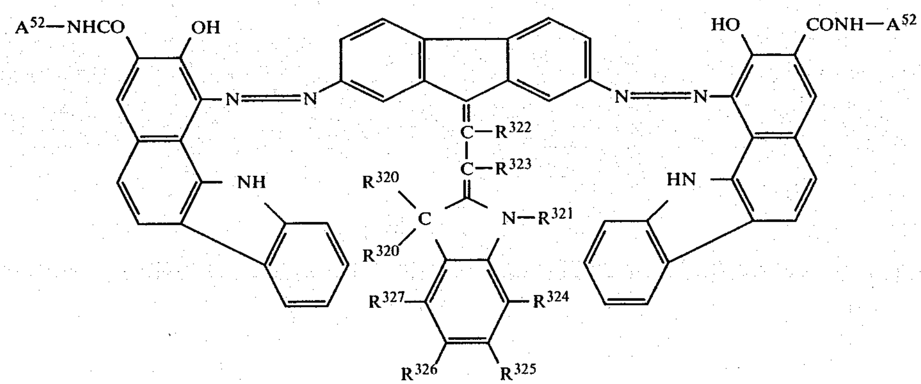
| Compound No. | $A^{52}$ | $R^{320}$ | $R^{321}$ | $R^{322}$ | $R^{323}$ | $R^{324}$ | $R^{325}$ | $R^{326}$ | $R^{327}$ |
|---|---|---|---|---|---|---|---|---|---|
| B-1068 | 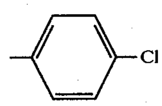 | H | $-CH_3$ | H | —CN | H | $-CH_3$ | H | H |
| B-1069 | 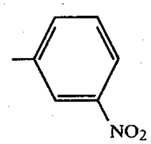 | H | $-CH_3$ | 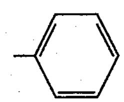 | H | H | H | $-CH_3$ | H |
| B-1070 | 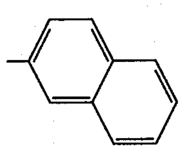 | H | $-C_2H_5$ | H | 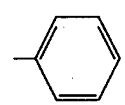 | H | $-CH_3$ | $-CH_3$ | H |

-continued
Compounds having the structure of Formula [XXXXIII]
Formula [XXXXIII]
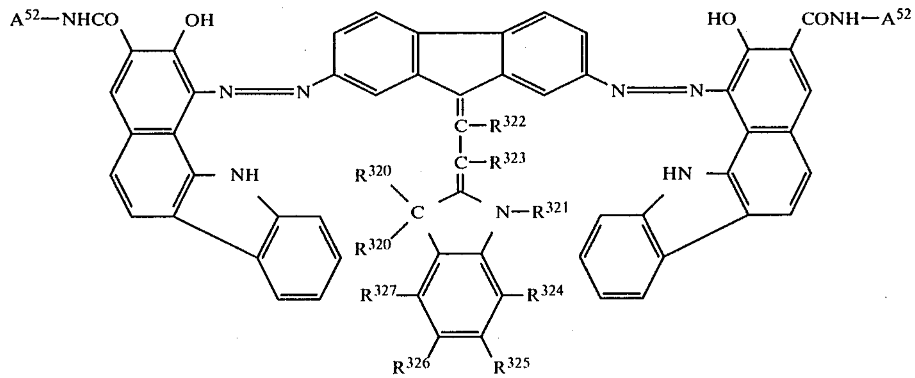
| Compound No. | $A^{52}$ | $R^{320}$ | $R^{321}$ | $R^{322}$ | $R^{323}$ | $R^{324}$ | $R^{325}$ | $R^{326}$ | $R^{327}$ |
|---|---|---|---|---|---|---|---|---|---|
| B-1071 | 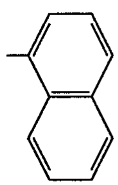 | H | $-C_2H_5$ | $-CH_3$ | H | 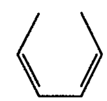 | | H | H |
| B-1072 | 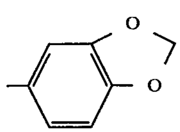 | $-CH_3$ | $-C_2H_5$ | H | $-CH_3$ | H | $-Cl$ | $-Cl$ | H |
| B-1073 | 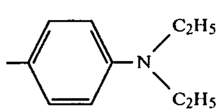 | $-CH_3$ | $-C_2H_5$ | $-CN$ | $-CN$ | H | H | $-Br$ | H |
| B-1074 | 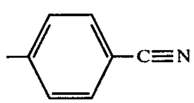 | $-CH_3$ | $-C_2H_5$ | $-CN$ | H | H | $-C_2H_5$ | H | H |

-continued
Compounds having the structure of Formula [XXXXIII]
Formula [XXXXIII]
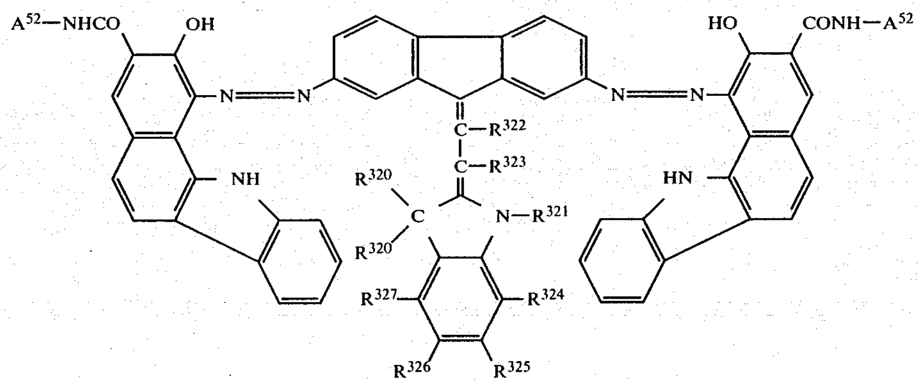
| Compound No. | $A^{52}$ | $R^{320}$ | $R^{321}$ | $R^{322}$ | $R^{323}$ | $R^{324}$ | $R^{325}$ | $R^{326}$ | $R^{327}$ |
|---|---|---|---|---|---|---|---|---|---|
| B-1075 | 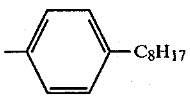 | $-CH_3$ | $-C_4H_9$ | $-CN$ | H | H | 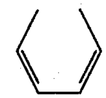 | | H |
| B-1076 | 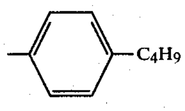 | $-C_2H_5$ | $-C_8H_{17}$ | 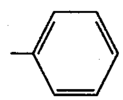 | H | 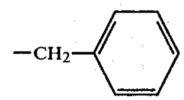 | H | H | H |
| B-1077 | 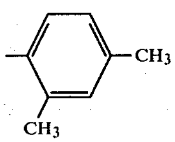 | $-C_2H_5$ | 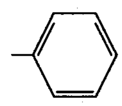 | 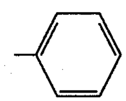 | H | H | H | H | $-OH$ |
| B-1078 | 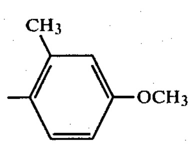 | $-C_2H_5$ | 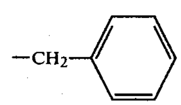 | H | $-CH_3$ | H | $-OCH_3$ | $-OCH_3$ | H |

B-1079
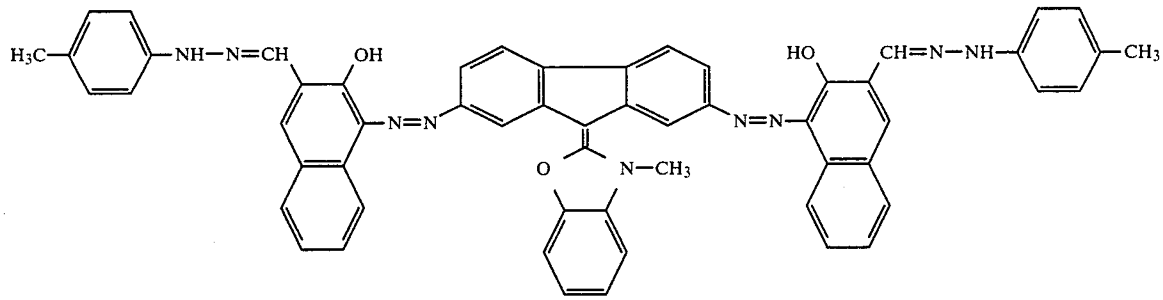
B-1080
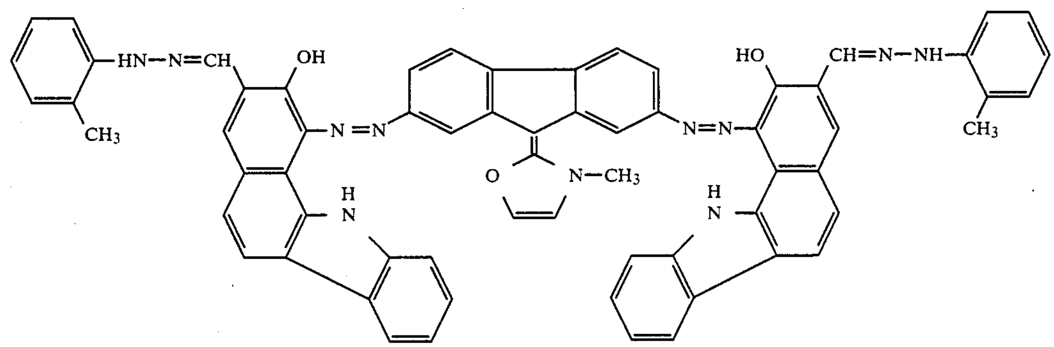
B-1081
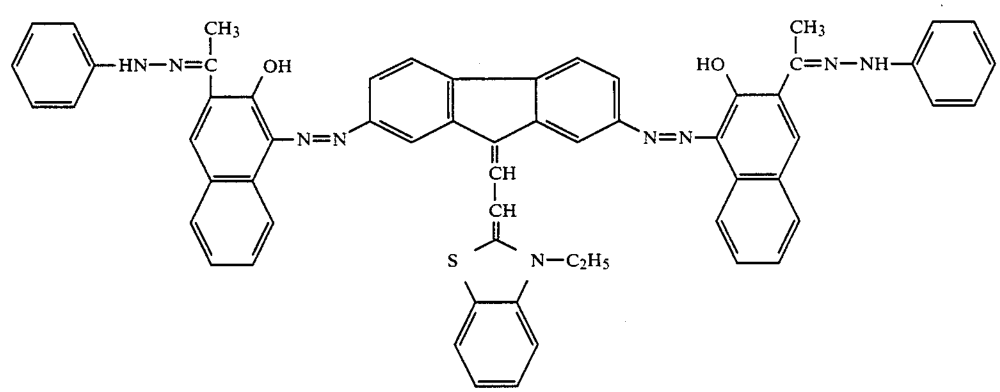
B-1082
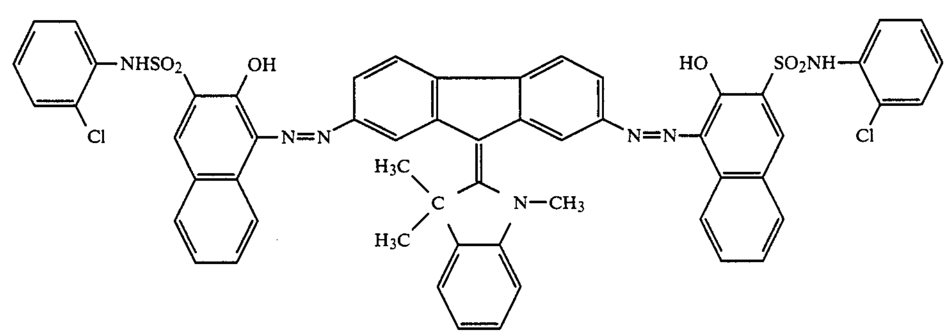

-continued
B-1083
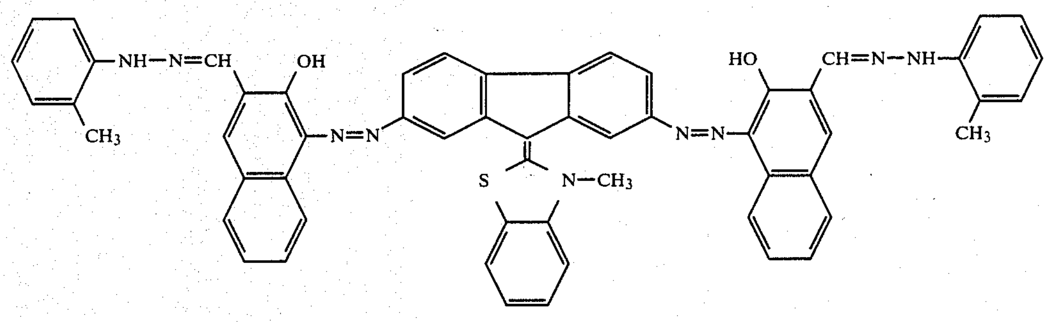
B-1084
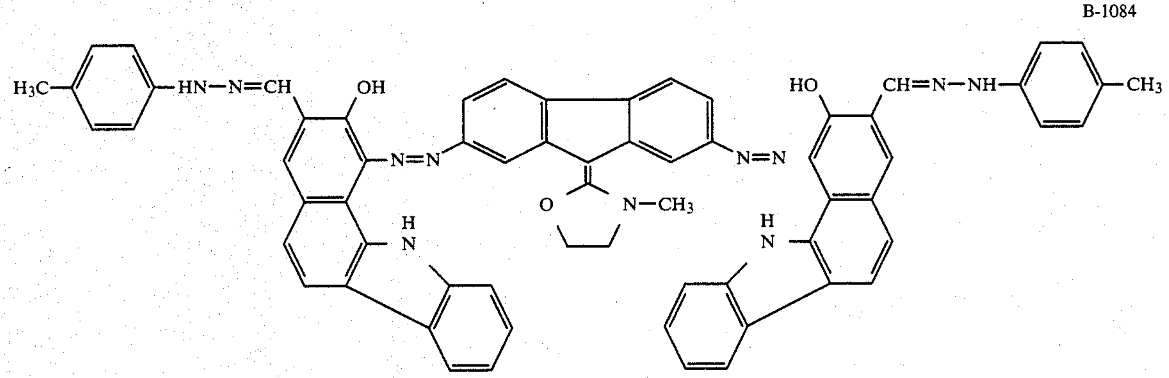
B-1085
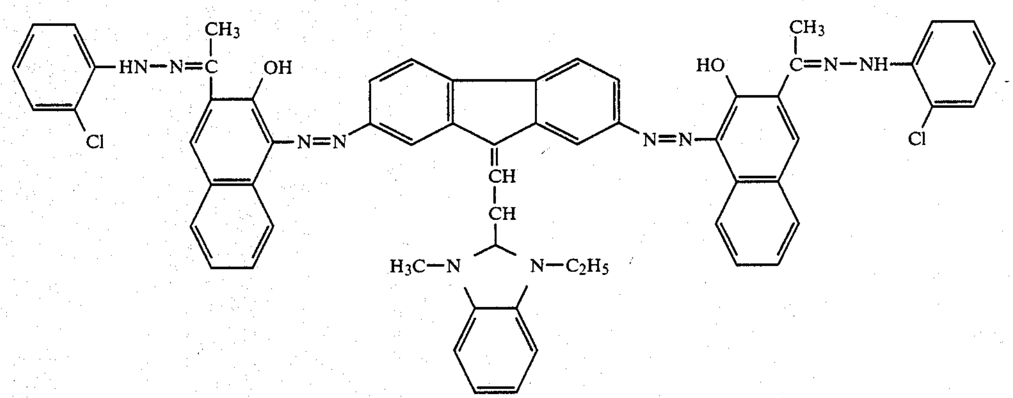
B-1086
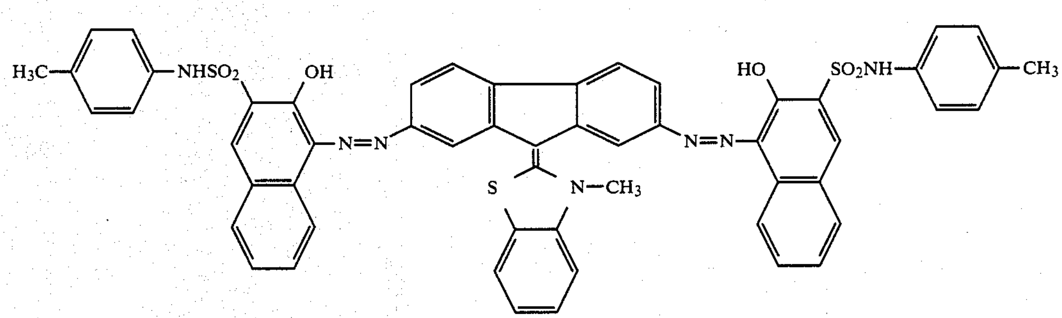

-continued
B-1087
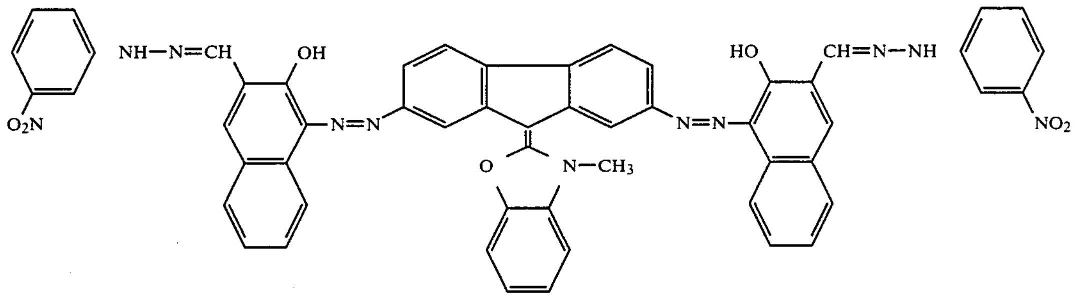
B-1088
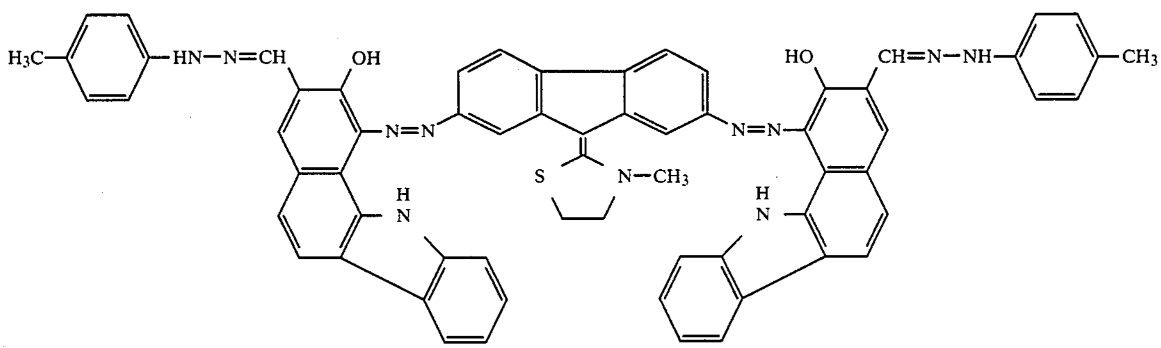
B-1089
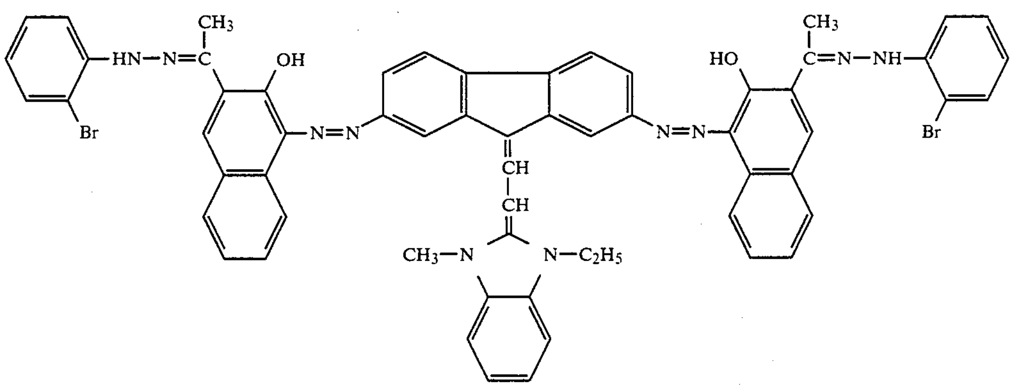
B-1090
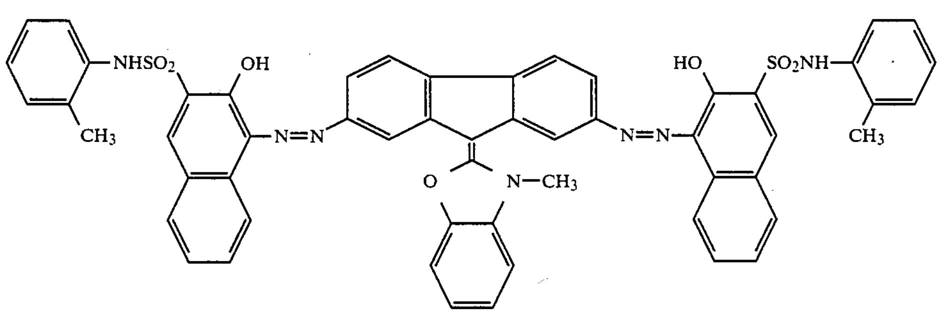

-continued
B-1091
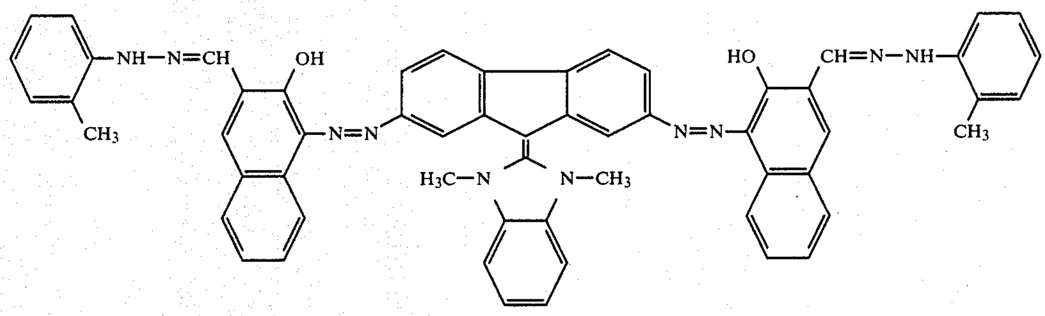
B-1092
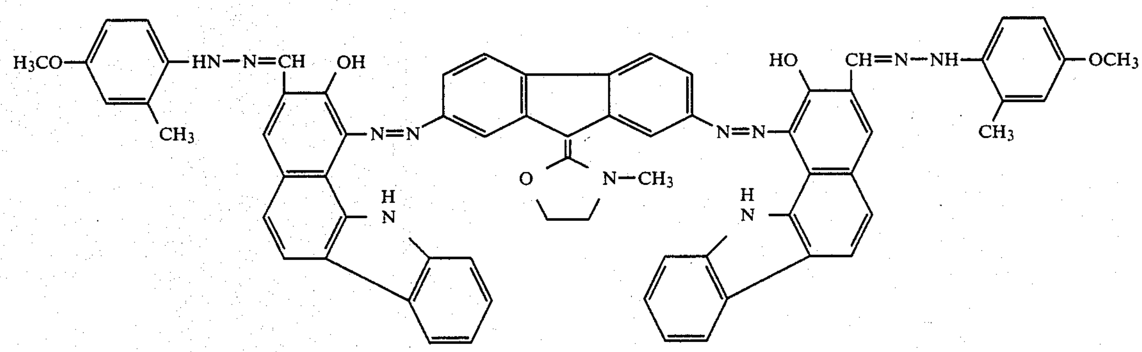
B-1093
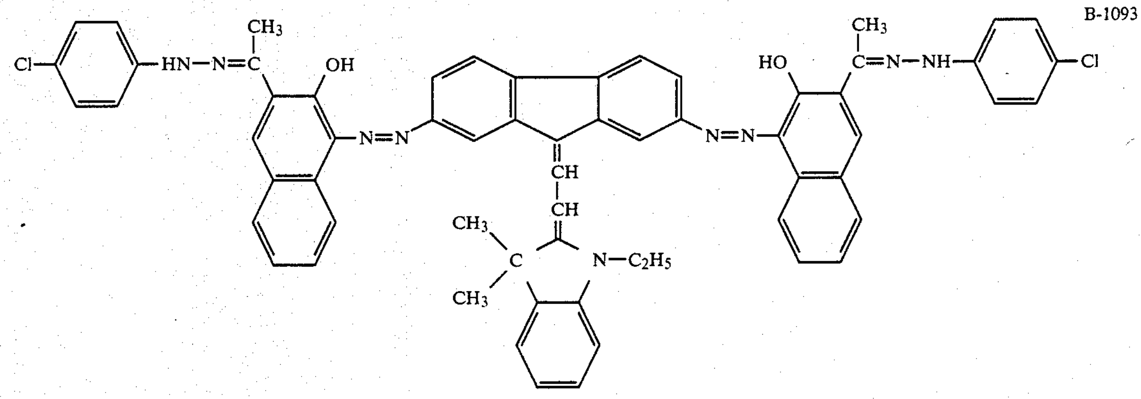
B-1094
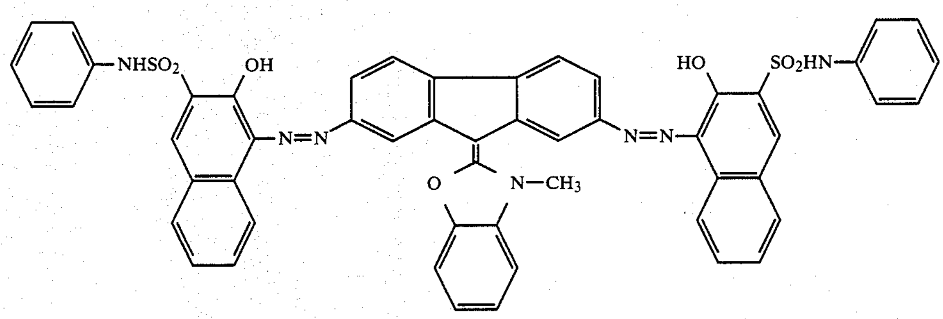

-continued
B-1095
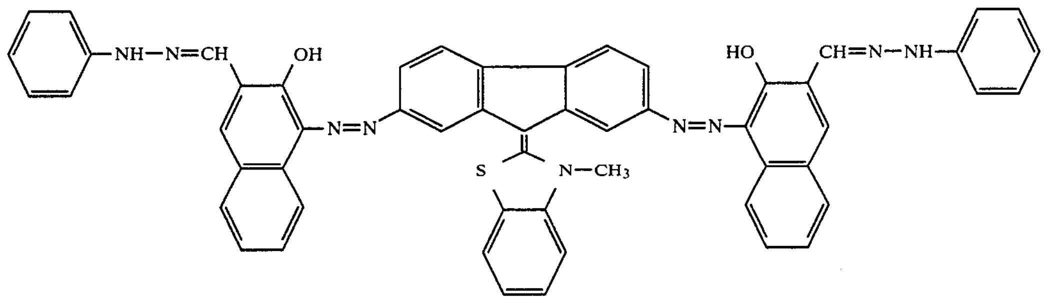
B-1096
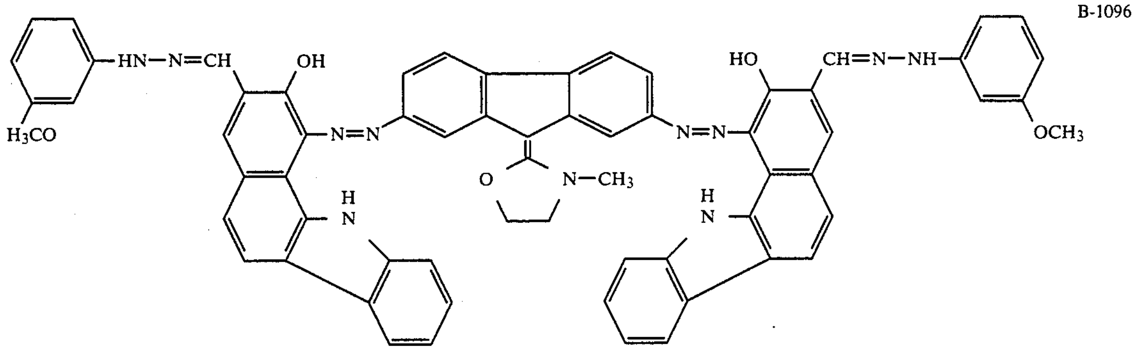
B-1097
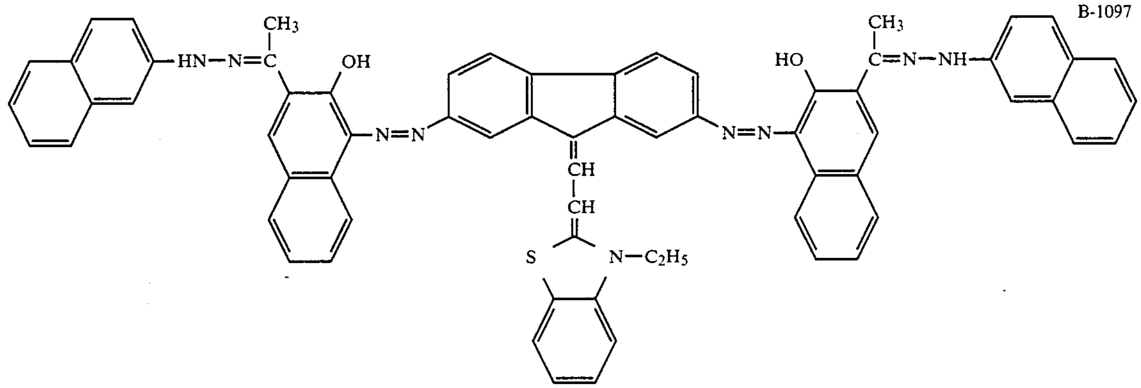
B-1098
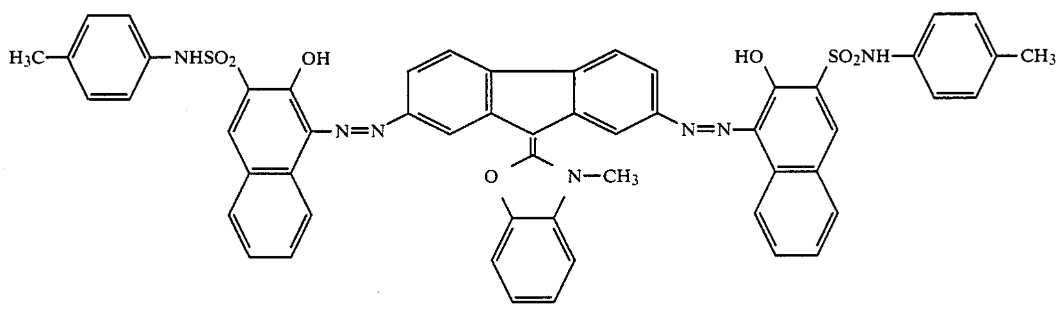
B-1099
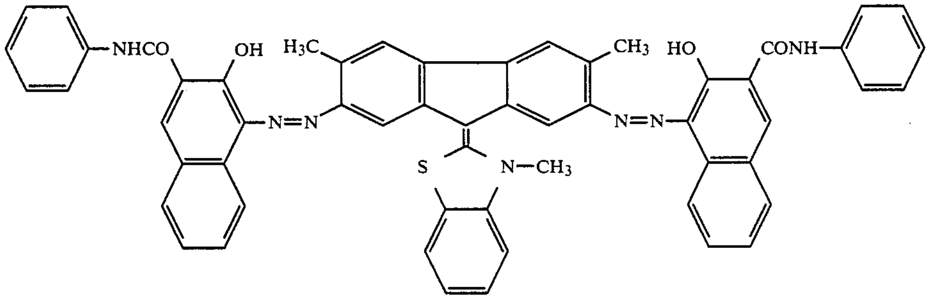

-continued
B-1100
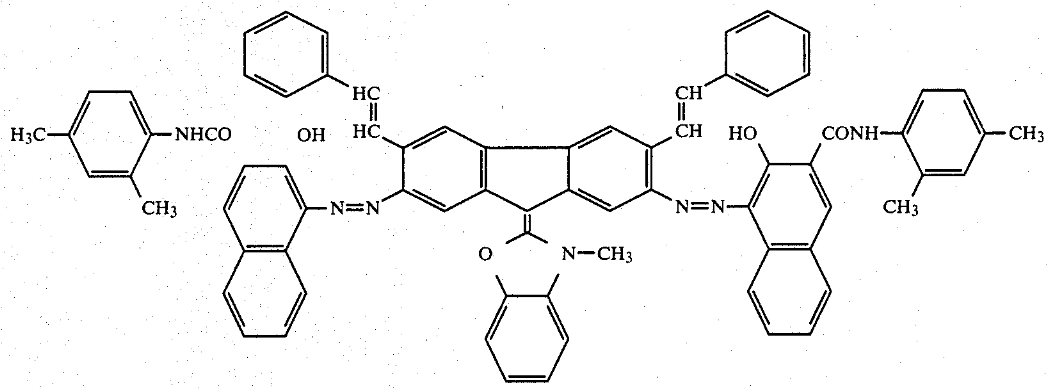
B-1101
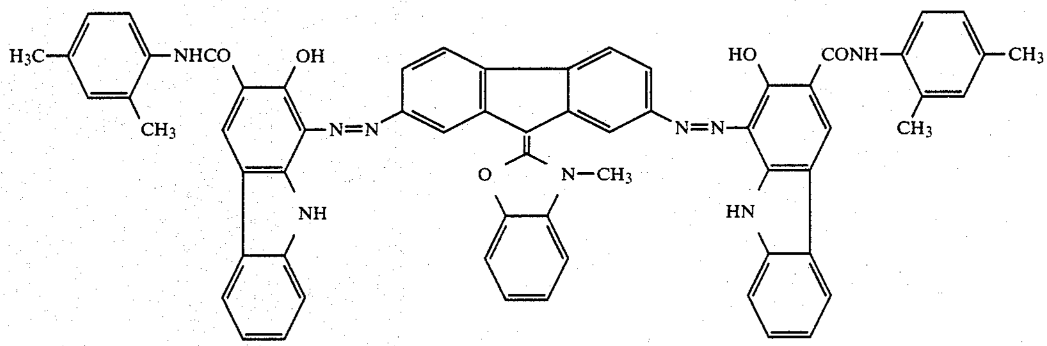
B-1102
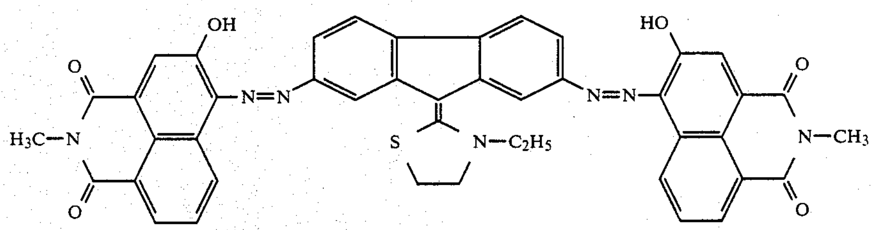
B-1103
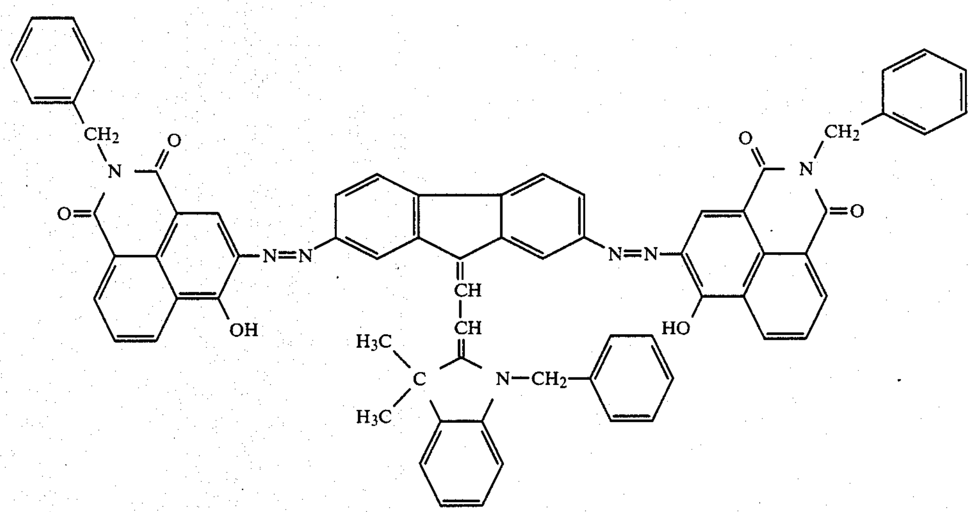

-continued
B-1104
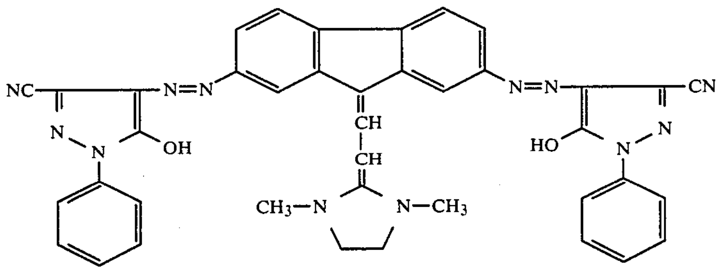
B-1105
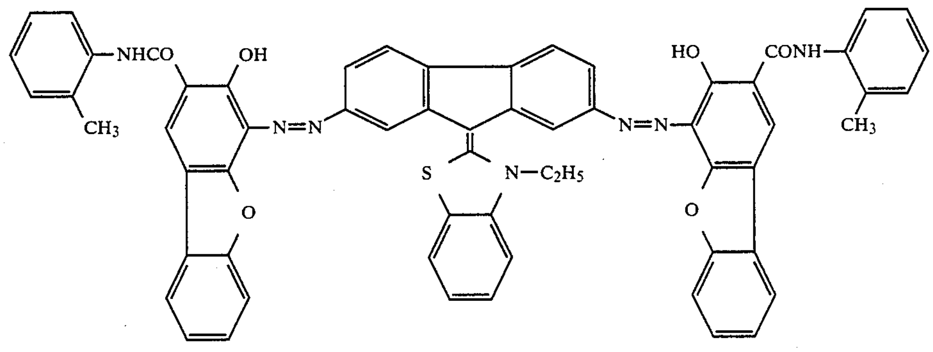
B-1106
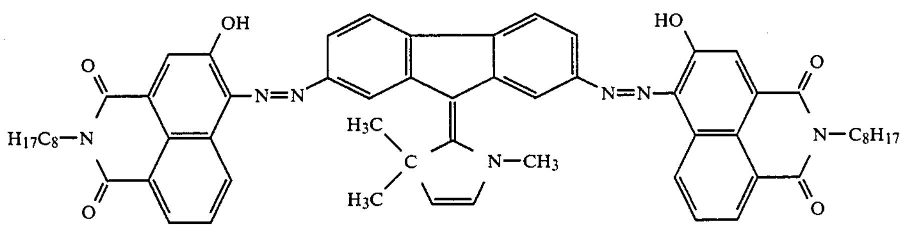
B-1107
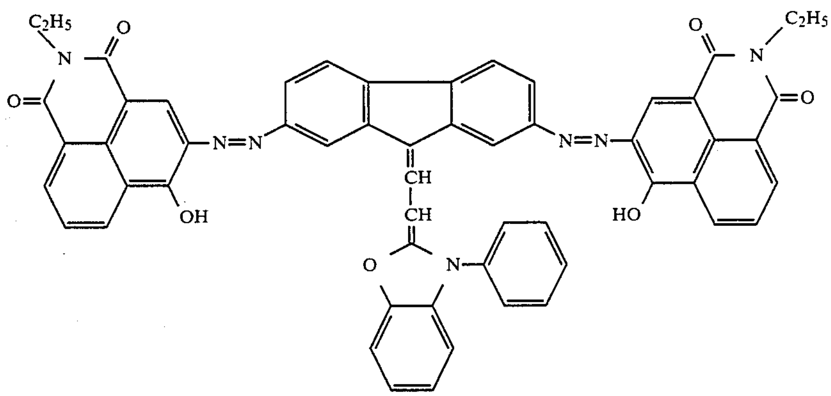
B-1108
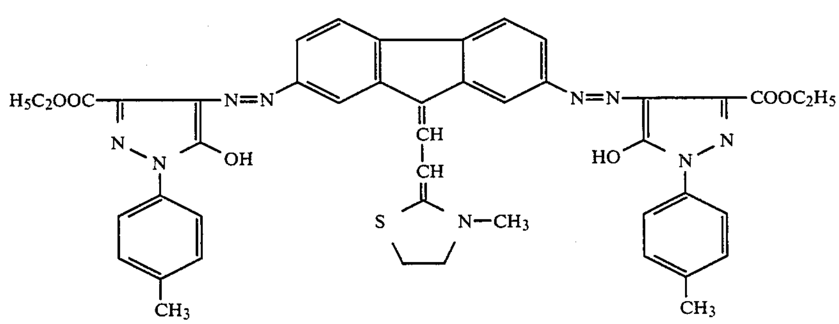

-continued
B-1109
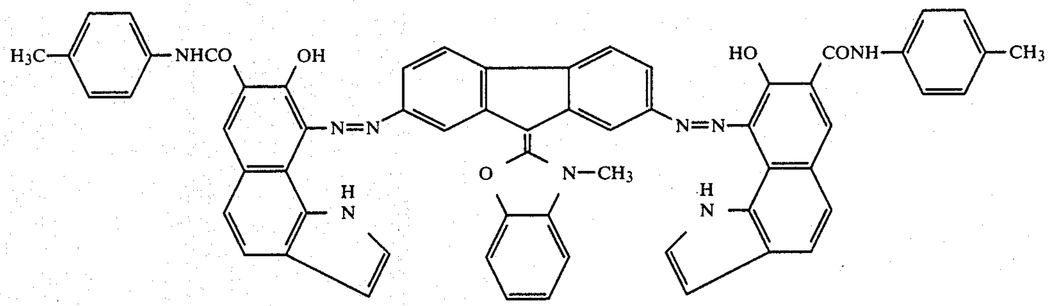
B-1110
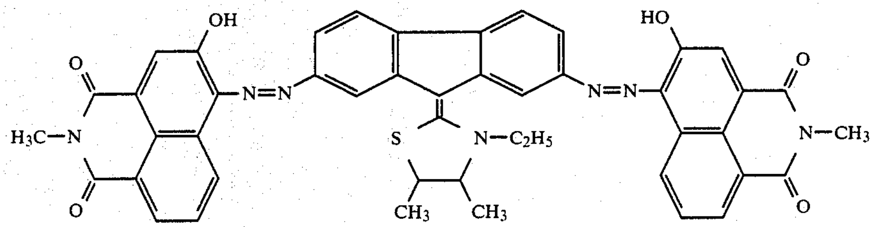
B-1111
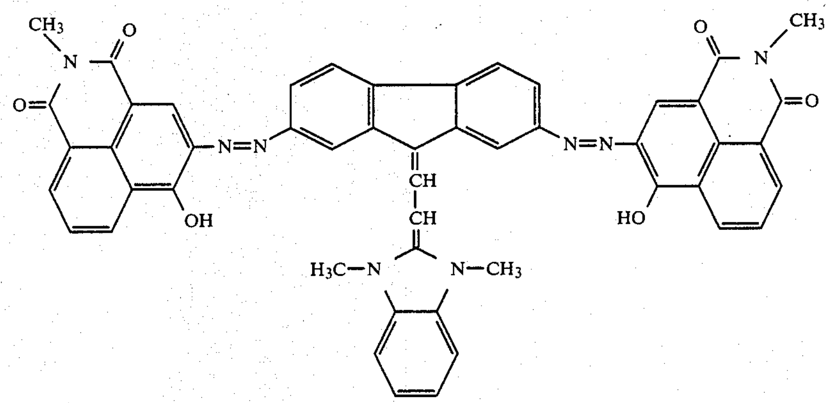
B-1112
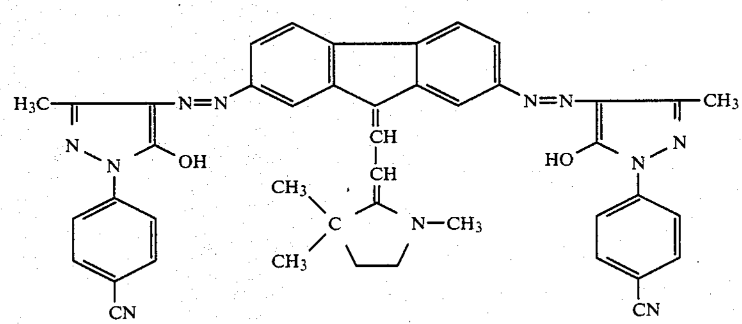
B-1113
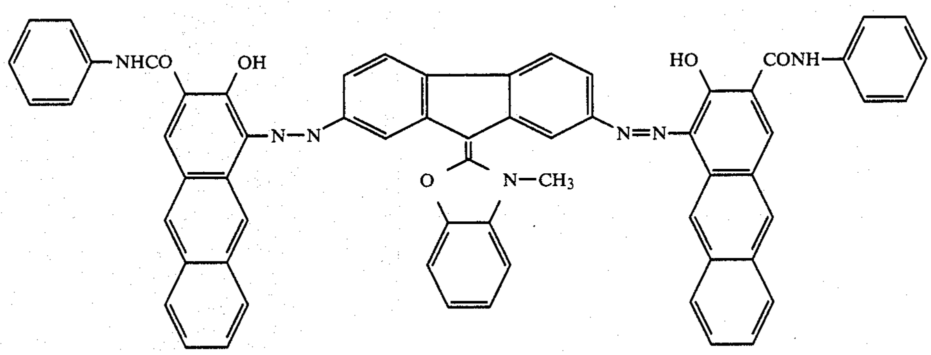

-continued
B-1114
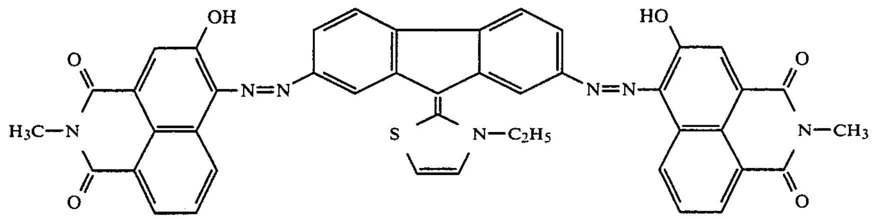
B-1115
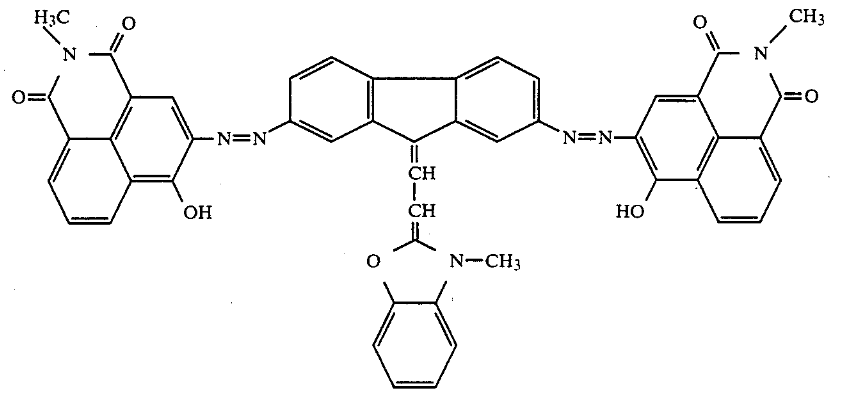
B-1116
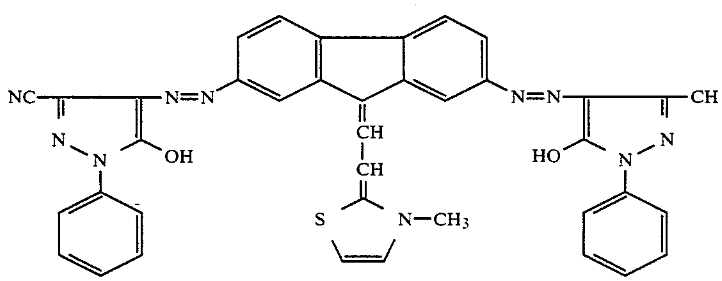
B-1117
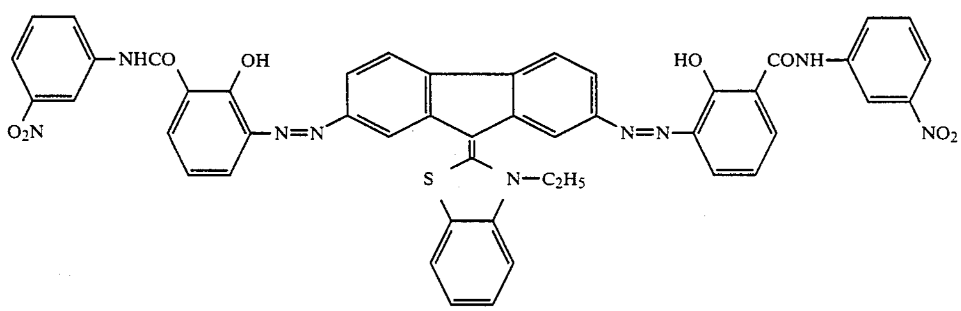
B-1118
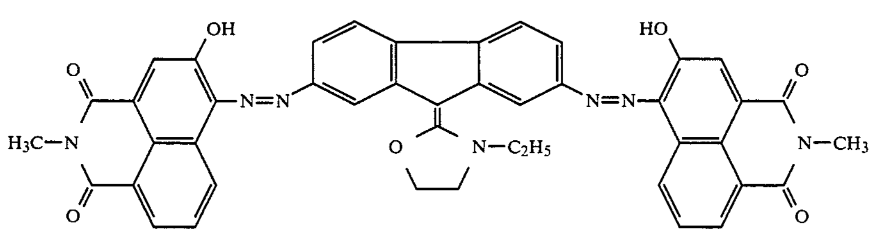

-continued

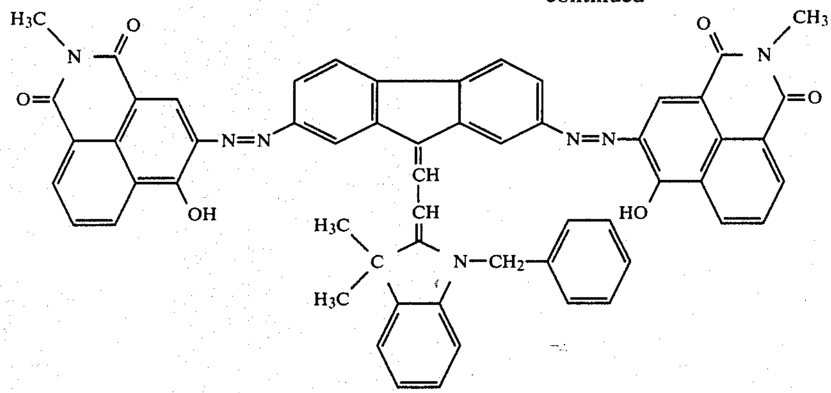

B-1119

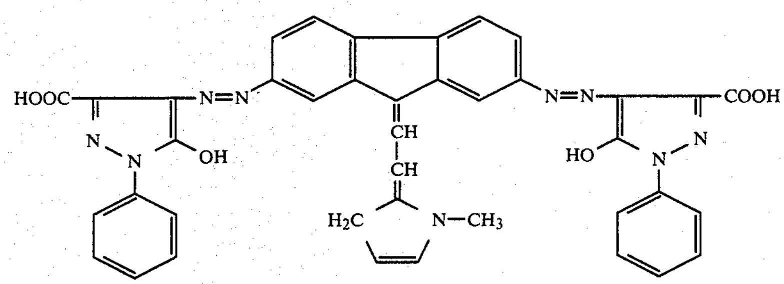

B-1120

The azo compounds of the invention represented by Formula [I] can readily be synthesized in such a synthesizing process as described below.

Namely, the compounds represented by Formula [S-3] can be prepared by condensing, in presence of a basic catalyzer, a compound represented by Formula [S-1] and a compound represented by Formula [S-2].

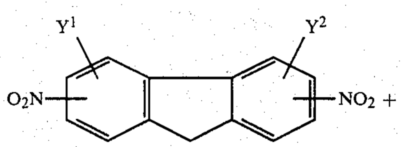

[S-1]

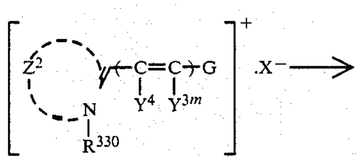

[S-2]

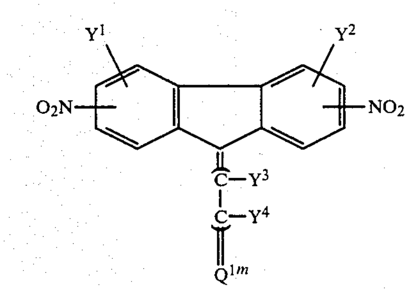

[S-3]

wherein $Z^2$ represents a group of atoms comprising a heterocyclic ring; $R^{330}$ is synonymous with $R^{11}$, $R^{12}$, or $R^{14}$; $X^-$ represents a counter anion;

G represents a split-off group including, for example, an aromatic ring having $-SR_{331}$, $-OR_{331}$, a halogen, $-SO_2R^{331}$, $-CH{=}NOH$,

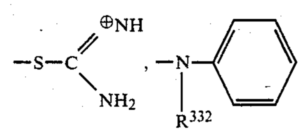

or a nitro group; and the like; in which $R^{331}$ represents an alkyl group, a substituted alkyl group, an aryl group, a substituted aryl group, or an aralkyl group; and $R^{332}$ represents an electron with drawing group including, for example, an acyl group such as acetyl group, a sulfo group, or the like; and the other symbols are synonymous with those in Formula [I].

Next, the compounds each represented by Formula [S-3] is reduced with such a reducing agent as zinc-calcium chloride, tin chloride-hydrochloric acid, or the like, so that the compounds represented by Formula [S-4] can be obtained.

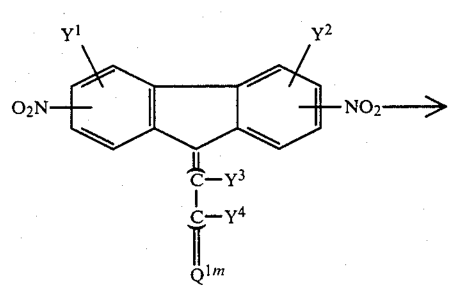

[S-3]

-continued

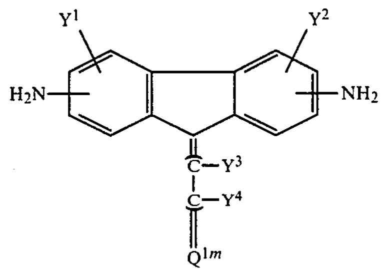

[S-4]

The diamino compounds each represented by Formula [S-4] is tetrazotized with sodium nitrite-hydrochloric acid and is then coupled to a compound represented by Formula [S-5], so that the compounds of the invention represented by Formula [I] can be obtained.

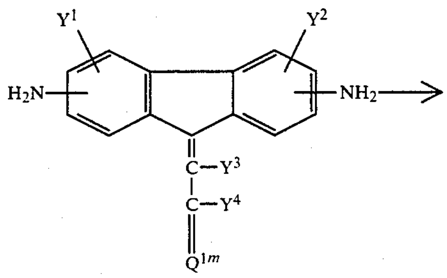

[S-4]

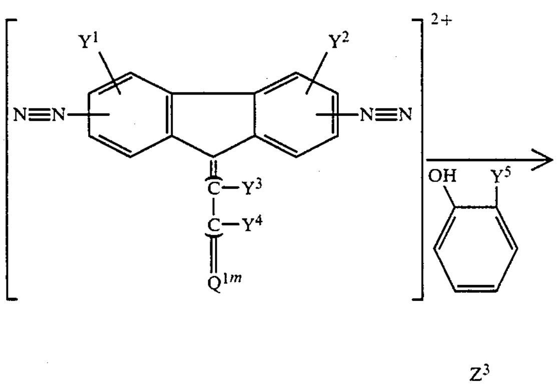

[S-5]

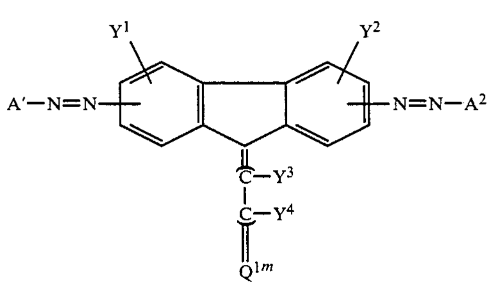

[I]

In Formula [S-5], $Y^5$ represents a group represented by the aforegiven $Q^2$ through $Q^7$; and $Z^3$ represents a group of atoms necessary for completing a group represented by the aforegiven $A^1$ or $A^2$.

The typical examples of the above-mentioned syntheses are given below:

SYNTHESIS EXAMPLE 1

(Synthesis of the exemplified compound B-14)

(1) Synthesis of 3-methyl-2-methylthiobenzothiazolium iodide:

A reaction of 18.1 g (0.1 mole) of 2-methylthiobenzothiazol and 17.3 g (0.12 mole) of methyl iodide was made in a sealed tube at 90° C. for a couple of hours. The resulted solid matters were pulverized and were then washed with acetone, so that the objective matter was obtained. The yield thereof was 31.2 g (96%).

(2) Synthesis of 2,7-dinitro-9-(3-methyl-2-benzothiazolinylidene)fluorene:

A mixture of 26.0 g (0.03 mole) of 3-methyl-2-methylthiobenzothiazolium iodide, 20.5 g (0.08 mole) of 2,7-dinitro fluorene and 200 ml of DMF was made, and was then added with 16.2 g (0.16 mole) of triethylamine, so that the resulted matter was reacted at 100° C. for a couple of hours. After cooling the reactant, 200 ml of methanol was added thereto, add the resulted deposited crystals were filtrated out and therefrom, and were then washed with methanol. The yield thereof was 23.2 g (72%).

(3) Synthesis of 2,7-diamino-9-(3-methyl-2-benzothiazolinylidene)fluorene:

Zinc dust in an amount of 40 g was added with 50 ml of 10% hydrochloric acid and the resulted solution was lightly stirred and was then filtrated. The resulted matter was washed with ethanol, so that an active zinc dust was obtained. The resulted zinc dusts were put into a flask of 300 ml capacity, and whereto 4.0 g (0.01 mole) of 2,7-dinitro-9-(3-methyl-2-benzothiazolinidene)fluorene and 100 ml of ethanol was added. Whereto, 2.5 ml of an aqueous solution of 0.56 g (0.005 mole) of calcium chloride was added, and the resulted mixture was refluxed for 4 hours and was then heat-filtrated. The mother liquid thereof was condensed, so that the objective matter was obtained. The yield was 2.02 g (59%).

(4) Synthesis of Exemplified Compound B-14:

A mixture of 2.02 g (0.005 mole) of 2,7-diamino-9-(3-methyl-2-benzothiazolinylidene)fluorene, 18 ml of concentrated hydrochloric acid, and 12 ml of water was made. To which 7 ml of an aqueous solution of 0.76 g (0.011 mole) of $NaNO_2$ were dropped with stirring and keeping a temperature of not higher than 5° C. After dropping, a further stirring was made at a temperature of not higher than 5° C. for one hour. Thereafter, 7 ml of an aqueous solution of 0.6 g (0.01 mole) of urea were dropped and were then stirred for 15 minutes. Therefrom an impurity was removed by a suction-filtration. The mother liquid was added with $HBF_4$ so as to filtrate the deposited matters, and was then washed off with $HBF_4$, so that a tetraazonium salt was obtained. Thus obtained tetrazonium salt was dissolved in 70 ml of cooled DMF and was then added with 140 ml of a cooled DMF solution of 3.96 g (0.01 mole) of 2-hydroxy-3-(2-methyl-4-methoxyphenylcarbamoyl)-11H-benzo[a]carbazole. In succession, 12 ml of an aqueous solution of 2.72 g (0.02 mole) of sodium acetate trihydrate were dropped thereinto, and the resulted solution was stirred at a temperature of not higher than 5° C. for one hour and was then further stirred for 3 hours at room temperature.

The resulted crystals were filtrated therefrom and were washed with DMF twice and with water twice and further with ethanol. Thereafter, it was dried, so that 4.44 g (73%) of Exemplified Compound B-14 were obtained.

SYNTHESIS EXAMPLE 2

(Synthesis of the exemplified compound B-909)

(1) Synthesis of 2,3-dimethylbenzoxazolium iodide

A reaction of 26.6 g (0.2 mole) of 2-methylbenzoxazole and 34.6 g (0.24 mole) of methyl iodide was made in a sealed tube at 90° C. for a couple of hours. The resulted solid matters were pulverized and were then washed with acetone, so that the objective matter was obtained. The yield thereof was 50.4 g (91%).

(2) Synthesis of 3-methyl-2-(N-acetylanilinovinyl)-benzoxazolium iodide

A mixture of 27.7 g (0.1 mole) of 2,3-dimethylbenzoxazolium iodide, 21.6 g (0.11 mole) of N,N'-diphenylformamidine, and 100 ml of acetic anhydride was made and was then refluxed. After cooling the mixture refluxed, 300 ml of acetone were added and were then filtrated to take crystals. The resulted crystals were washed with acetone, so that the objective matter was obtained. The yield thereof was 26.0 g (62%).

(3) Synthesis of 2,7-dinitro-9-(3-methylbenzoxazolinilidene)ethylidenefluorene

A mixture of 12.8 g (0.05%) of 2,7-dinitrofluorene, 21.0 g (0.05%) of 3-methyl-2-(N-acetylanilinovinyl)benzoxazolium iodide, and 100 ml of DMF was made. The resulted mixture was added with 10.1 g (0.1 mole) of triethylamine to react to each other at 100° C. for a couple of hours. After cooling, 100 ml of methanol were added and the resulted crystals were filtrated and were then washed with methanol. The yield thereof was 13.8 g (67%).

(4) Synthesis of 2,7-diamino-9-(3-methylbenzoxazolinylidene)ethylidenefluorene

Zinc dust in an amount of 40 g was added with 50 ml of 10% hydrochloric acid, and the resulted solution was lightly stirred and was then filtrated. The resulted matter was washed with ethanol, so that an active zinc dust was obtained. The resulted active zinc dusts were put into a flask of 300 ml capacity, and whereto 4.13 g (0.01 mole) of 2,7-dinitro-9-(3-methylbenzoxazolinylidene)ethylidenefluorene and 100 ml of ethanol were added, and further 2.5 ml of an aqueous solution of 0.56 g (0.005 mole) of calcium chloride were added thereto, and the resulted mixture was refluxed for 4 hours, and was then heat-filtrated. The mother liquid thereof was condensed, so that the objective matter was obtained. The yield thereof was 1.84 g (52%).

(5) Synthesis of Exemplified Compound B-909

There made a mixture of 1.77 g (0.005 mole) of 2,7-diamino-9-(3-methylbenzoxazolinylidene)fluorene, 18 ml of concentrated hydrochloric acid and 12 ml of water, and 7 ml of an aqueous solution of 0.76 g (0.011 mole) of $NaNO_2$ were dropped therein with stirring and keeping a temperature of not higher than 5° C. After dropping, a further stirring was made at a temeperature of not higher than 5° C. for one hour. Then, 7 ml of an aqueous solution of 0.6 g (0.01 mole) of urea were dropped thereinto and were then stirred for 15 minutes, and the insoluble matters are removed therefrom by a suction-filtration.

The mother liquid thereof was added with $HBF_4$ and the deposited matters are filtrated therefrom and are then washed with $HBF_4$, so that a tetrazonium salt was obtained. Thus obtained tetrazonium salt was dissolved in 70 ml of cooled DMF and was then added with 140 ml of a cooled DMF solution of 3.66 g (0.01 mole) of 2-hydroxy-3-(2-methylphenylcarbamoyl)-11H-benzo[a]carbazole, with keeping a temperature of not higher than 5° C. Successively, the resulted solution was added dropwise with 12 ml of an aqueous solution of 2.72 g (0.02 mole) of sodium acetate trihydrate and was then stirred at a temperature of not higher than 5° C. for one hour, and was further stirred at room temperature for 3 hours. The crystals produced were taken through a filtration and were washed twice with DMF, twice with water and then with methanol, and were thereafter dried, so that 3.60 g (65%) of Exemplified Compound B-909 were obtained.

The above-mentioned azo compounds of the invention are capable of displaying an excellent photoconductivity. In the case that a photoreceptor is manufactured by making use of the above-mentioned azo compounds of the invention, they can be manufactured by providing onto a conductive support with a light-sensitive layer in which the azo compounds of the invention dispersed in the binders of the layer. In particular, excellent results can be enjoyed in the case of constituting the so-called separate function type photoreceptor in such a manner that, among the various photoconductivity of the azo compounds of the invention, a particularly excellent carrier-generating function thereof is utilized to use as a carrier-generating substance and a carrier transport substance capable of effectively working is used in combination. The separate function type photoreceptors are also allowed to be of the dispersion type, and more preferably the laminated layer type photoreceptors comprising the laminated layers of a carrier-generating substance and a carrier transport layer containing a carrier transport substance.

In the case of using the azo compounds of the invention to serve as a carrier-generating substance, the carrier transport substances capable of being used in combination therewith include, for example, an electron acceptable substance readily capable of transporting electrons such as trinitrofluorenone or tetranitrofluorenone, and besides, an electron donative substance readily capable of transporting positive holes, such as a polymer having a heterocyclic compound on the side chain thereof, such as a poly-N-vinylcarbazole as a typical example, a triazole derivative, an oxadiazole derivative, an imidazole derivative, a pyrazoline derivative, a polyarylamine derivative, a phenylenediamine derivative, a hydrazone derivative, an amino-substituted chalcone derivative, a triarylamine derivative, a carbazole derivative, a stilbene derivative, a phenothiazine derivative, and the like. It is, however, to be understood that the carrier transport substances to be used in the invention shall not be limited thereto.

The typical examples of the carrier transport substances useful in the invention are given below:

Formula (1)

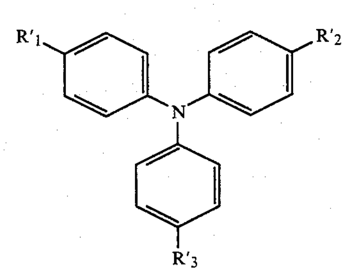

wherein $R'_1$, $R'_2$ and $R'_3$ each represent a hydrogen, an alkyl group, an alkoxy group, a halogen, a hydroxy group, a cyano group, a dialkylamino group, a diarylamino group, a diaralkylamino group, or a nitro group.

Formula (2)

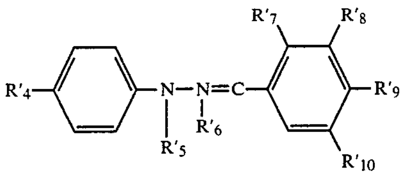

wherein $R'_4$, $R'_7$, $R'_8$, $R'_9$ and $R'_{10}$ each represent a hydrogen, an alkyl group, an alkoxy group, a halogen, a hydroxy group, a cyano group, a dialkylamino group, a diarylamino group, or a nitro group; $R'_5$ represents an alkyl group, a phenyl group allowed to have a substituent, a benzyl group allowed to have a substituent, or a naphthyl group allowed to have a substituent; and $R'_6$ represents a hydrogen, an alkyl group, a cyano group, or a phenyl group allowed to have a substituent.

Formula (3)

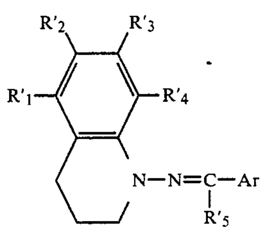

wherein $R'_{11}$, $R'_{12}$, $R'_{13}$ and $R'_{14}$ each represent hydrogen, an alkyl group, an alkoxy group, a halogen, a hydroxy group, a cyano group, a dialkylamino group, a diarylamino group, a diaralkylamino group, or a nitro group; $R'_5$ represents hydrogen, a phenyl group allowed to have a substituent, a cyano group, or an alkyl group; Ar represents or

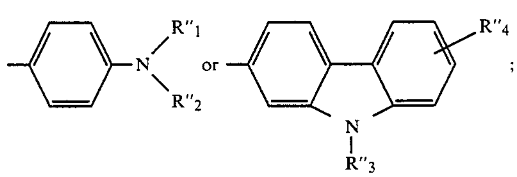

$R''_1$ $R''_2$ and $R''_3$ each represent an alkyl group, a benzyl group allowed to have a substituent, a phenyl group allowed to have a substituent, or a naphthyl group allowed to have a substituent; and $R''_4$ represents hydrogen, an alkyl group, ana alkoxy group, a halogen, a hydroxy group, a cyano group, a dialkylamino group, a diarylamino group, a diaralkylamino group, or a cyano group.

Formula (4)

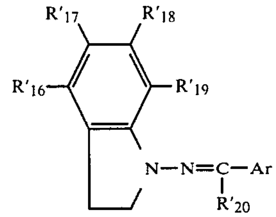

wherein $R'_{16}$, $R'_{17}$, $R'_{18}$ and $R'_{19}$ each represent hydrogen, an alkyl group, an alkoxy group, a halogen, a hydroxy group, a cyano group, a dialkylamino group, a diarylamino group, a diaralkylamino group, or a nitro group; $R'_{20}$ represents hydrogen, a phenyl group allowed to have a substituent, a cyano group, or an alkyl group; Ar represents or

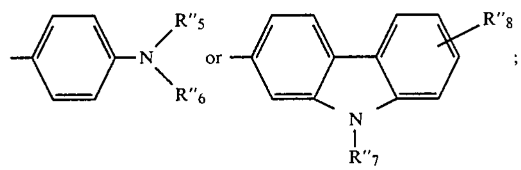

$R''_5$, $R''_6$ and $R''_7$ each represent an alkyl group, a benzyl group allowed to have a substituent, or a naphthyl group allowed to have a substituent; and $R''_8$ represents hydrogen, an alkyl group, an alkoxy group, a halogen, a hydroxy group, a cyano group, a dialkylamino group, a diarylamino group, a diaralkylamino group, or a nitro group.

Formula (5)

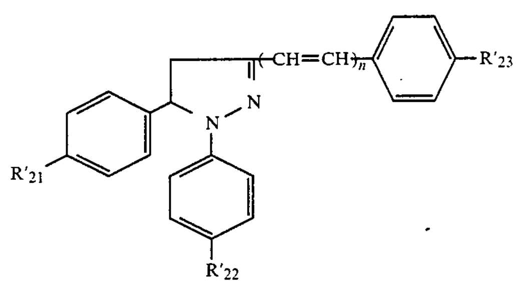

wherein $R'_{21}$, $R'_{22}$ and $R'_{23}$ each represent hydrogen, an alkyl group, an alkoxy group, a halogen, a hydroxy group, a cyano group, a dialkylamino group, a diarylamino group, a diaralkylamino group, or a nitro group; and n is an integer of 0 to 1.

Formula (6)

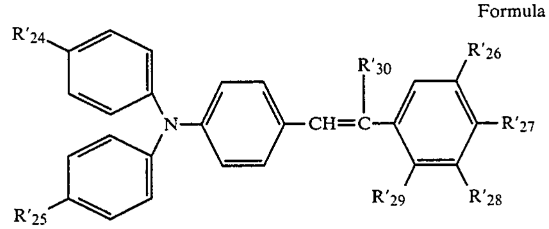

wherein $R'_{24}$, $R'_{25}$, $R'_{26}$, $R'_{27}$, $R'_{28}$ and $R'_{29}$ each represent hydrogen, an alkyl group, an alkoxy group, a halogen, a hydroxy group, a cyano group, a dialkylamino group, a diarylamino group, a diaralkylamino group, or a nitro group; and $R'_{30}$ represents hydrogen or a phenyl group.

Formula (7)

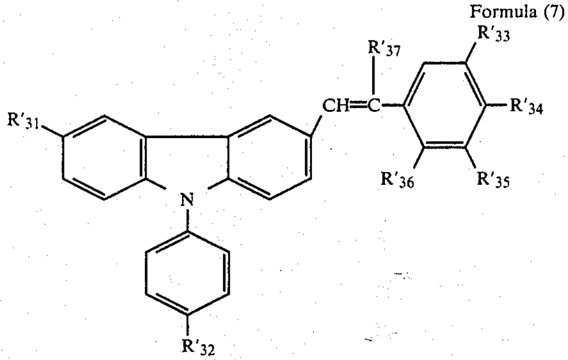

wherein $R'_{31}$, $R'_{32}$, $R'_{33}$, $R'_{34}$, $R'_{35}$ and $R'_{36}$ each represent hydrogen, an alkyl group, an alkoxy group, a halogen, a hydroxy group, a cyano group, a dialkylamino group, a diarylamino group, a diaralkylamino group, or a nitro group; and $R'_{37}$ represents hydrogen or a phenyl group.

Formula (8)

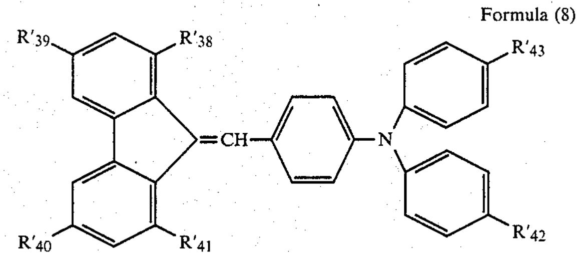

wherein $R'_{38}$, $R'_{39}$, $R'_{40}$, $R'_{41}$, $R'_{42}$ and $R'_{43}$ each represent hydrogen, an alkyl group, an alkoxy group, a halogen, a hydroxy group, a cyano group, a dialkylamino group, a diarylamino group, a diaralkylamino group, or a nitro group.

The typical examples of the abovegiven carrier transport substances are given below:

Compounds having the structure of Formula (1)

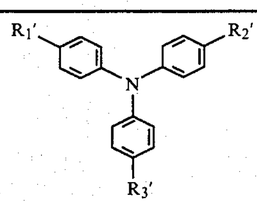

| No. | $R_1'$ | $R_2'$ | $R_3'$ |
|---|---|---|---|
| T-1 | H | H | H |
| T-2 | $-CH_3$ | H | H |
| T-3 | $-CH_3$ | $-CH_3$ | H |
| T-4 | $-CH_3$ | $-C_2H_5$ | H |
| T-5 | $-CH_3$ | $-OCH_3$ | H |
| T-6 | $-CH_3$ | $-OC_2H_5$ | H |
| T-7 | $-CH_3$ | $-N(C_2H_5)_2$ | H |

-continued

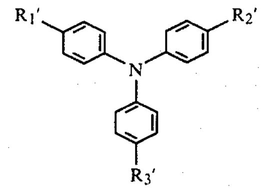

| No. | $R_1'$ | $R_2'$ | $R_3'$ |
|---|---|---|---|
| T-8 | $-CH_3$ | $-N(C_6H_5)_2$ | H |
| T-9 | $-CH_3$ | Cl | H |
| T-10 | $-CH_3$ | $-NO_2$ | H |
| T-11 | $-CH_3$ | $-CH_3$ | $-CH_3$ |
| T-12 | $-CH_3$ | $-CH_3$ | $-OCH_3$ |
| T-13 | $-CH_3$ | $-CH_3$ | $-NO_2$ |
| T-14 | $-CH_3$ | $-CH_3$ | 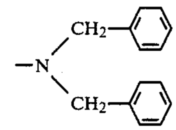 |
| T-15 | $-CH_3$ | $-C_2H_5$ | $-OCH_3$ |
| T-16 | $-CH_3$ | 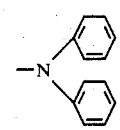 | 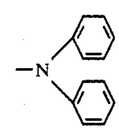 |
| T-17 | $-C_2H_5$ | $-OC_2H_5$ | $-OC_2H_5$ |
| T-18 | $-C_2H_5$ | H | H |
| T-19 | $-OCH_3$ | H | H |
| T-20 | $-OC_2H_5$ | H | H |
| T-21 | Cl | H | H |
| T-22 | I | H | H |
| T-23 | Br | H | H |
| T-24 | F | H | H |
| T-25 | $-NO_2$ | H | H |
| T-26 | 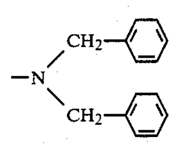 | H | H |
| T-27 | $-N(C_2H_5)_2$ | H | H |
| T-28 | 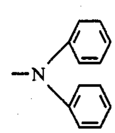 | H | H |
| T-29 | $-CN$ | H | H |
| T-30 | $-OH$ | H | H |
| T-31 | 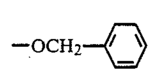 | H | H |
| T-32 | $-OCH_3$ | $-OCH_3$ | H |
| T-33 | $-OCH_3$ | $-OCH_3$ | $-OCH_3$ |
| T-34 | $-NO_2$ | $-NO_2$ | $-NO_2$ |

-continued
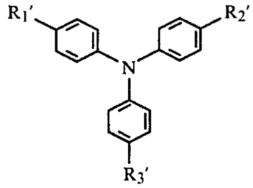
| No. | $R_1'$ | $R_2'$ | $R_3'$ |
|---|---|---|---|
| T-35 | 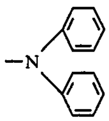 | 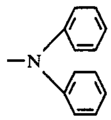 | 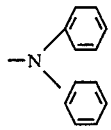 |
| T-36 | 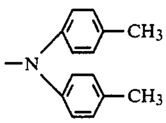 | $-CH_3$ | $-CH_3$ |
| T-37 | 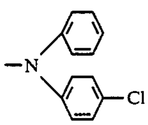 | —Cl | H |
| T-38 | 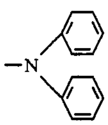 | 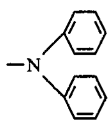 | $-OCH_3$ |
-continued
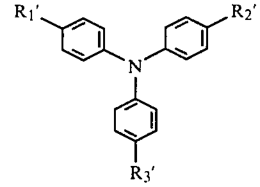
| No. | $R_1'$ | $R_2'$ | $R_3'$ |
|---|---|---|---|
| T-39 | 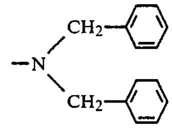 | H | H |
| T-40 | $-N(C_2H_5)_2$ | $-C_2H_5$ | $-CH_3$ |
| T-41 | $-N(C_2H_5)_2$ | $-OCH_3$ | H |
| T-42 | Br | Br | Br |
Compounds having the structure of Formula (2)
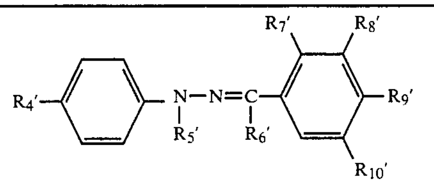
| No. | $R_4'$ | $R_5'$ | $R_6'$ | $R_7'$ | $R_8'$ | $R_9'$ | $R_{10}'$ |
|---|---|---|---|---|---|---|---|
| T-43 | H | 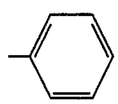 | H | H | H | H | H |
| T-44 | H | 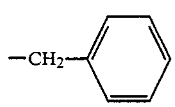 | H | H | H | H | H |
| T-45 | H | $-C_2H_5$ | H | H | H | H | H |
| T-46 | H | $-CH_3$ | H | H | H | H | H |
| T-47 | H | $-CH_3$ | H | H | H | $-CH_3$ | H |
| T-48 | H | $-CH_3$ | H | H | H | $-C_2H_5$ | H |
| T-49 | H | $-CH_3$ | H | H | H | $-OCH_3$ | H |
| T-50 | H | $-CH_3$ | H | H | H | $-OC_2H_5$ | H |
| T-51 | H | $-CH_3$ | H | H | H | $-N(CH_3)_2$ | H |
| T-52 | H | $-CH_3$ | H | H | H | $-N(C_2H_5)_2$ | H |

-continued

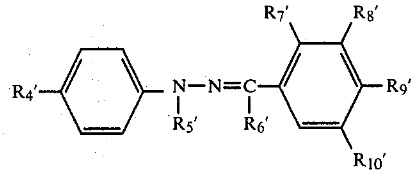

| No. | R4' | R5' | R6' | R7' | R8' | R9' | R10' |
|---|---|---|---|---|---|---|---|
| T-53 | H | $-CH_3$ | H | H | H | 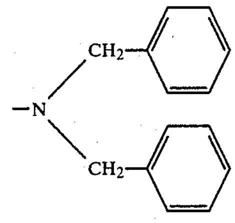 | H |
| T-54 | H | $-CH_3$ | H | $-CH_3$ | H | $-CH_3$ | H |
| T-55 | H | $-CH_3$ | H | Cl | H | $-CH_3$ | H |
| T-56 | H | $-CH_3$ | H | H | $-CH_3$ | $-CH_3$ | H |
| T-57 | H | $-CH_3$ | H | H | $-CH_3$ | H | $-CH_3$ |
| T-58 | H | $-CH_3$ | H | H | $-OCH_3$ | $-OCH_3$ | $-OCH_3$ |
| T-59 | H | $-CH_3$ | H | H | $-OCH_3$ | $-OCH_3$ | H |
| T-60 | H | $-CH_3$ | H | $-OCH_3$ | H | $-OCH_3$ | H |
| T-61 | H | $-CH_3$ | H | H | $-NO_2$ | H | H |
| T-62 | H | $-CH_3$ | H | H | H | $-OH$ | H |
| T-63 | H | 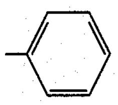 | H | H | H | H | H |
| T-64 | $-CH_3$ | $-CH_3$ | H | H | H | $-N(C_2H_5)_2$ | H |
| T-65 | $-C_2H_5$ | $-CH_3$ | H | H | H | 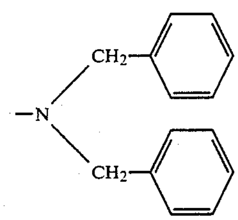 | H |
| T-66 | $-OCH_3$ | $-CH_3$ | H | $-CH_3$ | H | $-CH_3$ | H |
| T-67 | $-OC_2H_5$ | $-CH_3$ | H | Cl | H | $-CH_3$ | H |
| T-68 | Cl | $-CH_3$ | H | H | $-CH_3$ | $-CH_3$ | H |
| T-69 | $-N(CH_3)_2$ | $-CH_3$ | H | H | $-CH_3$ | H | $-CH_3$ |
| T-70 | $-N(C_2H_5)_2$ | $-CH_3$ | H | H | $-OCH_3$ | $-OCH_3$ | $-OCH_3$ |
| T-71 | $-NO_2$ | $-CH_3$ | H | H | $-OCH_3$ | $-OCH_3$ | H |
| T-72 | $-OH$ | $-CH_3$ | H | $-OCH_3$ | H | $-OCH_3$ | H |
| T-73 | $-CH_3$ | $-CH_3$ | 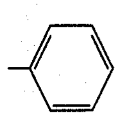 | H | $-NO_2$ | H | H |
| T-74 | $-C_2H_5$ | $-CH_3$ | $-CN$ | H | H | $-OH$ | H |
| T-75 | $-OCH_3$ | $-CH_3$ | $-CH_3$ | H | H | H | H |

-continued
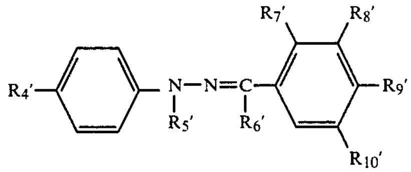
| No. | R4' | R5' | R6' | R7' | R8' | R9' | R10' |
|---|---|---|---|---|---|---|---|
| T-76 | H | —CH2—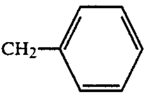 | H | H | H | $-N(C_2H_5)_2$ | H |
| T-77 | H | —CH2—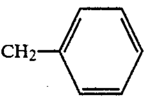 | H | H | H | 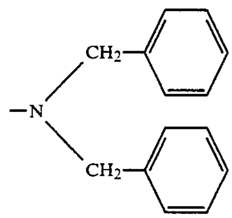 | H |
| T-78 | H | —CH2—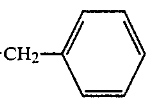 | H | $-CH_3$ | H | $-CH_3$ | H |
| T-79 | H | —CH2—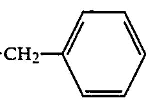 | H | Cl | H | $-CH_3$ | H |
| T-80 | $-CH_3$ | —CH2—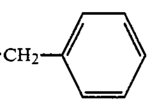 | H | H | $-CH_3$ | $-CH_3$ | H |
| T-81 | $-OCH_3$ | —CH2—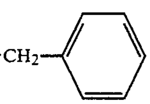 | H | H | $-CH_3$ | H | $-CH_3$ |
| T-82 | Cl | —CH2—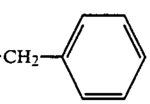 | H | H | $-OCH_3$ | $-OCH_3$ | $-OCH_3$ |
| T-83 | $-N(CH_3)_2$ | —CH2—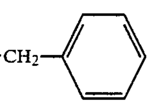 | H | H | $-OCH_3$ | $-OCH_3$ | H |
| T-84 | $-NO_2$ | —CH2—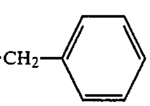 | —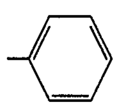 | $-OCH_3$ | H | $-OCH_3$ | H |
| T-85 | $-CH_3$ | —CH2—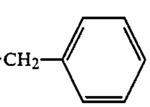 | $-CN$ | H | $-NO_2$ | H | H |
| T-86 | $-OC_2H_5$ | —CH2—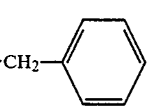 | $-CH_3$ | H | H | $-OH$ | H |

-continued
Compounds having the structure of Formula (3)
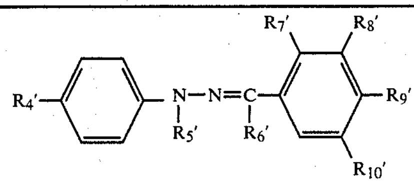
| No. | $R_4'$ | $R_5'$ | $R_6'$ | $R_7'$ | $R_8'$ | $R_9'$ | $R_{10}'$ |
|---|---|---|---|---|---|---|---|
| T-87 | Br | 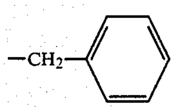 | $-C_2H_5$ | H | H | H | H |
| T-88 | H | 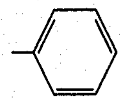 | H | H | H | $-N(C_2H_5)_2$ | H |
| T-89 | H | 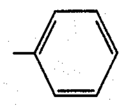 | H | H | H | 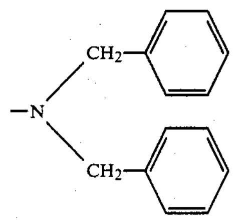 | H |
| T-90 | H | 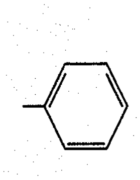 | H | $-CH_3$ | H | $-CH_3$ | H |
| T-91 | H | 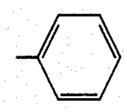 | 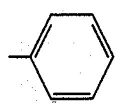 | Cl | H | $-CH_3$ | H |
| T-92 | $-CH_3$ | 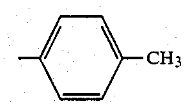 | —CN | H | $-CH_3$ | $-CH_3$ | H |
| T-93 | $-OCH_3$ | 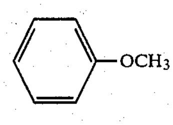 | H | H | $-CH_3$ | H | $-CH_3$ |
| T-94 | Cl | 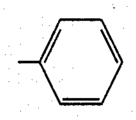 | $-CH_3$ | H | $-OCH_3$ | $-OCH_3$ | $-OCH_3$ |
| T-95 | $-N(CH_3)_2$ | 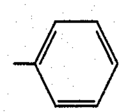 | $-C_2H_5$ | H | $-OCH_3$ | $-OCH_3$ | H |
| T-96 | $-NO_2$ | 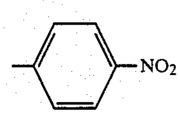 | H | $-OCH_3$ | H | $-OCH_3$ | H |
| T-97 | $-CH_3$ | $-C_2H_5$ | H | H | $-NO_2$ | H | H |
| T-98 | $-OC_2H_5$ | $-C_3H_7$ | H | H | H | —OH | H |
| T-99 | Br | $-C_4H_9$ | H | H | H | H | H |

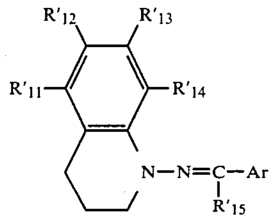
| No. | R'11 | R'12 | R'13 | R'14 | R'15 | Ar |
|---|---|---|---|---|---|---|
| T-100 | H | H | H | H | H | 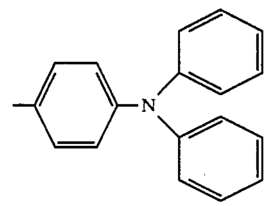 |
| T-101 | H | H | H | H | H | 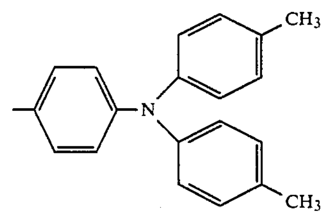 |
| T-102 | H | H | H | H | H | 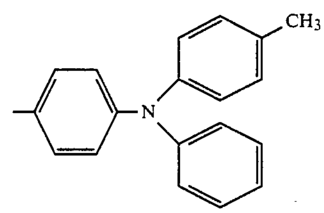 |
| T-103 | H | H | H | H | H | 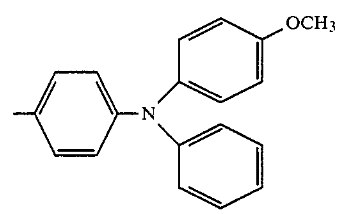 |
| T-104 | H | H | H | H | H | 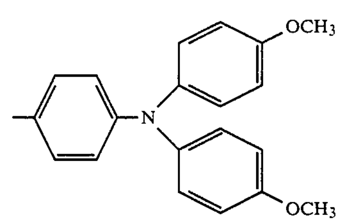 |
| T-105 | H | H | H | H | H | 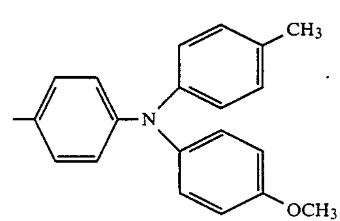 |

-continued
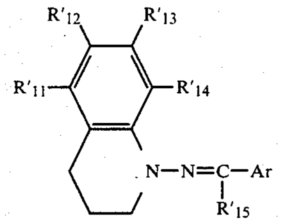
| No. | R'11 | R'12 | R'13 | R'14 | R'15 | Ar |
|---|---|---|---|---|---|---|
| T-106 | H | H | H | H | H | 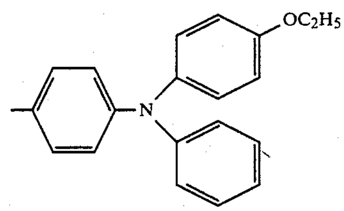 |
| T-107 | H | H | H | H | H | 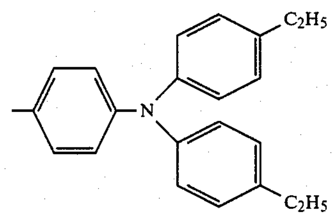 |
| T-108 | H | H | H | H | H | 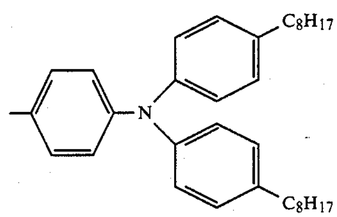 |
| T-109 | H | H | H | H | H | 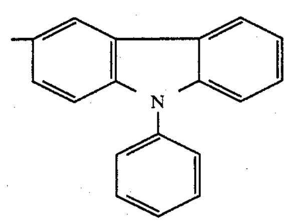 |
| T-110 | H | H | H | H | H | 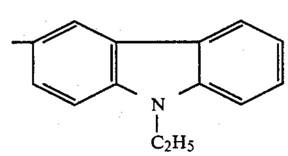 |
| T-111 | H | H | H | H | H | 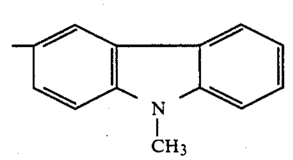 |

-continued
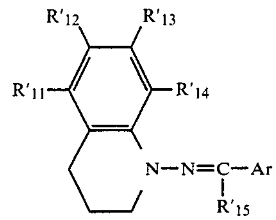
| No. | R'11 | R'12 | R'13 | R'14 | R'15 | Ar |
|---|---|---|---|---|---|---|
| T-112 | H | H | H | H | H | 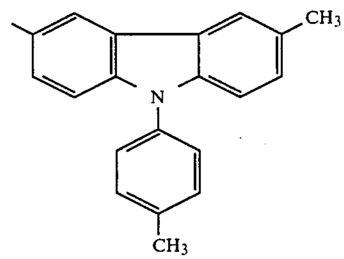 |
| T-113 | H | H | H | H | H | 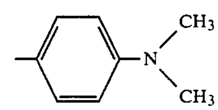 |
| T-114 | H | H | H | H | H | 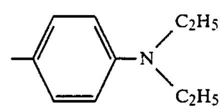 |
| T-115 | H | H | H | H | H | 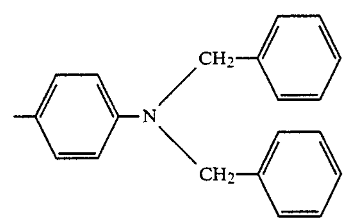 |
| T-116 | H | —OCH3 | H | H | H | 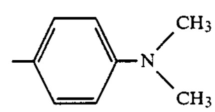 |
| T-117 | H | —OCH3 | H | H | H | 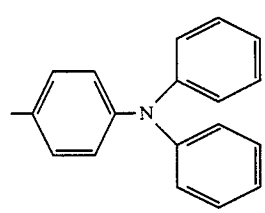 |
| T-118 | H | —OCH3 | H | H | H | 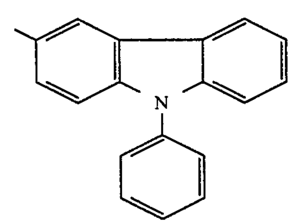 |

-continued
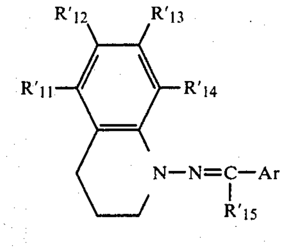
| No. | R'11 | R'12 | R'13 | R'14 | R'15 | Ar |
|---|---|---|---|---|---|---|
| T-119 | H | —$CH_3$ | H | H | H | 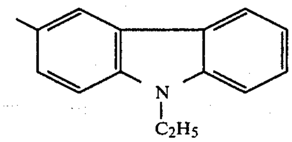  |
| T-120 | H | —$CH_3$ | H | H | H | 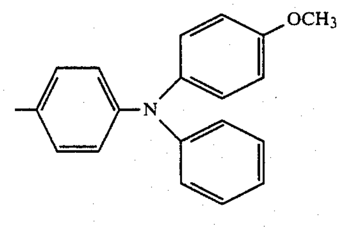  |
| T-121 | —$CH_3$ | H | H | H | —$CH_3$ | 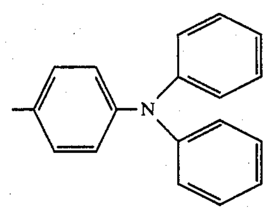  |
| T-122 | H | —$CH_3$ | H | H | —$CH_3$ | 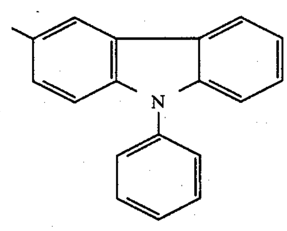  |
| T-123 | H | H | —$CH_3$ | H | —CN | 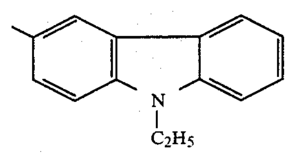  |
| T-124 | H | H | H | —$CH_3$ | —CN | 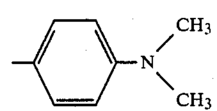  |
| T-125 | —$OCH_2$— 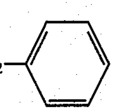 | H | H | H | 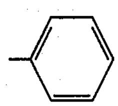 | 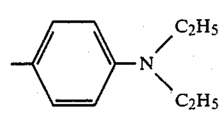  |
| T-126 | H | —$OCH_3$ | H | H | 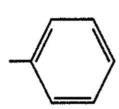 | 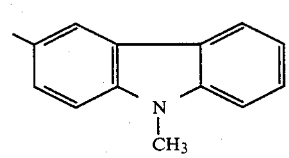  |

-continued
Compounds having the structure of Formula (4)
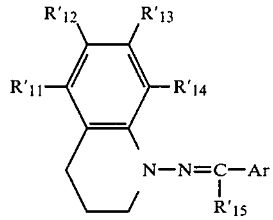
| No. | R'₁₁ | R'₁₂ | R'₁₃ | R'₁₄ | R'₁₅ | Ar |
|---|---|---|---|---|---|---|
| T-127 | H | H | $-NO_2$ | H | 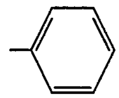 | 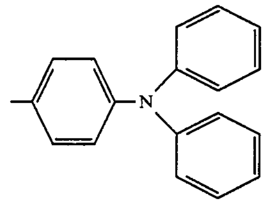 |
| T-128 | H | H | H | —OH | 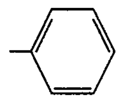 | 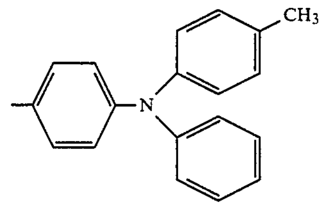 |
| T-129 | H | H | H | H | 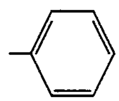 | 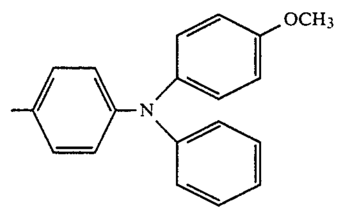 |
| T-130 | H | H | H | H | 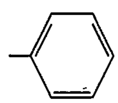 | 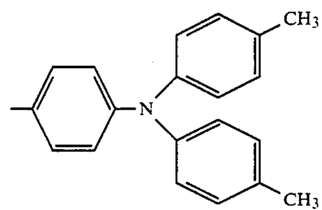 |
| T-131 | H | H | H | H | 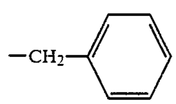 | 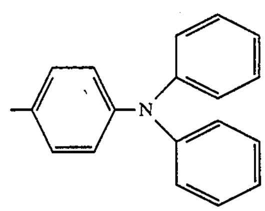 |
| T-132 | H | H | H | H | 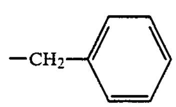 | 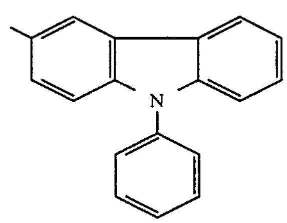 |

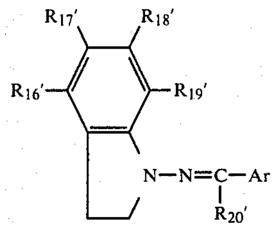
| No. | $R_{16}'$ | $R_{17}'$ | $R_{18}'$ | $R_{19}'$ | $R_{20}'$ | Ar |
|---|---|---|---|---|---|---|
| T-133 | H | H | H | H | H | 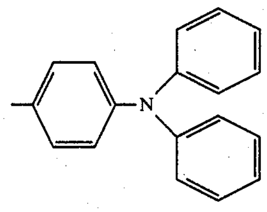 |
| T-134 | H | H | H | H | H | 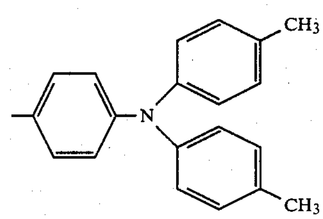 |
| T-135 | H | H | H | H | H | 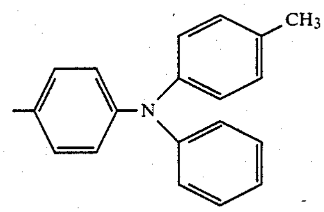 |
| T-136 | H | H | H | H | H | 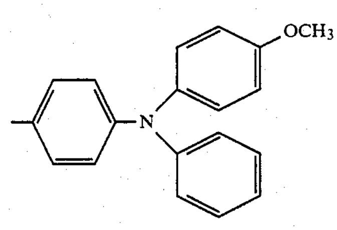 |
| T-137 | H | H | H | H | H | 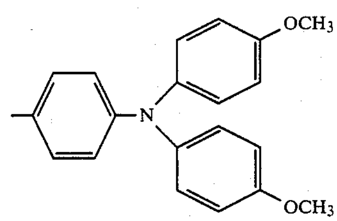 |
| T-138 | H | H | H | H | H | 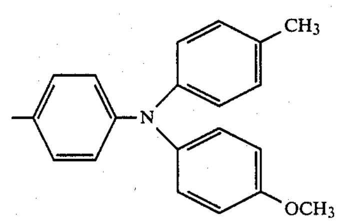 |

-continued
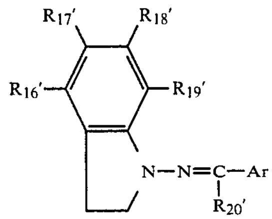
| No. | R16' | R17' | R18' | R19' | R20' | Ar |
|---|---|---|---|---|---|---|
| T-139 | H | H | H | H | H | 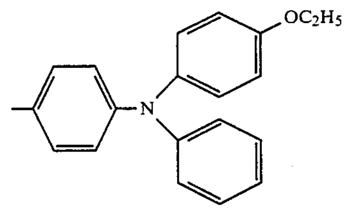 |
| T-140 | H | H | H | H | H | 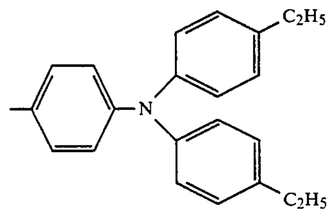 |
| T-141 | H | H | H | H | H | 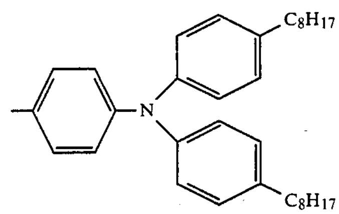 |
| T-142 | H | H | H | H | H | 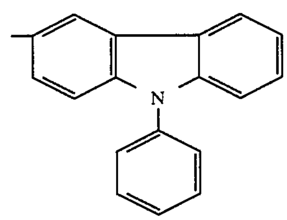 |
| T-143 | H | H | H | H | H | 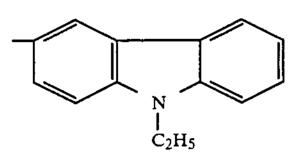 |
| T-144 | H | H | H | H | H | 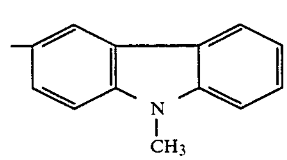 |

-continued
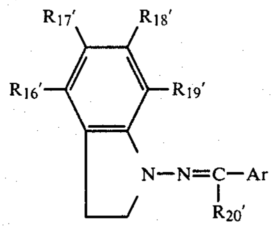
| No. | $R_{16}'$ | $R_{17}'$ | $R_{18}'$ | $R_{19}'$ | $R_{20}'$ | Ar |
|---|---|---|---|---|---|---|
| T-145 | H | H | H | H | H | 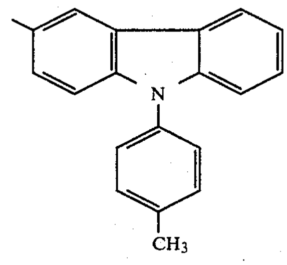 |
| T-146 | H | H | H | H | H | 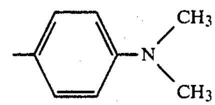 |
| T-147 | H | H | H | H | H | 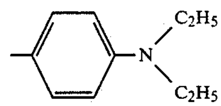 |
| T-148 | H | H | H | H | H | 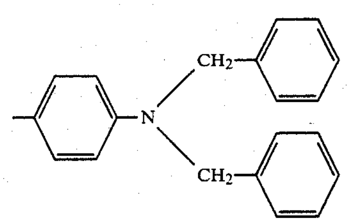 |
| T-149 | H | $-OCH_3$ | H | H | H | 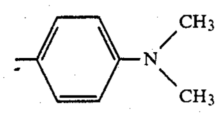 |
| T-150 | H | $-OCH_3$ | H | H | H | 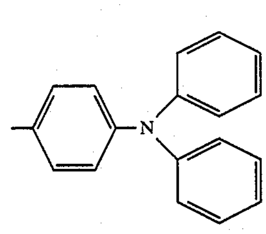 |
| T-151 | H | $-OCH_3$ | H | H | H | 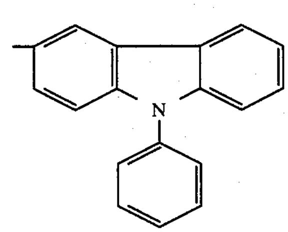 |

-continued
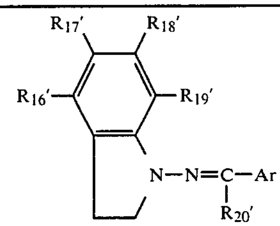
| No. | R16' | R17' | R18' | R19' | R20' | Ar |
|---|---|---|---|---|---|---|
| T-152 | H | —CH3 | H | H | H | 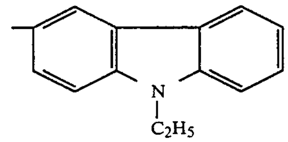 |
| T-153 | H | —CH3 | H | H | H | 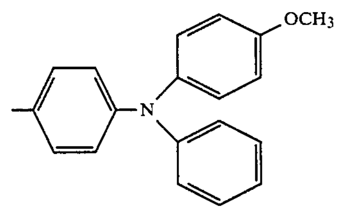 |
| T-154 | —CH3 | H | H | H | —CH3 | 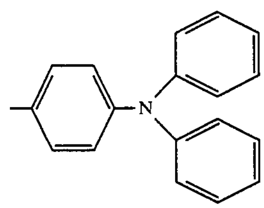 |
| T-155 | H | —CH3 | H | H | —CH3 | 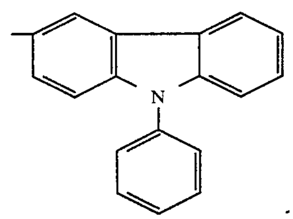 |
| T-156 | H | H | —CH3 | H | —CN | 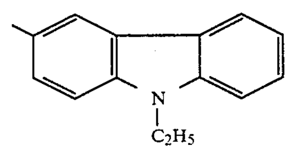 |
| T-157 | H | H | H | —CH3 | —CN | 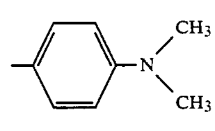 |
| T-158 | 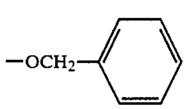 | H | H | H | 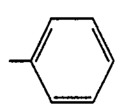 | 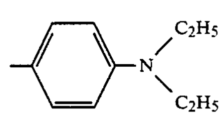 |
| T-159 | H | —OCH3 | H | H | 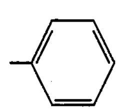 | 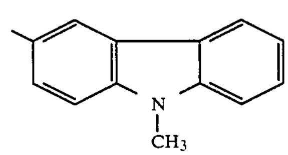 |

-continued
Compounds having the structure of Formula (5)
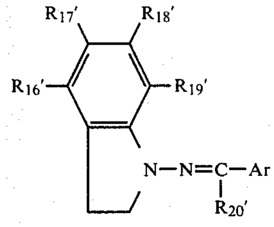
| No. | R16' | R17' | R18' | R19' | R20' | Ar |
| --- | --- | --- | --- | --- | --- | --- |
| T-160 | H | H | —NO2 | H | 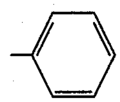 | 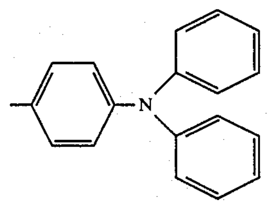  |
| T-161 | H | H | H | —OH | 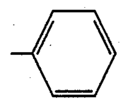 | 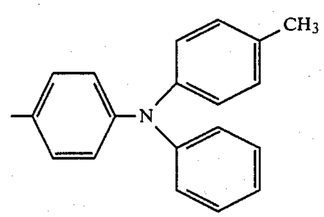  |
| T-162 | H | H | H | H | 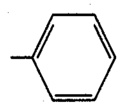 | 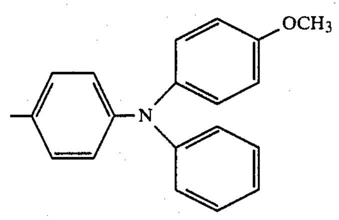  |
| T-163 | H | H | H | H | 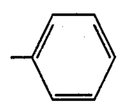 | 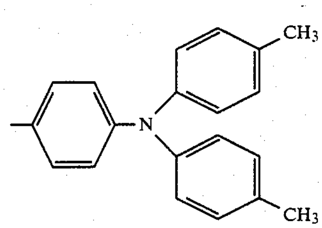  |
| T-164 | H | H | H | H | 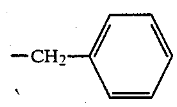  | 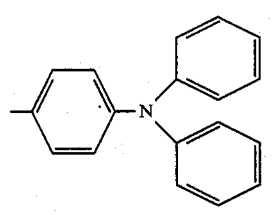  |
| T-165 | H | H | H | H | 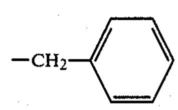  | 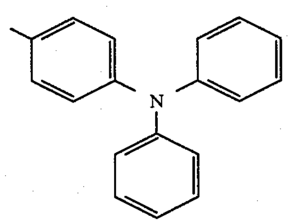  |

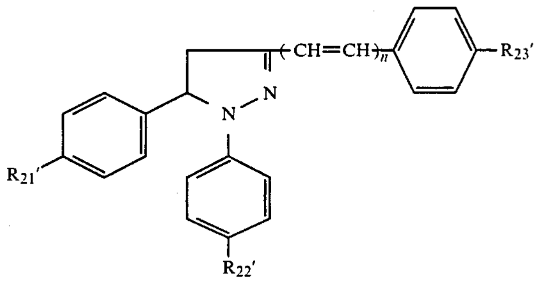
| No. | $R_{21}'$ | $R_{22}'$ | $R_{23}'$ | n |
|---|---|---|---|---|
| T-166 | H | H | H | 0 |
| T-167 | H | H | $-CH_3$ | 1 |
| T-168 | H | H | $-C_2H_5$ | 0 |
| T-169 | H | H | $-OCH_3$ | 1 |
| T-170 | H | H | $-OC_2H_5$ | 0 |
| T-171 | H | H | Cl | 1 |
| T-172 | H | H | Br | 1 |
| T-173 | H | H | F | 1 |
| T-174 | H | H | I | 1 |
| T-175 | H | H | $-N(CH_3)_2$ | 0 |
| T-176 | H | H | $-N(C_6H_5)_2$ | 1 |
| T-177 | H | H | $-N(C_2H_5)_2$ | 0 |
| T-178 | H | H | 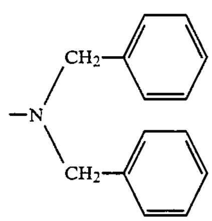 | 1 |
| T-179 | H | H | $-CN$ | 0 |
| T-180 | H | H | $-NO_2$ | 1 |
| T-181 | H | H | $-OH$ | 1 |
| T-182 | H | H | $-C_8H_{17}$ | 1 |
| T-183 | $-CH_3$ | H | H | 1 |
| T-184 | $-CH_3$ | H | $-CH_3$ | 1 |
| T-185 | $-CH_3$ | H | $-OCH_3$ | 1 |
| T-186 | $-CH_3$ | H | $-Cl$ | 1 |
| T-187 | $-CH_3$ | H | $-N(C_2H_5)_2$ | 1 |
| T-188 | $-OCH_3$ | $-CH_3$ | $-N(C_6H_5)_2$ | 1 |
| T-189 | $-OCH_3$ | $-OCH_3$ | $-OCH_3$ | 1 |
| T-190 | $-OCH_3$ | $-N(C_2H_5)_2$ | H | 1 |

-continued
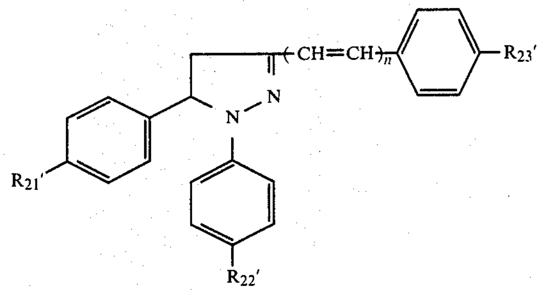
| No. | R21' | R22' | R23' | n |
|---|---|---|---|---|
| T-191 | Cl | $-N(C_6H_5)_2$ | H | 1 |
| T-192 | —OH | —OH | —OH | 1 |
| T-193 | $-N(C_2H_5)_2$ | H | H | 1 |
| T-194 | $-N(C_2H_5)_2$ | H | $-OCH_3$ | 1 |
| T-195 | $-N(C_2H_5)_2$ | H | $-N(C_2H_5)_2$ | 1 |
| T-196 | H | $-N(C_2H_5)_2$ | $-CH_3$ | 1 |
| T-197 | H | 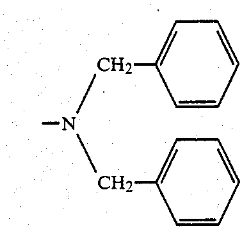 | $-OCH_3$ | 1 |
| T-198 | H | —CN | H | 1 |
Compounds having the structure of Formula (6)
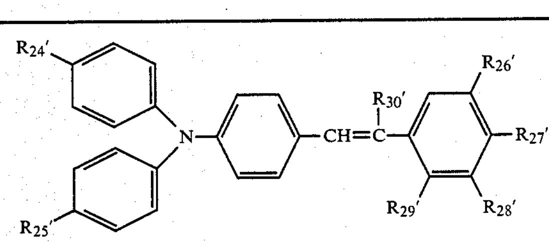
| No. | R24' | R25' | R26' | R27' | R28' | R29' | R30' |
|---|---|---|---|---|---|---|---|
| T-199 | H | H | H | H | H | H | H |
| T-200 | H | H | H | $-CH_3$ | H | H | H |
| T-201 | H | H | H | $-OCH_3$ | H | H | H |
| T-202 | H | H | H | —Cl | H | H | H |

-continued

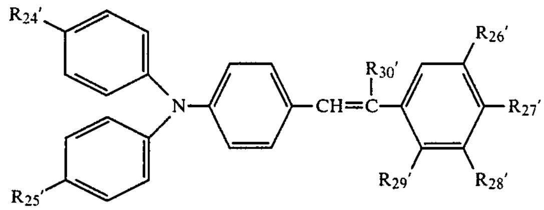

| No. | R24' | R25' | R26' | R27' | R28' | R29' | R30' |
|---|---|---|---|---|---|---|---|
| T-203 | H | H | —Cl | H | H | H | H |
| T-204 | H | H | —$CH_3$ | H | H | H | H |
| T-205 | H | H | —$OCH_3$ | H | H | H | 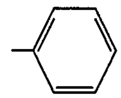 |
| T-206 | H | H | H | H | H | H | 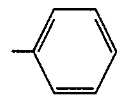 |
| T-207 | H | H | H | —$CH_3$ | H | H | 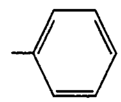 |
| T-208 | H | —$CH_3$ | H | H | H | H | H |
| T-209 | H | —$CH_3$ | H | —$CH_3$ | H | H | H |
| T-210 | H | —$CH_3$ | H | —$OCH_3$ | H | H | H |
| T-211 | H | —$CH_3$ | H | —$N(C_2H_5)_2$ | H | H | H |
| T-212 | H | —$CH_3$ | —$CH_3$ | H | H | H | H |
| T-213 | H | —$CH_3$ | —Cl | H | H | H | H |
| T-214 | H | —$CH_3$ | H | —$CH_3$ | —$CH_3$ | H | H |
| T-215 | H | —$OCH_3$ | —$OCH_3$ | —$OCH_3$ | —$OCH_3$ | H | H |
| T-216 | H | —$CH_3$ | H | H | —$NO_2$ | H | H |
| T-217 | H | —$CH_3$ | H | H | H | H | 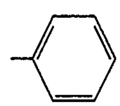 |
| T-218 | H | —$CH_3$ | H | —$CH_3$ | H | H | 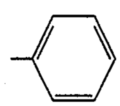 |
| T-219 | H | —$CH_3$ | H | Br | H | H | 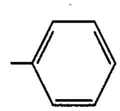 |
| T-220 | H | —$OCH_3$ | H | H | H | H | H |
| T-221 | H | —$OCH_3$ | H | —$CH_3$ | H | H | H |
| T-222 | H | —$OCH_3$ | H | —$OCH_3$ | H | H | H |
| T-223 | H | —$OCH_3$ | H | Br | H | H | H |
| T-224 | H | —$OCH_3$ | —$OCH_3$ | H | H | H | H |
| T-225 | H | —$OCH_3$ | —$NO_2$ | H | H | H | H |
| T-226 | H | —$OCH_3$ | —$OCH_3$ | —$OCH_3$ | H | H | H |
| T-227 | H | —$OCH_3$ | —$CH_3$ | H | H | —$CH_3$ | H |
| T-228 | H | —$OCH_3$ | H | —$C_2H_5$ | H | H | H |
| T-229 | H | —$OCH_3$ | H | H | H | H | 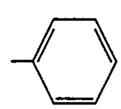 |

-continued
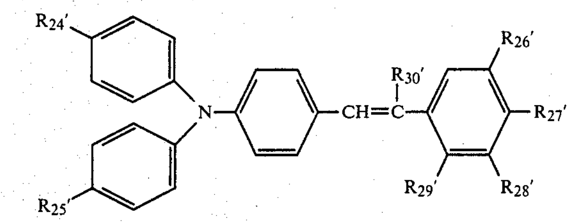
| No. | R24' | R25' | R26' | R27' | R28' | R29' | R30' |
|---|---|---|---|---|---|---|---|
| T-230 | H | —OCH3 | H | H | H | H | 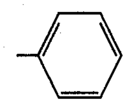 |
| T-231 | H | —OCH3 | —OCH3 | H | H | H | 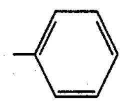 |
| T-232 | —CH3 | —CH3 | H | H | H | H | H |
| T-233 | —CH3 | —CH3 | H | —CH3 | H | H | H |
| T-234 | —CH3 | —CH3 | H | —OCH3 | H | H | H |
| T-235 | —CH3 | —CH3 | H | —Cl | H | H | H |
| T-236 | —CH3 | —CH3 | H | —Br | H | H | H |
| T-237 | —CH3 | —CH3 | —CH3 | H | H | H | H |
| T-238 | —CH3 | —CH3 | —OCH3 | H | H | H | H |
| T-239 | —CH3 | —CH3 | —CH3 | —OCH3 | H | H | H |
| T-240 | —CH3 | —CH3 | H | H | H | H | 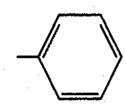 |
| T-241 | —CH3 | —CH3 | —OCH3 | —OCH3 | H | H | 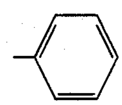 |
| T-242 | —CH3 | —CH3 | —OCH3 | —OCH3 | H | H | 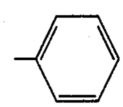 |
| T-243 | —CH3 | —CH3 | —CH3 | H | H | H | 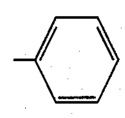 |
| T-244 | —CH3 | —OCH3 | H | H | H | H | H |
| T-245 | —CH3 | —OCH3 | H | —CH3 | H | H | H |
| T-246 | —CH3 | —OCH3 | H | —OCH3 | H | H | H |
| T-247 | —CH3 | —OCH3 | H | —Cl | H | H | H |
| T-248 | —CH3 | —OCH3 | —CH3 | H | H | H | H |
| T-249 | —CH3 | —OCH3 | —CH3 | —CH3 | H | H | H |
| T-250 | —CH3 | —OCH3 | —OCH3 | —OH | —OCH3 | H | H |
| T-251 | —CH3 | —OCH3 | H | 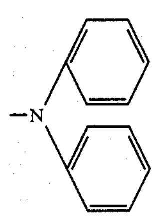 | H | H | H |

-continued

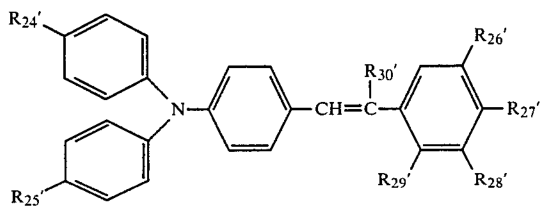

| No. | R24' | R25' | R26' | R27' | R28' | R29' | R30' |
|---|---|---|---|---|---|---|---|
| T-252 | —$CH_3$ | —$OCH_3$ | H | H | H | H | 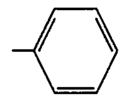 |
| T-253 | —$CH_3$ | —$OCH_3$ | H | —$N(CH_3)_2$ | H | H | 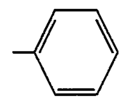 |
| T-254 | —$CH_3$ | —$OCH_3$ | —$NO_2$ | H | H | H | 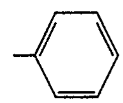 |
| T-255 | —$CH_3$ | —$OCH_3$ | H | —$OCH_3$ | H | H | 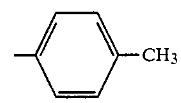  |
| T-256 | —$OCH_3$ | —$OCH_3$ | H | H | H | H | H |
| T-257 | —$OCH_3$ | —$OCH_3$ | H | —$CH_3$ | H | H | H |
| T-258 | —$OCH_3$ | —$OCH_3$ | H | —$OCH_3$ | H | H | H |
| T-259 | —$OCH_3$ | —$OCH_3$ | H | —F | H | H | H |
| T-260 | —$OCH_3$ | —$OCH_3$ | H | —$N(CH_3)_2$ | H | H | H |
| T-261 | —$OCH_3$ | —$OCH_3$ | H | —CN | H | H | H |
| T-262 | —$OCH_3$ | —$OCH_3$ | —$NO_2$ | H | H | H | H |
| T-263 | —$OCH_3$ | —$OCH_3$ | H | —OH | H | H | H |
| T-264 | —$OCH_3$ | —$OCH_3$ | H | H | H | H | 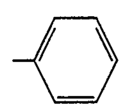 |
| T-265 | —$OCH_3$ | —$OCH_3$ | H | —$CH_3$ | H | H | 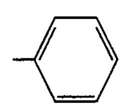 |
| T-266 | —$OCH_3$ | —$OCH_3$ | H | —$OCH_3$ | H | H | 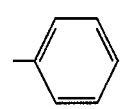 |
| T-267 | —$OCH_3$ | —$OCH_3$ | H | H | H | Cl | 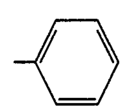 |
| T-268 | H | $C_2H_5$ | H | H | H | H | H |
| T-269 | H | $C_2H_5$ | H | —$CH_3$ | H | H | 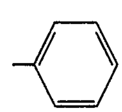 |

-continued
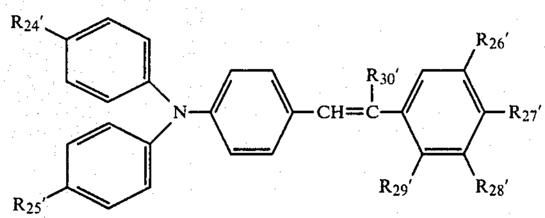
| No. | R24' | R25' | R26' | R27' | R28' | R29' | R30' |
|---|---|---|---|---|---|---|---|
| T-270 | $C_2H_3$ | $C_2H_5$ | H | $-OCH_3$ | H | H | H |
| T-271 | H | $OC_2H_5$ | $-CH_3$ | H | H | H | 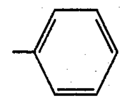 |
| T-272 | H | $OC_2H_5$ | $-Br$ | H | H | H | H |
| T-273 | H | $N(C_2H_5)_2$ | H | H | H | $-Cl$ | H |
| T-274 | H | $N(C_2H_5)_2$ | H | H | H | $-CH_3$ | 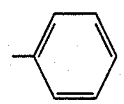 |
| T-275 | $NO_2$ | $NO_2$ | $-NO_2$ | H | H | H | 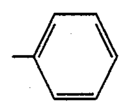 |
| T-276 | H | $NO_2$ | $-CH_3$ | $-CH_3$ | H | H | 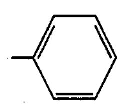 |
| T-277 | H | OH | H | $-N(CH_3)_2$ | H | H | H |
| T-278 | OH | OH | $-CN$ | H | H | H | H |
| T-279 | OH | $CH_3$ | H | 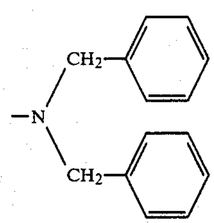 | H | H | H |
Compounds having the structure of Formula (7)

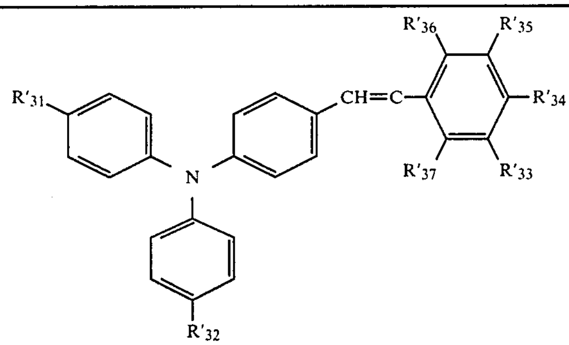

| No. | R'31 | R'32 | R'33 | R'34 | R'35 | R'36 | R'37 |
|---|---|---|---|---|---|---|---|
| T-280 | H | H | H | H | H | H | H |
| T-281 | H | H | H | $-CH_3$ | H | H | H |
| T-282 | H | H | H | $-OCH_3$ | H | H | H |
| T-283 | H | H | $-CH_3$ | H | H | H | H |
| T-284 | H | H | $-OCH_3$ | H | H | H | H |
| T-285 | H | H | H | Cl | H | H | H |
| T-286 | H | H | $-CH_3$ | $-CH_3$ | H | H | 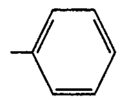 |
| T-287 | H | H | $-OCH_3$ | $-OCH_3$ | H | H | 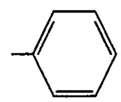 |
| T-288 | H | H | $-NO_2$ | H | H | H | 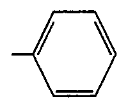 |
| T-289 | H | $-CH_3$ | H | H | H | H | H |
| T-290 | H | $-CH_3$ | H | $-CH_3$ | H | H | H |
| T-291 | H | $-CH_3$ | H | $-OCH_3$ | H | H | H |
| T-292 | H | $-CH_3$ | $-CH_3$ | H | H | H | H |
| T-293 | H | $-CH_3$ | $-OCH_3$ | H | H | H | H |
| T-294 | H | $-CH_3$ | H | H | H | —Cl | H |
| T-295 | H | $-CH_3$ | H | H | H | —Br | H |
| T-296 | H | $-CH_3$ | $-NO_2$ | H | H | H | H |
| T-297 | H | $-CH_3$ | H | $-N(CH_3)_2$ | H | H | 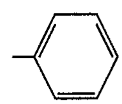 |
| T-298 | H | $-CH_3$ | H | H | H | H | 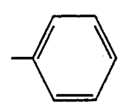 |
| T-299 | H | $-CH_3$ | H | $-OCH_3$ | H | H | 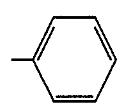 |
| T-300 | H | $-CH_3$ | H | —CN | H | H | 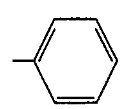 |
| T-301 | H | $-OCH_3$ | H | H | H | H | H |
| T-302 | H | $-OCH_3$ | H | $-CH_3$ | H | H | H |
| T-303 | H | $-OCH_3$ | H | $-OCH_3$ | H | H | H |

-continued
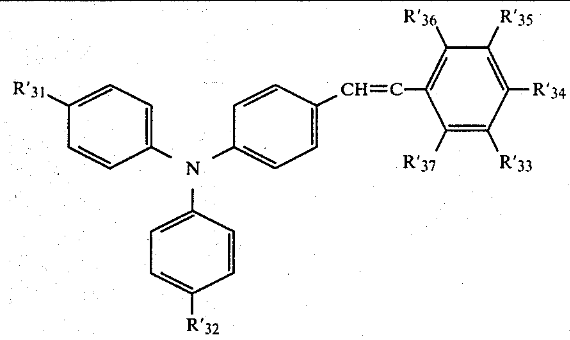
| No. | R'31 | R'32 | R'33 | R'34 | R'35 | R'36 | R'37 |
|---|---|---|---|---|---|---|---|
| T-304 | H | $-OCH_3$ | H | $-N(C_2H_5)_2$ | H | H | H |
| T-305 | H | $-OCH_3$ | H | 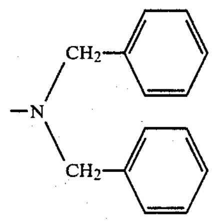 | H | H | H |
| T-306 | H | $-OCH_3$ | $-NO_2$ | H | H | H | H |
| T-307 | H | $-OCH_3$ | H | H | H | —Cl | H |
| T-308 | H | $-OCH_3$ | H | H | H | —Br | H |
| T-309 | H | $-OCH_3$ | H | H | H | H | 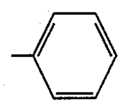 |
| T-310 | H | $-OCH_3$ | $-CH_3$ | $-CH_3$ | H | H | 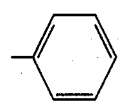 |
| T-311 | H | $-OCH_3$ | $-OCH_3$ | $-OCH_3$ | $-OCH_3$ | H | 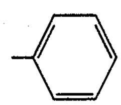 |
| T-312 | H | $-OCH_3$ | H | —OH | H | H | 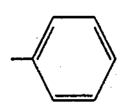 |
| T-313 | H | $-C_2H_5$ | H | H | H | H | H |
| T-314 | H | $-C_2H_5$ | H | $CH_3$ | H | H | H |
| T-315 | H | $-OC_2H_5$ | H | H | H | H | H |
| T-316 | H | $-OC_2H_5$ | H | $CH_3$ | H | H | H |
| T-317 | H | $-N(CH_3)_2$ | H | H | H | H | H |
| T-318 | H | $-N(C_2H_5)_2$ | H | H | H | H | H |
| T-319 | H | Cl | H | H | H | H | H |
| T-320 | H | Br | H | Br | H | H | H |

-continued
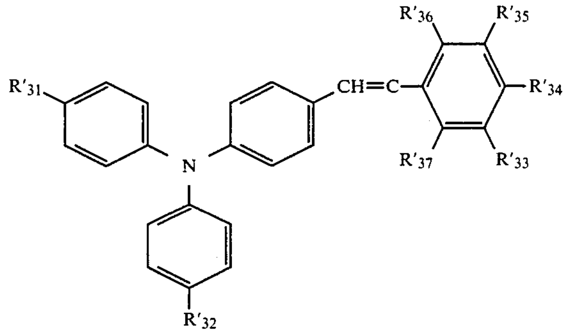
| No. | R'31 | R'32 | R'33 | R'34 | R'35 | R'36 | R'37 |
|---|---|---|---|---|---|---|---|
| T-321 | H | —OH | H | —OH | H | H | 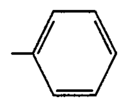 |
| T-322 | H | —CN | H | $CH_3$ | H | H | 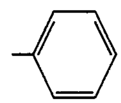 |
| T-323 | H | $-NO_2$ | H | $-OCH_3$ | H | H | 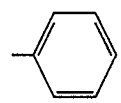 |
| T-324 | H | $-C_8H_{17}$ | H | $-N(CH_3)_2$ | H | H | 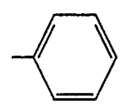 |
| T-325 | $-CH_3$ | H | H | H | H | H | H |
| T-326 | $-CH_3$ | $-CH_3$ | H | $-CH_3$ | H | H | H |
| T-327 | $-CH_3$ | $-N(CH_3)_2$ | H | H | H | H | H |
| T-328 | $-OCH_3$ | H | H | $-CH_3$ | H | H | H |
| T-329 | $-OCH_3$ | $-OCH_3$ | H | $-OCH_3$ | H | H | H |
| T-330 | $-OCH_3$ | Cl | H | —Cl | H | H | H |
| T-331 | $-NO_2$ | Br | H | H | H | H | H |
| T-332 | $-NO_2$ | F | H | —Br | H | H | H |
| T-333 | Cl | 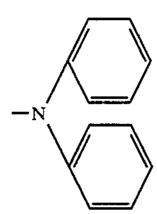 | H | H | H | H | 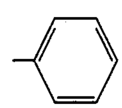 |
| T-334 | Br | Br | H | $-CH_3$ | H | H | 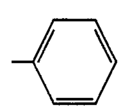 |
| T-335 | F | —CN | H | $-OCH_3$ | H | H | 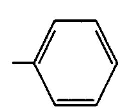 |

-continued

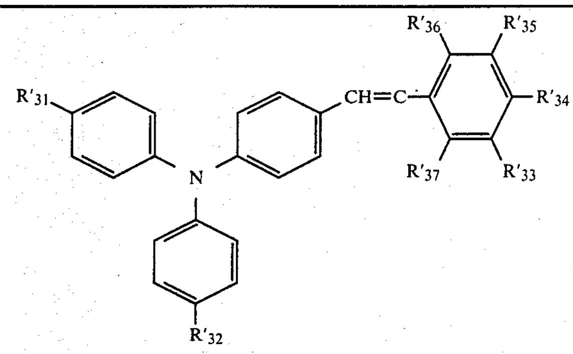

| No. | R'31 | R'32 | R'33 | R'34 | R'35 | R'36 | R'37 |
|---|---|---|---|---|---|---|---|
| T-336 | $-N(C_2H_5)_2$ | —OH | H | H | H | H | 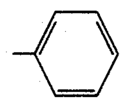 |

Compounds having the structure of Formula (8)

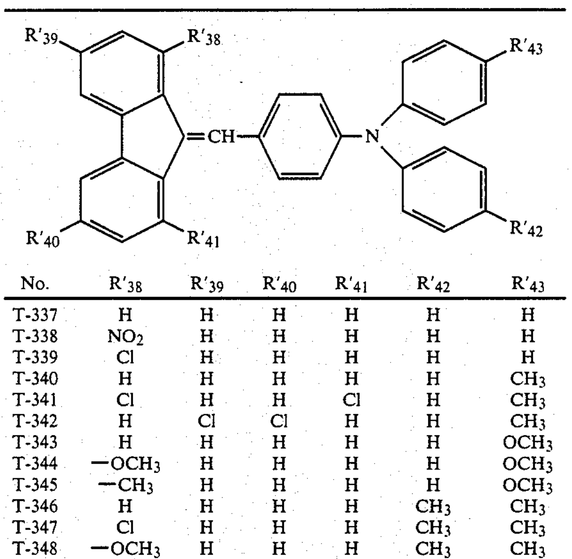

| No. | R'38 | R'39 | R'40 | R'41 | R'42 | R'43 |
|---|---|---|---|---|---|---|
| T-337 | H | H | H | H | H | H |
| T-338 | $NO_2$ | H | H | H | H | H |
| T-339 | Cl | H | H | H | H | H |
| T-340 | H | H | H | H | H | $CH_3$ |
| T-341 | Cl | H | H | Cl | H | $CH_3$ |
| T-342 | H | Cl | Cl | H | H | $CH_3$ |
| T-343 | H | H | H | H | H | $OCH_3$ |
| T-344 | $-OCH_3$ | H | H | H | H | $OCH_3$ |
| T-345 | $-CH_3$ | H | H | H | H | $OCH_3$ |
| T-346 | H | H | H | H | $CH_3$ | $CH_3$ |
| T-347 | Cl | H | H | H | $CH_3$ | $CH_3$ |
| T-348 | $-OCH_3$ | H | H | H | $CH_3$ | $CH_3$ |
| T-349 | H | H | H | H | $CH_3$ | $OCH_3$ |
| T-350 | Cl | H | H | H | $CH_3$ | $OCH_3$ |
| T-351 | $-OCH_3$ | H | H | H | $CH_3$ | $OCH_3$ |
| T-352 | H | H | H | H | $OCH_3$ | $OCH_3$ |
| T-353 | Cl | H | H | H | $OCH_3$ | $OCH_3$ |
| T-354 | $-OCH_3$ | H | H | H | $OCH_3$ | $OCH_3$ |
| T-355 | H | H | H | H | $C_8H_{17}$ | $C_8H_{17}$ |
| T-356 | H | H | H | H | Cl | Cl |
| T-357 | H | H | H | H | —CN | —CN |

There have been well-known a variety of the mechanical structures of photoreceptors, and the photoreceptors of the invention may be able to take any form of the above-mentioned mechanical structures.

Figure 2:
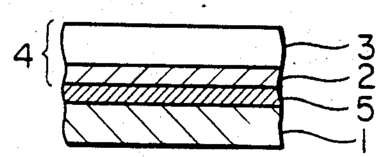
Figure 3:
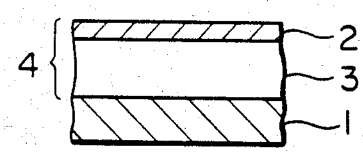
Figure 4:
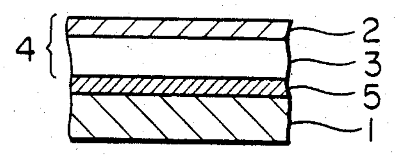
Figure 5:
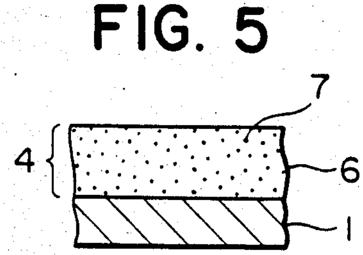
Figure 6:
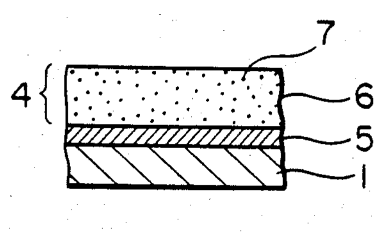

The ordinary forms thereof are shown in FIG. 1 through FIG. 6. In FIGS. 1 and 3, there provides onto a conductive support 1 with a light-sensitive layer 4 comprising a laminated member comprising a carrier-generating layer 2 mainly containing the above-mentioned azo compounds and a carrier transport layer 3 mainly containing a carrier transport substance. As shown in FIGS. 2 and 4, it is also allowed to provide the above-mentioned light-sensitive layer 4 with the interposition of interlayer 5 provided onto a conductive support 1. There can be obtained the photoreceptors capable of displaying the most excellent electrophotographic characteristics, when the light-sensitive layer 4 is constituted double-layerwise, as mentioned above. In the invention, it is also allowed, as shown in FIGS. 5 and 6, to provide directly or with the interposition of an interlayer 5 onto a conductive support 1 with a light-sensitive layer 4 prepared by dispersing the aforementioned carrier-generating substance 7 into a layer 6 mainly containing a carrier transport substance.

Such a carrier-generating layer 2 constituting a double-layered light-sensitive layer 4 can be formed on a conductive support 1 or on a carrier transport layer 3 directly, or if required, on an interlayer such as an adhesive layer or a carrier layer provided on the support or the carrier transport layer, in the following method.

(M-1) A method in which a solution prepared by dissolving an azo compound into an appropriate solvent and, if necessary, additionally mixing a binder thereinto is coated.

(M-2) A method in which a disersion liquid prepared by making an azo compound finely particulate in a dispersion medium by means of a ball mill or homomixer and, if necessary, additionally mixing a binder thereinto is coated.

The solvent or dispersion medium for use in the formation of the carrier-generating layer includes n-butylamine, diethylamine, ethylene diamine, isopropanolamine, triethanolamine, triethylenediamine, N,N-dimethylformamide, acetone, methylethyl ketone, cyclohexanone, benzene, toluene, xylene, chloroform, 1,2-dichloroethane, 1,1,2-trichloroethane, 1,1,1-trichloroethane, trichloroethane, tetrachloroethane, dichloromethane, tetrahydrofuran, dioxane, methanol, ethanol, isopropanol, ethyl acetate, butyl acetate, dimethyl sulfoxide, and the like.

The binder to be used for the carrier-generating layer or carrier-transport layer may be any discretional one, but is desirable to be an electric-insulating film-formable polymer which is hydrophobic and highly dielectric. Such polymers include, e.g., the folllowing examples, but are not limited thereto:

(P-1) Polycarbonate
(P-2) Polyester
(P-3) Methacrylic resin
(P-4) Acrylic resin (P-5) Polyvinyl chloride
(P-6) Polyvinylidene chloride
(P-7) Polystyrene
(P-8) Polyvinyl acetate
(P-9) Styrene-butadiene copolymer
(P-10) Vinylidene chloride-acrylonitrile copolymer
(P-11) Vinyl chloride-vinyl acetate copolymer
(P-12) Vinyl chloride-vinyl acetate-maleic anhydride copolymer
(P-13) Silicone resin
(P-14) Silicone-alkyd resin
(P-15) Phenol-formaldehyde resin
(P-16) Styrene-alkyd resin
(P-17) Poly-N-vinylcarbazole
(P-18) Polyvinyl butyral
(P-19) Polyvinyl formal These binder materials may be used alone or in a mixture of two or more of them.

The thickness of the thus formed carrier-generating layer 2 is preferably from 0.01 μm to 20 μm, and more preferably from 0.05 μm to 5 μm. The particle size of the azo compound in the case where the carrier-generating layer or photosensitive layer is of the dispersion type is preferably not more than 5 μm, and more preferably not more than 1 μm.

The conductive support material applicable to the photoreceptor of this invention includes metallic plates or drums whose metals include alloys; conductive polymers; paper made conductive by being coated, vacuum-deposited or laminated thereon with a conductive compound such as indium oxide or with a metallic thin layer such as of aluminum, palladium, gold, etc., or an alloy thereof; and the like. Those usable as the interlayer such as an adhesion layer or barrier layer include organic high-molecular materials such as polyvinyl alcohol, ethyl cellulose, carboxymethyl cellulose, and inorganic materials such as aluminum oxide, etc., in addition to the foregoing polymers used as the binder.

The photoreceptor of this invention is as has been described above. As will be apparent from the following examples the photoreceptor is excellent in the chargeability, sensitivity and image formability, and so excellently durable that it is hardly fatigued or deteriorated even when repeatedly used.

The present invention will be illustrated in detail by the following examples, but the embodiments of the invention are not limited by the examples.

EXAMPLES

Example 1

Two grams of Exemplified Compound B-56 and 2 g of polycarbonate resin 'Panlite L-1250' (manufactured by Teijin Chemical Industry Co., Ltd.) were added to 110 ml of 1,2-dichloroethane, and were dispersed over a period of 12 hours by means of a ball mill. This dispersed liquid was coated on an aluminum-vacuum-deposited polyester film so that the dry thickness is 1 μm to thereby form a carrier-generating layer, and further on this was coated a liquid as a carrier-transport layer prepared by dissolving 6 g of the foregoing compound T-201 and 10 g of polycarbonate resin 'Panlite L-1250' into 110 ml of 1,2-dichloroethane so that the dry thickness is 15 μm, whereby a photoreceptor of this invention was prepared.

The thus obtained photoreceptor was evaluated with respect to the following characteristics by use of an electronic paper tester Model SP-428, manufactured by Kawaguchi Denki Seisakusho K.K. The photoreceptor was charged for five seconds at a charging voltage of −6 KV, then allowed to stand for five seconds in the dark, and then exposed to a halogen lamp light so that the illuminance on the photosensitive surface of the photoreceptor is 35 luxes to thereby find the exposure (half-exposure) E ½ that is required for reducing the surface potential by half. Also, the surface potential (residual potential) $V_R$ of the photoreceptor after being subjected to a 30-lux.sec exposure was found. Further, the same tests and measurements were repeated 100 times. The obtained results are as given in Table 1.

TABLE 1

| | First | 100th |
|---|---|---|
| $V_A$ (V) | −920 | −910 |
| E ½ (lux · sec) | 3.1 | 3.1 |
| $V_R$ (V) | 0 | 0 |

Comparative Example 1

A comparative photoreceptor was prepared in the same manner as in Example 1 except that the following bisazo compound G-(1) was used as the carrier-generating material.

G-(1)

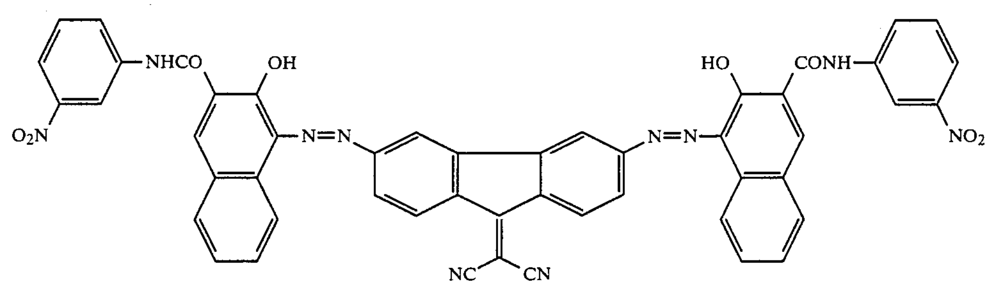

This comparative photoreceptor was measured in the same manner as in Example 1, and the results as shown in Table 2 were obtained.

TABLE 2

| | First | 100th |
|---|---|---|
| V (V) | −900 | −970 |
| E ½ (lux · sec) | 6.6 | 8.3 |
| $V_R$ (V) | −15 | −60 |

As is apparent from the above table, the photoreceptor of this invention is very excellent in the sensitivity as well as in the residual potential, and also in the stability when used repeatedly, as compared to the comparative photoreceptor.

Examples 2 through 4

Photoreceptor samples of this invention were prepared in the same manner as in Example 1 except that Exemplified Compounds B-521, B-461 and B-331 were used as the carrier-generating substance, and the foregoing compounds T-43, T-101 and T-138 were used as the carrier-transport substance. These resulting photoreceptors were tested and measured in the same manner as in Example 1, whereby the results as given in Table 3 were obtained. Any of the photoreceptors show excellent characteristics in the sensitivity, in the residual potential and in the stability when used repeatedly.

TABLE 3

| Example No. | carrier-generating substance | First | | | 100th | | |
|---|---|---|---|---|---|---|---|
| | | $V_A$(V) | E ½ (lux · sec) | $V_R$(V) | $V_A$(V) | E ½ (lux · sec) | $V_R$(V) |
| 2 | Exemplified Compound B-521 | −891 | 3.4 | 0 | −900 | 3.5 | 0 |
| 3 | Exemplified Compound B-461 | −910 | 3.6 | 0 | −920 | 3.6 | 0 |
| 4 | Exemplified Compound B-331 | −930 | 3.2 | 0 | −930 | 3.2 | 0 |

Example 5

On an aluminum foil-laminated polyester film conductive support was provided a 0.05 μm-thick interlayer comprised of a vinyl chloride-vinyl acetate-maleic anhydride copolymer 'Eslec MF-10' (a product of Sekisui Chemical Co., Ltd.), and on this was coated a dispersion liquid prepared by mixing and dispersing 2 g of Exemplified Compound B-1 into 110 ml of 1,2-dichloroethane for 24 hours by means of a ball mill to thereby form a carrier-generating layer so that the dry thickness is 0.5 μm. On this carrier-generating layer was coated a solution of 6 g of the foregoing compound T-113 and 10 g of a methacrylic resin 'Acrypet' (a product of Mitsubishi Rayon Co., Ltd.) both dissolved in 70 ml of 1,2-dichloroethane to thereby form a carrier-transport layer so that the dry thickness is 10 μm, whereby a photoreceptor of this invention was obtained.

This photoreceptor sample was tested and measured in the same manner as in Example 1, whereby the first test results E ½=3.5 lux.sec and $V_R$=0 v were obtained. The sample was excellent in the sensitivity as well as in the residual potential.

Example 6

On the same interlayer-provided conductive support as that used in Example 5 was coated an ethylenediamine 1% Exemplified Compound B-441 solution so that the dry thickness is 0.3 μm, whereby a carrier-generating layer was formed. After that, on this was coated a solution of 6 g of the foregoing compound T-176 and 10 g of a polyester resin 'Vylon 200' (a product of Toyo Spinning Co., Ltd.) both dissolved in 70 ml of 1,2-dichloroethane to thereby form a carrier-transport layer so that the dry thickness is 12 μm, whereby a photoreceptor of this invention was prepared.

This photoreceptor sample was tested and measured in the same manner as in Example 1, whereby the first test results E ½=4.1 lux.sec and $V_R$=0 v were obtained. The sample was excellent in the sensitivity and the residual potential.

Example 7

A carrier-generating layer was formed in the same manner as in Example 5 except that the Exemplified Compound B-1 was was replaced by Exemplified compound B-794. On this was coated a solution of 6 g of the foregoing compound T-200 and 10 g of a polycarbonate 'Panlite L-1250' (a product of Teijin Chemical Industry Co., Ltd.) both dissolved in 70 ml of 1,2-dichloroethane to thereby form a carrier-transport layer so that the dry thickness is 10 μm, whereby a photoreceptor of this invention was prepared.

This photoreceptor sample was tested and measured in the same manner as in Example 1, and the results were E ½=3.5 lux.sec and $V_R$=0 v.

Example 8

On the surface of a 100 mm-diameter aluminum drum was provided a 0.05 μm-thick interlayer comprised of a vinyl chloride-vinyl acetate-maleic anhydride copolymer 'Eslec MF-10' (a product of Sekisui Chemical Co., Ltd.), and on this was coated a dispersion liquid of 4 g of Exemplified Compound B-870 mixed and dispersed for 24 hours by a ball mill into 400 ml of 1,2-dichloroethane to thereby form a carrier-generating layer so that the dry thickness is 0.6 μm.

Further on this was coated a solution of 30 g of the foregoing compound T-136 and 50 g of a polycarbonate resin 'Iupilon S-1000' (a product of Mitsubish Gas Chemicals Co., Ltd.) both dissolved in 400 ml of 1,2-dichloroethane to form a carrier-transport layer so that the dry thickness is 18 μm, whereby a drum-form electrophotographic photoreceptor was prepared.

The thus prepared photoreceptor drum was loaded in a remodelled unit of Electrophotographic Copier U-Bix 1600MR (manufactured by Konishiroku Photo Ind. Co., Ltd.) to make copies of an image, and as a result, very-true-to-the-original and clear image copies were obtained. The. quality of the reproduced image was unchanged even after repeating the copying operation 10,000 times.

Comparative Example 2

A drum-form Comparative photoreceptor was prepared in the same manner as in Example 8 except that the Exemplified Compound B-870 used in Example 8 was replaced by bisazo compound G-3 having the following structural formula, and then evaluated with respect to the quality of the image copies obtained therefrom in the same manner as in Example 8, and as a result, none but fogged image copies were obtained. And as the copying is repeated, the contrast of the copy image becomes lowered, and almost no appreciable copy image was obtained after 2000-time copying operations.

thickness is 10 μm, whereby a photoreceptor was prepared.

G-3

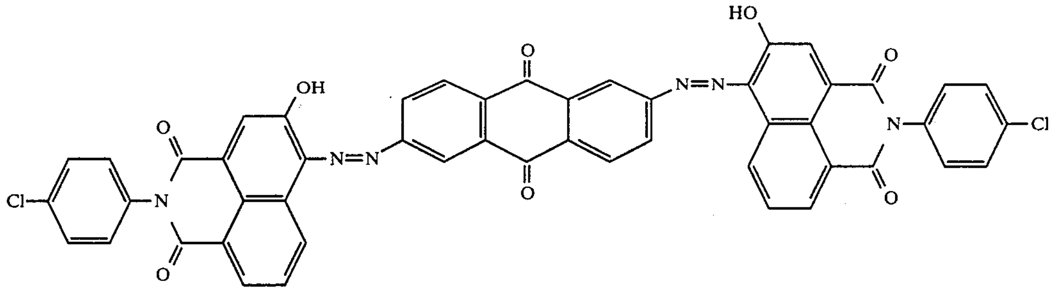

Example 9

On an aluminum foil-laminated polyester film conductive support was provided a 0.05 μm-thick interlayer comprised of a vinyl chloride-vinyl acetate-maleic anhydride copolymer 'Eslec MF-10' (a product of Sekisui Chemical Co., Ltd.), and then on this was coated a dispersion liquid of 5 g of Exemplified Compound B-949 and 3.3 g of a polycarbonate resin 'Panlite L-1250' (a product of Teijin Chemical Industry Co., Ltd.) added to and dispersed for 24 hours by means of a ball mill into 100 ml of dichloromethane to form a layer so that the dry thickness is 10 μm, whereby a photoreceptor was prepared.

The thus obtained photoreceptor sample was tested and measured in the same manner as in Example 1 with respect to E ½ and $V_R$ except that the charging voltage was changed to +6 KV, and the first results were E ½=5.5 lux.sec and $V_R$=+8 v.

Example 10

On an aluminum-deposited polyester film was provided a carrier-transport layer by coating a solution of 6 g of the foregoing compound T-114 and 10 g of a polyester resin 'Vylon 200' (a product of Toyo Spinning Co., Ltd.) dissolved in 70 ml of 1,2-dichloroethane so that the dry thickness is 10 μm.

On this was then coated a dispersion liquid of 1 g of Exemplified Compound B-1025 and 1 g of Exemplified Compound B-1022 both mixed and dispersed for 24 hours by means of a ball mill into 110 ml of 1,2-dichloroethane to form a carrier-generating layer so that the dry thickness is 0.5 μm, whereby a photoreceptor of this invention was prepared.

The thus obtained photoreceptor was evaluated in the same manner as in Example 9, and the results were E ½=4.8 lux.sec and $V_R$=+7 v.

Example 11

On an aluminum foil-laminated polyester film conductive support was provided a 0.05 μm-thick interlayer comprised of a vinyl chloride-vinyl acetate-maleic anhydride copolymer 'Eslec MF-10' (a product of Sekisui Chemical Co., Ltd.), and on this was then coated a dispersion liquid of 4 g of Exemplified Compound B-873, 8 g of the foregoing compound T-63, and 3 g of a polycarbonate resin 'Panlite L-1250' (a product of Teijin Chemical Industry Co., Ltd.) all added to and dispersed for 24 hours by means of a sand grinder into 100 ml of dichloroethane to form a layer so that the dry thickness is 10 μm, whereby a photoreceptor was prepared.

The above-obtained photoreceptor was tested and measured in the same manner as in Example 1 except that the charging voltage was changed to +6 kv, and the first results were E ½=4.8 lux.sec and $V_R$=0 v.

EXAMPLE 12

A solution of 2 g of Exemplified Compound B-526 dissolved in 100 ml of 1,2-dichloroethane was coated on an aluminum-laminated polyester film so that the dry thickness is 0.5 μm, whereby a carrier-generating layer was formed. Further on this was coated and dried a solution of 10 g of the foregoing compound T-3 and 14 g of a polycarbonate resin 'Panlite L-1250' (a product of Teijin Chemical Industry Co., Ltd.) dissolved in 140 ml of 1,2-dichloroethane to form a layer so that the dry thickness is 12 μm, whereby a photoreceptor of the invention was obtained.

The above-obtained photoreceptor was tested and measured in the same manner as in Example 1. The results were shown in Table 4.

TABLE 4

| | First | 100th |
|---|---|---|
| V (V) | −900 | −930 |
| E ½ (lux · sec) | 3.7 | 3.8 |
| $V_R$ (V) | 0 | 0 |

Example 13

A drum-form photoreceptor was prepared in the same manner as in Example 5 except that the Exemplified Compound B-1 used in Example 5 was replaced by Exemplified Compound B-287. The spectral sensitivity of this photoreceptor at 790 nm was 530 volt.cm².μW⁻¹.sec⁻¹ (light attenuation rate). The field copying test of the photoreceptor was performed using an experimental machine equipped with a semiconductor laser (790 nm) unit whose laser light intensity on the surface of the photoreceptor is 0.85 mW.

The surface of the photoreceptor was charged at −6 kv, then exposed to the laser light, and then subjected to reversal development under the condition of a bias voltage of −250 V, and as a result a fog-free, satisfactory image was obtained.

Comparative Example 3

A comparative photoreceptor sample was prepared in the same manner as in Example 13 except that the Exemplified Compound B-289 used in Example 13 was replaced by the following comparative bisazo compound G-6.

G-6

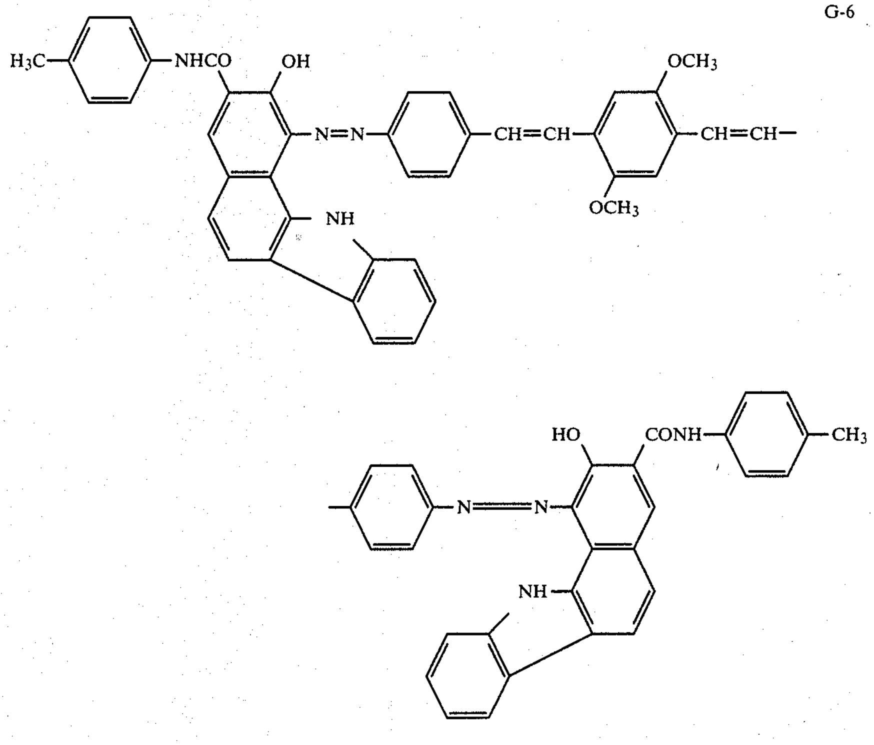

The spectral sensitivity of this photoreceptor at 790 nm was 120 volt.cm$^2$.$\mu$W$^{-1}$.sec$^{-1}$ (light attenuation rate). This comparative photoreceptor was used to perform a field copying test with the semiconductor laser in the same manner as in Example 13, but much fog appeared on the resulting image. Thus, no satisfactory image copies were obtained.

As is apparent from the results of the above examples and comparative examples, the photoreceptors of this invention are remarkably excellent in the characteristics such as the stability, sensitivity, durability, permissibility of any combination with diverse carrier-transport substances, and the like, as compared to the comparative photoreceptors.

Examples 14 through 27

Drum-form photoreceptor samples were prepared in the same manner as in Example 5 except that the Exemplified Compound B-1 (charge-generating substance) and the compound T-113 (charge-transport substance) were replaced as shown in Table 5. The spectral sensitivities of these photoreceptor samples at 790 nm are as given in Table 5. As a result of the field copying tests in these examples 14∼27, which were made in the same manner as in Example 16, fog-free, satisfactory image copies were obtained.

TABLE 5

| Example No. | Charge-generating substance | Charge transport material | Spectral sensitivity (volt · cm$^2$ · $\mu$W$^{-1}$ · sec$^{-1}$) |
|---|---|---|---|
| Example 14 | Exemplified compound B-279 | Compound T-100 | 540 |
| Example 15 | Exemplified compound B-234 | Compound T-133 | 510 |
| Example 16 | Exemplified compound B-542 | Compound T-199 | 460 |

TABLE 5-continued

| Example No. | Charge-generating substance | Charge transport material | Spectral sensitivity (volt · cm$^2$ · $\mu$W$^{-1}$ · sec$^{-1}$) |
|---|---|---|---|
| Example 17 | Exemplified compound B-587 | Compound T-201 | 500 |
| Example 18 | Exemplified compound B-836 | Compound T-146 | 510 |
| Example 19 | Exemplified compound B-833 | Compound T-110 | 510 |
| Example 20 | Exemplified compound B-912 | Compound T-206 | 550 |
| Example 21 | Exemplified compound B-913 | Compound T-147 | 530 |
| Example 22 | Exemplified compound B-1064 | Compound T-221 | 470 |
| Example 23 | Exemplified compound B-1061 | Compound T-102 | 450 |
| Example 24 | Exemplified compound B-998 | Compound T-222 | 430 |
| Example 25 | Exemplified compound B-992 | Compound T-103 | 400 |
| Example 26 | Exemplified compound B-824 | Compound T-52 | 390 |
| Example 27 | Exemplified compound B-890 | Compound T-303 | 390 |

What is claimed is:

1. A photoreceptor comprising a support and thereon a photosensitive layer containing an azo compound represented by the following Formula [I]

Formula [I]

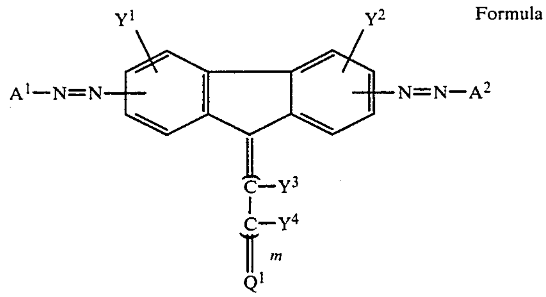

wherein $Y^1$ and $Y^2$ each represent hydrogen, an alkyl group, an alkoxy group, a halogen, a cyano group, or

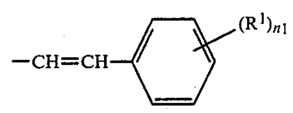

in which $R^1$ represents hydrogen, an alkyl group, an alkoxy group, a halogen, a cyano group, an ester group, an acryl group, a dialkylamino group, a diarylamino group, a diaralkylamino group, or a hydroxy group; and $n_1$ is an integer of from 1 to 5, provided that, when $n_1$ is not less than 2, $R^1$ is allowed to be a different substituent;

$Y_3$ and $Y_4$ each represent hydrogen, an alkyl group, a halogen, a cyano group, an acyl group, an ester group, or

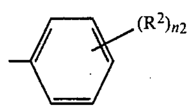

in which $R^2$ represents hydrogen, an alkyl group, an alkoxy group, a halogen, a cyano gradation, an ester group, an acyl group, a dialkylamino group, a diarylamino group, a diaralkylamino group, or a hydroxy group; and $n_2$ is an integer of from 1 to 5, provided that, when $n_2$ is not less than 2, $R^2$ is allowed to be a different substituent;

$Q^1$ represents

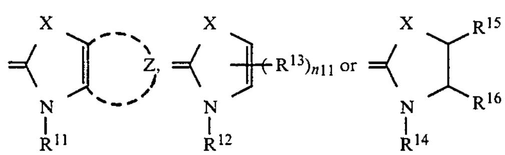

in which Z represents a group of atoms necessary for forming a substituted or unsubstituted aromatic carbon ring or a substituted or unsubstituted aromatic heterocyclic ring; $R_{11}$, $R_{12}$ and $R_{14}$ each represent hydrogen, an alkyl group, an aralkyl group, or

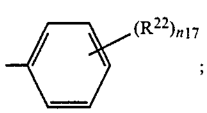

;

$R^{13}$, $R^{15}$ and $R^{16}$ and $R_{22}$ each represent hydrogen, an alkyl group, an aryl group, an alkoxy group, a halogen, a cyano group, an ester group, an acyl group, a dialkylamino group, a diaralkylamino group, a diarylamino group, a nitro group, an amino group, or a hydroxy group; $n_{11}$ is an integer of 1 or 2; $n_{17}$ is an integer of from 1 to 5, provided that, when $n_{11}$ and $n_{17}$ are not less than 2, respectively, $R^{13}$ and $R^{22}$ are allowed to be the same or different from each other, respectively, and it is also allowed to form an aliphatic carbon ring or an aliphatic heterocyclic ring with $R^{15}$ and $R^{16}$; X represents —O—, —S—,

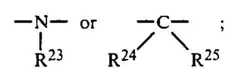

;

$R^{23}$ represents hydrogen, an alkyl group, an aralkyl group, or a phenyl group allowed to have a substituent; $R_{24}$ and $R_{25}$ each represent hydrogen, an alkyl group, an aralkyl group, or a phenyl group allowed to have a substituent;

$A^1$ and $A^2$ each represent

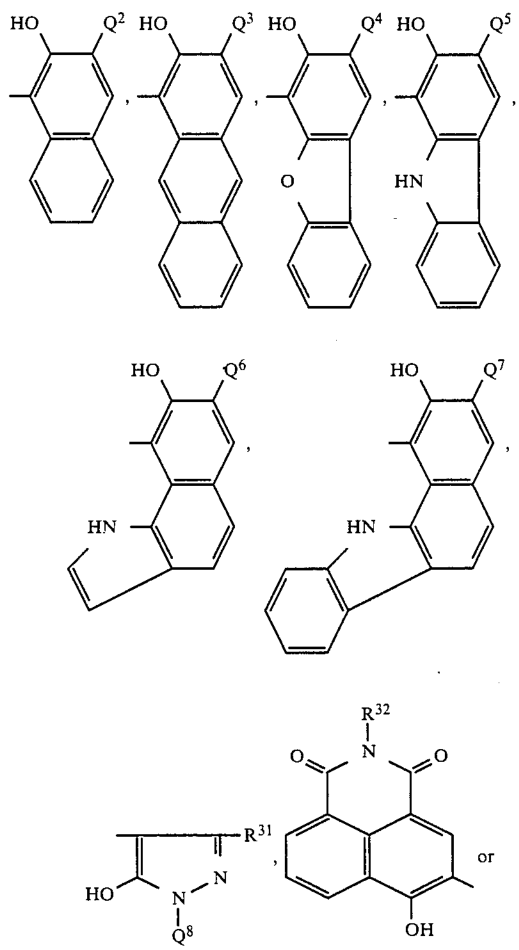

-continued

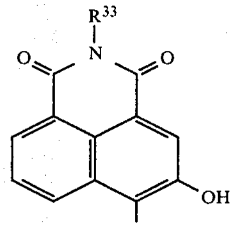

in which $Q^2$, $Q^3$, $Q^4$, $Q^5$, $Q^6$ and $Q^7$ represent

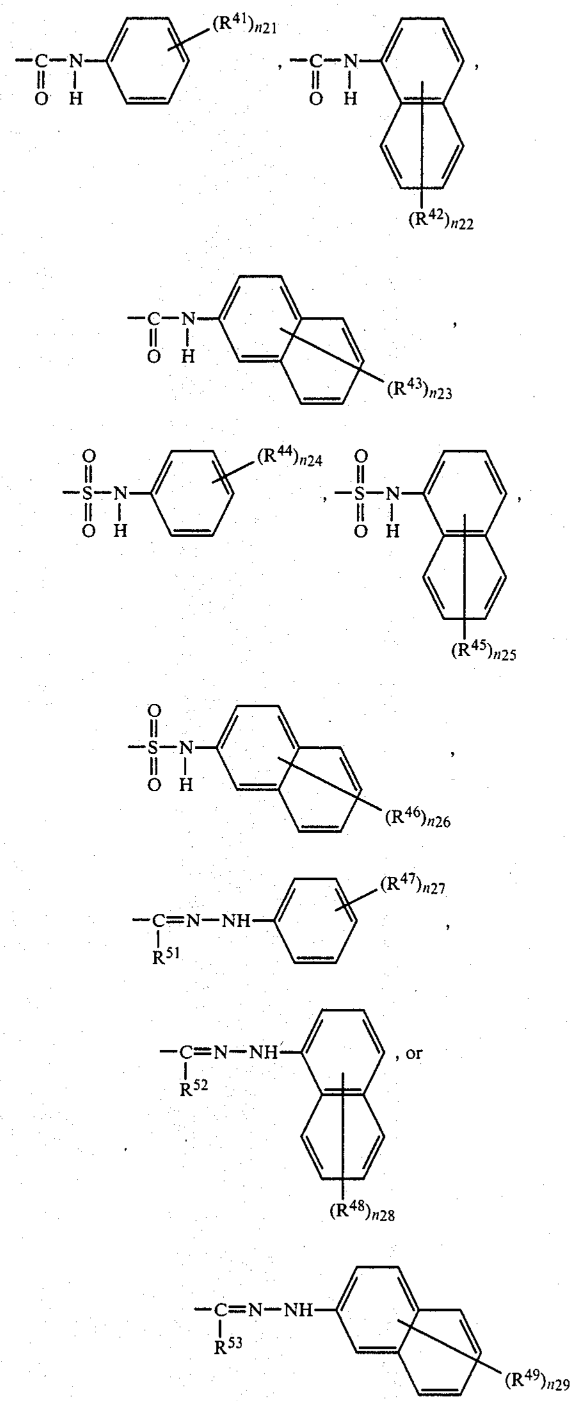

in which $R^{41}$, $R^{42}$, $R^{43}$, $R^{44}$, $R^{45}$, $R^{46}$, $R^{47}$, $R^{48}$ and $R^{49}$ each represent hydrogen, an alkyl group, an alkoxy group, a halogen, a cyano group, an ester group, an acyl group, a dialkylamino group, an diaralkylamino group, a diarylamino group, or a hydroxy group, and $n_{21}$, $n_{24}$ and $n_{27}$ are an integer of from 1 to 5, provided that, when $n_{21}$, $n_{24}$ and $n_{27}$ are not less than 2, $R^{41}$, $R^{44}$ and $R^{47}$ are allowed to be different substituents from each other, respectively, and $n_{22}$, $n_{23}$, $n_{25}$, $n_{26}$, $n_{28}$ and $n_{29}$ are an integer of from 1 to 7, provided that, when $n_{22}$, $n_{23}$, $n_{25}$, $n_{26}$, $n_{28}$ and $n_{29}$ are not less than 2, $R^{42}$, $R^{43}$, $R^{45}$, $R^{46}$, $R^{48}$ and $R^{49}$ are allowed to be the same or different from each other; $R^{51}$, $R^{52}$, and $R^{53}$ each represent an alkyl group; $Q^8$ represents

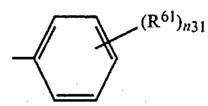

in which $R^{61}$ represents hydrogen, an alkyl group, an alkoxy group, a halogen, a cyano group, an ester group, an acyl group, a dialkylamino group, a diaralkylamino group, a diarylamino group, or a hydroxy group, and $n_{31}$ is an integer of from 1 to 5, provided that, when $n_{31}$ is not less than 2, $R^{61}$ is allowed to be a different substituent; $R^{31}$ represents hydrogen, an alkyl group, an amino group, a dialkylamino group, a diarylamino group, a diaralkylamino group, a carbamoyl group, a carboxyl group or the ester groups thereof, or a cyano group; $R^{32}$ and $R^{33}$ each represent an alkyl group, an aralkyl group, or

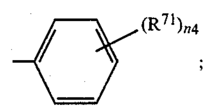

$R^{71}$ represents hydrogen, an alkyl group, an alkoxy group, a halogen, a cyano group, an ester group, an acyl group, a dialkylamino group, a diaralkylamino group, a diarylamino group, or a hydroxy group, and $n_{41}$ is an integer of from 1 to 5, provided that when $n_{41}$ is not less than 2, $R^{71}$ is allowed to be a different substituent; and m is zero, 1 or 2.

2. The photoreceptor of claim 1, wherein said photosensitive layer contains a carrier generation substance and a carrier transport substance and said carrier generation substance is said azo compound.

3. The photoreceptor of claim 2, wherein said photosensitive layer comprises a carrier generation layer which contains said carrier generation substance and a carrier transport layer which contains said carrier transport substance.

4. The photoreceptor of claim 1, wherein said azo compound is represented by the following Formula [II]

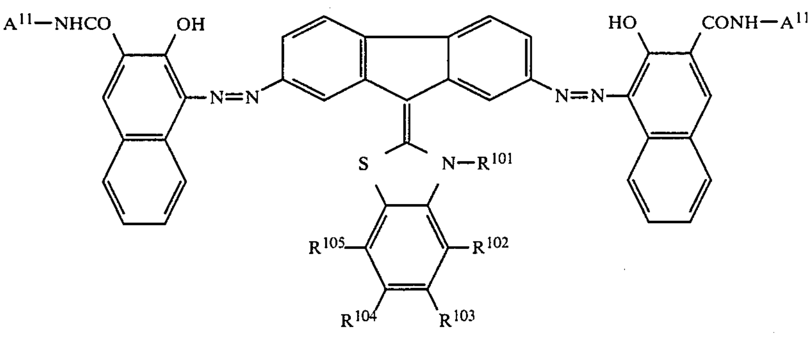

Formula [II]

wherein $R^{101}$ represents hydrogen, an alkyl group or an aralkyl group; $R^{102}$, $R^{103}$, $R^{104}$, $R^{105}$ each represent hydrogen, or alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{102}$, $R^{103}$, $R^{104}$, $R^{105}$ respectively; $A^{11}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

5. The photoreceptor of claim 1, wherein said azo compound is represented by the following Formula [III]

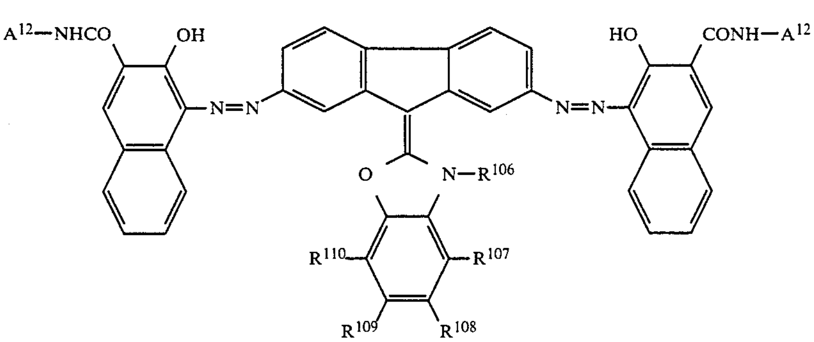

Formula [III]

wherein $R^{106}$ represents hydrogen, an alkyl group or an aralkyl group; $R^{107}$, $R^{108}$, $R^{109}$, $R^{110}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allkyl group, or a carbon ring or a heterocyclic ring with two out of $R^{107}$, $R^{108}$, $R^{109}$, $R^{110}$ respectively; $A^{12}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

6. The photoreceptor of claim 1, wherein said azo compound is represented by the following Formula [IV]

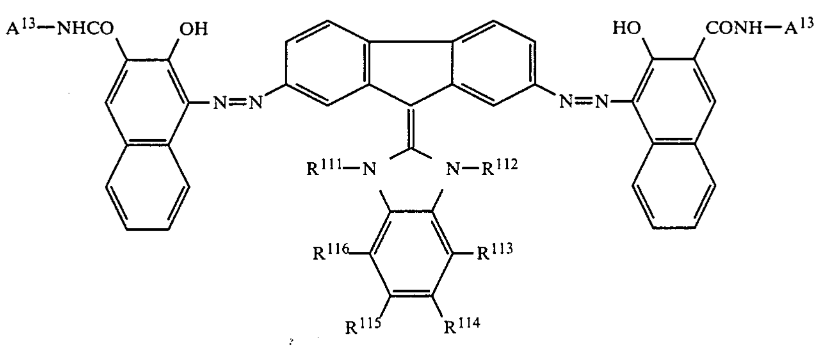

Formula [IV]

wherein $R^{111}$ $R^{112}$ represents hydrogen, an alkyl group or an aralkyl group; $R^{113}$, $R^{114}$, $R^{115}$, $R^{116}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{113}$, $R^{114}$, $R^{115}$, $R^{116}$ respectively; $A^{13}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

7. The photoreceptor of claim 1, wherein said azo compound is represented by the following Formula [V]

Formula [V]

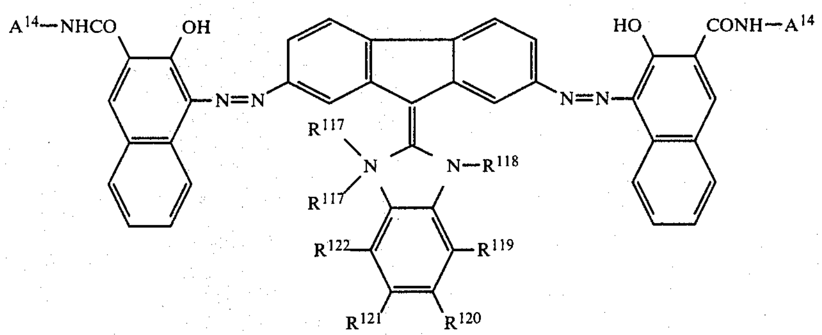

wherein $R^{117}$ $R^{118}$ represents hydrogen, an alkyl group or an aralkyl group; $R^{119}$, $R^{120}$, $R^{121}$, $R^{112}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{119}$, $R^{120}$, $R^{121}$, $R^{122}$ respectively; $A^{14}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

8. The photoreceptor of claim 1, wherein said azo compound is represented by the following Formula [VI]

Formula [VI]

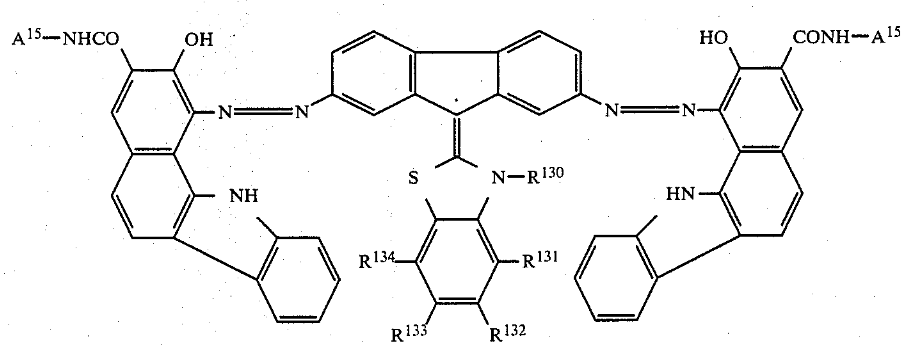

wherein $R^{130}$ represents hydrogen, an alkyl group or an aralkyl group; $R^{131}$, $R^{132}$, $R^{133}$, $R^{134}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{131}$, $R^{132}$, $R^{133}$, $R^{134}$ respectively; $A^{15}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

9. The photoreceptor of claim 1, wherein said azo compound is represented by the following Formula [VII]

Formula [VII]

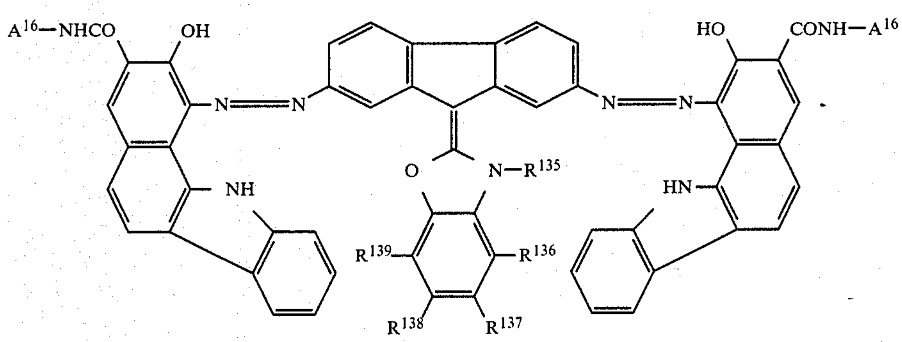

wherein $R^{135}$ represents hydrogen, an alkyl group or an aralkyl group; $R^{136}$, $R^{137}$, $R^{138}$, $R^{139}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{136}$, $R^{137}$, $R^{138}$, $R^{139}$ respectively; $A^{16}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

10. The photoreceptor of claim 1, wherein said azo compound is represented by the following Formula [VIII]

Formula [VIII]

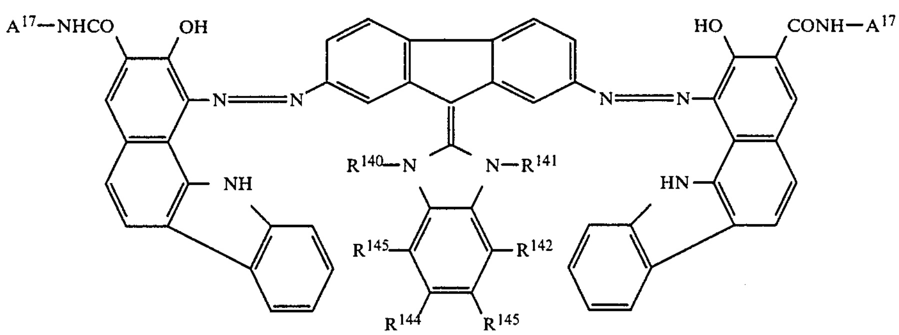

wherein $R^{140}$ $R^{141}$ represents hydrogen, an alkyl group or an aralkyl group; $R^{142}$, $R^{143}$, $R^{144}$, $R^{145}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{142}$, $R^{143}$, $R^{144}$, $R^{145}$ respectively; $A^{17}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

11. The photoreceptor of claim 1, wherein said azo compound is represented by the following Formula [IX]

Formula [IX]

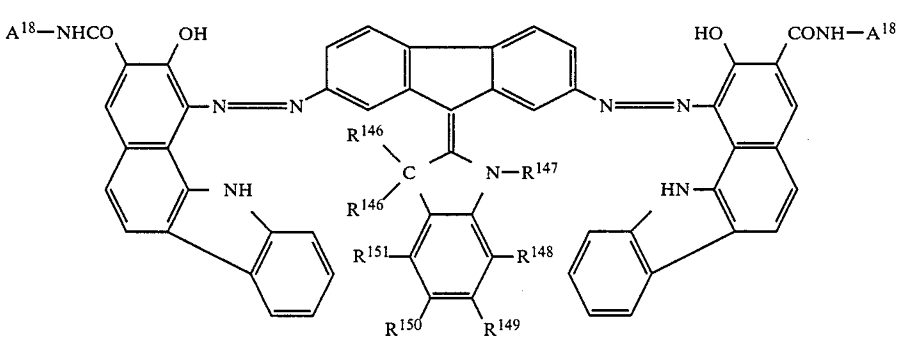

wherein $R^{146}$ $R^{147}$ represents hydrogen, an alkyl group or an aralkyl group; $R^{148}$, $R^{149}$, $R^{150}$, $R^{151}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{148}$, $R^{149}$, $R^{150}$, $R^{151}$ respectively; $A^{18}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

12. The photoreceptor of claim 1, wherein said azo compound is represented by the following Formula [X]

Formula [X]

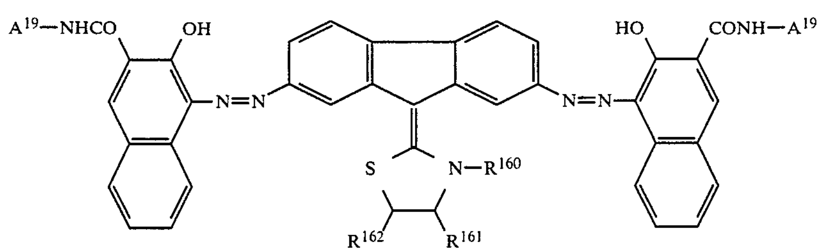

wherein $R^{160}$ represents hydrogen, an alkyl group or an aralkyl group; $R^{161}$, $R^{162}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{161}$, $R^{162}$; $A^{19}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

13. The photoreceptor of claim 1, wherein said azo compound is represented by the following Formula [XI]

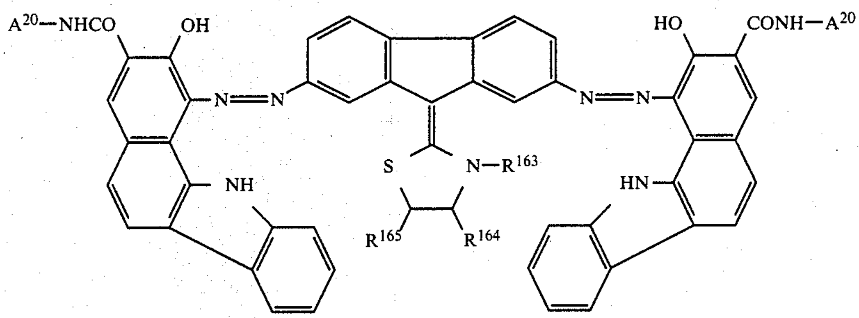

Formula [XI]

wherein $R^{163}$ represents hydrogen, an alkyl group or an aralkyl group; $R^{164}$, $R^{165}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{164}$, $R^{165}$; $A^{20}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

14. The photoreceptor of claim 1, wherein said azo compound is represented by the following Formula [XII]

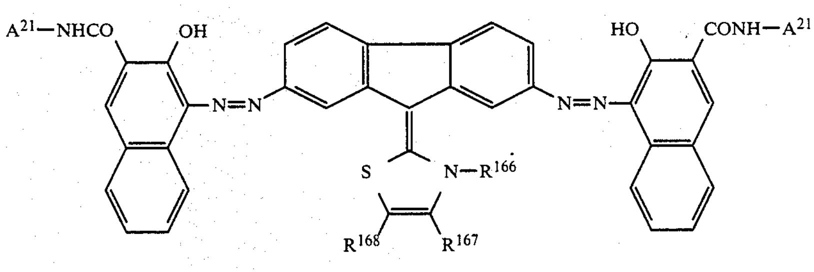

Formula [XII]

wherein $R^{166}$ represents hydrogen, an alkyl group or an aralkyl group; $R^{167}$, $R^{168}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{167}$, $R^{168}$; $A^{21}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

15. The photoreceptor of claim 1, wherein said azo compound is represented by the following Formula [XIII]

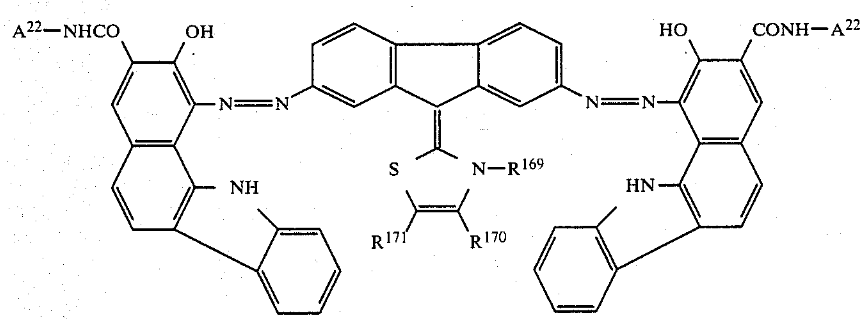

Formula [XIII]

wherein $R^{169}$ represents hydrogen, an alkyl group or an aralkyl group; $R^{170}$, $R^{171}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{170}$, $R^{171}$; $A^{22}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

16. The photoreceptor of claim 1, wherein said azo compound is represented by the following Formula [XIV]

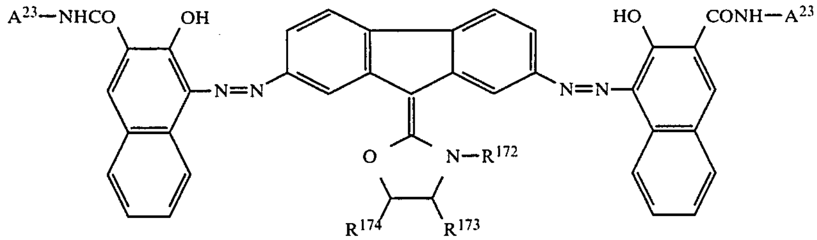

Formula [XIV]

wherein $R^{172}$ represents hydrogen, an alkyl group or an aralkyl group; $R^{173}$, $R^{174}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{173}$, $R^{174}$; $A^{23}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

17. The photoreceptor of claim 1, wherein said azo compound is represented by the following Formula [XV]

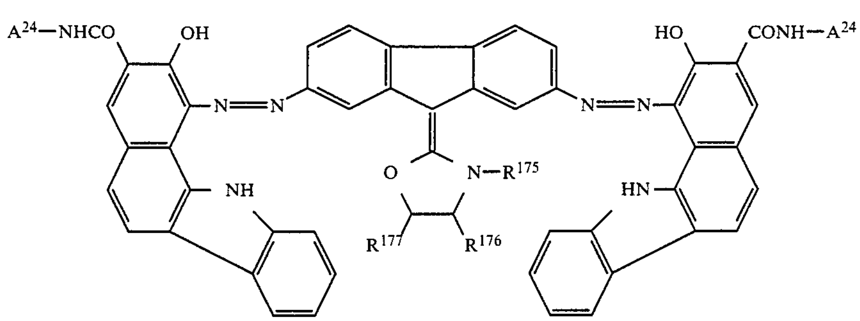

Formula [XV]

wherein $R^{175}$ represents hydrogen, an alkyl group or an aralkyl group; $R^{176}$, $R^{177}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{176}$, $R^{177}$; $A^{24}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

18. The photoreceptor of claim 1, wherein said azo compound is represented by the following Formula [XVI]

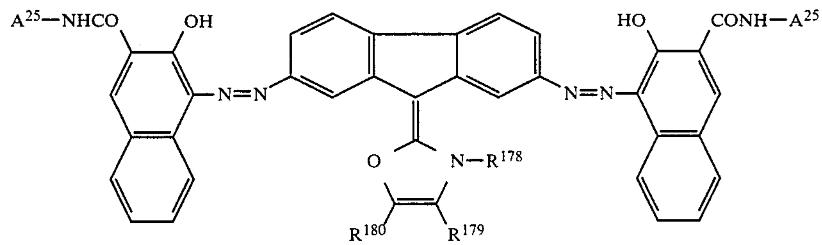

Formula [XVI]

wherein $R^{178}$ represents hydrogen, an alkyl group or an aralkyl group; $R^{179}$, $R^{180}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{179}$, $R^{180}$; $A^{25}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

19. The photoreceptor of claim 1, wherein said azo compound is represented by the following Formula [XVII]

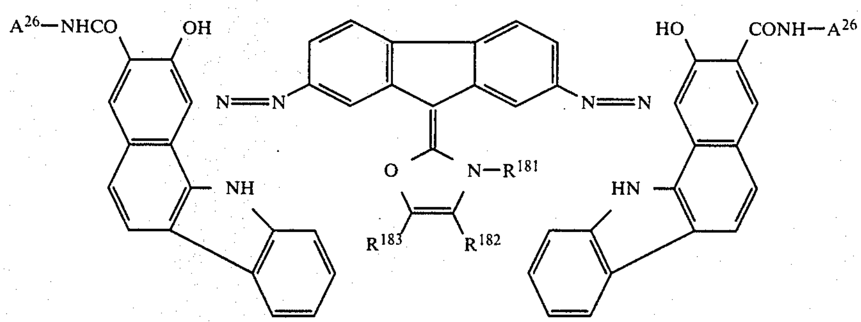

Formula [XVII]

wherein $R^{181}$ represents hydrogen, an alkyl group or an aralkyl group; $R^{182}$, $R^{183}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{182}$, $R^{183}$; $A^{26}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

20. The photoreceptor of claim 1, wherein said azo compound is represented by the following Formula [XVIII]

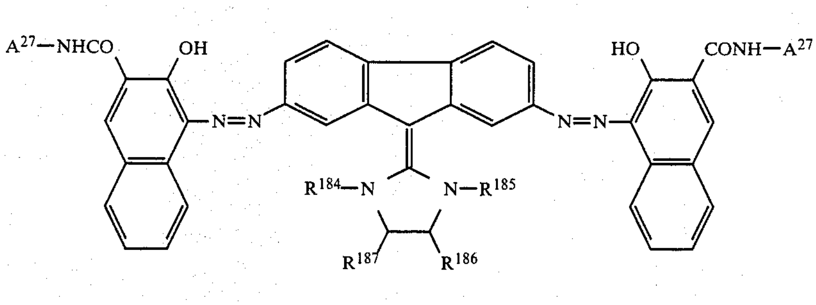

Formula [XVIII]

wherein $R^{184}$ $R^{185}$ represents hydrogen, an alkyl group or an aralkyl group; $R^{186}$, $R^{187}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{186}$, $R^{187}$; $A^{27}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

21. The photoreceptor of claim 1, wherein said azo compound is represented by the following Formula [XIX]

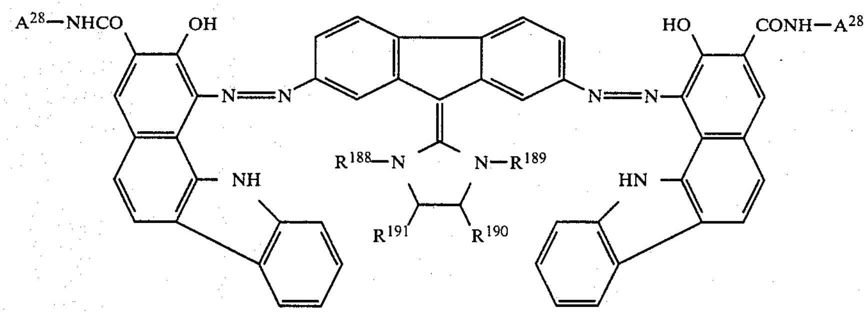

Formula [XIX]

wherein $R^{188}$ $R^{189}$ represents hydrogen, an alkyl group or an aralkyl group; $R^{190}$, $R^{191}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{190}$, $R^{191}$; $A^{28}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

22. The photoreceptor of claim 1, wherein said azo compound is represented by the following Formula [XX]

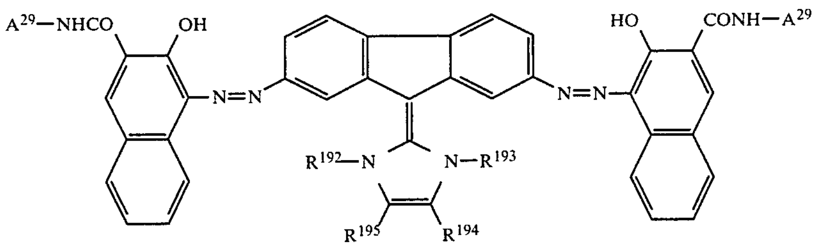

Formula [XX]

wherein $R^{192}$ $R^{193}$ represents hydrogen, an alkyl group or an aralkyl group; $R^{194}$, $R^{195}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{194}$, $R^{195}$; $A^{29}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

24. The photoreceptor of claim 1, wherein said azo compound is represented by the following Formula [XXII]

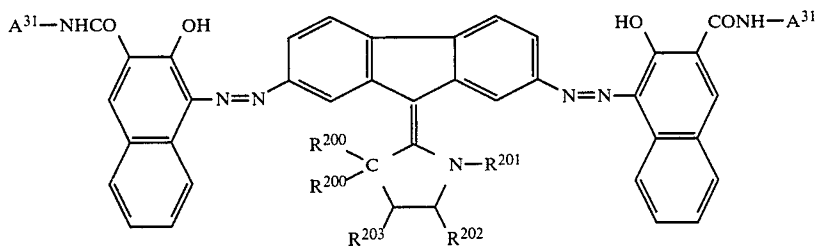

Formula [XXII]

optionally has a substituent selected from the group consisting of alkyl groups, alkoxy groups, halogens, cyano group, ester groups, acyl groups, dialkylamino groups, a diarylamino groups, diaralkylamino groups and hydroxy group.

23. The photoreceptor of claim 1, wherein said azo compound is represented by the following Formula [XXI]

wherein $R^{200}$ $R^{201}$ represents hydrogen, an alkyl group or an aralkyl group; $R^{202}$, $R^{203}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{202}$, $R^{203}$; $A^{31}$ represents an aryl group which

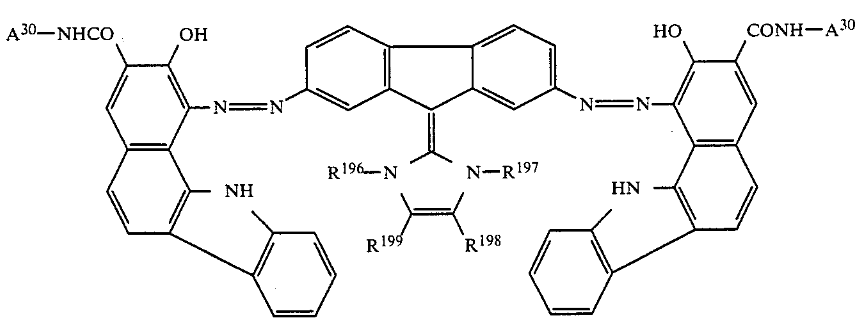

Formula [XXI]

wherein $R^{196}$ $R^{197}$ represents hydrogen, an alkyl group or an aralkyl group; $R^{198}$, $R^{199}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{198}$, $R^{199}$, $A^{30}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

25. The photoreceptor of claim 1, wherein said azo compound is represented by the following Formula [XXIII]

Formula [XXIII]

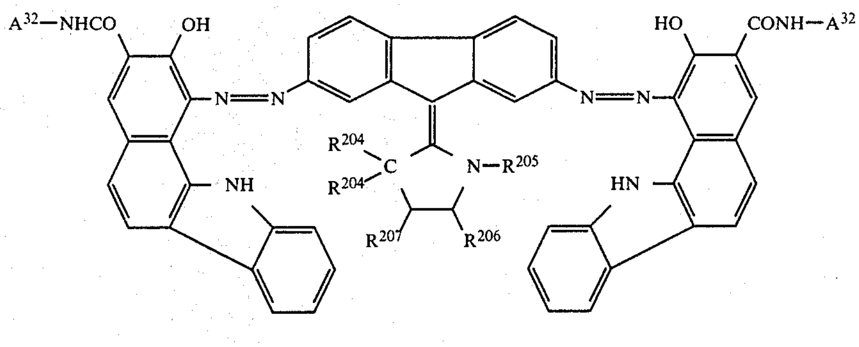

wherein $R^{204}$ $R^{205}$ represents hydrogen, an alkyl group or an aralkyl group; $R^{206}$, $R^{207}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{206}$, $R^{207}$; $A^{32}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

26. The photoreceptor of claim 1, wherein said azo compound is represented by the following Formula [XXIV]

Formula [XXIV]

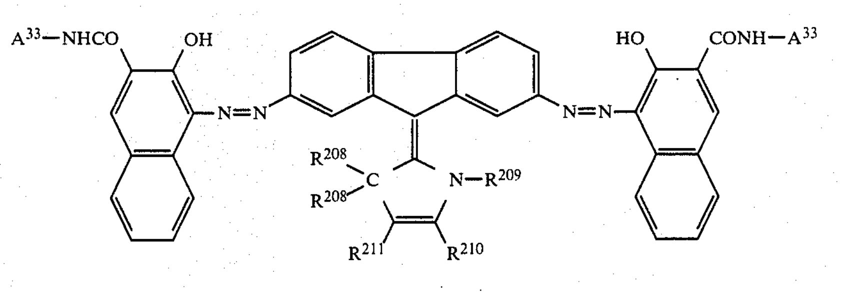

wherein $R^{208}$ $R^{209}$ represents hydrogen, an alkyl group or an aralkyl group; $R^{210}$, $R^{211}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{210}$, $R^{211}$; $A^{33}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

27. The photoreceptor of claim 1, wherein said azo compound is represented by the following Formula [XXV]

Formula [XXV]

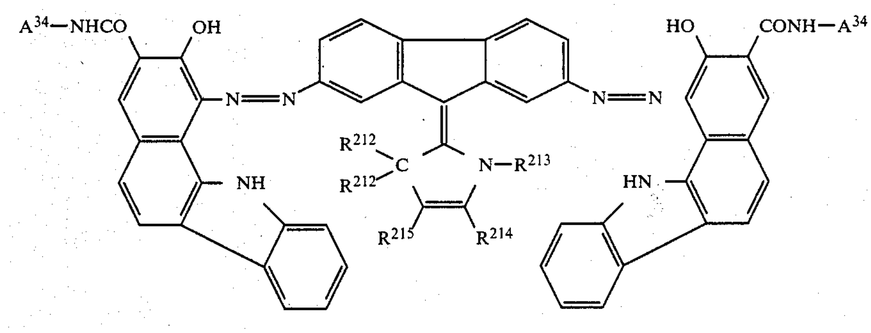

wherein $R^{212}$ $R^{213}$ represents hydrogen, an alkyl group or an aralkyl group; $R^{214}$, $R^{215}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{214}$, $R^{215}$; $A^{34}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

28. The photoreceptor of claim 1, wherein said azo compound is represented by the following Formula [XXVI]

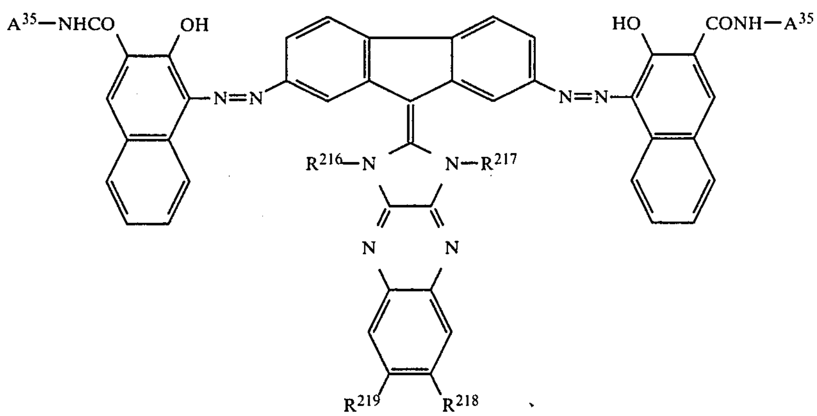

Formula [XXVI]

wherein $R^{216}$ $R^{217}$ represents hydrogen, an alkyl group or an aralkyl group; $R^{218}$, $R^{219}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{218}$, $R^{219}$; $A^{35}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

29. The photoreceptor of claim 1, wherein said azo compound is represented by the following Formula [XXVII]

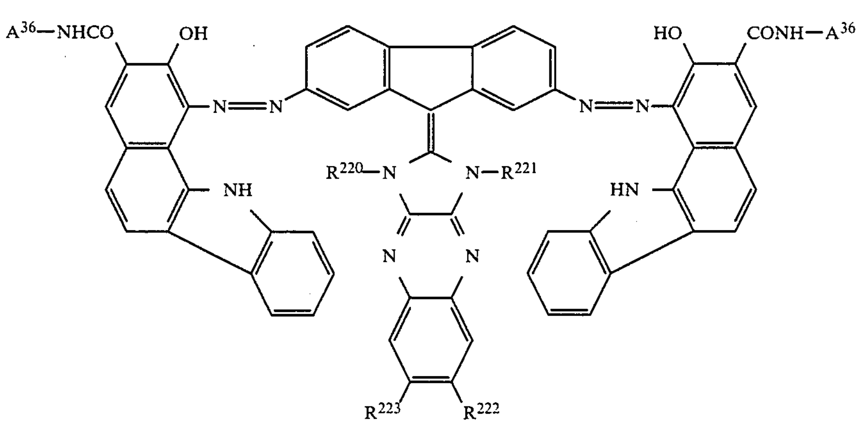

Formula [XXVII]

wherein $R^{220}$ $R^{221}$ represents hydrogen, an alkyl group or an aralkyl group; $R^{222}$, $R^{223}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{222}$, $R^{223}$; $A^{36}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

30. The photoreceptor of claim 1, wherein said azo compound is represented by the following Formula [XXVIII]

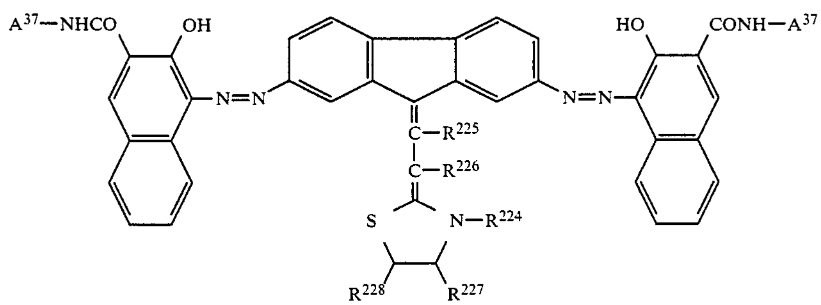

Formula [XXVIII]

wherein $R^{224}$ $R^{225}$ $R^{226}$ represents hydrogen, an alkyl group or an aralkyl group; $R^{227}$, $R^{228}$ each represent hydrogen, an alkyl group, an alkoxy group, a halogen, a cyano group, an ester group, an acyl group, a dialkylamino groups, a diaralkylamino group, a diarylamino group, a nitro group, an amino group, a hydroxy group, an allyl group, or a carbon ring or a heterocyclic ring with $R^{227}$, $R^{228}$; $A^{37}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

31. The photoreceptor of claim 1, wherein said azo compound is represented by the following Formula [XXIX]

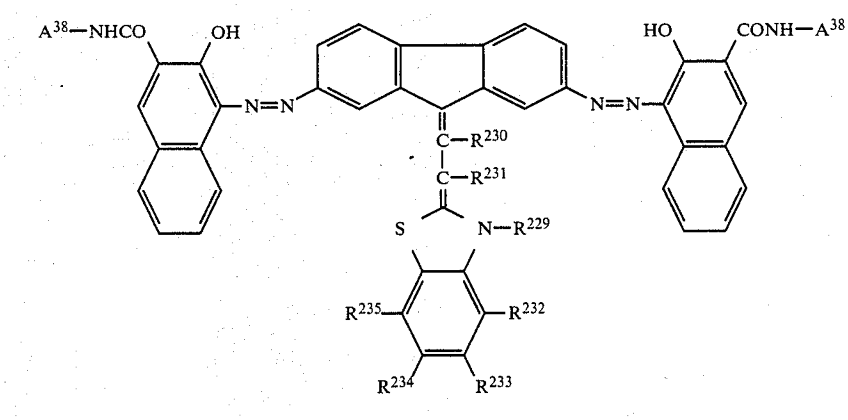

Formula [XXIX]

wherein $R^{229}$ $R^{230}$ $R^{231}$ represents hydrogen, an alkyl group or an aralkyl group; $R^{232}$, $R^{233}$, $R^{234}$, $R^{235}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{232}$, $R^{233}$, $R^{234}$, $R^{235}$ respectively; $A^{38}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

32. The photoreceptor of claim 1, wherein said azo compound is represented by the following Formula [XXX]

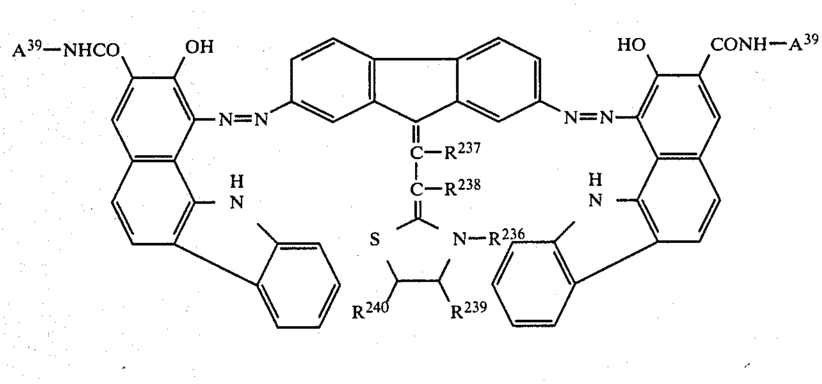

Formula [XXX]

wherein $R^{236}$ $R^{237}$ $R^{238}$ represents hydrogen, an alkyl group or an aralkyl group; $R^{239}$, $R^{240}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{239}$, $R^{240}$; $A^{39}$ represents an aryl group which optionally has a substituent selected from the group consisting of alkyl groups, alkoxy groups, halogens, cyano group, ester groups, acyl groups, dialkylamino groupos, a diarylamino groups, diaralkylamino groups and hydroxy group.

33. The photoreceptor of claim 1, wherein said azo compound is represented by the following Formula [XXXI]

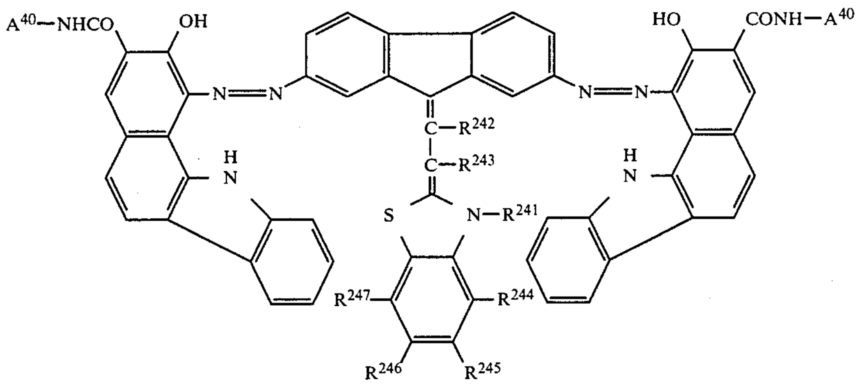

Formula [XXXI]

wherein $R^{241}$ $R^{242}$ $R^{243}$ represents hydrogen, an alkyl group or an aralkyl group; $R^{244}$, $R^{245}$, $R^{246}$, $R^{247}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{244}$, $R^{245}$, $R^{246}$, $R^{247}$ respectively; $A^{40}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

34. The photoreceptor of claim 1, wherein said azo compound is represented by the following Formula [XXXII]

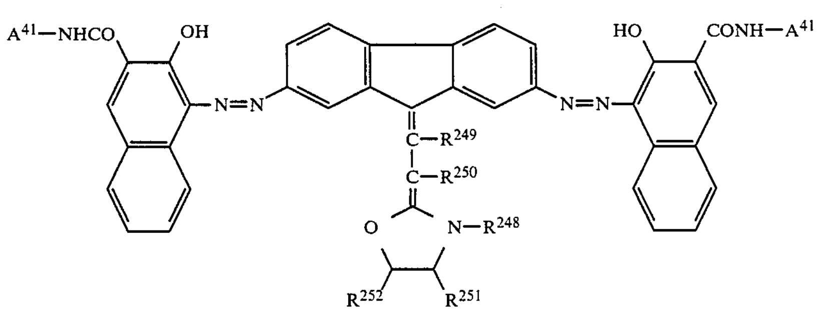

Formula [XXXII]

wherein $R^{248}$ $R^{249}$ $R^{250}$ represents hydrogen, an alkyl group or an aralkyl group; $R^{251}$, $R^{252}$ each represent hydrogen, an alkyl group, an alkoxy group, a halogen, a cyano group, an ester group, an acryl group, a dialkylamino group, a diaralkylamino group, a diarylamino group, a nitro group, an amino group, a hydroxy group, an allyl group, or a carbon ring or a heterocyclic ring with $R^{251}$, $R^{252}$; $A^{41}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

35. The photoreceptor of claim 1, wherein said azo compound is represented by the following Formula [XXXIII]

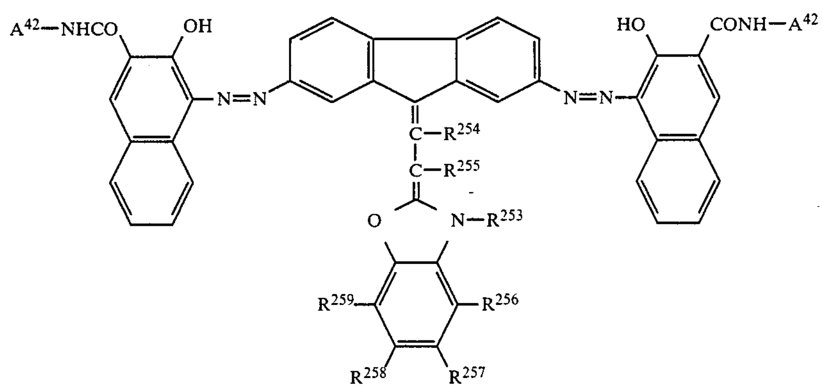

Formula [XXXIII]

wherein $R^{253}$ $R^{254}$ $R^{255}$ represents hydrogen, an alkyl group or an aralkyl group; $R^{256}$, $R^{257}$, $R^{258}$, $R^{259}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{256}$, $R^{257}$, $R^{258}$, $R^{259}$ respectively; $A^{42}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

36. The photoreceptor of claim 1, wherein said azo compound is represented by the following Formula [XXXIV]

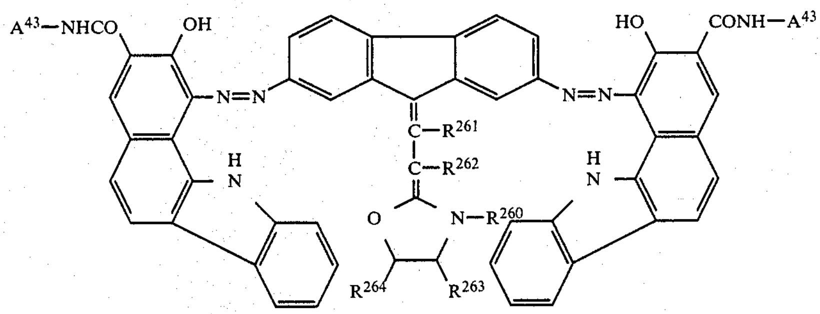

Formula [XXXIV]

wherein $R^{260}$ $R^{261}$ $R^{262}$ represents hydrogen, an alkyl group or an aralkyl group; $R^{263}$, $R^{264}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{263}$, $R^{264}$; $A^{43}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

37. The photoreceptor of claim 1, wherein said azo compound is represented by the following Formula [XXXV]

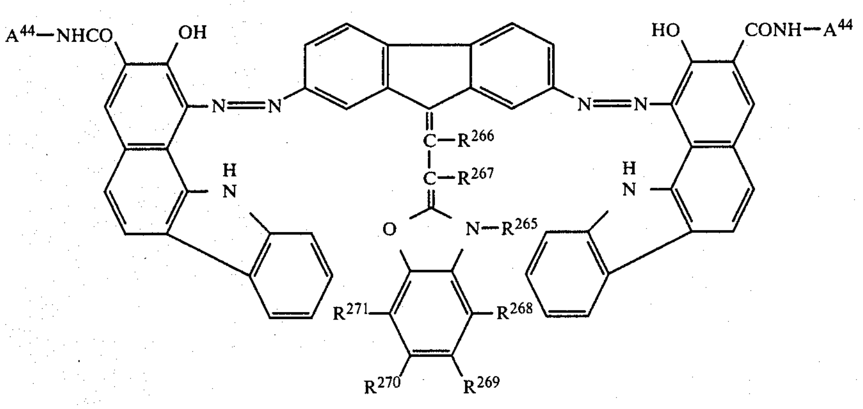

Formula [XXXV]

wherein $R^{265}$ $R^{266}$ $R^{267}$ represents hydrogen, an alkyl group or an aralkyl group; $R^{268}$, $R^{269}$, $R^{270}$, $R^{271}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{268}$, $R^{269}$, $R^{270}$, $R^{271}$ respectively; $A^{44}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

38. The photoreceptor of claim 1, wherein said azo compound is represented by the following Formula [XXXVI]

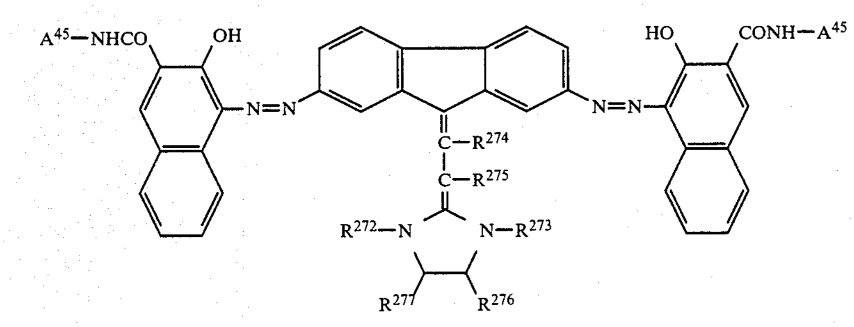

Formula [XXXVI]

wherein $R^{272}$ $R^{273}$ $R^{274}$ $R^{275}$ represents hydrogen, an alkyl group or an aralkyl group; $R^{276}$, $R^{277}$ each represent hydrogen, an alkyl group, an alkoxy group, a halogen, a cyano group, an ester group, an acryl group, a dialkylamino group, a diaralkylamino group, a diarylamino group, a nitro group, an amino group, a hydroxy group, an allyl group, or a carbon ring or a heterocyclic ring with $R^{276}$, $R^{277}$; $A^{45}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

39. The photoreceptor of claim 1, wherein said azo compound is represented by the following Formula [XXXVII]

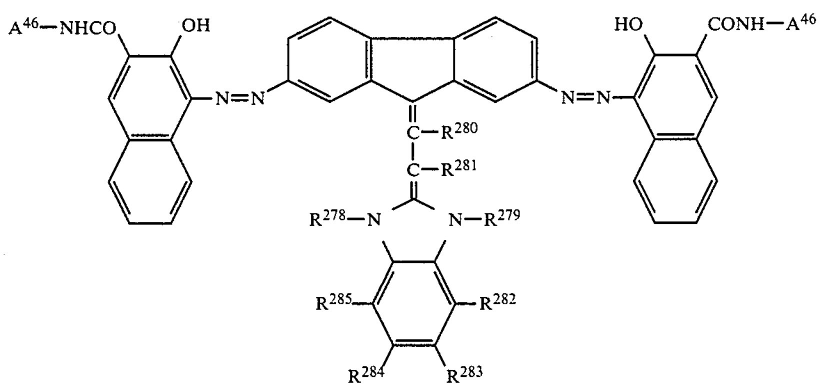

Formula [XXXVII]

wherein $R^{278}$ $R^{279}$ $R^{280}$ $R^{281}$ represents hydrogen, an alkyl group or an aralkyl group; $R^{282}$, $R^{283}$, $R^{284}$, $R^{285}$, each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{282}$, $R^{283}$, $R^{284}$, $R^{285}$ respectively; $A^{46}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

40. The photoreceptor of claim 1, wherein said azo compound is represented by the following Formula [XXXVIII]

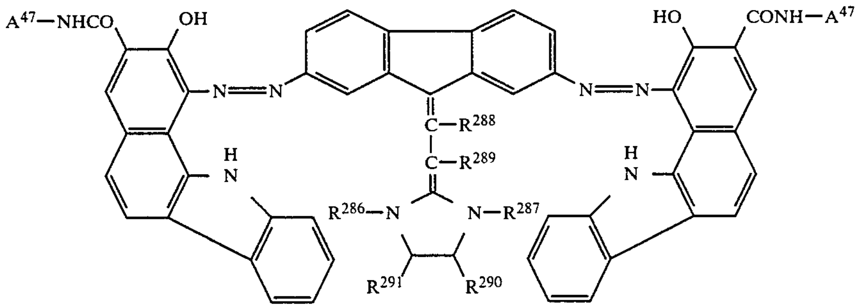

Formula [XXXVIII]

wherein $R^{286}$ $R^{287}$ $R^{288}$ $R^{289}$ represents hydrogen, an alkyl group or an aralkyl group; $R^{290}$, $R^{291}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{290}$, $R^{291}$; $A^{47}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

41. The photoreceptor of claim 1, wherein said azo compound is represented by the following Formula [XXXIX]

Formula [XXXIX]

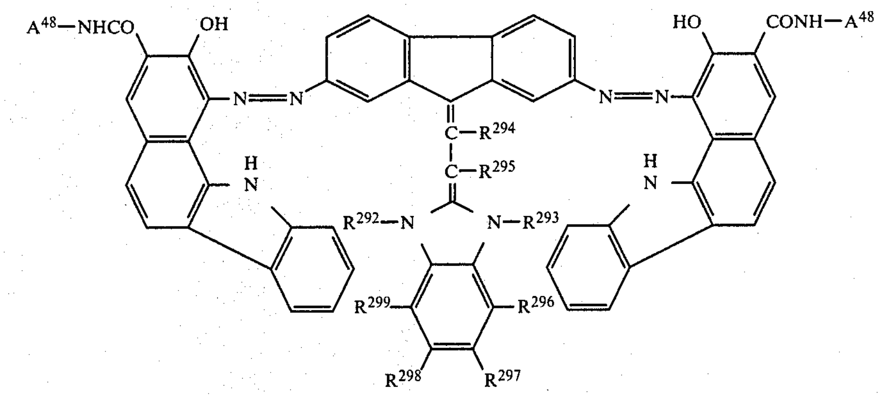

wherein $R^{292}$ $R^{293}$ $R^{294}$ $R^{295}$ represents hydrogen, an alkyl group or an aralkyl group; $R^{296}$, $R^{297}$, $R^{298}$, $R^{299}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{296}$, $R^{297}$, $R^{298}$, $R^{299}$ respectively; $A^{48}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

42. The photoreceptor of claim 1, wherein said azo compound is represented by the following Formula [XXXX]

Formula [XXXX]

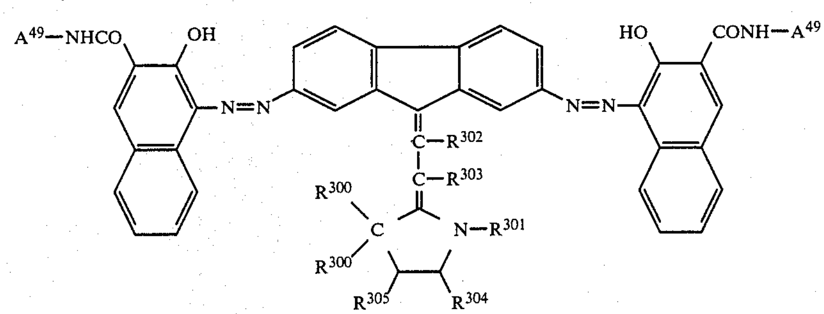

wherein $R^{300}$ $R^{301}$ $R^{302}$ $R^{303}$ represents hydrogen, an alkyl group or an aralkyl group; $R^{304}$, $R^{305}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{304}$, $R^{305}$; $A^{49}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

43. The photoreceptor of claim 1, wherein said azo compound is represented by the following Formula [XXXXI]

Formula [XXXXI]

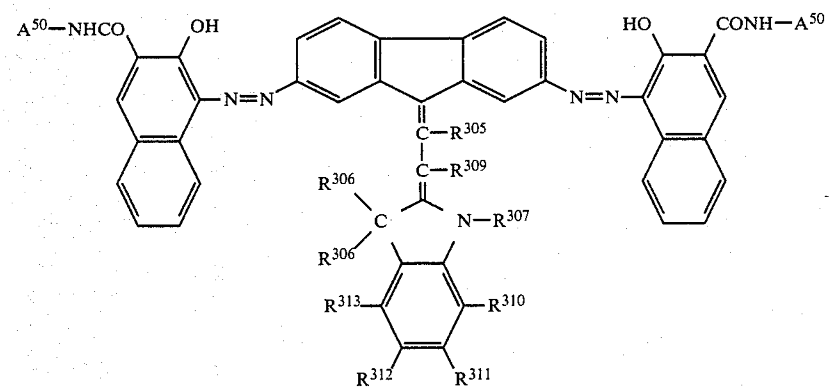

wherein $R^{306}$ $R^{307}$ $R^{308}$ $R^{309}$ represents hydrogen, an alkyl group or an aralkyl group; $R^{310}$, $R^{311}$, $R^{312}$, $R^{313}$ each represent hydrogen, an alkyl group, an alkoxy group, a halogen, a cyano group, an ester group, an acyl group, a dialkylamino group, a diaralkylamino group, a diarylamino group, a nitro group, an aminò group, a hydroxy group, an allyl group, or a carbon ring or a heterocyclic ring with two out of $R^{310}$, $R^{311}$, $R^{312}$, $R^{313}$ respectively; $A^{50}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

44. The photoreceptor of claim 1, wherein said azo compound is represented by the following Formula [XXXXII]

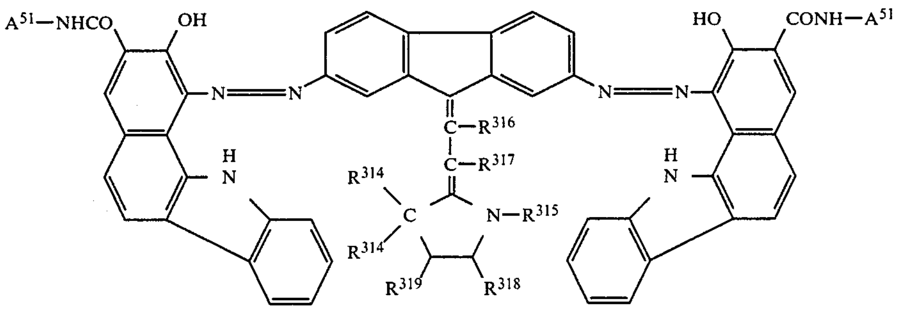

Formula [XXXXII]

wherein $R^{314}$ $R^{315}$ $R^{316}$ $R^{317}$ represents hydrogen, an alkyl group or an aralkyl group; $R^{318}$, $R^{319}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with $R^{318}$, $R^{319}$; $A^{51}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

45. The photoreceptor of claim 1, wherein said azo compound is represented by the following Formula [XXXXIII]

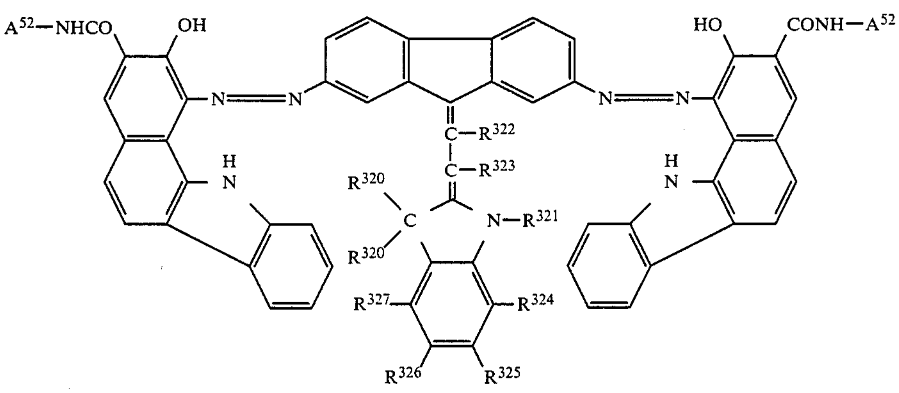

Formula [XXXXIII]

wherein $R^{320}$ $R^{321}$ $R^{322}$ $R^{323}$ represents hydrogen, an alkyl group or an aralkyl group; $R^{324}$, $R^{325}$, $R^{326}$, $R^{327}$ each represent hydrogen, an alkyl group, an alkoxy group, a halogen, a cyano group, an ester group, an acyl group, a dialkylamino group, a diaralkylamino group, a diarylamino group, a nitro group, an amino group, a hydroxy group, an allyl group, or a carbon ring or a heterocyclic ring with two out of $R^{324}$, $R^{325}$, $R^{326}$, $R^{327}$ respectively; $A^{52}$ represents an aryl group which optionally has a substituent selected from the group consisting of alkyl groups, alkoxy groups, halogens, cyano group, ester groups, acyl groups, dialkylamino groups, a diarylamino groups, diaralkylamino groups and hydroxy group.

46. The photoreceptor of claim 2, wherein said carrier transport substance is selected from the group consisting of trinitrofluorenone, tetranitrofluorenone, triazole derivatives, poly-N-vinyl carbazole, oxadiazole derivatives, imidazole derivatives, pyrazoline derivatives, polyarylamine derivatives, phenylenediamine derivatives, hydrazone derivatives, amino-substituted chalcone derivatives, triarylamine derivatives, carbazole derivatives, stilbene derivatives, and phenothiazine derivatives.

47. The photoreceptor of claim 3, wherein said carrier generation layer has the thickness in the range of from 0.1 $\mu m$ to 20 $\mu m$.

48. The photoreceptor of claim 1, wherein said photoreceptor has to intermediate layer.

* * * * *